(12) United States Patent
Barbieru et al.

(10) Patent No.: US 9,725,597 B2
(45) Date of Patent: Aug. 8, 2017

(54) ACID DYES, PROCESS FOR THE PRODUCTION THEREOF AND THEIR USE

(71) Applicant: DyStar Colours Distribution GmbH, Raunheim (DE)

(72) Inventors: Roxana Barbieru, Singapore (SG); Sivamurugan Vajiravelu, Singapore (SG); Wei Tian Loh, Singapore (SG)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 15/032,832

(22) PCT Filed: Oct. 22, 2014

(86) PCT No.: PCT/EP2014/072665
§ 371 (c)(1),
(2) Date: Apr. 28, 2016

(87) PCT Pub. No.: WO2015/062939
PCT Pub. Date: May 7, 2015

(65) Prior Publication Data
US 2016/0257817 A1    Sep. 8, 2016

(30) Foreign Application Priority Data

Oct. 29, 2013 (EP) ..................... 13190651
Oct. 29, 2013 (EP) ..................... 13190656

(51) Int. Cl.
| C09B 35/56 | (2006.01) |
| C09D 11/328 | (2014.01) |
| D21H 21/28 | (2006.01) |
| D06P 5/30 | (2006.01) |
| D06P 1/39 | (2006.01) |

(52) U.S. Cl.
CPC ............ C09B 35/56 (2013.01); C09D 11/328 (2013.01); D06P 1/39 (2013.01); D06P 5/30 (2013.01); D21H 21/28 (2013.01)

(58) Field of Classification Search
CPC ...... C09B 35/56; C09D 11/328; D21H 21/28; D06P 5/30; D06P 1/39
See application file for complete search history.

(56) References Cited

U.S. PATENT DOCUMENTS

| 3,956,294 A | 5/1976 | Eleckenstein et al. |
| 3,959,250 A | 5/1976 | Heinrich et al. |
| 3,960,480 A | 6/1976 | Heinrich et al. |
| 3,979,378 A | 9/1976 | Gnad et al. |
| 4,668,774 A | 5/1987 | Loeffler et al. |
| 4,801,694 A | 1/1989 | Scheibli et al. |
| 5,468,848 A | 11/1995 | Hassenrück et al. |
| 5,543,259 A | 8/1996 | Schwarz et al. |
| 5,728,874 A | 3/1998 | Mullins et al. |
| 2004/0006234 A1 | 1/2004 | Mayo et al. |
| 2009/0207287 A1 | 8/2009 | Miya et al. |

FOREIGN PATENT DOCUMENTS

| CN | 101337925 | * | 1/2009 |
| CN | 101337925 A | | 1/2009 |
| DE | 061174 C | | 2/1892 |
| DE | 072665 C | | 11/1893 |
| DE | 079780 C | | 2/1895 |
| DE | 172106 C | | 6/1906 |
| DE | 2230392 A1 | | 1/1974 |
| DE | 34 16 327 A1 | | 11/1985 |
| EP | 0085465 A1 | | 8/1983 |
| EP | 0632104 A1 | | 1/1995 |
| EP | 2457956 A1 | | 5/2012 |
| FR | 2217384 A1 | | 9/1974 |
| GB | 1331445 A | | 9/1973 |
| GB | 2337053 A | | 11/1999 |
| JP | H01197578 A | | 8/1989 |
| JP | H04212968 A | | 8/1992 |
| WO | WO-2007/045825 A2 | | 4/2007 |
| WO | WO2010/000780 | * | 1/2010 |
| WO | WO-2010/000780 A1 | | 1/2010 |

OTHER PUBLICATIONS

International Search Report for PCT/EP2014/072665 mailed Feb. 6, 2015.
U.S. Appl. No. 15/032,802, filed Apr. 28, 2016, Barbieru et al.
U.S. Appl. No. 15/032,704, filed Apr. 28, 2016, Barbieru et al.
U.S. Appl. No. 15/032,724, filed Apr. 28, 2016, Vajiravelu et al.

* cited by examiner

*Primary Examiner* — Amina Khan
(74) *Attorney, Agent, or Firm* — Drinker Biddle & Reath LLP

(57) ABSTRACT

Dye(s) of formula (I)

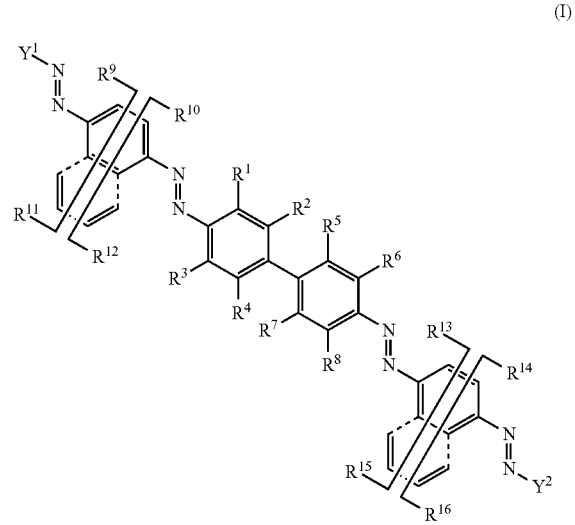

process for their production and their use are described.

21 Claims, No Drawings

ACID DYES, PROCESS FOR THE PRODUCTION THEREOF AND THEIR USE

CROSS-REFERENCE TO RELATED APPLICATIONS

This application is a national stage application (under 35 U.S.C. §371) of PCT/EP2014/072665, filed Oct. 22, 2014, which claims benefit of European Application Nos. 13190651.3, and 13190656.2, both filed Oct. 29, 2013, and all of which are incorporated herein by reference in their entireties.

The present invention relates to the technical field of dyestuffs for dyeing and printing of hydroxyl- and/or carboxamido-containing material.

Acid dyes with bridging groups are known from prior art and can be used as colorants in different applications, see for example GB 1,331,445, DE 34 16 327, U.S. Pat. No. 3,979,378, U.S. Pat. No. 5,543,259, US 2009/207287 A1, WO2010/000780 and CN 101337925 A. Acid dyes with pyridine couplers are known from the prior art and can be used as colorants in different applications, see for example U.S. Pat. No. 3,959,250, U.S. Pat. No. 5,468,848 and WO 2007/045825.

However, in the context of the dyeing and printing of hydroxyl- and/or carboxamido-containing material the known dyes have a number of technical disadvantages, which require improvement. One such disadvantage is, that many of them are comprising heavy metals such as Cu, Cr or Ni. Such heavy metals are critical from a toxicological as well as an environmental point of view and shall thus be excluded.

Surprisingly, it has now been found that the dyes of the formula (I) as described below show highly advantageous properties over the known dyes. These include high tinctorial strength with high brilliancy as well as high fastness properties such as wash, contact and light fastness on the materials mentioned above, on blends containing them as well as on microfibres. Most importantly, dyes of formula (I) are substantially heavy metal free and provide dyeings that are leveled. Metals may only be present as counter ions and are selected from the groups of alkali and earth alkali metals, which do not have such effects as heavy metals.

The present invention refers to dye(s) of formula (I)

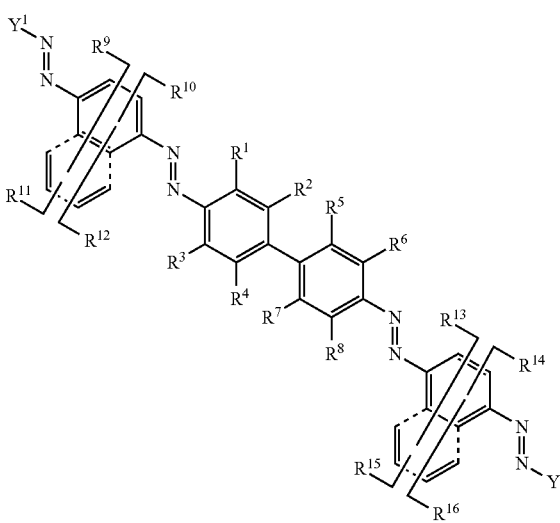

(I)

wherein independent from each other
$Y^1$ is formula IIa

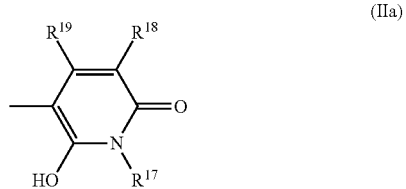

(IIa)

or formula II b,

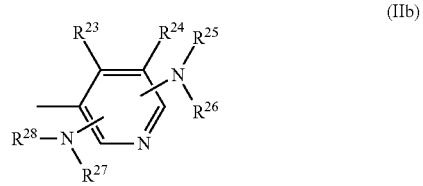

(IIb)

$Y^2$ is formula IIIa

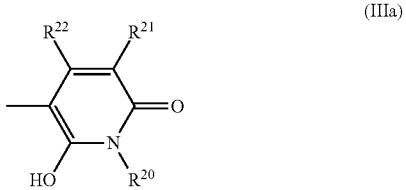

(IIIa)

or formula IIIb,

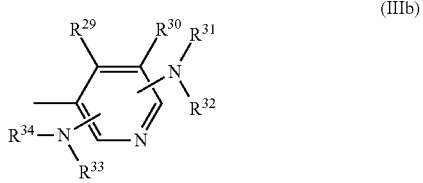

(IIIb)

$R^1$, $R^2$, $R^3$, $R^4$, $R^5$, $R^6$, $R^7$ and $R^8$ independent of each other is hydrogen, alkyl, alkoxy, halogen, trifluoromethyl or $SO_3M$,
whereby at least two of them are $SO_3M$,
$R^9$, $R^{10}$, $R^{11}$, $R^{12}$, $R^{13}$, $R^{14}$, $R^{15}$, $R^{16}$ independent of each other is hydrogen, alkyl, substituted alkyl, alkyl interrupted by one or two heteroatoms selected from the group consisting of oxygen and sulphur, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —$SO_3M$ or alkylureido,
$R^{17}$ and $R^{20}$ independent of each other is hydrogen, alkyl, alkenyl, cycloalkyl, trifluoromethyl, aryl, heteroaryl, heterocycloalkyl, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoaryl-carbamoyl, N-monoalkyl-N-monoarylcarbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N- monoaryl-sulfamoyl, N-monoalkyl-N-monoaryl-sulfamoyl, amino, N-acylamino, N-thioacylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino, N-heteroarylamino, N-heterocycloalkylamino, hydroxyalkylsulfonylalkyl or alkyl interrupted by one or more heteroatoms selected from the group consisting of oxygen and sulphur or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoaryl-carbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and SO₃M, or alkyl interrupted by one or more heteroatoms selected from the group consisting of oxygen and sulphur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoaryl-sulfamoyl and SO₃M, $R^{19}$ and $R^{21}$ independent of each other is cyano, carbamoyl, substituted carbamoyl, alkoxycarbonyl, trifluoromethyl, carbonyltrifluoromethyl, alkylsulfonyl, halogen, alkylsulfonic acid or SO₃M, $R^{19}$ and $R^{22}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, arylthio or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{23}$ and $R^{29}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, arylthio or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{24}$ and $R^{93}$ independent of each other is cyano, carbamoyl, substituted carbamoyl, alkoxycarbonyl, trifluoromethyl, carbonyltrifluoromethyl or halogen, $R^{25}$, $R^{26}$, $R^{27}$, $R^{28}$, $R^{31}$, $R^{32}$, $R^{33}$ and $R^{34}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyakylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocyclo-alkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenyilureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-di-aryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and SO₃M or alkyl interrupted by one or more heteroatoms selected from the group consisting of oxygen and sulfur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenyilureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoarylcarbamoyl, N,N-diaryl-carbamoyl, N-mono-cycloalkyl-N-monoaryl-carbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, M is hydrogen, an alkali metal, ammonium, one equivalent of an alkali earth metal or a monovalent organic cation, the dyes of formula (I) have two to six sulfonic acid groups and whereby the bonds with unfixed attachment points on the pyridine couplers mean that the amino rests bearing the substituents $R^{25}$, $R^{26}$, $R^{27}$ and $R^{28}$, respectively can be positioned ortho or para to $R^{24}$, meaning that when the amino rest bearing the substituents $R^{25}$ and $R^{26}$ is positioned ortho to $R^{24}$, the amino rest bearing the substituents $R^{27}$ to $R^{28}$ is positioned para to $R^{24}$, and vice versa; and the same applies to the amino rests bearing the substituents $R^{31}$, $R^{32}$, $R^{33}$ to $R^{34}$, respectively that can be positioned ortho or para to $R^{30}$, meaning that when the amino rest bearing the substituents $R^{31}$ and $R^{32}$ is positioned ortho to $R^{30}$, the amino rest bearing the substituents $R^{33}$ to $R^{34}$ is positioned para to $R^{30}$, and vice versa.

This invention refers to all tautomeric and geometric isomers of the dyes of formula (I).

Alkyl groups appearing in this invention may be straight-chain or branched and are $(C_1-C_{12})$-alkyl groups, preferably $(C_1-C_5)$-alkyl groups, for example n-butyl, isobutyl, n-pentyl, isopentyl, n-hexyl, 2-ethylhexyl, sec-butyl, tert-butyl and methylbutyl.

The same applies to alkoxy groups which accordingly are preferably $(C_1-C_8)$-alkoxy, for example methoxy and ethoxy, to thioalkoxy groups, which are preferably $(C_1-C_8)$-thioalkoxy, for example —$SCH_3$ or —$SC_2H_5$.

Cycloalkyl groups are preferably $(C_3-C_8)$-cycloalkyl and especially preferably cyclopentyl and cyclohexyl. The term cycloalkyl comprises for the purpose of the present invention substituted cycloalkyl groups and unsaturated cycloalkyl groups as well. A preferred group of this type is cyclopentenyl. Preferred substituents are alkyl, hydroxyalkyl, halogen, hydroxyl, alkoxy, acyl, cyano, nitro, amino, monoalkylamino, dialkylamino, mono(hydroxyalkyl)amino, bis-(hydroxyalkyl)amino, monoalkyl-mono(hydroxyalkyl)amino, carbamoyl, sulfamoyl, acylamino, ureido, aminosulfonylamino, alkoxycarbonyl and acyloxy.

Alkenyl groups may be straight-chain or branched and are preferably $(C_2-C_6)$-groups for example vinyl and allyl. The term alkenyl comprises for the purpose of the present invention alkynyl groups as well, for example ethynyl and propargyl.

Aryl groups appearing in this invention are preferably phenyl or naphthyl. The terms phenyl and naphthyl comprise unsubstituted as well as substituted phenyl and naphthyl. Preferred substituents are alkyl, cycloalkyl, heterocycloalkyl, hydroxyalkyl, halogen, hydroxyl, alkoxy, alkylthio, acyl, nitro, cyano, amino, monoalkylamino, dialkylamino, mono(hydroxyalkyl)amino, bis (hydroxyalkyl)amino, monoalkyl-mono(hydroxyalkyl)amino, carbamoyl, sulfamoyl, acylamino, ureido, aminosulfonylamino, alkoxycarbonyl and acyloxy.

Heteroaryl groups appearing in this invention are preferably pyridine, pyrimidine, pyridazine, pyrazine, pyrrole, imidazole, pyrazole, 1,2,4-thiadiazole, 1,2,4-triazole, tetrazole, thiophene, thiazole, isothiazole, benzothiazole, benzoisothiazole, 1,3,4-thiadiazole, furane, oxazole, benzoxazole or isoxazole. The terms heteroayl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis (hydroxyalkyl)amino, monoalkyl-mono(hydroxyalkyl) amino, carbamoyl, sulfamoyl, acylamino, ureido, aminosulfonylamino, alkoxycarbonyl and acyloxy.

Heterocycloalkyl groups are preferably pyrrolidine, piperidine, morpholine, tetrahydrofuran or piperazine. The terms heterocycloalkyl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis (hydroxyalkyl)amino, monoalkyl-mono(hydroxyalkyl)amino, carbamoyl, sulfamoyl, acylamino, aminocarbonylamino, aminosulfonylamino, alkoxycarbonyl and acyloxy.

Halogen is preferably chlorine, bromine or fluorine.

M is preferably hydrogen, lithium, sodium, potassium or mono-, di-, tri- or tetra-$(C_1-C_4)$-alkylammonium.

There exist some groups of preferred dyes. In one group of preferred dyes $Y^1$ is a group of formula (IIa) and $Y^2$ is a group of formula (IIIa). In another preferred group of dyes $Y^1$ is a group of formula (IIb) and $Y^2$ is a group of formula (IIIb). Also dyes wherein $Y^1$ is a group of formula (IIa) and $Y^2$ is a group of formula (IIIb) or the other way round forms a preferred embodiment of the present invention.

Accordingly Dye(s) of Formula (1)

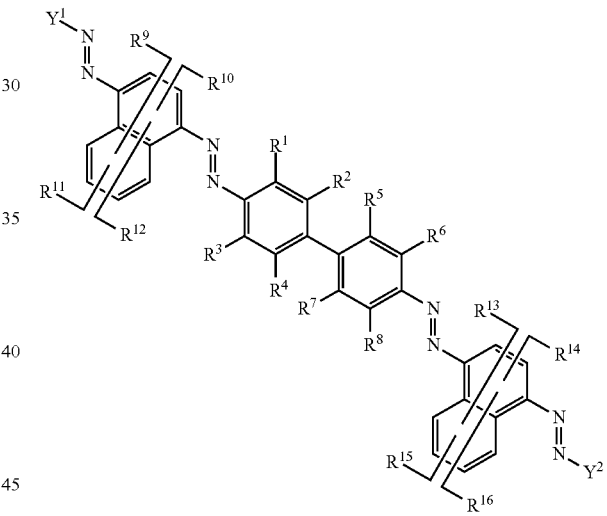

(1)

wherein
$Y^1$ is formula IIa

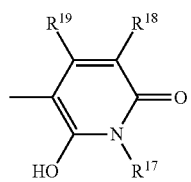

(IIa)

$Y^2$ is formula IIIa

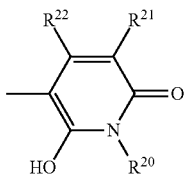

(IIIa)

$R^1$, $R^2$, $R^3$, $R^4$, $R^5$, $R^6$, $R^7$ and $R^6$ independent of each other is hydrogen, alkyl, alkoxy, halogen, trifluoromethyl or $SO_3M$, whereby at least two of them are $SO_3M$, $R^9$, $R^{10}$, $R^{11}$, $R^{12}$, $R^{13}$, $R^{14}$, $R^{15}$, $R^{16}$ independent of each other is hydrogen, alkyl, substituted alkyl, alkyl interrupted by one or two heteroatoms selected from the group consisting of oxygen and sulphur, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —$SO_3M$ or alkylureido, $R^{17}$ and $R^{20}$ independent of each other is hydrogen, alkyl, alkenyl, cycloalkyl, trifluoromethyl, aryl, heteroaryl, heterocycloalkyl, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoaryl-carbamoyl, N-monoalkyl-N-monoarylcarbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoaryl-sulfamoyl, amino, N-acylamino, N-thioacylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino, N-heteroarylamino, N-heterocycloalkylamino, hydroxyalkylsulfonylalkyl
or
alkyl interrupted by one or more heteroatoms selected from the group consisting of oxygen and sulphur
or
alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoaryl-carbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$,
or
alkyl interrupted by one or more heteroatoms selected from the group consisting of oxygen and sulphur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, $R^{18}$ and $R^{21}$ independent of each other is cyano, carbamoyl, alkoxycarbonyl, trifluoromethyl, carbonyltrifluoromethyl, alkylsulfonyl, halogen, alkylsulfonic acid or $SO_3M$, $R^{19}$ and $R^{22}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, arylthio
or
is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, M is hydrogen, an alkali metal, ammonium, one equivalent of an alkali earth metal or a monovalent organic cation and the dyes of formula (1) have two to six sulfonic acid groups form one preferred embodiment of the present invention.

Particularly preferred dyes of the present invention are those of formula (1a)

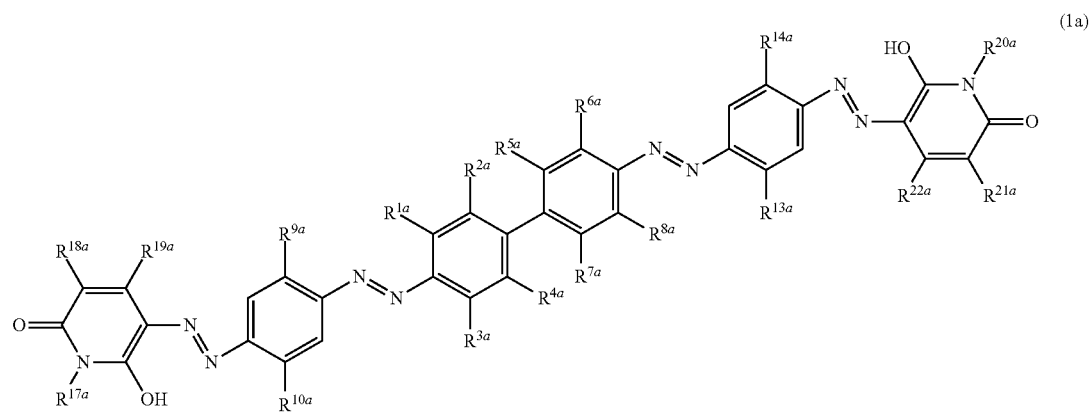

wherein $R^{1a}$, $R^{2a}$, $R^{3a}$, $R^{4a}$, $R^{5a}$, $R^{6a}$, $R^{7a}$ and $R^{8a}$ independent of each other is hydrogen, alkyl, alkoxy, halogen, trifluoromethyl or $SO_3M$ whereby at least two of them are $SO_3M$, $R^{9a}$, $R^{10a}$, $R^{13a}$ and $R^{14a}$ independently of one another are hydrogen, $(C_1$-$C_4)$-alkyl, $(C_1$-$C_4)$-alkoxy, halogen, trifluoromethyl, —$SO_3M$ or $(C_1$-$C_4)$-acylamino, $R^{17a}$ and $R^{20a}$ independent of each other is hydrogen, alkyl, alkenyl, cycloalkyl, trifluoromethyl, aryl, heteroaryl, heterocycloalkyl, carbamoyl, sulfamoyl, amino, N-acylamino, ureido, alkylureido, phenylureido, N-monoalkylamino, N,N-dialkyl-amino, N-arylamino, N,N-diarylamino, N-alkyl-N-aryl-amino, N-monocycloalkyl-amino, N,N-dicycloalkylamino, N-alkyl-N-cycloalkyl-amino, N-aryl-N-cycloalkyl-amino, hydroxylalkylsulfonylalkyl or alkyl interrupted by one or more heteroatoms selected from the group consisting of oxygen and sulphur or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, $R^{18a}$ and $R^{21a}$ independent of each other is cyano, carbamoyl or alkoxycarbonyl, $R^{19a}$ and $R^{22a}$ independent of each other is unsubstituted, linear or branched $(C_1$-$C_4)$ alkyl, unsubstituted $(C_5$-$C_7)$ cycloalkyl or substituted $(C_5$-$C_7)$ cycloalkyl with one or more substituents such as methyl, ethyl, isobutyl, sec-butyl, tert-butyl and methylbutyl and M is hydrogen, an alkali metal, ammonium, one equivalent of an alkali earth metal or a monovalent organic cation.

In especially preferred dyes of formula (1a)

$R^{1a}$, $R^{3a}$, $R^{4a}$, $R^{5a}$, $R^{6a}$ and $R^{8a}$ independent from each other is $SO_3M$, hydrogen, alkyl, alkoxy or halogen,—whereby at least two of them are $SO_3M$, $R^{2a}$ and $R^{7a}$ is hydrogen, $R^{9a}$, $R^{10a}$, $R^{13a}$ and $R^{14a}$ independent of each other is hydrogen, methyl, halogen, —$SO_3M$ or acetylamino, $R^{17a}$ and $R^{20a}$ independent of each other is methyl, ethyl, butyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentene-2-yl, 2-ethylhexyl, 2,2-dimethylpropyl, phenyl, benzyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 6-hydroxy-1-[2-(2-hydroxyethylsulfanyl)-ethyl], 2-(2-tertbutylsulfanylethanesulfonyl)-ethyl, 2-(ethylsulfonyl)ethanol, 3-(4-hydroxybutoxy)propyl, 2-(2-hydroxyethoxy)ethyl, 3-Isopropoxy propyl or 3-ethoxypropyl, $R^{18a}$ and $R^{21a}$ independent of each other is cyano or carbamoyl, $R^{19a}$ and $R^{22a}$ is methyl and M is hydrogen, sodium, potassium, lithium or ammonium.

Examples of preferred dyes of the formula (1a) are the compounds of the formulae ($1a^1$ to $1a^{1249}$) as shown in Table 1, whereby $R^{2a}$ and $R^{7a}$ is hydrogen;

TABLE 1

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^1$ | H | $SO_3H$ | H | H | $SO_3H$ | H | Methyl | Methyl | CN | Methyl | Methyl |
| $1a^2$ | H | H | $SO_3H$ | $SO_3H$ | H | H | | | | | |
| $1a^3$ | Methyl | H | $SO_3H$ | $SO_3H$ | H | Methyl | | | | | |
| $1a^4$ | OMe | H | $SO_3H$ | $SO_3H$ | H | OMe | | | | | |
| $1a^5$ | F | H | $SO_3H$ | $SO_3H$ | H | F | | | | | |
| $1a^6$ | $CF_3$ | H | $SO_3H$ | $SO_3H$ | H | $CF_3$ | | | | | |
| $1a^7$ | H | $SO_3H$ | H | H | $SO_3H$ | H | Methyl | Methyl | CN | Methyl | Ethyl |
| $1a^8$ | H | H | $SO_3H$ | $SO_3H$ | H | H | | | | | |
| $1a^9$ | Methyl | H | $SO_3H$ | $SO_3H$ | H | Methyl | | | | | |
| $1a^{10}$ | OMe | H | $SO_3H$ | $SO_3H$ | H | OMe | | | | | |
| $1a^{11}$ | H | H | $SO_3H$ | $SO_3H$ | H | F | | | | | |
| $1a^{12}$ | $CF_3$ | H | $SO_3H$ | $SO_3H$ | H | $CF_3$ | | | | | |
| $1a^{13}$ | H | $SO_3H$ | H | H | $SO_3H$ | H | Methyl | Methyl | CN | Methyl | Propyl |
| $1a^{14}$ | H | H | $SO_3H$ | $SO_3H$ | H | H | | | | | |
| $1a^{15}$ | Methyl | H | $SO_3H$ | $SO_3H$ | H | Methyl | | | | | |
| $1a^{16}$ | OMe | H | $SO_3H$ | $SO_3H$ | H | OMe | | | | | |
| $1a^{17}$ | F | H | $SO_3H$ | $SO_3H$ | H | F | | | | | |
| $1a^{18}$ | $CF_3$ | H | $SO_3H$ | $SO_3H$ | H | $CF_3$ | | | | | |
| $1a^{19}$ | H | $SO_3H$ | H | H | $SO_3H$ | H | Methyl | Methyl | CN | Methyl | Butyl |
| $1a^{20}$ | H | H | $SO_3H$ | $SO_3H$ | H | H | | | | | |
| $1a^{21}$ | Methyl | H | $SO_3H$ | $SO_3H$ | H | Methyl | | | | | |
| $1a^{22}$ | OMe | H | $SO_3H$ | $SO_3H$ | H | OMe | | | | | |
| $1a^{23}$ | F | H | $SO_3H$ | $SO_3H$ | H | F | | | | | |
| $1a^{24}$ | $CF_3$ | H | $SO_3H$ | $SO_3H$ | H | $CF_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{25}$ | H | $SO_3H$ | H | H | $SO_3H$ | H | Methyl | Methyl | CN | Methyl | Pentyl |
| $1a^{26}$ | H | H | $SO_3H$ | $SO_3H$ | H | H | | | | | |
| $1a^{27}$ | Methyl | H | $SO_3H$ | $SO_3H$ | H | Methyl | | | | | |
| $1a^{28}$ | OMe | H | $SO_3H$ | $SO_3H$ | H | OMe | | | | | |
| $1a^{29}$ | F | H | $SO_3H$ | $SO_3H$ | H | F | | | | | |
| $1a^{30}$ | $CF_3$ | H | $SO_3H$ | $SO_3H$ | H | $CF_3$ | | | | | |
| $1a^{31}$ | H | $SO_3H$ | H | H | $SO_3H$ | H | Methyl | Methyl | CN | Methyl | Hexyl |
| $1a^{32}$ | H | H | $SO_3H$ | $SO_3H$ | H | H | | | | | |
| $1a^{33}$ | Methyl | H | $SO_3H$ | $SO_3H$ | H | Methyl | | | | | |
| $1a^{34}$ | OMe | H | $SO_3H$ | $SO_3H$ | H | OMe | | | | | |
| $1a^{35}$ | F | H | $SO_3H$ | $SO_3H$ | H | F | | | | | |
| $1a^{36}$ | $CF_3$ | H | $SO_3H$ | $SO_3H$ | H | $CF_3$ | | | | | |
| $1a^{37}$ | H | $SO_3H$ | H | H | $SO_3H$ | H | Methyl | Methyl | CN | Methyl | Cyclobutyl |
| $1a^{38}$ | H | H | $SO_3H$ | $SO_3H$ | H | H | | | | | |
| $1a^{39}$ | Methyl | H | $SO_3H$ | $SO_3H$ | H | Methyl | | | | | |
| $1a^{40}$ | OMe | H | $SO_3H$ | $SO_3H$ | H | OMe | | | | | |
| $1a^{41}$ | F | H | $SO_3H$ | $SO_3H$ | H | F | | | | | |
| $1a^{42}$ | $CF_3$ | H | $SO_3H$ | $SO_3H$ | H | $CF_3$ | | | | | |
| $1a^{43}$ | H | $SO_3H$ | H | H | $SO_3H$ | H | Methyl | Methyl | CN | Methyl | Cyclopentyl |
| $1a^{44}$ | H | H | $SO_3H$ | $SO_3H$ | H | H | | | | | |
| $1a^{45}$ | Methyl | H | $SO_3H$ | $SO_3H$ | H | Methyl | | | | | |
| $1a^{46}$ | OMe | H | $SO_3H$ | $SO_3H$ | H | OMe | | | | | |
| $1a^{47}$ | F | H | $SO_3H$ | $SO_3H$ | H | F | | | | | |
| $1a^{48}$ | $CF_3$ | H | $SO_3H$ | $SO_3H$ | H | $CF_3$ | | | | | |
| $1a^{49}$ | H | $SO_3H$ | H | H | $SO_3H$ | H | Methyl | Methyl | CN | Methyl | Cyclohexyl |
| $1a^{50}$ | H | H | $SO_3H$ | $SO_3H$ | H | H | | | | | |
| $1a^{51}$ | Methyl | H | $SO_3H$ | $SO_3H$ | H | Methyl | | | | | |
| $1a^{52}$ | OMe | H | $SO_3H$ | $SO_3H$ | H | OMe | | | | | |
| $1a^{53}$ | F | H | $SO_3H$ | $SO_3H$ | H | F | | | | | |
| $1a^{54}$ | $CF_3$ | H | $SO_3H$ | $SO_3H$ | H | $CF_3$ | | | | | |
| $1a^{55}$ | H | $SO_3H$ | H | H | $SO_3H$ | H | Methyl | Methyl | CN | Methyl | 2-Methyl-cyclohexyl |
| $1a^{56}$ | H | H | $SO_3H$ | $SO_3H$ | H | H | | | | | |
| $1a^{57}$ | Methyl | H | $SO_3H$ | $SO_3H$ | H | Methyl | | | | | |
| $1a^{58}$ | OMe | H | $SO_3H$ | $SO_3H$ | H | OMe | | | | | |
| $1a^{59}$ | F | H | $SO_3H$ | $SO_3H$ | H | F | | | | | |
| $1a^{60}$ | $CF_3$ | H | $SO_3H$ | $SO_3H$ | H | $CF_3$ | | | | | |
| $1a^{61}$ | H | $SO_3H$ | H | H | $SO_3H$ | H | Methyl | Methyl | CN | Methyl | 3-Methyl-cyclohexyl |
| $1a^{62}$ | H | H | $SO_3H$ | $SO_3H$ | H | H | | | | | |
| $1a^{63}$ | Methyl | H | $SO_3H$ | $SO_3H$ | H | Methyl | | | | | |
| $1a^{64}$ | OMe | H | $SO_3H$ | $SO_3H$ | H | OMe | | | | | |
| $1a^{65}$ | F | H | $SO_3H$ | $SO_3H$ | H | F | | | | | |
| $1a^{66}$ | $CF_3$ | H | $SO_3H$ | $SO_3H$ | H | $CF_3$ | | | | | |
| $1a^{67}$ | H | $SO_3H$ | H | H | $SO_3H$ | H | Methyl | Methyl | CN | Methyl | Isopropyl |
| $1a^{68}$ | H | H | $SO_3H$ | $SO_3H$ | H | H | | | | | |
| $1a^{69}$ | Methyl | H | $SO_3H$ | $SO_3H$ | H | Methyl | | | | | |
| $1a^{70}$ | OMe | H | $SO_3H$ | $SO_3H$ | H | OMe | | | | | |
| $1a^{71}$ | F | H | $SO_3H$ | $SO_3H$ | H | F | | | | | |
| $1a^{72}$ | $CF_3$ | H | $SO_3H$ | $SO_3H$ | H | $CF_3$ | | | | | |
| $1a73$ | H | $SO_3H$ | H | H | $SO_3H$ | H | Methyl | Methyl | CN | Methyl | Sec-butyl |
| $1a74$ | H | H | $SO_3H$ | $SO_3H$ | H | H | | | | | |
| $1a75$ | Methyl | H | $SO_3H$ | $SO_3H$ | H | Methyl | | | | | |
| $1a76$ | OMe | H | $SO_3H$ | $SO_3H$ | H | OMe | | | | | |
| $1a77$ | F | H | $SO_3H$ | $SO_3H$ | H | F | | | | | |
| $1a78$ | $CF_3$ | H | $SO_3H$ | $SO_3H$ | H | $CF_3$ | | | | | |
| $1a79$ | H | $SO_3H$ | H | H | $SO_3H$ | H | Methyl | Methyl | CN | Methyl | 2-Methylbutyl |
| $1a80$ | H | H | $SO_3H$ | $SO_3H$ | H | H | | | | | |
| $1a81$ | Methyl | H | $SO_3H$ | $SO_3H$ | H | Methyl | | | | | |
| $1a82$ | OMe | H | $SO_3H$ | $SO_3H$ | H | OMe | | | | | |
| $1a83$ | F | H | $SO_3H$ | $SO_3H$ | H | F | | | | | |
| $1a84$ | $CF_3$ | H | $SO_3H$ | $SO_3H$ | H | $CF_3$ | | | | | |
| $1a85$ | H | $SO_3H$ | H | H | $SO_3H$ | H | Methyl | Methyl | CN | Methyl | 1-Ethylpropyl |
| $1a86$ | H | H | $SO_3H$ | $SO_3H$ | H | H | | | | | |
| $1a87$ | Methyl | H | $SO_3H$ | $SO_3H$ | H | Methyl | | | | | |
| $1a88$ | OMe | H | $SO_3H$ | $SO_3H$ | H | OMe | | | | | |
| $1a89$ | F | H | $SO_3H$ | $SO_3H$ | H | F | | | | | |
| $1a90$ | $CF_3$ | H | $SO_3H$ | $SO_3H$ | H | $CF_3$ | | | | | |
| $1a^{91}$ | H | $SO_3H$ | H | H | $SO_3H$ | H | Methyl | Methyl | CN | Methyl | 1,2-Dimethyl-propyl |
| $1a^{92}$ | H | H | $SO_3H$ | $SO_3H$ | H | H | | | | | |
| $1a^{93}$ | Methyl | H | $SO_3H$ | $SO_3H$ | H | Methyl | | | | | |
| $1a^{94}$ | OMe | H | $SO_3H$ | $SO_3H$ | H | OMe | | | | | |
| $1a^{95}$ | F | H | $SO_3H$ | $SO_3H$ | H | F | | | | | |
| $1a^{96}$ | $CF_3$ | H | $SO_3H$ | $SO_3H$ | H | $CF_3$ | | | | | |
| $1a^{97}$ | H | $SO_3H$ | H | H | $SO_3H$ | H | Methyl | Methyl | CN | Methyl | Tert-butyl |
| $1a^{98}$ | H | H | $SO_3H$ | $SO_3H$ | H | H | | | | | |
| $1a^{99}$ | Methyl | H | $SO_3H$ | $SO_3H$ | H | Methyl | | | | | |
| $1a^{100}$ | OMe | H | $SO_3H$ | $SO_3H$ | H | OMe | | | | | |
| $1a^{101}$ | F | H | $SO_3H$ | $SO_3H$ | H | F | | | | | |
| $1a^{102}$ | $CF_3$ | H | $SO_3H$ | $SO_3H$ | H | $CF_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{103}$ | H | $SO_3H$ | H | H | $SO_3H$ | H | Methyl | Methyl | CN | Methyl | 3-Methylbutyl |
| $1a^{104}$ | H | H | $SO_3H$ | $SO_3H$ | H | H | | | | | |
| $1a^{105}$ | Methyl | H | $SO_3H$ | $SO_3H$ | H | Methyl | | | | | |
| $1a^{106}$ | OMe | H | $SO_3H$ | $SO_3H$ | H | OMe | | | | | |
| $1a^{107}$ | F | H | $SO_3H$ | $SO_3H$ | H | F | | | | | |
| $1a^{108}$ | $CF_3$ | H | $SO_3H$ | $SO_3H$ | H | $CF_3$ | | | | | |
| $1a^{109}$ | H | $SO_3H$ | H | H | $SO_3H$ | H | Methyl | Methyl | CN | Methyl | Pentan-2-yl |
| $1a^{110}$ | H | H | $SO_3H$ | $SO_3H$ | H | H | | | | | |
| $1a^{111}$ | Methyl | H | $SO_3H$ | $SO_3H$ | H | Methyl | | | | | |
| $1a^{112}$ | OMe | H | $SO_3H$ | $SO_3H$ | H | OMe | | | | | |
| $1a^{113}$ | F | H | $SO_3H$ | $SO_3H$ | H | F | | | | | |
| $1a^{114}$ | $CF_3$ | H | $SO_3H$ | $SO_3H$ | H | $CF_3$ | | | | | |
| $1a^{115}$ | H | $SO_3H$ | H | H | $SO_3H$ | H | Methyl | Methyl | CN | Methyl | 2-Ethylhexyl |
| $1a^{116}$ | H | H | $SO_3H$ | $SO_3H$ | H | H | | | | | |
| $1a^{117}$ | Methyl | H | $SO_3H$ | $SO_3H$ | H | Methyl | | | | | |
| $1a^{118}$ | OMe | H | $SO_3H$ | $SO_3H$ | H | OMe | | | | | |
| $1a^{119}$ | F | H | $SO_3H$ | $SO_3H$ | H | F | | | | | |
| $1a^{120}$ | $CF_3$ | H | $SO_3H$ | $SO_3H$ | H | $CF_3$ | | | | | |
| $1a^{121}$ | H | $SO_3H$ | H | H | $SO_3H$ | H | Methyl | Methyl | CN | Methyl | 2,2-Dimethyl-propyl |
| $1a^{122}$ | H | H | $SO_3H$ | $SO_3H$ | H | H | | | | | |
| $1a^{123}$ | Methyl | H | $SO_3H$ | $SO_3H$ | H | Methyl | | | | | |
| $1a^{124}$ | OMe | H | $SO_3H$ | $SO_3H$ | H | OMe | | | | | |
| $1a^{125}$ | F | H | $SO_3H$ | $SO_3H$ | H | F | | | | | |
| $1a^{126}$ | $CF_3$ | H | $SO_3H$ | $SO_3H$ | H | $CF_3$ | | | | | |
| $1a^{127}$ | H | $SO_3H$ | H | H | $SO_3H$ | H | Methyl | Methyl | CN | Methyl | Phenyl |
| $1a^{128}$ | H | H | $SO_3H$ | $SO_3H$ | H | H | | | | | |
| $1a^{129}$ | Methyl | H | $SO_3H$ | $SO_3H$ | H | Methyl | | | | | |
| $1a^{130}$ | OMe | H | $SO_3H$ | $SO_3H$ | H | OMe | | | | | |
| $1a^{131}$ | F | H | $SO_3H$ | $SO_3H$ | H | F | | | | | |
| $1a^{132}$ | $CF_3$ | H | $SO_3H$ | $SO_3H$ | H | $CF_3$ | | | | | |
| $1a^{133}$ | H | $SO_3H$ | H | H | $SO_3H$ | H | Methyl | Methyl | CN | Methyl | Benzyl |
| $1a^{134}$ | H | H | $SO_3H$ | $SO_3H$ | H | H | | | | | |
| $1a^{135}$ | Methyl | H | $SO_3H$ | $SO_3H$ | H | Methyl | | | | | |
| $1a^{136}$ | OMe | H | $SO_3H$ | $SO_3H$ | H | OMe | | | | | |
| $1a^{137}$ | F | H | $SO_3H$ | $SO_3H$ | H | F | | | | | |
| $1a^{138}$ | $CF_3$ | H | $SO_3H$ | $SO_3H$ | H | $CF_3$ | | | | | |
| $1a^{139}$ | H | $SO_3H$ | H | H | $SO_3H$ | H | Methyl | F | CN | Methyl | Methyl |
| $1a^{140}$ | H | H | $SO_3H$ | $SO_3H$ | H | H | | | | | |
| $1a^{141}$ | Methyl | H | $SO_3H$ | $SO_3H$ | H | Methyl | | | | | |
| $1a^{142}$ | OMe | H | $SO_3H$ | $SO_3H$ | H | OMe | | | | | |
| $1a^{143}$ | $CF_3$ | H | $SO_3H$ | $SO_3H$ | H | $CF_3$ | | | | | |
| $1a^{144}$ | H | $SO_3H$ | H | H | $SO_3H$ | H | Methyl | F | CN | Methyl | Ethyl |
| $1a^{145}$ | H | H | $SO_3H$ | $SO_3H$ | H | H | | | | | |
| $1a^{146}$ | Methyl | H | $SO_3H$ | $SO_3H$ | H | Methyl | | | | | |
| $1a^{147}$ | OMe | H | $SO_3H$ | $SO_3H$ | H | OMe | | | | | |
| $1a^{148}$ | H | $SO_3H$ | H | H | $SO_3H$ | H | Methyl | F | CN | Methyl | Propyl |
| $1a^{149}$ | H | H | $SO_3H$ | $SO_3H$ | H | H | | | | | |
| $1a^{150}$ | Methyl | H | $SO_3H$ | $SO_3H$ | H | Methyl | | | | | |
| $1a^{151}$ | OMe | H | $SO_3H$ | $SO_3H$ | H | OMe | | | | | |
| $1a^{152}$ | H | $SO_3H$ | H | H | $SO_3H$ | H | Methyl | F | CN | Methyl | Butyl |
| $1a^{153}$ | H | H | $SO_3H$ | $SO_3H$ | H | H | | | | | |
| $1a^{154}$ | Methyl | H | $SO_3H$ | $SO_3H$ | H | Methyl | | | | | |
| $1a^{155}$ | OMe | H | $SO_3H$ | $SO_3H$ | H | OMe | | | | | |
| $1a^{156}$ | H | $SO_3H$ | H | H | $SO_3H$ | H | Methyl | F | CN | Methyl | Pentyl |
| $1a^{157}$ | H | $SO_3H$ | H | H | $SO_3H$ | H | | | | | |
| $1a^{158}$ | Methyl | H | $SO_3H$ | $SO_3H$ | H | Methyl | | | | | |
| $1a^{159}$ | OMe | H | $SO_3H$ | $SO_3H$ | H | OMe | | | | | |
| $1a^{160}$ | H | $SO_3H$ | H | H | $SO_3H$ | H | Methyl | F | CN | Methyl | Hexyl |
| $1a^{161}$ | H | H | $SO_3H$ | $SO_3H$ | H | H | | | | | |
| $1a^{162}$ | Methyl | H | $SO_3H$ | $SO_3H$ | H | Methyl | | | | | |
| $1a^{163}$ | OMe | H | $SO_3H$ | $SO_3H$ | H | OMe | | | | | |
| $1a^{164}$ | H | $SO_3H$ | H | H | $SO_3H$ | H | Methyl | F | CN | Methyl | Cyclobutyl |
| $1a^{165}$ | H | H | $SO_3H$ | $SO_3H$ | H | H | | | | | |
| $1a^{166}$ | Methyl | H | $SO_3H$ | $SO_3H$ | H | Methyl | | | | | |
| $1a^{167}$ | OMe | H | $SO_3H$ | $SO_3H$ | H | OMe | | | | | |
| $1a^{168}$ | H | $SO_3H$ | H | H | $SO_3H$ | H | Methyl | F | CN | Methyl | Cyclopentyl |
| $1a^{169}$ | H | H | $SO_3H$ | $SO_3H$ | H | H | | | | | |
| $1a^{170}$ | Methyl | H | $SO_3H$ | $SO_3H$ | H | Methyl | | | | | |
| $1a^{171}$ | OMe | H | $SO_3H$ | $SO_3H$ | H | OMe | | | | | |
| $1a^{172}$ | H | $SO_3H$ | H | H | $SO_3H$ | H | Methyl | F | CN | Methyl | Cyclohexyl |
| $1a^{173}$ | H | H | $SO_3H$ | $SO_3H$ | H | H | | | | | |
| $1a^{174}$ | Methyl | H | $SO_3H$ | $SO_3H$ | H | Methyl | | | | | |
| $1a^{175}$ | OMe | H | $SO_3H$ | $SO_3H$ | H | OMe | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{176}$ | H | $SO_3H$ | H | H | $SO_3H$ | H | Methyl | F | CN | Methyl | 2-Methyl-cyclohexyl |
| $1a^{177}$ | H | H | $SO_3H$ | $SO_3H$ | H | H | | | | | |
| $1a^{178}$ | Methyl | H | $SO_3H$ | $SO_3H$ | H | Methyl | | | | | |
| $1a^{179}$ | OMe | H | $SO_3H$ | $SO_3H$ | H | OMe | | | | | |
| $1a^{180}$ | H | $SO_3H$ | H | H | $SO_3H$ | H | Methyl | F | CN | Methyl | 3-Methyl-cyclohexyl |
| $1a^{181}$ | H | H | $SO_3H$ | $SO_3H$ | H | H | | | | | |
| $1a^{182}$ | Methyl | H | $SO_3H$ | $SO_3H$ | H | Methyl | | | | | |
| $1a^{183}$ | OMe | H | $SO_3H$ | $SO_3H$ | H | OMe | | | | | |
| $1a^{184}$ | H | $SO_3H$ | H | H | $SO_3H$ | H | Methyl | F | CN | Methyl | Isopropyl |
| $1a^{185}$ | H | H | $SO_3H$ | $SO_3H$ | H | H | | | | | |
| $1a^{186}$ | Methyl | H | $SO_3H$ | $SO_3H$ | H | Methyl | | | | | |
| $1a^{187}$ | OMe | H | $SO_3H$ | $SO_3H$ | H | OMe | | | | | |
| $1a^{188}$ | H | $SO_3H$ | H | H | $SO_3H$ | H | Methyl | F | CN | Methyl | Sec-butyl |
| $1a^{189}$ | H | H | $SO_3H$ | $SO_3H$ | H | H | | | | | |
| $1a^{190}$ | Methyl | H | $SO_3H$ | $SO_3H$ | H | Methyl | | | | | |
| $1a^{191}$ | OMe | H | $SO_3H$ | $SO_3H$ | H | OMe | | | | | |
| $1a^{192}$ | H | $SO_3H$ | H | H | $SO_3H$ | H | Methyl | F | CN | Methyl | 2-Methylbutyl |
| $1a^{193}$ | H | H | $SO_3H$ | $SO_3H$ | H | H | | | | | |
| $1a^{194}$ | Methyl | H | $SO_3H$ | $SO_3H$ | H | Methyl | | | | | |
| $1a^{195}$ | OMe | H | $SO_3H$ | $SO_3H$ | H | OMe | | | | | |
| $1a^{196}$ | H | $SO_3H$ | H | H | $SO_3H$ | H | Methyl | F | CN | Methyl | 1-Ethylpropyl |
| $1a^{197}$ | H | H | $SO_3H$ | $SO_3H$ | H | H | | | | | |
| $1a^{198}$ | Methyl | H | $SO_3H$ | $SO_3H$ | H | Methyl | | | | | |
| $1a^{199}$ | OMe | H | $SO_3H$ | $SO_3H$ | H | OMe | | | | | |
| $1a^{200}$ | H | $SO_3H$ | H | H | $SO_3H$ | H | Methyl | F | CN | Methyl | 1,2-Dimethyl-propyl |
| $1a^{201}$ | H | H | $SO_3H$ | $SO_3H$ | H | H | | | | | |
| $1a^{202}$ | Methyl | H | $SO_3H$ | $SO_3H$ | H | Methyl | | | | | |
| $1a^{203}$ | OMe | H | $SO_3H$ | $SO_3H$ | H | OMe | | | | | |
| $1a^{204}$ | H | $SO_3H$ | H | H | $SO_3H$ | H | Methyl | F | CN | Methyl | Tert-butyl |
| $1a^{205}$ | H | H | $SO_3H$ | $SO_3H$ | H | H | | | | | |
| $1a^{206}$ | Methyl | H | $SO_3H$ | $SO_3H$ | H | Methyl | | | | | |
| $1a^{207}$ | OMe | H | $SO_3H$ | $SO_3H$ | H | OMe | | | | | |
| $1a^{208}$ | H | $SO_3H$ | H | H | $SO_3H$ | H | Methyl | F | CN | Methyl | 3-Methylbutyl |
| $1a^{209}$ | H | H | $SO_3H$ | $SO_3H$ | H | H | | | | | |
| $1a^{210}$ | Methyl | H | $SO_3H$ | $SO_3H$ | H | Methyl | | | | | |
| $1a^{211}$ | OMe | H | $SO_3H$ | $SO_3H$ | H | OMe | | | | | |
| $1a^{212}$ | H | $SO_3H$ | H | H | $SO_3H$ | H | Methyl | F | CN | Methyl | Pentan-2-yl |
| $1a^{213}$ | H | H | $SO_3H$ | $SO_3H$ | H | H | | | | | |
| $1a^{214}$ | Methyl | H | $SO_3H$ | $SO_3H$ | H | Methyl | | | | | |
| $1a^{215}$ | OMe | H | $SO_3H$ | $SO_3H$ | H | OMe | | | | | |
| $1a^{216}$ | F | H | $SO_3H$ | $SO_3H$ | H | F | | | | | |
| $1a^{217}$ | $CF_3$ | H | $SO_3H$ | $SO_3H$ | H | $CF_3$ | | | | | |
| $1a^{218}$ | H | $SO_3H$ | H | H | $SO_3H$ | H | Methyl | F | CN | Methyl | 2-Ethylhexyl |
| $1a^{219}$ | H | H | $SO_3H$ | $SO_3H$ | H | H | | | | | |
| $1a^{220}$ | Methyl | H | $SO_3H$ | $SO_3H$ | H | Methyl | | | | | |
| $1a^{221}$ | OMe | H | $SO_3H$ | $SO_3H$ | H | OMe | | | | | |
| $1a^{222}$ | H | $SO_3H$ | H | H | $SO_3H$ | H | Methyl | F | CN | Methyl | 2,2-Dimethyl-propyl |
| $1a^{223}$ | H | H | $SO_3H$ | $SO_3H$ | H | H | | | | | |
| $1a^{224}$ | Methyl | H | $SO_3H$ | $SO_3H$ | H | Methyl | | | | | |
| $1a^{225}$ | OMe | H | $SO_3H$ | $SO_3H$ | H | OMe | | | | | |
| $1a^{226}$ | H | $SO_3H$ | H | H | $SO_3H$ | H | Methyl | F | CN | Methyl | Phenyl |
| $1a^{227}$ | H | H | $SO_3H$ | $SO_3H$ | H | H | | | | | |
| $1a^{228}$ | Methyl | H | $SO_3H$ | $SO_3H$ | H | Methyl | | | | | |
| $1a^{229}$ | OMe | H | $SO_3H$ | $SO_3H$ | H | OMe | | | | | |
| $1a^{230}$ | F | H | $SO_3H$ | $SO_3H$ | H | F | | | | | |
| $1a^{231}$ | $CF_3$ | H | $SO_3H$ | $SO_3H$ | H | $CF_3$ | | | | | |
| $1a^{232}$ | H | $SO_3H$ | H | H | $SO_3H$ | H | Methyl | F | CN | Methyl | Benzyl |
| $1a^{233}$ | H | H | $SO_3H$ | $SO_3H$ | H | H | | | | | |
| $1a^{234}$ | Methyl | H | $SO_3H$ | $SO_3H$ | H | Methyl | | | | | |
| $1a^{235}$ | OMe | H | $SO_3H$ | $SO_3H$ | H | OMe | | | | | |
| $1a^{236}$ | F | H | $SO_3H$ | $SO_3H$ | H | H | | | | | |
| $1a^{237}$ | $CF_3$ | H | $SO_3H$ | $SO_3H$ | H | $CF_3$ | | | | | |
| $1a^{238}$ | H | $SO_3H$ | H | H | $SO_3H$ | H | $NHCOCH_3$ | OMe | CN | Methyl | Methyl |
| $1a^{239}$ | H | H | $SO_3H$ | $SO_3H$ | H | H | | | | | |
| $1a^{240}$ | Methyl | H | $SO_3H$ | $SO_3H$ | H | Methyl | | | | | |
| $1a^{241}$ | OMe | H | $SO_3H$ | $SO_3H$ | H | OMe | | | | | |
| $1a^{242}$ | F | H | $SO_3H$ | $SO_3H$ | H | F | | | | | |
| $1a^{243}$ | $CF_3$ | H | $SO_3H$ | $SO_3H$ | H | $CF_3$ | | | | | |
| $1a^{244}$ | H | $SO_3H$ | H | H | $SO_3H$ | H | $NHCOCH_3$ | OMe | CN | Methyl | Ethyl |
| $1a^{245}$ | H | H | $SO_3H$ | $SO_3H$ | H | H | | | | | |
| $1a^{246}$ | Methyl | H | $SO_3H$ | $SO_3H$ | H | Methyl | | | | | |
| $1a^{247}$ | OMe | H | $SO_3H$ | $SO_3H$ | H | OMe | | | | | |
| $1a^{248}$ | F | H | $SO_3H$ | $SO_3H$ | H | F | | | | | |
| $1a^{249}$ | $CF_3$ | H | $SO_3H$ | $SO_3H$ | H | $CF_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{250}$ | H | SO$_3$H | H | H | SO$_3$H | H | NHCOCH$_3$ | OMe | OMe | Methyl | Propyl |
| $1a^{251}$ | H | H | SO$_3$H | SO$_3$H | H | H | | | | | |
| $1a^{252}$ | Methyl | H | SO$_3$H | SO$_3$H | H | Methyl | | | | | |
| $1a^{253}$ | OMe | H | SO$_3$H | SO$_3$H | H | OMe | | | | | |
| $1a^{254}$ | F | H | SO$_3$H | SO$_3$H | H | F | | | | | |
| $1a^{255}$ | CF$_3$ | H | SO$_3$H | SO$_3$H | H | CF$_3$ | | | | | |
| $1a^{256}$ | H | SO$_3$H | H | H | SO$_3$H | H | NHCOCH$_3$ | OMe | CN | Methyl | Butyl |
| $1a^{257}$ | H | H | SO$_3$H | SO$_3$H | H | H | | | | | |
| $1a^{258}$ | Methyl | H | SO$_3$H | SO$_3$H | H | Methyl | | | | | |
| $1a^{259}$ | OMe | H | SO$_3$H | SO$_3$H | H | OMe | | | | | |
| $1a^{260}$ | F | H | SO$_3$H | SO$_3$H | H | F | | | | | |
| $1a^{261}$ | CF$_3$ | H | SO$_3$H | SO$_3$H | H | CF$_3$ | | | | | |
| $1a^{262}$ | H | SO$_3$H | H | H | SO$_3$H | H | NHCOCH$_3$ | OMe | CN | Methyl | Pentyl |
| $1a^{263}$ | H | H | SO$_3$H | SO$_3$H | H | H | | | | | |
| $1a^{264}$ | Methyl | H | SO$_3$H | SO$_3$H | H | Methyl | | | | | |
| $1a^{265}$ | OMe | H | SO$_3$H | SO$_3$H | H | OMe | | | | | |
| $1a^{266}$ | F | H | SO$_3$H | SO$_3$H | H | F | | | | | |
| $1a^{267}$ | CF$_3$ | H | SO$_3$H | SO$_3$H | H | CF$_3$ | | | | | |
| $1a^{268}$ | H | SO$_3$H | H | H | SO$_3$H | H | NHCOCH$_3$ | OMe | CN | Methyl | Hexyl |
| $1a^{269}$ | H | H | SO$_3$H | SO$_3$H | H | H | | | | | |
| $1a^{270}$ | Methyl | H | SO$_3$H | SO$_3$H | H | Methyl | | | | | |
| $1a^{271}$ | OMe | H | SO$_3$H | SO$_3$H | H | OMe | | | | | |
| $1a^{272}$ | F | H | SO$_3$H | SO$_3$H | H | F | | | | | |
| $1a^{273}$ | CF$_3$ | H | SO$_3$H | SO$_3$H | H | CF$_3$ | | | | | |
| $1a^{274}$ | H | SO$_3$H | H | H | SO$_3$H | H | NHCOCH$_3$ | OMe | CN | Methyl | Cyclobutyl |
| $1a^{275}$ | H | H | SO$_3$H | SO$_3$H | H | H | | | | | |
| $1a^{276}$ | Methyl | H | SO$_3$H | SO$_3$H | H | Methyl | | | | | |
| $1a^{277}$ | OMe | H | SO$_3$H | SO$_3$H | H | OMe | | | | | |
| $1a^{278}$ | F | H | SO$_3$H | SO$_3$H | H | F | | | | | |
| $1a^{279}$ | CF$_3$ | H | SO$_3$H | SO$_3$H | H | CF$_3$ | | | | | |
| $1a^{280}$ | H | SO$_3$H | H | H | SO$_3$H | H | NHCOCH$_3$ | OMe | CN | Methyl | Cyclopentyl |
| $1a^{281}$ | H | H | SO$_3$H | SO$_3$H | H | H | | | | | |
| $1a^{282}$ | Methyl | H | SO$_3$H | SO$_3$H | H | Methyl | | | | | |
| $1a^{283}$ | OMe | H | SO$_3$H | SO$_3$H | H | OMe | | | | | |
| $1a^{284}$ | F | H | SO$_3$H | SO$_3$H | H | F | | | | | |
| $1a^{285}$ | CF$_3$ | H | SO$_3$H | SO$_3$H | H | CF$_3$ | | | | | |
| $1a^{286}$ | H | SO$_3$H | H | H | SO$_3$H | H | NHCOCH$_3$ | OMe | CN | Methyl | Cyclohexyl |
| $1a^{287}$ | H | H | SO$_3$H | SO$_3$H | H | H | | | | | |
| $1a^{288}$ | Methyl | H | SO$_3$H | SO$_3$H | H | Methyl | | | | | |
| $1a^{289}$ | OMe | H | SO$_3$H | SO$_3$H | H | OMe | | | | | |
| $1a^{290}$ | F | H | SO$_3$H | SO$_3$H | H | F | | | | | |
| $1a^{291}$ | CF$_3$ | H | SO$_3$H | SO$_3$H | H | CF$_3$ | | | | | |
| $1a^{292}$ | H | SO$_3$H | H | H | SO$_3$H | H | NHCOCH$_3$ | OMe | CN | Methyl | 2-Methyl-cyclohexyl |
| $1a^{293}$ | H | H | SO$_3$H | SO$_3$H | H | H | | | | | |
| $1a^{294}$ | Methyl | H | SO$_3$H | SO$_3$H | H | Methyl | | | | | |
| $1a^{295}$ | OMe | H | SO$_3$H | SO$_3$H | H | OMe | | | | | |
| $1a^{296}$ | F | H | SO$_3$H | SO$_3$H | H | F | | | | | |
| $1a^{297}$ | CF$_3$ | H | SO$_3$H | SO$_3$H | H | CF$_3$ | | | | | |
| $1a^{298}$ | H | SO$_3$H | H | H | SO$_3$H | H | NHCOCH$_3$ | OMe | CN | Methyl | 3-Methyl-cyclohexyl |
| $1a^{299}$ | H | H | SO$_3$H | SO$_3$H | H | H | | | | | |
| $1a^{300}$ | Methyl | H | SO$_3$H | SO$_3$H | H | Methyl | | | | | |
| $1a^{301}$ | OMe | H | SO$_3$H | SO$_3$H | H | OMe | | | | | |
| $1a^{302}$ | F | H | SO$_3$H | SO$_3$H | H | F | | | | | |
| $1a^{303}$ | CF$_3$ | H | SO$_3$H | SO$_3$H | H | CF$_3$ | | | | | |
| $1a^{304}$ | H | SO$_3$H | H | H | SO$_3$H | H | NHCOCH$_3$ | OMe | CN | Methyl | Isopropyl |
| $1a^{305}$ | H | H | SO$_3$H | SO$_3$H | H | H | | | | | |
| $1a^{306}$ | Methyl | H | SO$_3$H | SO$_3$H | H | Methyl | | | | | |
| $1a^{307}$ | OMe | H | SO$_3$H | SO$_3$H | H | OMe | | | | | |
| $1a^{308}$ | F | H | SO$_3$H | SO$_3$H | H | F | | | | | |
| $1a^{309}$ | CF$_3$ | H | SO$_3$H | SO$_3$H | H | CF$_3$ | | | | | |
| $1a^{310}$ | H | SO$_3$H | H | H | SO$_3$H | H | NHCOCH$_3$ | OMe | CN | Methyl | Sec-butyl |
| $1a^{311}$ | H | H | SO$_3$H | SO$_3$H | H | H | | | | | |
| $1a^{312}$ | Methyl | H | SO$_3$H | SO$_3$H | H | Methyl | | | | | |
| $1a^{313}$ | OMe | H | SO$_3$H | SO$_3$H | H | OMe | | | | | |
| $1a^{314}$ | F | H | SO$_3$H | SO$_3$H | H | F | | | | | |
| $1a^{315}$ | CF$_3$ | H | SO$_3$H | SO$_3$H | H | CF$_3$ | | | | | |
| $1a^{316}$ | H | SO$_3$H | H | H | SO$_3$H | H | NHCOCH$_3$ | OMe | CN | Methyl | 2-Methylbutyl |
| $1a^{317}$ | H | H | SO$_3$H | SO$_3$H | H | H | | | | | |
| $1a^{318}$ | Methyl | H | SO$_3$H | SO$_3$H | H | Methyl | | | | | |
| $1a^{319}$ | OMe | H | SO$_3$H | SO$_3$H | H | OMe | | | | | |
| $1a^{320}$ | F | H | SO$_3$H | SO$_3$H | H | F | | | | | |
| $1a^{321}$ | CF$_3$ | H | SO$_3$H | SO$_3$H | H | CF$_3$ | | | | | |
| $1a^{322}$ | H | SO$_3$H | H | H | SO$_3$H | H | NHCOCH$_3$ | OMe | CN | Methyl | 1-Ethylpropyl |
| $1a^{323}$ | H | H | SO$_3$H | SO$_3$H | H | H | | | | | |
| $1a^{324}$ | Methyl | H | SO$_3$H | SO$_3$H | H | Methyl | | | | | |
| $1a^{325}$ | OMe | H | SO$_3$H | SO$_3$H | H | OMe | | | | | |
| $1a^{326}$ | F | H | SO$_3$H | SO$_3$H | H | C | | | | | |
| $1a^{327}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{328}$ | H | SO$_3$H | H | H | SO$_3$H | H | NHCOCH$_3$ | OMe | CN | Methyl | 1,2-Dimethyl-propyl |
| $1a^{329}$ | H | H | SO$_3$H | SO$_3$H | H | H | | | | | |
| $1a^{330}$ | Methyl | H | SO$_3$H | SO$_3$H | H | Methyl | | | | | |
| $1a^{331}$ | OMe | H | SO$_3$H | SO$_3$H | H | OMe | | | | | |
| $1a^{332}$ | F | H | SO$_3$H | SO$_3$H | H | F | | | | | |
| $1a^{333}$ | CF$_3$ | H | SO$_3$H | SO$_3$H | H | CF$_3$ | | | | | |
| $1a^{334}$ | H | SO$_3$H | H | H | SO$_3$H | H | NHCOCH$_3$ | OMe | CN | Methyl | Tert-butyl |
| $1a^{335}$ | H | H | SO$_3$H | SO$_3$H | H | H | | | | | |
| $1a^{336}$ | Methyl | H | SO$_3$H | SO$_3$H | H | Methyl | | | | | |
| $1a^{337}$ | OMe | H | SO$_3$H | SO$_3$H | H | OMe | | | | | |
| $1a^{338}$ | F | H | SO$_3$H | SO$_3$H | H | F | | | | | |
| $1a^{339}$ | CF$_3$ | H | SO$_3$H | SO$_3$H | H | CF$_3$ | | | | | |
| $1a^{340}$ | H | SO$_3$H | H | H | SO$_3$H | H | NHCOCH$_3$ | OMe | CN | Methyl | 3-Methylbutyl |
| $1a^{341}$ | H | H | SO$_3$H | SO$_3$H | H | H | | | | | |
| $1a^{342}$ | Methyl | H | SO$_3$H | SO$_3$H | H | Methyl | | | | | |
| $1a^{343}$ | OMe | H | SO$_3$H | SO$_3$H | H | OMe | | | | | |
| $1a^{344}$ | F | H | SO$_3$H | SO$_3$H | H | F | | | | | |
| $1a^{345}$ | CF$_3$ | H | SO$_3$H | SO$_3$H | H | CF$_3$ | | | | | |
| $1a^{346}$ | H | SO$_3$H | H | H | SO$_3$H | H | NHCOCH$_3$ | OMe | CN | Methyl | Pentan-2-yl |
| $1a^{347}$ | H | H | SO$_3$H | SO$_3$H | H | H | | | | | |
| $1a^{348}$ | Methyl | H | SO$_3$H | SO$_3$H | H | Methyl | | | | | |
| $1a^{349}$ | OMe | H | SO$_3$H | SO$_3$H | H | OMe | | | | | |
| $1a^{350}$ | F | H | SO$_3$H | SO$_3$H | H | F | | | | | |
| $1a^{351}$ | CF$_3$ | H | SO$_3$H | SO$_3$H | H | CF$_3$ | | | | | |
| $1a^{352}$ | H | SO$_3$H | H | H | SO$_3$H | H | NHCOCH$_3$ | OMe | CN | Methyl | 2-Ethylhexyl |
| $1a^{353}$ | H | H | SO$_3$H | SO$_3$H | H | H | | | | | |
| $1a^{354}$ | Methyl | H | SO$_3$H | SO$_3$H | H | Methyl | | | | | |
| $1a^{355}$ | OMe | H | SO$_3$H | SO$_3$H | H | OMe | | | | | |
| $1a^{356}$ | F | H | SO$_3$H | SO$_3$H | H | F | | | | | |
| $1a^{357}$ | CF$_3$ | H | SO$_3$H | SO$_3$H | H | CF$_3$ | | | | | |
| $1a^{358}$ | H | SO$_3$H | H | H | SO$_3$H | H | NHCOCH$_3$ | OMe | CN | Methyl | 2,2-Dimethyl-propyl |
| $1a^{359}$ | H | H | SO$_3$H | SO$_3$H | H | H | | | | | |
| $1a^{360}$ | Methyl | H | SO$_3$H | SO$_3$H | H | Methyl | | | | | |
| $1a^{361}$ | OMe | H | SO$_3$H | SO$_3$H | H | OMe | | | | | |
| $1a^{362}$ | F | H | SO$_3$H | SO$_3$H | H | F | | | | | |
| $1a^{363}$ | H | SO$_3$H | H | H | SO$_3$H | H | NHCOCH$_3$ | OMe | CN | Methyl | Phenyl |
| $1a^{364}$ | H | H | SO$_3$H | SO$_3$H | H | H | | | | | |
| $1a^{365}$ | Methyl | H | SO$_3$H | SO$_3$H | H | Methyl | | | | | |
| $1a^{366}$ | OMe | H | SO$_3$H | SO$_3$H | H | OMe | | | | | |
| $1a^{367}$ | F | H | SO$_3$H | SO$_3$H | H | F | | | | | |
| $1a^{368}$ | CF$_3$ | H | SO$_3$H | SO$_3$H | H | CF$_3$ | | | | | |
| $1a^{369}$ | H | SO$_3$H | H | H | SO$_3$H | H | NHCOCH$_3$ | OMe | CN | Methyl | Benzyl |
| $1a^{370}$ | H | H | SO$_3$H | SO$_3$H | H | H | | | | | |
| $1a^{371}$ | Methyl | H | SO$_3$H | SO$_3$H | H | Methyl | | | | | |
| $1a^{372}$ | OMe | H | SO$_3$H | SO$_3$H | H | OMe | | | | | |
| $1a^{373}$ | F | H | SO$_3$H | SO$_3$H | H | F | | | | | |
| $1a^{374}$ | CF$_3$ | H | SO$_3$H | SO$_3$H | H | CF$_3$ | | | | | |
| $1a^{375}$ | H | SO$_3$H | H | H | SO$_3$H | H | Methyl | Methyl | CONH$_2$ | Methyl | Methyl |
| $1a^{376}$ | H | H | SO$_3$H | SO$_3$H | H | H | | | | | |
| $1a^{377}$ | Methyl | H | SO$_3$H | SO$_3$H | H | Methyl | | | | | |
| $1a^{378}$ | OMe | H | SO$_3$H | SO$_3$H | H | OMe | | | | | |
| $1a^{379}$ | F | H | SO$_3$H | SO$_3$H | H | F | | | | | |
| $1a^{380}$ | CF$_3$ | H | SO$_3$H | SO$_3$H | H | CF$_3$ | | | | | |
| $1a^{381}$ | H | SO$_3$H | H | H | SO$_3$H | H | Methyl | Methyl | CONH$_2$ | Methyl | Ethyl |
| $1a^{382}$ | H | H | SO$_3$H | SO$_3$H | H | H | | | | | |
| $1a^{383}$ | Methyl | H | SO$_3$H | SO$_3$H | H | Methyl | | | | | |
| $1a^{384}$ | OMe | H | SO$_3$H | SO$_3$H | H | OMe | | | | | |
| $1a^{385}$ | F | H | SO$_3$H | SO$_3$H | H | F | | | | | |
| $1a^{386}$ | CF$_3$ | H | SO$_3$H | SO$_3$H | H | CF$_3$ | | | | | |
| $1a^{387}$ | H | SO$_3$H | H | H | SO$_3$H | H | Methyl | Methyl | CONH$_2$ | Methyl | Propyl |
| $1a^{388}$ | H | H | SO$_3$H | SO$_3$H | H | H | | | | | |
| $1a^{389}$ | Methyl | H | SO$_3$H | SO$_3$H | H | Methyl | | | | | |
| $1a^{390}$ | OMe | H | SO$_3$H | SO$_3$H | H | OMe | | | | | |
| $1a^{391}$ | F | H | SO$_3$H | SO$_3$H | H | F | | | | | |
| $1a^{392}$ | CF$_3$ | H | SO$_3$H | SO$_3$H | H | CF$_3$ | | | | | |
| $1a^{393}$ | H | SO$_3$H | H | H | SO$_3$H | H | Methyl | Methyl | CONH$_2$ | Methyl | Butyl |
| $1a^{394}$ | H | H | SO$_3$H | SO$_3$H | H | H | | | | | |
| $1a^{395}$ | Methyl | H | SO$_3$H | SO$_3$H | H | Methyl | | | | | |
| $1a^{396}$ | OMe | H | SO$_3$H | SO$_3$H | H | OMe | | | | | |
| $1a^{397}$ | F | H | SO$_3$H | SO$_3$H | H | F | | | | | |
| $1a^{398}$ | CF$_3$ | H | SO$_3$H | SO$_3$H | H | CF$_3$ | | | | | |
| $1a^{399}$ | H | SO$_3$H | H | H | SO$_3$H | H | Methyl | Methyl | CONH$_2$ | Methyl | Pentyl |
| $1a^{400}$ | H | H | SO$_3$H | SO$_3$H | H | H | | | | | |
| $1a^{401}$ | Methyl | H | SO$_3$H | SO$_3$H | H | Methyl | | | | | |
| $1a^{402}$ | OMe | H | SO$_3$H | SO$_3$H | H | OMe | | | | | |
| $1a^{403}$ | F | H | SO$_3$H | SO$_3$H | H | F | | | | | |
| $1a^{404}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{405}$ | H | SO$_3$H | H | H | SO$_3$H | H | Methyl | Methyl | CONH$_2$ | Methyl | Hexyl |
| $1a^{406}$ | H | H | SO$_3$H | SO$_3$H | H | H | | | | | |
| $1a^{407}$ | Methyl | H | SO$_3$H | SO$_3$H | H | Methyl | | | | | |
| $1a^{408}$ | OMe | H | SO$_3$H | SO$_3$H | H | OMe | | | | | |
| $1a^{409}$ | F | H | SO$_3$H | SO$_3$H | H | F | | | | | |
| $1a^{410}$ | CF$_3$ | H | SO$_3$H | SO$_3$H | H | CF$_3$ | | | | | |
| $1a^{411}$ | H | SO$_3$H | H | H | SO$_3$H | H | Methyl | Methyl | CONH$_2$ | Methyl | Cyclobutyl |
| $1a^{412}$ | H | H | SO$_3$H | SO$_3$H | H | H | | | | | |
| $1a^{413}$ | Methyl | H | SO$_3$H | SO$_3$H | H | Methyl | | | | | |
| $1a^{414}$ | OMe | H | SO$_3$H | SO$_3$H | H | OMe | | | | | |
| $1a^{415}$ | F | H | SO$_3$H | SO$_3$H | H | F | | | | | |
| $1a^{416}$ | CF$_3$ | H | SO$_3$H | SO$_3$H | H | CF$_3$ | | | | | |
| $1a^{417}$ | H | SO$_3$H | H | H | SO$_3$H | H | Methyl | Methyl | CONH$_2$ | Methyl | Cyclopentyl |
| $1a^{418}$ | H | H | SO$_3$H | SO$_3$H | H | H | | | | | |
| $1a^{419}$ | Methyl | H | SO$_3$H | SO$_3$H | H | Methyl | | | | | |
| $1a^{420}$ | OMe | H | SO$_3$H | SO$_3$H | H | OMe | | | | | |
| $1a^{421}$ | F | H | SO$_3$H | SO$_3$H | H | F | | | | | |
| $1a^{422}$ | CF$_3$ | H | SO$_3$H | SO$_3$H | H | CF$_3$ | | | | | |
| $1a^{423}$ | H | SO$_3$H | H | H | SO$_3$H | H | Methyl | Methyl | CONH$_2$ | Methyl | Cyclohexyl |
| $1a^{424}$ | H | H | SO$_3$H | SO$_3$H | H | H | | | | | |
| $1a^{425}$ | Methyl | H | SO$_3$H | SO$_3$H | H | Methyl | | | | | |
| $1a^{426}$ | OMe | H | SO$_3$H | SO$_3$H | H | OMe | | | | | |
| $1a^{427}$ | F | H | SO$_3$H | SO$_3$H | H | F | | | | | |
| $1a^{428}$ | CF$_3$ | H | SO$_3$H | SO$_3$H | H | CF$_3$ | | | | | |
| $1a^{429}$ | H | SO$_3$H | H | H | SO$_3$H | H | Methyl | Methyl | CONH$_2$ | Methyl | 2-Methyl-cyclohexyl |
| $1a^{430}$ | H | H | SO$_3$H | SO$_3$H | H | H | | | | | |
| $1a^{431}$ | Methyl | H | SO$_3$H | SO$_3$H | H | Methyl | | | | | |
| $1a^{432}$ | OMe | H | SO$_3$H | SO$_3$H | H | OMe | | | | | |
| $1a^{433}$ | F | H | SO$_3$H | SO$_3$H | H | F | | | | | |
| $1a^{434}$ | CF$_3$ | H | SO$_3$H | SO$_3$H | H | CF$_3$ | | | | | |
| $1a^{435}$ | H | SO$_3$H | H | H | SO$_3$H | H | Methyl | Methyl | CONH$_2$ | Methyl | 3-Methyl-cyclohexyl |
| $1a^{436}$ | H | H | SO$_3$H | SO$_3$H | H | H | | | | | |
| $1a^{437}$ | Methyl | H | SO$_3$H | SO$_3$H | H | Methyl | | | | | |
| $1a^{438}$ | OMe | H | SO$_3$H | SO$_3$H | H | OMe | | | | | |
| $1a^{439}$ | F | H | SO$_3$H | SO$_3$H | H | F | | | | | |
| $1a^{440}$ | CF$_3$ | H | SO$_3$H | SO$_3$H | H | CF$_3$ | | | | | |
| $1a^{441}$ | H | SO$_3$H | H | H | SO$_3$H | H | Methyl | Methyl | CONH$_2$ | Methyl | Isopropyl |
| $1a^{442}$ | H | H | SO$_3$H | SO$_3$H | H | H | | | | | |
| $1a^{443}$ | Methyl | H | SO$_3$H | SO$_3$H | H | Methyl | | | | | |
| $1a^{444}$ | OMe | H | SO$_3$H | SO$_3$H | H | OMe | | | | | |
| $1a^{445}$ | F | H | SO$_3$H | SO$_3$H | H | F | | | | | |
| $1a^{446}$ | CF$_3$ | H | SO$_3$H | SO$_3$H | H | CF$_3$ | | | | | |
| $1a^{447}$ | H | SO$_3$H | H | H | SO$_3$H | H | Methyl | Methyl | CONH$_2$ | Methyl | Sec-butyl |
| $1a^{448}$ | H | H | SO$_3$H | SO$_3$H | H | H | | | | | |
| $1a^{449}$ | Methyl | H | SO$_3$H | SO$_3$H | H | Methyl | | | | | |
| $1a^{450}$ | OMe | H | SO$_3$H | SO$_3$H | H | OMe | | | | | |
| $1a^{451}$ | F | H | SO$_3$H | SO$_3$H | H | F | | | | | |
| $1a^{452}$ | CF$_3$ | H | SO$_3$H | SO$_3$H | H | CF$_3$ | | | | | |
| $1a^{453}$ | H | SO$_3$H | H | H | SO$_3$H | H | Methyl | Methyl | CONH$_2$ | Methyl | 2-Methylbutyl |
| $1a^{454}$ | H | H | SO$_3$H | SO$_3$H | H | H | | | | | |
| $1a^{455}$ | Methyl | H | SO$_3$H | SO$_3$H | H | Methyl | | | | | |
| $1a^{456}$ | OMe | H | SO$_3$H | SO$_3$H | H | OMe | | | | | |
| $1a^{457}$ | F | H | SO$_3$H | SO$_3$H | H | F | | | | | |
| $1a^{458}$ | CF$_3$ | H | SO$_3$H | SO$_3$H | H | CF$_3$ | | | | | |
| $1a^{459}$ | H | SO$_3$H | H | H | SO$_3$H | H | Methyl | Methyl | CONH$_2$ | Methyl | 1-Ethylpropyl |
| $1a^{460}$ | H | H | SO$_3$H | SO$_3$H | H | H | | | | | |
| $1a^{461}$ | Methyl | H | SO$_3$H | SO$_3$H | H | Methyl | | | | | |
| $1a^{462}$ | OMe | H | SO$_3$H | SO$_3$H | H | OMe | | | | | |
| $1a^{463}$ | F | H | SO$_3$H | SO$_3$H | H | F | | | | | |
| $1a^{464}$ | CF$_3$ | H | SO$_3$H | SO$_3$H | H | CF$_3$ | | | | | |
| $1a^{465}$ | H | SO$_3$H | H | H | SO$_3$H | H | Methyl | Methyl | CONH$_2$ | Methyl | 1,2-Dimethyl-propyl |
| $1a^{466}$ | H | H | SO$_3$H | SO$_3$H | H | H | | | | | |
| $1a^{467}$ | Methyl | H | SO$_3$H | SO$_3$H | H | Methyl | | | | | |
| $1a^{468}$ | OMe | H | SO$_3$H | SO$_3$H | H | OMe | | | | | |
| $1a^{469}$ | F | H | SO$_3$H | SO$_3$H | H | F | | | | | |
| $1a^{470}$ | CF$_3$ | H | SO$_3$H | SO$_3$H | H | CF$_3$ | | | | | |
| $1a^{471}$ | H | SO$_3$H | H | H | SO$_3$H | H | Methyl | Methyl | CONH$_2$ | Methyl | Tert-butyl |
| $1a^{472}$ | H | H | SO$_3$H | SO$_3$H | H | H | | | | | |
| $1a^{473}$ | Methyl | H | SO$_3$H | SO$_3$H | H | Methyl | | | | | |
| $1a^{474}$ | OMe | H | SO$_3$H | SO$_3$H | H | OMe | | | | | |
| $1a^{475}$ | F | H | SO$_3$H | SO$_3$H | H | F | | | | | |
| $1a^{476}$ | CF$_3$ | H | SO$_3$H | SO$_3$H | H | CF$_3$ | | | | | |
| $1a^{477}$ | H | SO$_3$H | H | H | SO$_3$H | H | Methyl | Methyl | CONH$_2$ | Methyl | 3-Methylbutyl |
| $1a^{478}$ | H | H | SO$_3$H | SO$_3$H | H | H | | | | | |
| $1a^{479}$ | Methyl | H | SO$_3$H | SO$_3$H | H | Methyl | | | | | |
| $1a^{480}$ | OMe | H | SO$_3$H | SO$_3$H | H | OMe | | | | | |
| $1a^{481}$ | F | H | SO$_3$H | SO$_3$H | H | F | | | | | |
| $1a^{482}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{483}$ | H | $SO_3H$ | H | H | $SO_3H$ | H | Methyl | Methyl | $CONH_2$ | Methyl | Pentan-2-yl |
| $1a^{484}$ | H | H | $SO_3H$ | $SO_3H$ | H | H | | | | | |
| $1a^{485}$ | Methyl | H | $SO_3H$ | $SO_3H$ | H | Methyl | | | | | |
| $1a^{486}$ | OMe | H | $SO_3H$ | $SO_3H$ | H | OMe | | | | | |
| $1a^{487}$ | F | H | $SO_3H$ | $SO_3H$ | H | F | | | | | |
| $1a^{488}$ | $CF_3$ | H | $SO_3H$ | $SO_3H$ | H | $CF_3$ | | | | | |
| $1a^{489}$ | H | $SO_3H$ | H | H | $SO_3H$ | H | Methyl | Methyl | $CONH_2$ | Methyl | 2-Ethylhexyl |
| $1a^{490}$ | H | H | $SO_3H$ | $SO_3H$ | H | H | | | | | |
| $1a^{491}$ | Methyl | H | $SO_3H$ | $SO_3H$ | H | Methyl | | | | | |
| $1a^{492}$ | OMe | H | $SO_3H$ | $SO_3H$ | H | OMe | | | | | |
| $1a^{493}$ | F | H | $SO_3H$ | $SO_3H$ | H | F | | | | | |
| $1a^{494}$ | $CF_3$ | H | $SO_3H$ | $SO_3H$ | H | $CF_3$ | | | | | |
| $1a^{495}$ | H | $SO_3H$ | H | H | $SO_3H$ | H | Methyl | Methyl | $CONH_2$ | Methyl | 2,2-Dimethyl-propyl |
| $1a^{496}$ | H | H | $SO_3H$ | $SO_3H$ | H | H | | | | | |
| $1a^{497}$ | Methyl | H | $SO_3H$ | $SO_3H$ | H | Methyl | | | | | |
| $1a^{498}$ | OMe | H | $SO_3H$ | $SO_3H$ | H | OMe | | | | | |
| $1a^{499}$ | F | H | $SO_3H$ | $SO_3H$ | H | F | | | | | |
| $1a^{500}$ | $CF_3$ | H | $SO_3H$ | $SO_3H$ | H | $CF_3$ | | | | | |
| $1a^{501}$ | H | $SO_3H$ | H | H | $SO_3H$ | H | Methyl | Methyl | $CONH_2$ | Methyl | Phenyl |
| $1a^{502}$ | H | H | $SO_3H$ | $SO_3H$ | H | H | | | | | |
| $1a^{503}$ | Methyl | H | $SO_3H$ | $SO_3H$ | H | Methyl | | | | | |
| $1a^{504}$ | OMe | H | $SO_3H$ | $SO_3H$ | H | OMe | | | | | |
| $1a^{505}$ | F | H | $SO_3H$ | $SO_3H$ | H | F | | | | | |
| $1a^{506}$ | $CF_3$ | H | $SO_3H$ | $SO_3H$ | H | $CF_3$ | | | | | |
| $1a^{507}$ | H | $SO_3H$ | H | H | $SO_3H$ | H | Methyl | Methyl | $CONH_2$ | Methyl | Benzyl |
| $1a^{508}$ | H | H | $SO_3H$ | $SO_3H$ | H | H | | | | | |
| $1a^{509}$ | Methyl | H | $SO_3H$ | $SO_3H$ | H | Methyl | | | | | |
| $1a^{510}$ | OMe | H | $SO_3H$ | $SO_3H$ | H | OMe | | | | | |
| $1a^{511}$ | F | H | $SO_3H$ | $SO_3H$ | H | F | | | | | |
| $1a^{512}$ | $CF_3$ | H | $SO_3H$ | $SO_3H$ | H | $CF_3$ | | | | | |
| $1a^{513}$ | H | $SO_3H$ | H | H | $SO_3H$ | H | Methyl | F | $CONH_2$ | Methyl | Methyl |
| $1a^{514}$ | H | H | $SO_3H$ | $SO_3H$ | H | H | | | | | |
| $1a^{515}$ | Methyl | H | $SO_3H$ | $SO_3H$ | H | Methyl | | | | | |
| $1a^{516}$ | OMe | H | $SO_3H$ | $SO_3H$ | H | OMe | | | | | |
| $1a^{517}$ | H | $SO_3H$ | H | H | $SO_3H$ | H | Methyl | F | $CONH_2$ | Methyl | Ethyl |
| $1a^{518}$ | H | H | $SO_3H$ | $SO_3H$ | H | H | | | | | |
| $1a^{519}$ | Methyl | H | $SO_3H$ | $SO_3H$ | H | Methyl | | | | | |
| $1a^{520}$ | OMe | H | $SO_3H$ | $SO_3H$ | H | OMe | | | | | |
| $1a^{521}$ | H | $SO_3H$ | H | H | $SO_3H$ | H | Methyl | F | $CONH_2$ | Methyl | Propyl |
| $1a^{522}$ | H | H | $SO_3H$ | $SO_3H$ | H | H | | | | | |
| $1a^{523}$ | Methyl | H | $SO_3H$ | $SO_3H$ | H | Methyl | | | | | |
| $1a^{524}$ | OMe | H | $SO_3H$ | $SO_3H$ | H | OMe | | | | | |
| $1a^{525}$ | H | $SO_3H$ | H | H | $SO_3H$ | H | Methyl | F | $CONH_2$ | Methyl | Butyl |
| $1a^{526}$ | H | H | $SO_3H$ | $SO_3H$ | H | H | | | | | |
| $1a^{527}$ | Methyl | H | $SO_3H$ | $SO_3H$ | H | Methyl | | | | | |
| $1a^{528}$ | OMe | H | $SO_3H$ | $SO_3H$ | H | OMe | | | | | |
| $1a^{529}$ | H | $SO_3H$ | H | H | $SO_3H$ | H | Methyl | F | $CONH_2$ | Methyl | Pentyl |
| $1a^{530}$ | H | H | $SO_3H$ | $SO_3H$ | H | H | | | | | |
| $1a^{531}$ | Methyl | H | $SO_3H$ | $SO_3H$ | H | Methyl | | | | | |
| $1a^{532}$ | OMe | H | $SO_3H$ | $SO_3H$ | H | OMe | | | | | |
| $1a^{533}$ | H | $SO_3H$ | H | H | $SO_3H$ | H | Methyl | F | $CONH_2$ | Methyl | Hexyl |
| $1a^{534}$ | H | H | $SO_3H$ | $SO_3H$ | H | H | | | | | |
| $1a^{535}$ | Methyl | H | $SO_3H$ | $SO_3H$ | H | Methyl | | | | | |
| $1a^{536}$ | OMe | H | $SO_3H$ | $SO_3H$ | H | OMe | | | | | |
| $1a^{537}$ | H | $SO_3H$ | H | H | $SO_3H$ | H | Methyl | F | $CONH_2$ | Methyl | Cyclobutyl |
| $1a^{538}$ | H | H | $SO_3H$ | $SO_3H$ | H | H | | | | | |
| $1a^{539}$ | Methyl | H | $SO_3H$ | $SO_3H$ | H | Methyl | | | | | |
| $1a^{540}$ | OMe | H | $SO_3H$ | $SO_3H$ | H | OMe | | | | | |
| $1a^{541}$ | H | $SO_3H$ | H | H | $SO_3H$ | H | Methyl | F | $CONH_2$ | Methyl | Cyclopentyl |
| $1a^{542}$ | H | H | $SO_3H$ | $SO_3H$ | H | H | | | | | |
| $1a^{543}$ | Methyl | H | $SO_3H$ | $SO_3H$ | H | Methyl | | | | | |
| $1a^{544}$ | OMe | H | $SO_3H$ | $SO_3H$ | H | OMe | | | | | |
| $1a^{545}$ | H | $SO_3H$ | H | H | $SO_3H$ | H | Methyl | F | $CONH_2$ | Methyl | Cyclohexyl |
| $1a^{546}$ | H | H | $SO_3H$ | $SO_3H$ | H | H | | | | | |
| $1a^{547}$ | Methyl | H | $SO_3H$ | $SO_3H$ | H | Methyl | | | | | |
| $1a^{548}$ | OMe | H | $SO_3H$ | $SO_3H$ | H | OMe | | | | | |
| $1a^{549}$ | H | $SO_3H$ | H | H | $SO_3H$ | H | Methyl | F | $CONH_2$ | Methyl | 2-Methyl-cyclohexyl |
| $1a^{550}$ | H | H | $SO_3H$ | $SO_3H$ | H | H | | | | | |
| $1a^{551}$ | Methyl | H | $SO_3H$ | $SO_3H$ | H | Methyl | | | | | |
| $1a^{552}$ | OMe | H | $SO_3H$ | $SO_3H$ | H | OMe | | | | | |
| $1a^{553}$ | H | $SO_3H$ | H | H | $SO_3H$ | H | Methyl | F | $CONH_2$ | Methyl | 3-Methyl-cyclohexyl |
| $1a^{554}$ | H | H | $SO_3H$ | $SO_3H$ | H | H | | | | | |
| $1a^{555}$ | Methyl | H | $SO_3H$ | $SO_3H$ | H | Methyl | | | | | |
| $1a^{556}$ | OMe | H | $SO_3H$ | $SO_3H$ | H | OMe | | | | | |
| $1a^{557}$ | H | $SO_3H$ | H | H | $SO_3H$ | H | Methyl | F | $CONH_2$ | Methyl | Isopropyl |
| $1a^{558}$ | H | H | $SO_3H$ | $SO_3H$ | H | H | | | | | |
| $1a^{559}$ | Methyl | H | $SO_3H$ | $SO_3H$ | H | Methyl | | | | | |
| $1a^{560}$ | OMe | H | $SO_3H$ | $SO_3H$ | H | OMe | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| $1a^{561}$ | H | $SO_3H$ | H | H | $SO_3H$ | H | Methyl | F | $CONH_2$ | Methyl | Sec-butyl |
| $1a^{562}$ | H | H | $SO_3H$ | $SO_3H$ | H | H | | | | | |
| $1a^{563}$ | Methyl | H | $SO_3H$ | $SO_3H$ | H | Methyl | | | | | |
| $1a^{564}$ | OMe | H | $SO_3H$ | $SO_3H$ | H | OMe | | | | | |
| $1a^{565}$ | H | $SO_3H$ | H | H | $SO_3H$ | H | Methyl | F | $CONH_2$ | Methyl | 2-Methylbutyl |
| $1a^{566}$ | H | H | $SO_3H$ | $SO_3H$ | H | H | | | | | |
| $1a^{567}$ | Methyl | H | $SO_3H$ | $SO_3H$ | H | Methyl | | | | | |
| $1a^{568}$ | OMe | H | $SO_3H$ | $SO_3H$ | H | OMe | | | | | |
| $1a^{569}$ | H | $SO_3H$ | H | H | $SO_3H$ | H | Methyl | F | $CONH_2$ | Methyl | 1-Ethylpropyl |
| $1a^{570}$ | H | H | $SO_3H$ | $SO_3H$ | H | H | | | | | |
| $1a^{571}$ | Methyl | H | $SO_3H$ | $SO_3H$ | H | Methyl | | | | | |
| $1a^{572}$ | OMe | H | $SO_3H$ | $SO_3H$ | H | OMe | | | | | |
| $1a^{573}$ | H | $SO_3H$ | H | H | $SO_3H$ | H | Methyl | F | $CONH_2$ | Methyl | 1,2-Dimethyl-propyl |
| $1a^{574}$ | H | H | $SO_3H$ | $SO_3H$ | H | H | | | | | |
| $1a^{575}$ | Methyl | H | $SO_3H$ | $SO_3H$ | H | Methyl | | | | | |
| $1a^{576}$ | OMe | H | $SO_3H$ | $SO_3H$ | H | OMe | | | | | |
| $1a^{577}$ | H | $SO_3H$ | H | H | $SO_3H$ | H | Methyl | F | $CONH_2$ | Methyl | Tert-butyl |
| $1a^{578}$ | H | H | $SO_3H$ | $SO_3H$ | H | H | | | | | |
| $1a^{579}$ | Methyl | H | $SO_3H$ | $SO_3H$ | H | Methyl | | | | | |
| $1a^{580}$ | OMe | H | $SO_3H$ | $SO_3H$ | H | OMe | | | | | |
| $1a^{581}$ | H | $SO_3H$ | H | H | $SO_3H$ | H | Methyl | F | $CONH_2$ | Methyl | 3-Methylbutyl |
| $1a^{582}$ | H | H | $SO_3H$ | $SO_3H$ | H | H | | | | | |
| $1a^{583}$ | Methyl | H | $SO_3H$ | $SO_3H$ | H | Methyl | | | | | |
| $1a^{584}$ | OMe | H | $SO_3H$ | $SO_3H$ | H | OMe | | | | | |
| $1a^{585}$ | H | $SO_3H$ | H | H | $SO_3H$ | H | Methyl | F | $CONH_2$ | Methyl | Pentan-2-yl |
| $1a^{586}$ | H | H | $SO_3H$ | $SO_3H$ | H | H | | | | | |
| $1a^{587}$ | Methyl | H | $SO_3H$ | $SO_3H$ | H | Methyl | | | | | |
| $1a^{588}$ | OMe | H | $SO_3H$ | $SO_3H$ | H | OMe | | | | | |
| $1a^{589}$ | H | $SO_3H$ | H | H | $SO_3H$ | H | Methyl | F | $CONH_2$ | Methyl | 2-Ethylhexyl |
| $1a^{590}$ | H | H | $SO_3H$ | $SO_3H$ | H | H | | | | | |
| $1a^{591}$ | Methyl | H | $SO_3H$ | $SO_3H$ | H | Methyl | | | | | |
| $1a^{592}$ | OMe | H | $SO_3H$ | $SO_3H$ | H | OMe | | | | | |
| $1a^{593}$ | F | H | $SO_3H$ | $SO_3H$ | H | F | | | | | |
| $1a^{594}$ | $CF_3$ | H | $SO_3H$ | $SO_3H$ | H | $CF_3$ | | | | | |
| $1a^{595}$ | H | $SO_3H$ | H | H | $SO_3H$ | H | Methyl | F | $CONH_2$ | Methyl | 2,2-Dimethyl-propyl |
| $1a^{596}$ | H | H | $SO_3H$ | $SO_3H$ | H | H | | | | | |
| $1a^{597}$ | Methyl | H | $SO_3H$ | $SO_3H$ | H | Methyl | | | | | |
| $1a^{598}$ | OMe | H | $SO_3H$ | $SO_3H$ | H | OMe | | | | | |
| $1a^{599}$ | H | $SO_3H$ | H | H | $SO_3H$ | H | Methyl | F | $CONH_2$ | Methyl | Phenyl |
| $1a^{600}$ | H | H | $SO_3H$ | $SO_3H$ | H | H | | | | | |
| $1a^{601}$ | Methyl | H | $SO_3H$ | $SO_3H$ | H | Methyl | | | | | |
| $1a^{602}$ | OMe | H | $SO_3H$ | $SO_3H$ | H | OMe | | | | | |
| $1a^{603}$ | F | H | $SO_3H$ | $SO_3H$ | H | F | | | | | |
| $1a^{604}$ | $CF_3$ | H | $SO_3H$ | $SO_3H$ | H | $CF_3$ | | | | | |
| $1a^{605}$ | H | $SO_3H$ | H | H | $SO_3H$ | H | Methyl | F | $CONH_2$ | Methyl | Benzyl |
| $1a^{606}$ | H | H | $SO_3H$ | $SO_3H$ | H | H | | | | | |
| $1a^{607}$ | Methyl | H | $SO_3H$ | $SO_3H$ | H | Methyl | | | | | |
| $1a^{608}$ | OMe | H | $SO_3H$ | $SO_3H$ | H | OMe | | | | | |
| $1a^{609}$ | F | H | $SO_3H$ | $SO_3H$ | H | F | | | | | |
| $1a^{610}$ | $CF_3$ | H | $SO_3H$ | $SO_3H$ | H | $CF_3$ | | | | | |
| $1a^{611}$ | H | $SO_3H$ | H | H | $SO_3H$ | H | $NHCOCH_3$ | OMe | $CONH_2$ | Methyl | Methyl |
| $1a^{612}$ | H | H | $SO_3H$ | $SO_3H$ | H | H | | | | | |
| $1a^{613}$ | Methyl | H | $SO_3H$ | $SO_3H$ | H | Methyl | | | | | |
| $1a^{614}$ | OMe | H | $SO_3H$ | $SO_3H$ | H | OMe | | | | | |
| $1a^{615}$ | F | H | $SO_3H$ | $SO_3H$ | H | F | | | | | |
| $1a^{616}$ | $CF_3$ | H | $SO_3H$ | $SO_3H$ | H | $CF_3$ | | | | | |
| $1a^{617}$ | H | $SO_3H$ | H | H | $SO_3H$ | H | $NHCOCH_3$ | OMe | $CONH_2$ | Methyl | Ethyl |
| $1a^{618}$ | H | H | $SO_3H$ | $SO_3H$ | H | H | | | | | |
| $1a^{619}$ | Methyl | H | $SO_3H$ | $SO_3H$ | H | Methyl | | | | | |
| $1a^{620}$ | OMe | H | $SO_3H$ | $SO_3H$ | H | OMe | | | | | |
| $1a^{621}$ | F | H | $SO_3H$ | $SO_3H$ | H | F | | | | | |
| $1a^{622}$ | $CF_3$ | H | $SO_3H$ | $SO_3H$ | H | $CF_3$ | | | | | |
| $1a^{623}$ | H | $SO_3H$ | H | H | $SO_3H$ | H | $NHCOCH_3$ | OMe | $CONH_2$ | Methyl | Propyl |
| $1a^{624}$ | H | H | $SO_3H$ | $SO_3H$ | H | H | | | | | |
| $1a^{625}$ | Methyl | H | $SO_3H$ | $SO_3H$ | H | Methyl | | | | | |
| $1a^{626}$ | OMe | H | $SO_3H$ | $SO_3H$ | H | OMe | | | | | |
| $1a^{627}$ | F | H | $SO_3H$ | $SO_3H$ | H | F | | | | | |
| $1a^{628}$ | $CF_3$ | H | $SO_3H$ | $SO_3H$ | H | $CF_3$ | | | | | |
| $1a^{629}$ | H | $SO_3H$ | H | H | $SO_3H$ | H | $NHCOCH_3$ | OMe | $CONH_2$ | Methyl | Butyl |
| $1a^{630}$ | H | H | $SO_3H$ | $SO_3H$ | H | H | | | | | |
| $1a^{631}$ | Methyl | H | $SO_3H$ | $SO_3H$ | H | Methyl | | | | | |
| $1a^{632}$ | OMe | H | $SO_3H$ | $SO_3H$ | H | OMe | | | | | |
| $1a^{633}$ | F | H | $SO_3H$ | $SO_3H$ | H | F | | | | | |
| $1a^{634}$ | $CF_3$ | H | $SO_3H$ | $SO_3H$ | H | $CF_3$ | | | | | |

TABLE 1-continued

| Structure | R$^{1a}$ | R$^{3a}$ | R$^{4a}$ | R$^{5a}$ | R$^{6a}$ | R$^{8a}$ | R$^{9a}$/R$^{13a}$ | R$^{10a}$/R$^{14a}$ | R$^{18a}$/R$^{21a}$ | R$^{19a}$/R$^{22a}$ | R$^{17a}$/R$^{20a}$ |
|---|---|---|---|---|---|---|---|---|---|---|---|
| 1a$^{635}$ | H | SO$_3$H | H | H | SO$_3$H | H | NHCOCH$_3$ | OMe | CONH$_2$ | Methyl | Pentyl |
| 1a$^{636}$ | H | H | SO$_3$H | SO$_3$H | H | H | | | | | |
| 1a$^{637}$ | Methyl | H | SO$_3$H | SO$_3$H | H | Methyl | | | | | |
| 1a$^{638}$ | OMe | H | SO$_3$H | SO$_3$H | H | OMe | | | | | |
| 1a$^{639}$ | F | H | SO$_3$H | SO$_3$H | H | F | | | | | |
| 1a$^{640}$ | CF$_3$ | H | SO$_3$H | SO$_3$H | H | CF$_3$ | | | | | |
| 1a$^{641}$ | H | SO$_3$H | H | H | SO$_3$H | H | NHCOCH$_3$ | OMe | CONH$_2$ | Methyl | Hexyl |
| 1a$^{642}$ | H | H | SO$_3$H | SO$_3$H | H | H | | | | | |
| 1a$^{643}$ | Methyl | H | SO$_3$H | SO$_3$H | H | Methyl | | | | | |
| 1a$^{644}$ | OMe | H | SO$_3$H | SO$_3$H | H | OMe | | | | | |
| 1a$^{645}$ | F | H | SO$_3$H | SO$_3$H | H | F | | | | | |
| 1a$^{646}$ | CF$_3$ | H | SO$_3$H | SO$_3$H | H | CF$_3$ | | | | | |
| 1a$^{647}$ | H | SO$_3$H | H | H | SO$_3$H | H | NHCOCH$_3$ | OMe | CONH$_2$ | Methyl | Cyclobutyl |
| 1a$^{648}$ | H | H | SO$_3$H | SO$_3$H | H | H | | | | | |
| 1a$^{649}$ | Methyl | H | SO$_3$H | SO$_3$H | H | Methyl | | | | | |
| 1a$^{650}$ | OMe | H | SO$_3$H | SO$_3$H | H | OMe | | | | | |
| 1a$^{651}$ | F | H | SO$_3$H | SO$_3$H | H | F | | | | | |
| 1a$^{652}$ | CF$_3$ | H | SO$_3$H | SO$_3$H | H | CF$_3$ | | | | | |
| 1a$^{653}$ | H | SO$_3$H | H | H | SO$_3$H | H | NHCOCH$_3$ | OMe | CONH$_2$ | Methyl | Cyclopentyl |
| 1a$^{654}$ | H | H | SO$_3$H | SO$_3$H | H | H | | | | | |
| 1a$^{655}$ | Methyl | H | SO$_3$H | SO$_3$H | H | Methyl | | | | | |
| 1a$^{656}$ | OMe | H | SO$_3$H | SO$_3$H | H | OMe | | | | | |
| 1a$^{657}$ | F | H | SO$_3$H | SO$_3$H | H | F | | | | | |
| 1a$^{658}$ | CF$_3$ | H | SO$_3$H | SO$_3$H | H | CF$_3$ | | | | | |
| 1a$^{659}$ | H | SO$_3$H | H | H | SO$_3$H | H | NHCOCH$_3$ | OMe | CONH$_2$ | Methyl | Cyclohexyl |
| 1a$^{660}$ | H | H | SO$_3$H | SO$_3$H | H | H | | | | | |
| 1a$^{661}$ | Methyl | H | SO$_3$H | SO$_3$H | H | Methyl | | | | | |
| 1a$^{662}$ | OMe | H | SO$_3$H | SO$_3$H | H | OMe | | | | | |
| 1a$^{663}$ | F | H | SO$_3$H | SO$_3$H | H | F | | | | | |
| 1a$^{664}$ | CF$_3$ | H | SO$_3$H | SO$_3$H | H | CF$_3$ | | | | | |
| 1a$^{665}$ | H | SO$_3$H | H | H | SO$_3$H | H | NHCOCH$_3$ | OMe | CONH$_2$ | Methyl | 2-Methyl-cyclohexyl |
| 1a$^{666}$ | H | H | SO$_3$H | SO$_3$H | H | H | | | | | |
| 1a$^{667}$ | Methyl | H | SO$_3$H | SO$_3$H | H | Methyl | | | | | |
| 1a$^{668}$ | OMe | H | SO$_3$H | SO$_3$H | H | OMe | | | | | |
| 1a$^{669}$ | F | H | SO$_3$H | SO$_3$H | H | F | | | | | |
| 1a$^{670}$ | CF$_3$ | H | SO$_3$H | SO$_3$H | H | CF$_3$ | | | | | |
| 1a$^{671}$ | H | SO$_3$H | H | H | SO$_3$H | H | NHCOCH$_3$ | OMe | CONH$_2$ | Methyl | 3-Methyl-cyclohexyl |
| 1a$^{672}$ | H | H | SO$_3$H | SO$_3$H | H | H | | | | | |
| 1a$^{673}$ | Methyl | H | SO$_3$H | SO$_3$H | H | Methyl | | | | | |
| 1a$^{674}$ | OMe | H | SO$_3$H | SO$_3$H | H | OMe | | | | | |
| 1a$^{675}$ | F | H | SO$_3$H | SO$_3$H | H | F | | | | | |
| 1a$^{676}$ | CF$_3$ | H | SO$_3$H | SO$_3$H | H | CF$_3$ | | | | | |
| 1a$^{677}$ | H | SO$_3$H | H | H | SO$_3$H | H | NHCOCH$_3$ | OMe | CONH$_2$ | Methyl | Isopropyl |
| 1a$^{678}$ | H | H | SO$_3$H | SO$_3$H | H | H | | | | | |
| 1a$^{679}$ | Methyl | H | SO$_3$H | SO$_3$H | H | Methyl | | | | | |
| 1a$^{680}$ | OMe | H | SO$_3$H | SO$_3$H | H | OMe | | | | | |
| 1a$^{681}$ | F | H | SO$_3$H | SO$_3$H | H | F | | | | | |
| 1a$^{682}$ | CF$_3$ | H | SO$_3$H | SO$_3$H | H | CF$_3$ | | | | | |
| 1a$^{683}$ | H | SO$_3$H | H | H | SO$_3$H | H | NHCOCH$_3$ | OMe | CONH$_2$ | Methyl | Sec-butyl |
| 1a$^{684}$ | H | H | SO$_3$H | SO$_3$H | H | H | | | | | |
| 1a$^{685}$ | Methyl | H | SO$_3$H | SO$_3$H | H | Methyl | | | | | |
| 1a$^{686}$ | OMe | H | SO$_3$H | SO$_3$H | H | OMe | | | | | |
| 1a$^{687}$ | F | H | SO$_3$H | SO$_3$H | H | F | | | | | |
| 1a$^{688}$ | CF$_3$ | H | SO$_3$H | SO$_3$H | H | CF$_3$ | | | | | |
| 1a$^{689}$ | H | SO$_3$H | H | H | SO$_3$H | H | NHCOCH$_3$ | OMe | CONH$_2$ | Methyl | 2-Methylbutyl |
| 1a$^{690}$ | H | H | SO$_3$H | SO$_3$H | H | H | | | | | |
| 1a$^{691}$ | Methyl | H | SO$_3$H | SO$_3$H | H | Methyl | | | | | |
| 1a$^{692}$ | OMe | H | SO$_3$H | SO$_3$H | H | OMe | | | | | |
| 1a$^{693}$ | F | H | SO$_3$H | SO$_3$H | H | F | | | | | |
| 1a$^{694}$ | CF$_3$ | H | SO$_3$H | SO$_3$H | H | CF$_3$ | | | | | |
| 1a$^{695}$ | H | SO$_3$H | H | H | SO$_3$H | H | NHCOCH$_3$ | OMe | CONH$_2$ | Methyl | 1-Ethyl-propyl |
| 1a$^{696}$ | H | H | SO$_3$H | SO$_3$H | H | H | | | | | |
| 1a$^{697}$ | Methyl | H | SO$_3$H | SO$_3$H | H | Methyl | | | | | |
| 1a$^{698}$ | OMe | H | SO$_3$H | SO$_3$H | H | OMe | | | | | |
| 1a$^{699}$ | F | H | SO$_3$H | SO$_3$H | H | F | | | | | |
| 1a$^{700}$ | CF$_3$ | H | SO$_3$H | SO$_3$H | H | CF$_3$ | | | | | |
| 1a$^{701}$ | H | SO$_3$H | H | H | SO$_3$H | H | NHCOCH$_3$ | OMe | CONH$_2$ | Methyl | 1,2-Dimethyl-propyl |
| 1a$^{702}$ | H | H | SO$_3$H | SO$_3$H | H | H | | | | | |
| 1a$^{703}$ | Methyl | H | SO$_3$H | SO$_3$H | H | Methyl | | | | | |
| 1a$^{704}$ | OMe | H | SO$_3$H | SO$_3$H | H | OMe | | | | | |
| 1a$^{705}$ | F | H | SO$_3$H | SO$_3$H | H | F | | | | | |
| 1a$^{706}$ | CF$_3$ | H | SO$_3$H | SO$_3$H | H | CF$_3$ | | | | | |
| 1a$^{707}$ | H | SO$_3$H | H | H | SO$_3$H | H | NHCOCH$_3$ | OMe | CONH$_2$ | Methyl | Tert-butyl |
| 1a$^{708}$ | H | H | SO$_3$H | SO$_3$H | H | H | | | | | |
| 1a$^{709}$ | Methyl | H | SO$_3$H | SO$_3$H | H | Methyl | | | | | |
| 1a$^{710}$ | OMe | H | SO$_3$H | SO$_3$H | H | OMe | | | | | |
| 1a$^{711}$ | F | H | SO$_3$H | SO$_3$H | H | F | | | | | |
| 1a$^{712}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{713}$ | H | SO$_3$H | H | H | SO$_3$H | H | NHCOCH$_3$ | OMe | CONH$_2$ | Methyl | 3-Methylbutyl |
| 1a$^{714}$ | H | H | SO$_3$H | SO$_3$H | H | H | | | | | |
| 1a$^{715}$ | Methyl | H | SO$_3$H | SO$_3$H | H | Methyl | | | | | |
| 1a$^{716}$ | OMe | H | SO$_3$H | SO$_3$H | H | OMe | | | | | |
| 1a$^{717}$ | F | H | SO$_3$H | SO$_3$H | H | F | | | | | |
| 1a$^{718}$ | CF$_3$ | H | SO$_3$H | SO$_3$H | H | CF$_3$ | | | | | |
| 1a$^{719}$ | H | SO$_3$H | H | H | SO$_3$H | H | NHCOCH$_3$ | OMe | CONH$_2$ | Methyl | Pentan-2-yl |
| 1a$^{720}$ | H | H | SO$_3$H | SO$_3$H | H | H | | | | | |
| 1a$^{721}$ | Methyl | H | SO$_3$H | SO$_3$H | H | Methyl | | | | | |
| 1a$^{722}$ | OMe | H | SO$_3$H | SO$_3$H | H | OMe | | | | | |
| 1a$^{723}$ | F | H | SO$_3$H | SO$_3$H | H | F | | | | | |
| 1a$^{724}$ | CF$_3$ | H | SO$_3$H | SO$_3$H | H | CF$_3$ | | | | | |
| 1a$^{725}$ | H | SO$_3$H | H | H | SO$_3$H | H | NHCOCH$_3$ | OMe | CONH$_2$ | Methyl | 2-Ethyl-hexyl |
| 1a$^{726}$ | H | H | SO$_3$H | SO$_3$H | H | H | | | | | |
| 1a$^{727}$ | Methyl | H | SO$_3$H | SO$_3$H | H | Methyl | | | | | |
| 1a$^{728}$ | OMe | H | SO$_3$H | SO$_3$H | H | OMe | | | | | |
| 1a$^{729}$ | F | H | SO$_3$H | SO$_3$H | H | F | | | | | |
| 1a$^{730}$ | CF$_3$ | H | SO$_3$H | SO$_3$H | H | CF$_3$ | | | | | |
| 1a$^{731}$ | H | SO$_3$H | H | H | SO$_3$H | H | NHCOCH$_3$ | OMe | CONH$_2$ | Methyl | 2,2-Dimethyl-propyl |
| 1a$^{732}$ | H | H | SO$_3$H | SO$_3$H | H | H | | | | | |
| 1a$^{733}$ | Methyl | H | SO$_3$H | SO$_3$H | H | Methyl | | | | | |
| 1a$^{734}$ | OMe | H | SO$_3$H | SO$_3$H | H | OMe | | | | | |
| 1a$^{735}$ | F | H | SO$_3$H | SO$_3$H | H | F | | | | | |
| 1a$^{736}$ | H | SO$_3$H | H | H | SO$_3$H | H | NHCOCH$_3$ | OMe | CN | Methyl | Phenyl |
| 1a$^{737}$ | H | H | SO$_3$H | SO$_3$H | H | H | | | | | |
| 1a$^{738}$ | Methyl | H | SO$_3$H | SO$_3$H | H | Methyl | | | | | |
| 1a$^{739}$ | OMe | H | SO$_3$H | SO$_3$H | H | OMe | | | | | |
| 1a$^{740}$ | F | H | SO$_3$H | SO$_3$H | H | F | | | | | |
| 1a$^{741}$ | CF$_3$ | H | SO$_3$H | SO$_3$H | H | CF$_3$ | | | | | |
| 1a$^{742}$ | H | SO$_3$H | H | H | SO$_3$H | H | NHCOCH$_3$ | OMe | CN | Methyl | Benzyl |
| 1a$^{743}$ | H | H | SO$_3$H | SO$_3$H | H | H | | | | | |
| 1a$^{744}$ | Methyl | H | SO$_3$H | SO$_3$H | H | Methyl | | | | | |
| 1a$^{745}$ | OMe | H | SO$_3$H | SO$_3$H | H | OMe | | | | | |
| 1a$^{746}$ | F | H | SO$_3$H | SO$_3$H | H | F | | | | | |
| 1a$^{747}$ | CF$_3$ | H | SO$_3$H | SO$_3$H | H | CF$_3$ | | | | | |
| 1a$^{748}$ | H | SO$_3$H | H | H | SO$_3$H | H | Methyl | Methyl | CN | Methyl | Allyl |
| 1a$^{749}$ | H | H | SO$_3$H | SO$_3$H | H | H | | | | | |
| 1a$^{750}$ | Methyl | H | SO$_3$H | SO$_3$H | H | Methyl | | | | | |
| 1a$^{751}$ | OMe | H | SO$_3$H | SO$_3$H | H | OMe | | | | | |
| 1a$^{752}$ | F | H | SO$_3$H | SO$_3$H | H | F | | | | | |
| 1a$^{753}$ | CF$_3$ | H | SO$_3$H | SO$_3$H | H | CF$_3$ | | | | | |
| 1a$^{754}$ | H | SO$_3$H | H | H | SO$_3$H | H | Methyl | Methyl | CN | Methyl | 2-Methoxy-ethyl |
| 1a$^{755}$ | H | H | SO$_3$H | SO$_3$H | H | H | | | | | |
| 1a$^{756}$ | Methyl | H | SO$_3$H | SO$_3$H | H | Methyl | | | | | |
| 1a$^{757}$ | OMe | H | SO$_3$H | SO$_3$H | H | OMe | | | | | |
| 1a$^{758}$ | F | H | SO$_3$H | SO$_3$H | H | F | | | | | |
| 1a$^{759}$ | CF$_3$ | H | SO$_3$H | SO$_3$H | H | CF$_3$ | | | | | |
| 1a$^{760}$ | H | SO$_3$H | H | H | SO$_3$H | H | Methyl | Methyl | CN | Methyl | 3-Methoxy-propyl |
| 1a$^{761}$ | H | H | SO$_3$H | SO$_3$H | H | H | | | | | |
| 1a$^{762}$ | Methyl | H | SO$_3$H | SO$_3$H | H | Methyl | | | | | |
| 1a$^{763}$ | OMe | H | SO$_3$H | SO$_3$H | H | OMe | | | | | |
| 1a$^{764}$ | F | H | SO$_3$H | SO$_3$H | H | F | | | | | |
| 1a$^{765}$ | CF$_3$ | H | SO$_3$H | SO$_3$H | H | CF$_3$ | | | | | |
| 1a$^{766}$ | H | SO$_3$H | H | H | SO$_3$H | H | Methyl | Methyl | CN | Methyl | 2-Cyano-ethyl |
| 1a$^{767}$ | H | H | SO$_3$H | SO$_3$H | H | H | | | | | |
| 1a$^{768}$ | Methyl | H | SO$_3$H | SO$_3$H | H | Methyl | | | | | |
| 1a$^{769}$ | OMe | H | SO$_3$H | SO$_3$H | H | OMe | | | | | |
| 1a$^{770}$ | F | H | SO$_3$H | SO$_3$H | H | F | | | | | |
| 1a$^{771}$ | CF$_3$ | H | SO$_3$H | SO$_3$H | H | CF$_3$ | | | | | |
| 1a$^{772}$ | H | SO$_3$H | H | H | SO$_3$H | H | Methyl | Methyl | CN | Methyl | 2-(Methyl-thio)ethyl |
| 1a$^{773}$ | H | H | SO$_3$H | SO$_3$H | H | H | | | | | |
| 1a$^{774}$ | Methyl | H | SO$_3$H | SO$_3$H | H | Methyl | | | | | |
| 1a$^{775}$ | OMe | H | SO$_3$H | SO$_3$H | H | OMe | | | | | |
| 1a$^{776}$ | F | H | SO$_3$H | SO$_3$H | H | F | | | | | |
| 1a$^{777}$ | CF$_3$ | H | SO$_3$H | SO$_3$H | H | CF$_3$ | | | | | |
| 1a$^{778}$ | H | SO$_3$H | H | H | SO$_3$H | H | Methyl | Methyl | CN | Methyl | 2-Fluoro-ethyl |
| 1a$^{779}$ | H | H | SO$_3$H | SO$_3$H | H | H | | | | | |
| 1a$^{780}$ | Methyl | H | SO$_3$H | SO$_3$H | H | Methyl | | | | | |
| 1a$^{781}$ | OMe | H | SO$_3$H | SO$_3$H | H | OMe | | | | | |
| 1a$^{782}$ | F | H | SO$_3$H | SO$_3$H | H | F | | | | | |
| 1a$^{783}$ | CF$_3$ | H | SO$_3$H | SO$_3$H | H | CF$_3$ | | | | | |
| 1a$^{784}$ | H | SO$_3$H | H | H | SO$_3$H | H | Methyl | Methyl | CN | Methyl | 2-Chloro-ethyl |
| 1a$^{785}$ | H | H | SO$_3$H | SO$_3$H | H | H | | | | | |
| 1a$^{786}$ | Methyl | H | SO$_3$H | SO$_3$H | H | Methyl | | | | | |
| 1a$^{787}$ | OMe | H | SO$_3$H | SO$_3$H | H | OMe | | | | | |
| 1a$^{788}$ | F | H | SO$_3$H | SO$_3$H | H | F | | | | | |
| 1a$^{789}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{790}$ | H | SO$_3$H | H | H | SO$_3$H | H | Methyl | Methyl | CN | Methyl | 3-Chloro-propyl |
| 1a$^{791}$ | H | H | SO$_3$H | SO$_3$H | H | H | | | | | |
| 1a$^{792}$ | Methyl | H | SO$_3$H | SO$_3$H | H | Methyl | | | | | |
| 1a$^{793}$ | OMe | H | SO$_3$H | SO$_3$H | H | OMe | | | | | |
| 1a$^{794}$ | F | H | SO$_3$H | SO$_3$H | H | F | | | | | |
| 1a$^{795}$ | CF$_3$ | H | SO$_3$H | SO$_3$H | H | CF$_3$ | | | | | |
| 1a$^{796}$ | H | SO$_3$H | H | H | SO$_3$H | H | Methyl | Methyl | CN | Methyl | Tetrahydro-furfuryl |
| 1a$^{797}$ | H | H | SO$_3$H | SO$_3$H | H | H | | | | | |
| 1a$^{798}$ | Methyl | H | SO$_3$H | SO$_3$H | H | Methyl | | | | | |
| 1a$^{799}$ | OMe | H | SO$_3$H | SO$_3$H | H | OMe | | | | | |
| 1a$^{800}$ | F | H | SO$_3$H | SO$_3$H | H | F | | | | | |
| 1a$^{801}$ | CF$_3$ | H | SO$_3$H | SO$_3$H | H | CF$_3$ | | | | | |
| 1a$^{802}$ | H | SO$_3$H | H | H | SO$_3$H | H | Methyl | Methyl | CN | Methyl | 2-Furan-2-yl-ethyl |
| 1a$^{803}$ | H | H | SO$_3$H | SO$_3$H | H | H | | | | | |
| 1a$^{804}$ | Methyl | H | SO$_3$H | SO$_3$H | H | Methyl | | | | | |
| 1a$^{805}$ | OMe | H | SO$_3$H | SO$_3$H | H | OMe | | | | | |
| 1a$^{806}$ | F | H | SO$_3$H | SO$_3$H | H | F | | | | | |
| 1a$^{807}$ | CF$_3$ | H | SO$_3$H | SO$_3$H | H | CF$_3$ | | | | | |
| 1a$^{808}$ | H | SO$_3$H | H | H | SO$_3$H | H | Methyl | Methyl | CN | Methyl | 2-(2-Hydroxy-ethylsulfanyl)-ethyl |
| 1a$^{809}$ | H | H | SO$_3$H | SO$_3$H | H | H | | | | | |
| 1a$^{810}$ | Methyl | H | SO$_3$H | SO$_3$H | H | Methyl | | | | | |
| 1a$^{811}$ | OMe | H | SO$_3$H | SO$_3$H | H | OMe | | | | | |
| 1a$^{812}$ | F | H | SO$_3$H | SO$_3$H | H | F | | | | | |
| 1a$^{813}$ | CF$_3$ | H | SO$_3$H | SO$_3$H | H | CF$_3$ | | | | | |
| 1a$^{814}$ | H | SO$_3$H | H | H | SO$_3$H | H | Methyl | Methyl | CN | Methyl | 2-(2-tert-Butylsulfanyl-ethanesulfonyl)-ethyl |
| 1a$^{815}$ | H | H | SO$_3$H | SO$_3$H | H | H | | | | | |
| 1a$^{816}$ | Methyl | H | SO$_3$H | SO$_3$H | H | Methyl | | | | | |
| 1a$^{817}$ | OMe | H | SO$_3$H | SO$_3$H | H | OMe | | | | | |
| 1a$^{818}$ | F | H | SO$_3$H | SO$_3$H | H | F | | | | | |
| 1a$^{819}$ | CF$_3$ | H | SO$_3$H | SO$_3$H | H | CF$_3$ | | | | | |
| 1a$^{820}$ | H | SO$_3$H | H | H | SO$_3$H | H | Methyl | Methyl | CN | Methyl | 3-(4-Hydroxy-butoxy)propyl |
| 1a$^{821}$ | H | H | SO$_3$H | SO$_3$H | H | H | | | | | |
| 1a$^{822}$ | Methyl | H | SO$_3$H | SO$_3$H | H | Methyl | | | | | |
| 1a$^{823}$ | OMe | H | SO$_3$H | SO$_3$H | H | OMe | | | | | |
| 1a$^{824}$ | F | H | SO$_3$H | SO$_3$H | H | F | | | | | |
| 1a$^{825}$ | CF$_3$ | H | SO$_3$H | SO$_3$H | H | CF$_3$ | | | | | |
| 1a$^{826}$ | H | SO3H | H | H | SO3H | H | Methyl | Methyl | CN | Methyl | 2-(2-Hydroxy-ethoxy)ethyl |
| 1a$^{827}$ | H | H | SO3H | SO3H | H | H | | | | | |
| 1a$^{828}$ | Methyl | H | SO3H | SO3H | H | Methyl | | | | | |
| 1a$^{829}$ | OMe | H | SO3H | SO3H | H | OMe | | | | | |
| 1a$^{830}$ | F | H | SO3H | SO3H | H | F | | | | | |
| 1a$^{831}$ | CF3 | H | SO3H | SO3H | H | CF3 | | | | | |
| 1a$^{832}$ | H | SO$_3$H | H | H | SO$_3$H | H | Methyl | Methyl | CN | Methyl | 3-Isopropoxy-propyl |
| 1a$^{833}$ | H | H | SO$_3$H | SO$_3$H | H | H | | | | | |
| 1a$^{834}$ | Methyl | H | SO$_3$H | SO$_3$H | H | Methyl | | | | | |
| 1a$^{835}$ | OMe | H | SO$_3$H | SO$_3$H | H | OMe | | | | | |
| 1a$^{836}$ | F | H | SO$_3$H | SO$_3$H | H | F | | | | | |
| 1a$^{837}$ | CF$_3$ | H | SO$_3$H | SO$_3$H | H | CF$_3$ | | | | | |
| 1a$^{838}$ | H | SO$_3$H | H | H | SO$_3$H | H | Methyl | F | CN | Methyl | Allyl |
| 1a$^{839}$ | H | H | SO$_3$H | SO$_3$H | H | H | | | | | |
| 1a$^{840}$ | Methyl | H | SO$_3$H | SO$_3$H | H | Methyl | | | | | |
| 1a$^{841}$ | OMe | H | SO$_3$H | SO$_3$H | H | OMe | | | | | |
| 1a$^{842}$ | H | SO$_3$H | H | H | SO$_3$H | H | Methyl | F | CN | Methyl | 2-Methoxy-ethyl |
| 1a$^{843}$ | H | H | SO$_3$H | SO$_3$H | H | H | | | | | |
| 1a$^{844}$ | Methyl | H | SO$_3$H | SO$_3$H | H | Methyl | | | | | |
| 1a$^{845}$ | OMe | H | SO$_3$H | SO$_3$H | H | OMe | | | | | |
| 1a$^{846}$ | H | SO$_3$H | H | H | SO$_3$H | H | Methyl | F | CN | Methyl | 3-Methoxy-propyl |
| 1a$^{847}$ | H | H | SO$_3$H | SO$_3$H | H | H | | | | | |
| 1a$^{848}$ | Methyl | H | SO$_3$H | SO$_3$H | H | Methyl | | | | | |
| 1a$^{849}$ | OMe | H | SO$_3$H | SO$_3$H | H | OMe | | | | | |
| 1a$^{850}$ | H | SO$_3$H | H | H | SO$_3$H | H | Methyl | F | CN | Methyl | 2-Cyano-ethyl |
| 1a$^{851}$ | H | H | SO$_3$H | SO$_3$H | H | H | | | | | |
| 1a$^{852}$ | Methyl | H | SO$_3$H | SO$_3$H | H | Methyl | | | | | |
| 1a$^{853}$ | OMe | H | SO$_3$H | SO$_3$H | H | OMe | | | | | |
| 1a$^{854}$ | H | SO$_3$H | H | H | SO$_3$H | H | Methyl | F | CN | Methyl | 2-(Methyl-thio)ethyl |
| 1a$^{855}$ | H | H | SO$_3$H | SO$_3$H | H | H | | | | | |
| 1a$^{856}$ | Methyl | H | SO$_3$H | SO$_3$H | H | Methyl | | | | | |
| 1a$^{857}$ | OMe | H | SO$_3$H | SO$_3$H | H | OMe | | | | | |
| 1a$^{858}$ | H | SO$_3$H | H | H | SO$_3$H | H | Methyl | F | CN | Methyl | 2-Fluoro-ethyl |
| 1a$^{859}$ | H | H | SO$_3$H | SO$_3$H | H | H | | | | | |
| 1a$^{860}$ | Methyl | H | SO$_3$H | SO$_3$H | H | Methyl | | | | | |
| 1a$^{861}$ | OMe | H | SO$_3$H | SO$_3$H | H | OMe | | | | | |
| 1a$^{862}$ | H | SO$_3$H | H | H | SO$_3$H | H | Methyl | F | CN | Methyl | 2-Chloro-ethyl |
| 1a$^{863}$ | H | H | SO$_3$H | SO$_3$H | H | H | | | | | |
| 1a$^{864}$ | Methyl | H | SO$_3$H | SO$_3$H | H | Methyl | | | | | |
| 1a$^{865}$ | OMe | H | SO$_3$H | SO$_3$H | H | OMe | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{866}$ | H | SO$_3$H | H | H | SO$_3$H | H | Methyl | F | CN | Methyl | 3-Chloro-propyl |
| 1a$^{867}$ | H | H | SO$_3$H | SO$_3$H | H | H | | | | | |
| 1a$^{868}$ | Methyl | H | SO$_3$H | SO$_3$H | H | Methyl | | | | | |
| 1a$^{869}$ | OMe | H | SO$_3$H | SO$_3$H | H | OMe | | | | | |
| 1a$^{870}$ | H | SO$_3$H | H | H | SO$_3$H | H | Methyl | F | CN | Methyl | Tetrahydro-furfuryl |
| 1a$^{871}$ | H | H | SO$_3$H | SO$_3$H | H | H | | | | | |
| 1a$^{872}$ | Methyl | H | SO$_3$H | SO$_3$H | H | Methyl | | | | | |
| 1a$^{873}$ | OMe | H | SO$_3$H | SO$_3$H | H | OMe | | | | | |
| 1a$^{874}$ | H | SO$_3$H | H | H | SO$_3$H | H | Methyl | F | CN | Methyl | 2-Furan-2-yl-ethyl |
| 1a$^{875}$ | H | H | SO$_3$H | SO$_3$H | H | H | | | | | |
| 1a$^{876}$ | Methyl | H | SO$_3$H | SO$_3$H | H | Methyl | | | | | |
| 1a$^{877}$ | OMe | H | SO$_3$H | SO$_3$H | H | OMe | | | | | |
| 1a$^{878}$ | H | SO$_3$H | H | H | SO$_3$H | H | Methyl | F | CN | Methyl | 2-(2-Hydroxy-ethylsulfanyl)-ethyl |
| 1a$^{879}$ | H | H | SO$_3$H | SO$_3$H | H | H | | | | | |
| 1a$^{880}$ | Methyl | H | SO$_3$H | SO$_3$H | H | Methyl | | | | | |
| 1a$^{881}$ | OMe | H | SO$_3$H | SO$_3$H | H | OMe | | | | | |
| 1a$^{882}$ | H | SO$_3$H | H | H | SO$_3$H | H | Methyl | F | CN | Methyl | 2-(2-tert-Butylsulfanyl-ethanesulfonyl)-ethyl |
| 1a$^{883}$ | H | H | SO$_3$H | SO$_3$H | H | H | | | | | |
| 1a$^{884}$ | Methyl | H | SO$_3$H | SO$_3$H | H | Methyl | | | | | |
| 1a$^{885}$ | OMe | H | SO$_3$H | SO$_3$H | H | OMe | | | | | |
| 1a$^{886}$ | H | SO$_3$H | H | H | SO$_3$H | H | Methyl | F | CN | Methyl | 3-(4-Hydroxy-butoxy)propyl |
| 1a$^{887}$ | H | H | SO$_3$H | SO$_3$H | H | H | | | | | |
| 1a$^{888}$ | Methyl | H | SO$_3$H | SO$_3$H | H | Methyl | | | | | |
| 1a$^{889}$ | OMe | H | SO$_3$H | SO$_3$H | H | OMe | | | | | |
| 1a$^{890}$ | H | SO$_3$H | H | H | SO$_3$H | H | Methyl | F | CN | Methyl | 2-(2-Hydroxy-ethoxy)ethyl |
| 1a$^{891}$ | H | H | SO$_3$H | SO$_3$H | H | H | | | | | |
| 1a$^{892}$ | Methyl | H | SO$_3$H | SO$_3$H | H | Methyl | | | | | |
| 1a$^{893}$ | OMe | H | SO$_3$H | SO$_3$H | H | OMe | | | | | |
| 1a$^{894}$ | H | SO$_3$H | H | H | SO$_3$H | H | Methyl | F | CN | Methyl | 3-Isopropoxy-propyl |
| 1a$^{895}$ | H | H | SO$_3$H | SO$_3$H | H | H | | | | | |
| 1a$^{896}$ | Methyl | H | SO$_3$H | SO$_3$H | H | Methyl | | | | | |
| 1a$^{897}$ | OMe | H | SO$_3$H | SO$_3$H | H | OMe | | | | | |
| 1a$^{898}$ | F | H | SO$_3$H | SO$_3$H | H | F | | | | | |
| 1a$^{899}$ | CF$_3$ | H | SO$_3$H | SO$_3$H | H | CF$_3$ | | | | | |
| 1a$^{900}$ | H | SO3H | H | H | SO3H | H | Methyl | F | CN | Methyl | 3-Ethoxy-propyl |
| 1a$^{901}$ | H | H | SO3H | SO3H | H | H | | | | | |
| 1a$^{902}$ | Methyl | H | SO3H | SO3H | H | Methyl | | | | | |
| 1a$^{903}$ | OMe | H | SO3H | SO3H | H | OMe | | | | | |
| 1a$^{904}$ | F | H | SO3H | SO3H | H | F | | | | | |
| 1a$^{905}$ | CF3 | H | SO3H | SO3H | H | CF3 | | | | | |
| 1a$^{906}$ | H | SO$_3$H | H | H | SO$_3$H | H | NHCOCH$_3$ | OMe | CN | Methyl | Allyl |
| 1a$^{907}$ | H | H | SO$_3$Hf | SO$_3$H | H | H | | | | | |
| 1a$^{908}$ | Methyl | H | SO$_3$H | SO$_3$H | H | Methyl | | | | | |
| 1a$^{909}$ | OMe | H | SO$_3$H | SO$_3$H | H | OMe | | | | | |
| 1a$^{910}$ | F | H | SO$_3$H | SO$_3$H | H | F | | | | | |
| 1a$^{911}$ | CF$_3$ | H | SO$_3$H | SO$_3$H | H | CF$_3$ | | | | | |
| 1a$^{912}$ | H | SO$_3$H | H | H | SO$_3$H | H | NHCOCH$_3$ | OMe | CN | Methyl | 2-Methoxy-ethyl |
| 1a$^{913}$ | H | H | SO$_3$H | SO$_3$H | H | H | | | | | |
| 1a$^{914}$ | Methyl | H | SO$_3$H | SO$_3$H | H | Methyl | | | | | |
| 1a$^{915}$ | OMe | H | SO$_3$H | SO$_3$H | H | OMe | | | | | |
| 1a$^{916}$ | F | H | SO$_3$H | SO$_3$H | H | F | | | | | |
| 1a$^{917}$ | CF$_3$ | H | SO$_3$H | SO$_3$H | H | CF$_3$ | | | | | |
| 1a$^{918}$ | H | SO$_3$H | H | H | SO$_3$H | H | NHCOCH$_3$ | OMe | CN | Methyl | 3-Methoxy-propyl |
| 1a$^{919}$ | H | H | SO$_3$H | SO$_3$H | H | H | | | | | |
| 1a$^{920}$ | Methyl | H | SO$_3$H | SO$_3$H | H | Methyl | | | | | |
| 1a$^{921}$ | OMe | H | SO$_3$H | SO$_3$H | H | OMe | | | | | |
| 1a$^{922}$ | F | H | SO$_3$H | SO$_3$H | H | F | | | | | |
| 1a$^{923}$ | CF$_3$ | H | SO$_3$H | SO$_3$H | H | CF$_3$ | | | | | |
| 1a$^{924}$ | H | SO$_3$H | H | H | SO$_3$H | H | NHCOCH$_3$ | OMe | CN | Methyl | 2-Cyano-ethyl |
| 1a$^{925}$ | H | H | SO$_3$H | SO$_3$H | H | H | | | | | |
| 1a$^{926}$ | Methyl | H | SO$_3$H | SO$_3$H | H | Methyl | | | | | |
| 1a$^{927}$ | OMe | H | SO$_3$H | SO$_3$H | H | OMe | | | | | |
| 1a$^{928}$ | F | H | SO$_3$H | SO$_3$H | H | F | | | | | |
| 1a$^{929}$ | CF$_3$ | H | SO$_3$H | SO$_3$H | H | CF$_3$ | | | | | |
| 1a$^{930}$ | H | SO$_3$H | H | H | SO$_3$H | H | NHCOCH$_3$ | OMe | CN | Methyl | 2-(Methyl-thio)ethyl |
| 1a$^{931}$ | H | H | SO$_3$H | SO$_3$H | H | H | | | | | |
| 1a$^{932}$ | Methyl | H | SO$_3$H | SO$_3$H | H | Methyl | | | | | |
| 1a$^{933}$ | OMe | H | SO$_3$H | SO$_3$H | H | OMe | | | | | |
| 1a$^{934}$ | F | H | SO$_3$H | SO$_3$H | H | F | | | | | |
| 1a$^{935}$ | CF$_3$ | H | SO$_3$H | SO$_3$H | H | CF$_3$ | | | | | |
| 1a$^{936}$ | H | SO$_3$H | H | H | SO$_3$H | H | NHCOCH$_3$ | OMe | CN | Methyl | 2-Fluoro-ethyl |
| 1a$^{937}$ | H | H | SO$_3$H | SO$_3$H | H | H | | | | | |
| 1a$^{938}$ | Methyl | H | SO$_3$H | SO$_3$H | H | Methyl | | | | | |
| 1a$^{939}$ | OMe | H | SO$_3$H | SO$_3$H | H | OMe | | | | | |
| 1a$^{940}$ | F | H | SO$_3$H | SO$_3$H | H | F | | | | | |
| 1a$^{941}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{942}$ | H | SO$_3$H | H | H | SO$_3$H | H | NHCOCH$_3$ | OMe | CN | Methyl | 2-Chloro-ethyl |
| 1a$^{943}$ | H | H | SO$_3$H | SO$_3$H | H | H | | | | | |
| 1a$^{944}$ | Methyl | H | SO$_3$H | SO$_3$H | H | Methyl | | | | | |
| 1a$^{945}$ | OMe | H | SO$_3$H | SO$_3$H | H | OMe | | | | | |
| 1a$^{946}$ | F | H | SO$_3$H | SO$_3$H | H | F | | | | | |
| 1a$^{947}$ | CF$_3$ | H | SO$_3$H | SO$_3$H | H | CF$_3$ | | | | | |
| 1a$^{948}$ | H | SO$_3$H | H | H | SO$_3$H | H | NHCOCH$_3$ | OMe | CN | Methyl | 3-Chloro-propyl |
| 1a$^{949}$ | H | H | SO$_3$H | SO$_3$H | H | H | | | | | |
| 1a$^{950}$ | Methyl | H | SO$_3$H | SO$_3$H | H | Methyl | | | | | |
| 1a$^{951}$ | OMe | H | SO$_3$H | SO$_3$H | H | OMe | | | | | |
| 1a$^{952}$ | F | H | SO$_3$H | SO$_3$H | H | F | | | | | |
| 1a$^{953}$ | CF$_3$ | H | SO$_3$H | SO$_3$H | H | CF$_3$ | | | | | |
| 1a$^{954}$ | H | SO$_3$H | H | HM | H | H | NHCOCH$_3$ | OMe | CN | Methyl | Tetrahydro-furfuryl |
| 1a$^{955}$ | H | H | SO$_3$H | SO$_3$H | H | H | | | | | |
| 1a$^{956}$ | Methyl | H | SO$_3$H | SO$_3$H | H | Methyl | | | | | |
| 1a$^{957}$ | OMe | H | SO$_3$H | SO$_3$H | H | OMe | | | | | |
| 1a$^{958}$ | F | H | SO$_3$H | SO$_3$H | H | F | | | | | |
| 1a$^{959}$ | CF$_3$ | H | SO$_3$H | SO$_3$H | H | CF$_3$ | | | | | |
| 1a$^{960}$ | H | SO$_3$H | H | H | SO$_3$H | H | NHCOCH$_3$ | OMe | CN | Methyl | 2-Furan-2-yl-ethyl |
| 1a$^{961}$ | H | H | SO$_3$H | SO$_3$H | H | H | | | | | |
| 1a$^{962}$ | Methyl | H | SO$_3$H | SO$_3$H | H | Methyl | | | | | |
| 1a$^{963}$ | OMe | H | SO$_3$H | SO$_3$H | H | OMe | | | | | |
| 1a$^{964}$ | F | H | SO$_3$H | SO$_3$H | H | F | | | | | |
| 1a$^{965}$ | CF$_3$ | H | SO$_3$H | SO$_3$H | H | CF$_3$ | | | | | |
| 1a$^{966}$ | H | SO$_3$H | H | H | SO$_3$H | H | NHCOCH$_3$ | OMe | CN | Methyl | 2-(2-Hydroxy-ethylsulfanyl)-ethyl |
| 1a$^{967}$ | H | H | SO$_3$H | SO$_3$H | H | H | | | | | |
| 1a$^{968}$ | Methyl | H | SO$_3$H | SO$_3$H | H | Methyl | | | | | |
| 1a$^{969}$ | OMe | H | SO$_3$H | SO$_3$H | H | OMe | | | | | |
| 1a$^{970}$ | F | H | SO$_3$H | SO$_3$H | H | F | | | | | |
| 1a$^{971}$ | CF$_3$ | H | SO$_3$H | SO$_3$H | H | CF$_3$ | | | | | |
| 1a$^{972}$ | H | SO$_3$H | H | H | SO$_3$H | H | NHCOCH$_3$ | OMe | CN | Methyl | 2-(2-tert-Butylsulfanyl-ethanesulfonyl)-ethyl |
| 1a$^{973}$ | H | H | SO$_3$H | SO$_3$H | H | H | | | | | |
| 1a$^{974}$ | Methyl | H | SO$_3$H | SO$_3$H | H | Methyl | | | | | |
| 1a$^{975}$ | OMe | H | SO$_3$H | SO$_3$H | H | OMe | | | | | |
| 1a$^{976}$ | F | H | SO$_3$H | SO$_3$H | H | F | | | | | |
| 1a$^{977}$ | CF$_3$ | H | SO$_3$H | SO$_3$H | H | CF$_3$ | | | | | |
| 1a$^{978}$ | H | SO$_3$H | H | H | SO$_3$H | H | NHCOCH$_3$ | OMe | CN | Methyl | 3-(4-Hydroxy-butoxy)propyl |
| 1a$^{979}$ | H | H | SO$_3$H | SO$_3$H | H | H | | | | | |
| 1a$^{980}$ | Methyl | H | SO$_3$H | SO$_3$H | H | Methyl | | | | | |
| 1a$^{981}$ | OMe | H | SO$_3$H | SO$_3$H | H | OMe | | | | | |
| 1a$^{982}$ | F | H | SO$_3$H | SO$_3$H | H | F | | | | | |
| 1a$^{983}$ | CF$_3$ | H | SO$_3$H | SO$_3$H | H | CF$_3$ | | | | | |
| 1a$^{984}$ | H | SO$_3$H | H | H | SO$_3$H | H | NHCOCH$_3$ | OMe | CN | Methyl | 2-(2-Hydroxy-ethoxy)ethyl |
| 1a$^{985}$ | H | H | SO$_3$H | SO$_3$H | H | H | | | | | |
| 1a$^{986}$ | Methyl | H | SO$_3$H | SO$_3$H | H | Methyl | | | | | |
| 1a$^{987}$ | OMe | H | SO$_3$H | SO$_3$H | H | OMe | | | | | |
| 1a$^{988}$ | F | H | SO$_3$H | SO$_3$H | H | F | | | | | |
| 1a$^{989}$ | CF$_3$ | H | SO$_3$H | SO$_3$H | H | CF$_3$ | | | | | |
| 1a$^{990}$ | H | SO$_3$H | H | H | SO$_3$H | H | NHCOCH$_3$ | OMe | CN | Methyl | 3-Isopropoxy-propyl |
| 1a$^{991}$ | H | H | SO3H | SO3H | H | H | | | | | |
| 1a$^{992}$ | Methyl | H | SO3H | SO3H | H | Methyl | | | | | |
| 1a$^{993}$ | OMe | H | SO3H | SO3H | H | OMe | | | | | |
| 1a$^{994}$ | F | H | SO3H | SO3H | H | F | | | | | |
| 1a$^{995}$ | CF$_3$ | H | SO3H | SO3H | H | CF$_3$ | | | | | |
| 1a$^{996}$ | H | SO$_3$H | H | H | SO$_3$H | H | Me | Me | CONH$_2$ | Methyl | Allyl |
| 1a$^{997}$ | H | H | SO$_3$H | SO$_3$H | H | H | | | | | |
| 1a$^{998}$ | Methyl | H | SO$_3$H | SO$_3$H | H | Methyl | | | | | |
| 1a$^{999}$ | OMe | H | SO$_3$H | SO$_3$H | H | OMe | | | | | |
| 1a$^{1000}$ | F | H | SO$_3$H | SO$_3$H | H | F | | | | | |
| 1a$^{1001}$ | CF$_3$ | H | SO$_3$H | SO$_3$H | H | CF$_3$ | | | | | |
| 1a$^{1002}$ | H | SO$_3$H | H | H | SO$_3$H | H | Me | Me | CONH$_2$ | Methyl | 2-Methoxy-ethyl |
| 1a$^{1003}$ | H | H | SO$_3$H | SO$_3$H | H | H | | | | | |
| 1a$^{1004}$ | Methyl | H | SO$_3$H | SO$_3$H | H | Methyl | | | | | |
| 1a$^{1005}$ | OMe | H | SO$_3$H | SO$_3$H | H | OMe | | | | | |
| 1a$^{1006}$ | F | H | SO$_3$H | SO$_3$H | H | F | | | | | |
| 1a$^{1007}$ | CF$_3$ | H | SO$_3$H | SO$_3$H | H | CF$_3$ | | | | | |
| 1a$^{1008}$ | H | SO$_3$H | H | H | SO$_3$H | H | Methyl | Methyl | CONH$_2$ | Methyl | 3-Methoxy-propyl |
| 1a$^{1009}$ | H | H | SO$_3$H | SO$_3$H | H | H | | | | | |
| 1a$^{1010}$ | Methyl | H | SO$_3$H | SO$_3$H | H | Methyl | | | | | |
| 1a$^{1011}$ | OMe | H | SO$_3$H | SO$_3$H | H | OMe | | | | | |
| 1a$^{1012}$ | F | H | SO$_3$H | SO$_3$H | H | F | | | | | |
| 1a$^{1013}$ | CF$_3$ | H | SO$_3$H | SO$_3$H | H | CF$_3$ | | | | | |
| 1a$^{1014}$ | H | SO$_3$H | H | H | SO$_3$H | H | Methyl | Methyl | CONH$_2$ | Methyl | 2-Cyano-ethyl |
| 1a$^{1015}$ | H | H | SO$_3$H | SO$_3$H | H | H | | | | | |
| 1a$^{1016}$ | Methyl | H | SO$_3$H | SO$_3$H | H | Methyl | | | | | |
| 1a$^{1017}$ | OMe | H | SO$_3$H | SO$_3$H | H | OMe | | | | | |
| 1a$^{1018}$ | F | H | SO$_3$H | SO$_3$H | H | F | | | | | |
| 1a$^{1019}$ | CF$_3$ | H | SO$_3$H | SO$_3$H | H | CF$_3$ | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{1020}$ | H | SO$_3$H | H | H | SO$_3$H | H | Methyl | Methyl | CONH$_2$ | Methyl | 2-(Methyl-thio)ethyl |
| 1a$^{1021}$ | H | H | SO$_3$H | SO$_3$H | H | H | | | | | |
| 1a$^{1022}$ | Methyl | H | SO$_3$H | SO$_3$H | H | Methyl | | | | | |
| 1a$^{1023}$ | OMe | H | SO$_3$H | SO$_3$H | H | OMe | | | | | |
| 1a$^{1024}$ | F | H | SO$_3$H | SO$_3$H | H | F | | | | | |
| 1a$^{1025}$ | CF$_3$ | H | SO$_3$H | SO$_3$H | H | CF$_3$ | | | | | |
| 1a$^{1026}$ | H | SO$_3$H | H | H | SO$_3$H | H | Methyl | Methyl | CONH$_2$ | Methyl | 2-Fluoro-ethyl |
| 1a$^{1027}$ | H | H | SO$_3$H | SO$_3$H | H | H | | | | | |
| 1a$^{1028}$ | Methyl | H | SO$_3$H | SO$_3$H | H | Methyl | | | | | |
| 1a$^{1029}$ | OMe | H | SO$_3$H | SO$_3$H | H | OMe | | | | | |
| 1a$^{1030}$ | F | H | SO$_3$H | SO$_3$H | H | F | | | | | |
| 1a$^{1031}$ | CF$_3$ | H | SO$_3$H | SO$_3$H | H | CF$_3$ | | | | | |
| 1a$^{1032}$ | H | SO$_3$H | H | H | SO$_3$H | H | Methyl | Methyl | CONH$_2$ | Methyl | 2-Chloro-ethyl |
| 1a$^{1033}$ | H | H | SO$_3$H | SO$_3$H | H | H | | | | | |
| 1a$^{1034}$ | Methyl | H | SO$_3$H | SO$_3$H | H | Methyl | | | | | |
| 1a$^{1035}$ | OMe | H | SO$_3$H | SO$_3$H | H | OMe | | | | | |
| 1a$^{1036}$ | F | H | SO$_3$H | SO$_3$H | H | F | | | | | |
| 1a$^{1037}$ | CF$_3$ | H | SO$_3$H | SO$_3$H | H | CF$_3$ | | | | | |
| 1a$^{1038}$ | H | SO$_3$H | H | H | SO$_3$H | H | Methyl | Methyl | CONH$_2$ | Methyl | 3-Chloro-propyl |
| 1a$^{1039}$ | H | H | SO$_3$H | SO$_3$H | H | H | | | | | |
| 1a$^{1040}$ | Methyl | H | SO$_3$H | SO$_3$H | H | Methyl | | | | | |
| 1a$^{1041}$ | OMe | H | SO$_3$H | SO$_3$H | H | OMe | | | | | |
| 1a$^{1042}$ | F | H | SO$_3$H | SO$_3$H | H | F | | | | | |
| 1a$^{1043}$ | CF$_3$ | H | SO$_3$H | SO$_3$H | H | CF$_3$ | | | | | |
| 1a$^{1044}$ | H | SO$_3$H | H | H | SO$_3$H | H | Methyl | Methyl | CONH$_2$ | Methyl | Tetrahydro-furfuryl |
| 1a$^{1045}$ | H | H | SO$_3$H | SO$_3$H | H | H | | | | | |
| 1a$^{1046}$ | Methyl | H | SO$_3$H | SO$_3$H | H | Methyl | | | | | |
| 1a$^{1047}$ | OMe | H | SO$_3$H | SO$_3$H | H | OMe | | | | | |
| 1a$^{1048}$ | F | H | SO$_3$H | SO$_3$H | H | F | | | | | |
| 1a$^{1049}$ | CF$_3$ | H | SO$_3$H | SO$_3$H | H | CF$_3$ | | | | | |
| 1a$^{1050}$ | H | SO$_3$H | H | H | SO$_3$H | H | Methyl | Methyl | CONH$_2$ | Methyl | 2-Furan-2-yl-ethyl |
| 1a$^{1051}$ | H | H | SO$_3$H | SO$_3$H | H | H | | | | | |
| 1a$^{1052}$ | Methyl | H | SO$_3$H | SO$_3$H | H | Methyl | | | | | |
| 1a$^{1053}$ | OMe | H | SO$_3$H | SO$_3$H | H | OMe | | | | | |
| 1a$^{1054}$ | F | H | SO$_3$H | SO$_3$H | H | F | | | | | |
| 1a$^{1055}$ | CF$_3$ | H | SO$_3$H | SO$_3$H | H | CF$_3$ | | | | | |
| 1a$^{1056}$ | H | SO$_3$H | H | H | SO$_3$H | H | Methyl | Methyl | CONH$_2$ | Methyl | 2-(2-Hydroxy-ethylsulfanyl)-ethyl |
| 1a$^{1057}$ | H | H | SO$_3$H | SO$_3$H | H | H | | | | | |
| 1a$^{1058}$ | Methyl | H | SO$_3$H | SO$_3$H | H | Methyl | | | | | |
| 1a$^{1059}$ | OMe | H | SO$_3$H | SO$_3$H | H | OMe | | | | | |
| 1a$^{1060}$ | F | H | SO$_3$H | SO$_3$H | H | F | | | | | |
| 1a$^{1061}$ | CF$_3$ | H | SO$_3$H | SO$_3$H | H | CF$_3$ | | | | | |
| 1a$^{1062}$ | H | SO$_3$H | H | H | SO$_3$H | H | Methyl | Methyl | CONH$_2$ | Methyl | 2-(2-tert-Butylsulfanyl-ethanesulfonyl)-ethyl |
| 1a$^{1063}$ | H | H | SO$_3$H | SO$_3$H | H | H | | | | | |
| 1a$^{1064}$ | Methyl | H | SO$_3$H | SO$_3$H | H | Methyl | | | | | |
| 1a$^{1065}$ | OMe | H | SO$_3$H | SO$_3$H | H | OMe | | | | | |
| 1a$^{1066}$ | F | H | SO$_3$H | SO$_3$H | H | F | | | | | |
| 1a$^{1067}$ | CF$_3$ | H | SO$_3$H | SO$_3$H | H | CF$_3$ | | | | | |
| 1a$^{1068}$ | H | SO$_3$H | H | H | SO$_3$H | H | Methyl | Methyl | CONH$_2$ | Methyl | 3-(4-Hydroxy-butoxy)propyl |
| 1a$^{1069}$ | H | H | SO$_3$H | SO$_3$H | H | H | | | | | |
| 1a$^{1070}$ | Methyl | H | SO$_3$H | SO$_3$H | H | Methyl | | | | | |
| 1a$^{1071}$ | OMe | H | SO$_3$H | SO$_3$H | H | OMe | | | | | |
| 1a$^{1072}$ | F | H | SO$_3$H | SO$_3$H | H | F | | | | | |
| 1a$^{1073}$ | CF$_3$ | H | SO$_3$H | SO$_3$H | H | CF$_3$ | | | | | |
| 1a$^{1074}$ | H | SO$_3$H | H | H | SO$_3$H | H | Methyl | Methyl | CONH$_2$ | Methyl | 2-(2-Hydroxy-ethoxy)ethyl |
| 1a$^{1075}$ | H | H | SO$_3$H | SO$_3$H | H | H | | | | | |
| 1a$^{1076}$ | Methyl | H | SO$_3$H | SO$_3$H | H | Methyl | | | | | |
| 1a$^{1077}$ | OMe | H | SO$_3$H | SO$_3$H | H | OMe | | | | | |
| 1a$^{1078}$ | F | H | SO$_3$H | SO$_3$H | H | F | | | | | |
| 1a$^{1079}$ | CF$_3$ | H | SO$_3$H | SO$_3$H | H | CF$_3$ | | | | | |
| 1a$^{1080}$ | H | SO$_3$H | H | H | SO$_3$H | H | Methyl | Methyl | CONH$_2$ | Methyl | 3-Isopropoxy-propyl |
| 1a$^{1081}$ | H | H | SO$_3$H | SO$_3$H | H | H | | | | | |
| 1a$^{1082}$ | Methyl | H | SO$_3$H | SO$_3$H | H | Methyl | | | | | |
| 1a$^{1083}$ | OMe | H | SO$_3$H | SO$_3$H | H | OMe | | | | | |
| 1a$^{1084}$ | F | H | SO$_3$H | SO$_3$H | H | F | | | | | |
| 1a$^{1085}$ | CF$_3$ | H | SO$_3$H | SO$_3$H | H | CF$_3$ | | | | | |
| 1a$^{1086}$ | H | SO3H | H | H | SO3H | H | Methyl | Methyl | CONH$_2$ | Methyl | 3-Ethoxy-propyl |
| 1a$^{1087}$ | H | H | SO3H | SO3H | H | H | | | | | |
| 1a$^{1088}$ | Methyl | H | SO3H | SO3H | H | Methyl | | | | | |
| 1a$^{1089}$ | OMe | H | SO3H | SO3H | H | OMe | | | | | |
| 1a$^{1090}$ | F | H | SO3H | SO3H | H | F | | | | | |
| 1a$^{1091}$ | CF3 | H | SO3H | SO3H | H | CF3 | | | | | |
| 1a$^{1092}$ | H | SO$_3$H | H | H | SO$_3$H | H | Methyl | F | CONH$_2$ | Methyl | Allyl |
| 1a$^{1093}$ | H | H | SO$_3$H | SO$_3$H | H | H | | | | | |
| 1a$^{1094}$ | Methyl | H | SO$_3$H | SO$_3$H | H | Methyl | | | | | |
| 1a$^{1095}$ | OMe | H | SO$_3$H | SO$_3$H | H | OMe | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{1096}$ | H | SO$_3$H | H | H | SO$_3$H | H | Methyl | F | CONH$_2$ | Methyl | 2-Methoxy-ethyl |
| 1a$^{1097}$ | H | H | SO$_3$H | SO$_3$H | H | H | | | | | |
| 1a$^{1098}$ | Methyl | H | SO$_3$H | SO$_3$H | H | Methyl | | | | | |
| 1a$^{1099}$ | OMe | H | SO$_3$H | SO$_3$H | H | OMe | | | | | |
| 1a$^{1100}$ | H | SO$_3$H | H | H | SO$_3$H | H | Methyl | F | CONH$_2$ | Methyl | 3-Methoxy-propyl |
| 1a$^{1101}$ | H | H | SO$_3$H | SO$_3$H | H | H | | | | | |
| 1a$^{1102}$ | Methyl | H | SO$_3$H | SO$_3$H | H | Methyl | | | | | |
| 1a$^{1103}$ | OMe | H | SO$_3$H | SO$_3$H | H | OMe | | | | | |
| 1a$^{1104}$ | H | SO$_3$H | H | H | SO$_3$H | H | Methyl | F | CONH$_2$ | Methyl | 2-Cyano-ethyl |
| 1a$^{1105}$ | H | H | SO$_3$H | SO$_3$H | H | H | | | | | |
| 1a$^{1106}$ | v | H | SO$_3$H | SO$_3$H | H | Methyl | | | | | |
| 1a$^{1107}$ | OMe | H | SO$_3$H | SO$_3$H | H | OMe | | | | | |
| 1a$^{1108}$ | H | SO$_3$H | H | H | SO$_3$H | H | Methyl | F | CONH$_2$ | Methyl | 2-(Methyl-thio)ethyl |
| 1a$^{1109}$ | H | H | SO$_3$H | SO$_3$H | H | H | | | | | |
| 1a$^{1110}$ | Methyl | H | SO$_3$H | SO$_3$H | H | Methyl | | | | | |
| 1a$^{1111}$ | OMe | H | SO$_3$H | SO$_3$H | H | OMe | | | | | |
| 1a$^{1112}$ | H | SO$_3$H | H | H | SO$_3$H | H | Methyl | F | CONH$_2$ | Methyl | 2-Fluoro-ethyl |
| 1a$^{1113}$ | H | H | SO$_3$H | SO$_3$H | H | H | | | | | |
| 1a$^{1114}$ | Methyl | H | SO$_3$H | SO$_3$H | H | Methyl | | | | | |
| 1a$^{1115}$ | OMe | H | SO$_3$H | SO$_3$H | H | OMe | | | | | |
| 1a$^{1116}$ | H | SO$_3$H | H | H | SO$_3$H | H | Methyl | F | CONH$_2$ | Methyl | 2-Chloro-ethyl |
| 1a$^{1117}$ | H | H | SO$_3$H | SO$_3$H | H | H | | | | | |
| 1a$^{1118}$ | Methyl | H | SO$_3$H | SO$_3$H | H | Methyl | | | | | |
| 1a$^{1119}$ | OMe | H | SO$_3$H | SO$_3$H | H | OMe | | | | | |
| 1a$^{1120}$ | H | SO$_3$H | H | H | SO$_3$H | H | Methyl | F | CONH$_2$ | Methyl | 3-Chloro-propyl |
| 1a$^{1121}$ | H | H | SO$_3$H | SO$_3$H | H | H | | | | | |
| 1a$^{1122}$ | Methyl | H | SO$_3$H | SO$_3$H | H | Methyl | | | | | |
| 1a$^{1123}$ | OMe | H | SO$_3$H | SO$_3$H | H | OMe | | | | | |
| 1a$^{1124}$ | H | SO$_3$H | H | H | SO$_3$H | H | Methyl | F | CONH$_2$ | Methyl | Tetrahydro-furfuryl |
| 1a$^{1125}$ | H | H | SO$_3$H | SO$_3$H | H | H | | | | | |
| 1a$^{1126}$ | Methyl | H | SO$_3$H | SO$_3$H | H | Methyl | | | | | |
| 1a$^{1127}$ | OMe | H | SO$_3$H | SO$_3$H | H | OMe | | | | | |
| 1a$^{1128}$ | H | SO$_3$H | H | H | SO$_3$H | H | Methyl | F | CONH$_2$ | Methyl | 2-Furan-2-yl-ethyl |
| 1a$^{1129}$ | H | H | SO$_3$H | SO$_3$H | H | H | | | | | |
| 1a$^{1130}$ | Methyl | H | SO$_3$H | SO$_3$H | H | Methyl | | | | | |
| 1a$^{1131}$ | OMe | H | SO$_3$H | SO$_3$H | H | OMe | | | | | |
| 1a$^{1132}$ | H | SO$_3$H | H | H | SO$_3$H | H | Methyl | F | CONH$_2$ | Methyl | 2-(2-Hydroxy-ethylsulfanyl)-ethyl |
| 1a$^{1133}$ | H | H | SO$_3$H | SO$_3$H | H | H | | | | | |
| 1a$^{1134}$ | Methyl | H | SO$_3$H | SO$_3$H | H | Methyl | | | | | |
| 1a$^{1135}$ | OMe | H | SO$_3$H | SO$_3$H | H | OMe | | | | | |
| 1a$^{1136}$ | H | SO$_3$H | H | H | SO$_3$H | H | Methyl | F | CONH$_2$ | Methyl | 2-(2-tert-Butylsulfanyl-ethanesulfonyl)-ethyl |
| 1a$^{1137}$ | H | H | SO$_3$H | SO$_3$H | H | H | | | | | |
| 1a$^{1138}$ | Methyl | H | SO$_3$H | SO$_3$H | H | Methyl | | | | | |
| 1a$^{1139}$ | OMe | H | SO$_3$H | SO$_3$H | H | OMe | | | | | |
| 1a$^{1140}$ | H | SO$_3$H | H | H | SO$_3$H | H | Methyl | F | CONH$_2$ | Methyl | 3-(4-Hydroxy-butoxy)propyl |
| 1a$^{1141}$ | H | H | SO$_3$H | SO$_3$H | H | H | | | | | |
| 1a$^{1142}$ | Methyl | H | SO$_3$H | SO$_3$H | H | Methyl | | | | | |
| 1a$^{1143}$ | OMe | H | SO$_3$H | SO$_3$H | H | OMe | | | | | |
| 1a$^{1144}$ | H | SO$_3$H | H | H | SO$_3$H | H | Methyl | F | CONH$_2$ | Methyl | 2-(2-Hydroxy-ethoxy)ethyl |
| 1a$^{1145}$ | H | H | SO$_3$H | SO$_3$H | H | H | | | | | |
| 1a$^{1146}$ | Methyl | H | SO$_3$H | SO$_3$H | H | Methyl | | | | | |
| 1a$^{1147}$ | OMe | H | SO$_3$H | SO$_3$H | H | OMe | | | | | |
| 1a$^{1148}$ | H | SO$_3$H | H | H | SO$_3$H | H | Methyl | F | CONH$_2$ | Methyl | 3-Isopropoxy-propyl |
| 1a$^{1149}$ | H | H | SO$_3$H | SO$_3$H | H | H | | | | | |
| 1a$^{1150}$ | Methyl | H | SO$_3$H | SO$_3$H | H | Methyl | | | | | |
| 1a$^{1151}$ | OMe | H | SO$_3$H | SO$_3$H | H | OMe | | | | | |
| 1a$^{1152}$ | F | H | SO$_3$H | SO$_3$H | H | F | | | | | |
| 1a$^{1153}$ | CF$_3$ | H | SO$_3$H | SO$_3$H | H | CF$_3$ | | | | | |
| 1a$^{1154}$ | H | SO3H | H | H | SO3H | H | Methyl | F | CONH$_2$ | Methyl | 3-Ethoxy-propyl |
| 1a$^{1155}$ | H | H | SO3H | SO3H | H | H | | | | | |
| 1a$^{1156}$ | Methyl | H | SO3H | SO3H | H | Methyl | | | | | |
| 1a$^{1157}$ | OMe | H | SO3H | SO3H | H | OMe | | | | | |
| 1a$^{1158}$ | F | H | SO3H | SO3H | H | F | | | | | |
| 1a$^{1159}$ | CF3 | H | SO3H | SO3H | H | CF3 | | | | | |
| 1a$^{1160}$ | H | SO$_3$H | H | H | SO$_3$H | H | NHCOCH$_3$ | OMe | CONH$_2$ | Methyl | Allyl |
| 1a$^{1161}$ | H | H | SO$_3$H | SO$_3$H | H | H | | | | | |
| 1a$^{1162}$ | Methyl | H | SO$_3$H | SO$_3$H | H | Methyl | | | | | |
| 1a$^{1163}$ | OMe | H | SO$_3$H | SO$_3$H | H | OMe | | | | | |
| 1a$^{1164}$ | F | H | SO$_3$H | SO$_3$H | H | F | | | | | |
| 1a$^{1165}$ | CF$_3$ | H | SO$_3$H | SO$_3$H | H | CF$_3$ | | | | | |
| 1a$^{1166}$ | H | SO$_3$H | H | H | SO$_3$H | H | NHCOCH$_3$ | OMe | CONH$_2$ | Methyl | 2-Methoxy-ethyl |
| 1a$^{1167}$ | H | H | SO$_3$H | SO$_3$H | H | H | | | | | |
| 1a$^{1168}$ | Methyl | H | SO$_3$H | SO$_3$H | H | Methyl | | | | | |
| 1a$^{1169}$ | OMe | H | SO$_3$H | SO$_3$H | H | OMe | | | | | |
| 1a$^{1170}$ | F | H | SO$_3$H | SO$_3$H | H | F | | | | | |
| 1a$^{1171}$ | CF$_3$ | H | SO$_3$H | SO$_3$H | H | CF$_3$ | | | | | |
| 1a$^{1172}$ | H | SO$_3$H | H | H | SO$_3$H | H | NHCOCH$_3$ | OMe | CONH$_2$ | Methyl | 3-Methoxy-propyl |
| 1a$^{1173}$ | H | H | SO$_3$H | SO$_3$H | H | H | | | | | |

TABLE 1-continued

| Structure | $R^{1a}$ | $R^{3a}$ | $R^{4a}$ | $R^{5a}$ | $R^{6a}$ | $R^{8a}$ | $R^{9a}/R^{13a}$ | $R^{10a}/R^{14a}$ | $R^{18a}/R^{21a}$ | $R^{19a}/R^{22a}$ | $R^{17a}/R^{20a}$ |
|---|---|---|---|---|---|---|---|---|---|---|---|
| 1a$^{1174}$ | Methyl | H | SO$_3$H | SO$_3$H | H | Methyl | | | | | |
| 1a$^{1175}$ | OMe | H | SO$_3$H | SO$_3$H | H | OMe | | | | | |
| 1a$^{1176}$ | F | H | SO$_3$H | SO$_3$H | H | F | | | | | |
| 1a$^{1177}$ | CF$_3$ | H | SO$_3$H | SO$_3$H | H | CF$_3$ | | | | | |
| 1a$^{1178}$ | H | SO$_3$H | H | H | SO$_3$H | H | NHCOCH$_3$ | OMe | CONH$_2$ | Methyl | 2-Cyano-ethyl |
| 1a$^{1179}$ | H | H | SO$_3$H | SO$_3$H | H | H | | | | | |
| 1a$^{1180}$ | Methyl | H | SO$_3$H | SO$_3$H | H | Methyl | | | | | |
| 1a$^{1181}$ | OMe | H | SO$_3$H | SO$_3$H | H | OMe | | | | | |
| 1a$^{1182}$ | F | H | SO$_3$H | SO$_3$H | H | F | | | | | |
| 1a$^{1183}$ | CF$_3$ | H | SO$_3$H | SO$_3$H | H | CF$_3$ | | | | | |
| 1a$^{1184}$ | H | SO$_3$H | H | H | SO$_3$H | H | NHCOCH$_3$ | OMe | CONH$_2$ | Methyl | 2-(Methyl-thio)ethyl |
| 1a$^{1185}$ | H | H | SO$_3$H | SO$_3$H | H | H | | | | | |
| 1a$^{1186}$ | Methyl | H | SO$_3$H | SO$_3$H | H | Methyl | | | | | |
| 1a$^{1187}$ | OMe | H | SO$_3$H | SO$_3$H | H | OMe | | | | | |
| 1a$^{1188}$ | F | H | SO$_3$H | SO$_3$H | H | F | | | | | |
| 1a$^{1189}$ | CF$_3$ | H | SO$_3$H | SO$_3$H | H | CF$_3$ | | | | | |
| 1a$^{1190}$ | H | SO$_3$H | H | H | SO$_3$H | H | NHCOCH$_3$ | OMe | CONH$_2$ | Methyl | 2-Fluoro-ethyl |
| 1a$^{1191}$ | H | H | SO$_3$H | SO$_3$H | H | H | | | | | |
| 1a$^{1192}$ | Methyl | H | SO$_3$H | SO$_3$H | H | Methyl | | | | | |
| 1a$^{1193}$ | OMe | H | SO$_3$H | SO$_3$H | H | OMe | | | | | |
| 1a$^{1194}$ | F | H | SO$_3$H | SO$_3$H | H | F | | | | | |
| 1a$^{1195}$ | CF$_3$ | H | SO$_3$H | SO$_3$H | H | CF$_3$ | | | | | |
| 1a$^{1196}$ | H | SO$_3$H | H | H | SO$_3$H | H | NHCOCH$_3$ | OMe | CONH$_2$ | Methyl | 2-Chloro-ethyl |
| 1a$^{1197}$ | H | H | SO$_3$H | SO$_3$H | H | H | | | | | |
| 1a$^{1198}$ | Methyl | H | SO$_3$H | SO$_3$H | H | Methyl | | | | | |
| 1a$^{1199}$ | OMe | H | SO$_3$H | SO$_3$H | H | OMe | | | | | |
| 1a$^{1200}$ | F | H | SO$_3$H | SO$_3$H | H | F | | | | | |
| 1a$^{1201}$ | CF$_3$ | H | SO$_3$H | SO$_3$H | H | CF$_3$ | | | | | |
| 1a$^{1202}$ | H | SO$_3$H | H | H | SO$_3$H | H | NHCOCH$_3$ | OMe | CONH$_2$ | Methyl | 3-Chloro-propyl |
| 1a$^{1203}$ | H | H | SO$_3$H | SO$_3$H | H | H | | | | | |
| 1a$^{1204}$ | Methyl | H | SO$_3$H | SO$_3$H | H | Methyl | | | | | |
| 1a$^{1205}$ | OMe | H | SO$_3$H | SO$_3$H | H | OMe | | | | | |
| 1a$^{1206}$ | F | H | SO$_3$H | SO$_3$H | H | F | | | | | |
| 1a$^{1207}$ | CF$_3$ | H | SO$_3$H | SO$_3$H | H | CF$_3$ | | | | | |
| 1a$^{1208}$ | H | SO$_3$H | hh | H | SO$_3$H | H | NHCOCH$_3$ | OMe | CONH$_2$ | Methyl | Tetrahydro-furfuryl |
| 1a$^{1209}$ | H | H | SO$_3$H | SO$_3$H | H | H | | | | | |
| 1a$^{1210}$ | Methyl | H | SO$_3$H | SO$_3$H | H | Methyl | | | | | |
| 1a$^{1211}$ | OMe | H | SO$_3$H | SO$_3$H | H | OMe | | | | | |
| 1a$^{1212}$ | F | H | SO$_3$H | SO$_3$H | H | F | | | | | |
| 1a$^{1213}$ | CF$_3$ | H | SO$_3$H | SO$_3$H | H | CF$_3$ | | | | | |
| 1a$^{1214}$ | H | SO$_3$H | H | H | SO$_3$H | H | NHCOCH$_3$ | OMe | CONH$_2$ | Methyl | 2-Furan-2-yl-ethyl |
| 1a$^{1215}$ | H | H | SO$_3$H | SO$_3$H | H | H | | | | | |
| 1a$^{1216}$ | Methyl | H | SO$_3$H | SO$_3$H | H | Methyl | | | | | |
| 1a$^{1217}$ | OMe | H | SO$_3$H | SO$_3$H | H | OMe | | | | | |
| 1a$^{1218}$ | F | H | SO$_3$H | SO$_3$H | H | F | | | | | |
| 1a$^{1219}$ | CF$_3$ | H | SO$_3$H | SO$_3$H | H | CF$_3$ | | | | | |
| 1a$^{1220}$ | H | SO$_3$H | H | H | SO$_3$H | H | NHCOCH$_3$ | OMe | CONH$_2$ | Methyl | 2-(2-Hydroxy-ethylsulfanyl)-ethyl |
| 1a$^{1221}$ | H | H | SO$_3$H | SO$_3$H | H | H | | | | | |
| 1a$^{1222}$ | Methyl | H | SO$_3$H | SO$_3$H | H | Methyl | | | | | |
| 1a$^{1223}$ | OMe | H | SO$_3$H | SO$_3$H | H | OMe | | | | | |
| 1a$^{1224}$ | F | H | SO$_3$H | SO$_3$H | H | F | | | | | |
| 1a$^{1225}$ | CF$_3$ | H | SO$_3$H | SO$_3$H | H | CF$_3$ | | | | | |
| 1a$^{1226}$ | H | SO$_3$H | H | H | SO$_3$H | H | NHCOCH$_3$ | OMe | CONH$_2$ | Methyl | 3-(4-Hydroxy-butoxy)propyl |
| 1a$^{1227}$ | H | H | SO$_3$H | SO$_3$H | H | H | | | | | |
| 1a$^{1228}$ | Methyl | H | SO$_3$H | SO$_3$H | H | Methyl | | | | | |
| 1a$^{1229}$ | OMe | H | SO$_3$H | SO$_3$H | H | OMe | | | | | |
| 1a$^{1230}$ | F | H | SO$_3$H | SO$_3$H | H | F | | | | | |
| 1a$^{1231}$ | CF$_3$ | H | SO$_3$H | SO$_3$H | H | CF$_3$ | | | | | |
| 1a$^{1232}$ | H | SO$_3$H | H | H | SO$_3$H | H | NHCOCH$_3$ | OMe | CONH$_2$ | Methyl | 2-(2-Hydroxy-ethoxy)ethyl |
| 1a$^{1233}$ | H | H | SO$_3$H | SO$_3$H | H | H | | | | | |
| 1a$^{1234}$ | Methyl | H | SO$_3$H | SO$_3$H | H | Methyl | | | | | |
| 1a$^{1235}$ | OMe | H | SO$_3$H | SO$_3$H | H | OMe | | | | | |
| 1a$^{1236}$ | F | H | SO$_3$H | SO$_3$H | H | F | | | | | |
| 1a$^{1237}$ | CF$_3$ | H | SO$_3$H | SO$_3$H | H | CF$_3$ | | | | | |
| 1a$^{1238}$ | H | SO$_3$H | H | H | SO$_3$H | H | NHCOCH$_3$ | OMe | CONH$_2$ | Methyl | 3-Isopropoxy-propyl |
| 1a$^{1239}$ | H | H | SO$_3$H | SO$_3$H | H | H | | | | | |
| 1a$^{1240}$ | Methyl | H | SO$_3$H | SO$_3$H | H | Methyl | | | | | |
| 1a$^{1241}$ | OMe | H | SO$_3$H | SO$_3$H | H | OMe | | | | | |
| 1a$^{1242}$ | F | H | SO$_3$H | SO$_3$H | H | F | | | | | |
| 1a$^{1243}$ | CF$_3$ | H | SO$_3$H | SO$_3$H | H | CF$_3$ | | | | | |
| 1a$^{1244}$ | H | SO$_3$H | H | H | SO$_3$H | H | NHCOCH$_3$ | OMe | CONH$_2$ | Methyl | 3-Ethoxy-propyl |
| 1a$^{1245}$ | H | H | SO$_3$H | SO$_3$H | H | H | | | | | |
| 1a$^{1246}$ | Methyl | H | SO$_3$H | SO$_3$H | H | Methyl | | | | | |
| 1a$^{1247}$ | OMe | H | SO$_3$H | SO$_3$H | H | OMe | | | | | |
| 1a$^{1248}$ | F | H | SO$_3$H | SO$_3$H | H | F | | | | | |
| 1a$^{1249}$ | CF3 | H | SO$_3$H | SO$_3$H | H | CF3 | | | | | |

Further preferred dyes of the present invention are those of formula (1 b)

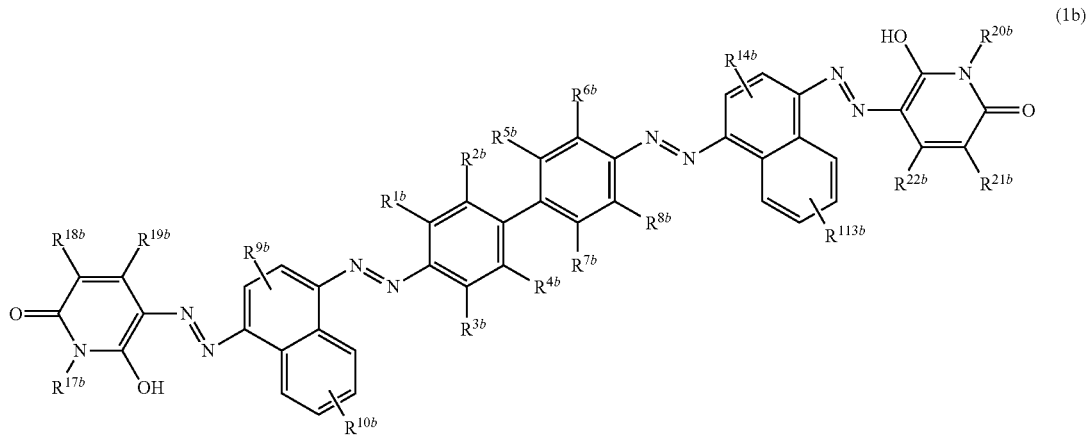

wherein
$R^{1b}$, $R^{2b}$, $R^{3b}$, $R^{4b}$, $R^{5b}$, $R^{6b}$, $R^{7b}$ and $R^{8b}$ independent of each other is hydrogen, alkyl, alkoxy, halogen, trifluoromethyl or $SO_3M$ whereby at least two of them are $SO_3M$,
$R^{9b}$, $R^{10b}$, $R^{13b}$ and $R^{14b}$ independent of each other is hydrogen, ($C_1$-$C_4$)-alkyl, ($C_1$-$C_4$)-alkoxy, halogen, trifluoromethyl, —$SO_3M$ or ($C_1$-$C_4$)-acylamino,
$R^{17b}$ and $R^{20b}$ independent of each other is hydrogen, alkyl, alkenyl, cycloalkyl, trifluoromethyl, aryl, heteroaryl, heterocycloalkyl, carbamoyl, sulfamoyl, amino, N-acylamino, ureido, alkylureido, phenylureido, N-monoalkylamino, N,N-dialkyl-amino, N-arylamino, N,N-diarylamino, N-alkyl-N-aryl-amino, N-monocycloalkyl-amino, N,N-dicycloalkylamino, N-alkyl-N-cycloalkyl-amino, N-aryl-N-cycloalkyl-amino, hydroxylalkylsulfonylalkyl
or
alkyl interrupted by one or more heteroatoms selected from the group consisting of oxygen and sulphur
or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
or
alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, $R^{18e}$ and $R^{11b}$ independent of each other is cyano, carbamoyl or alkoxycarbonyl, $R^{19b}$ and $R^{22b}$ independent of each other is unsubstituted, linear or branched ($C_1$-$C_4$) alkyl, unsubstituted ($C_5$-$C_7$) cycloalkyl or substituted ($C_1$-$C_7$) cycloalkyl with one or more substituents such as methyl, ethyl, isobutyl, sec-butyl, tert-butyl and methylbutyl, and M is hydrogen, an alkali metal, ammonium, one equivalent of an alkali earth metal or a monovalent organic cation.

In especially preferred dyes of formula (1b)

$R^{1b}$, $R^{3b}$, $R^{4b}$, $R^{5b}$, $R^{6b}$ and $R^{8b}$ independent of each other is $SO_3M$, hydrogen, alkyl, alkoxy or halogen,—whereby at least two of them are $SO_3M$, $R^{2b}$ and $R^{7b}$ is hydrogen, $R^{9b}$, $R^{10b}$, $R^{13b}$ and $R^{14b}$ independent of each other is hydrogen, methyl, halogen, —$SO_3M$ or acetylamino, $R^{17b}$ and $R^{20b}$ independent of each other is methyl, ethyl, butyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentene-2-yl, 2-ethylhexyl, 2,2-dimethylpropyl, phenyl, benzyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 6-hydroxy-1-[2-(2-hydroxyethylsulfanyl)-ethyl], 2-(2-tertbutylsulfanylethanesulfonyl)-ethyl, 2-(ethylsulfonyl)ethanol, 3-(4-hydroxybutoxy)propyl, 2-(2-hydroxyethoxy)ethyl, 3-Isopropoxy propyl or 3-ethoxypropyl, $R^{18b}$ and $R^{21b}$ independent of each other is cyano or carbamoyl, $R^{19b}$ and $R^{22b}$ is methyl, and M is hydrogen, sodium, potassium, lithium or ammonium.

Examples of preferred dyes of the formula (1b) are the compounds of the formulae (1b$^1$ to 1b$^{170}$) as shown in Table 2, whereby $R^{2b}$ and $R^{7b}$ is hydrogen:

TABLE 2

| Structure | $R^{1b}$ | $R^{3b}$ | $R^{4b}$ | $R^{5b}$ | $R^{6b}$ | $R^{8b}$ | $R^{9b}/R^{13b}$ | $R^{10b}/R^{14b}$ | $R^{18b}/R^{21b}$ | $R^{19b}/R^{22b}$ $R21^b$ $R22^b$ | $R^{17b}/R^{20b}$ |
|---|---|---|---|---|---|---|---|---|---|---|---|
| $1b^1$ | H | $SO_3H$ | H | H | $SO_3H$ | H | 6-$SO_3H$ | H | $CONH_2$ | Methyl | Methyl |
| $1b^2$ | H | H | $SO_3H$ | $SO_3H$ | H | H | | | | | |
| $1b^3$ | Methyl | H | $SO_3H$ | $SO_3H$ | H | Methyl | | | | | |
| $1b^4$ | OMe | H | $SO_3H$ | $SO_3H$ | H | OMe | | | | | |
| $1b^5$ | F | H | $SO_3H$ | $SO_3H$ | H | F | | | | | |
| $1b^6$ | H | $SO_3H$ | H | H | $SO_3H$ | H | 6-$SO_3H$ | H | $CONH_2$ | Methyl | Ethyl |
| $1b^7$ | H | H | $SO_3H$ | $SO_3H$ | H | H | | | | | |
| $1b^8$ | Methyl | H | $SO_3H$ | $SO_3H$ | H | Methyl | | | | | |
| $1b^9$ | OMe | H | $SO_3H$ | $SO_3H$ | H | OMe | | | | | |
| $1b^{10}$ | F | H | $SO_3H$ | $SO_3H$ | H | F | | | | | |
| $1b^{11}$ | H | $SO_3H$ | H | H | $SO_3H$ | H | 6-$SO_3H$ | H | $CONH_2$ | Methyl | Propyl |
| $1b^{12}$ | H | H | $SO_3H$ | $SO_3H$ | H | H | | | | | |
| $1b^{13}$ | Methyl | H | $SO_3H$ | $SO_3H$ | H | Methyl | | | | | |
| $1b^{14}$ | OMe | H | $SO_3H$ | $SO_3H$ | H | OMe | | | | | |
| $1b^{15}$ | F | H | $SO_3H$ | $SO_3H$ | H | F | | | | | |
| $1b^{16}$ | H | $SO_3H$ | H | H | $SO_3H$ | H | 6-$SO_3H$ | H | $CONH_2$ | Methyl | Butyl |
| $1b^{17}$ | H | H | $SO_3H$ | $SO_3H$ | H | H | | | | | |
| $1b^{18}$ | Methyl | H | $SO_3H$ | $SO_3H$ | H | Methyl | | | | | |
| $1b^{19}$ | OMe | H | $SO_3H$ | $SO_3H$ | H | OMe | | | | | |
| $1b^{20}$ | F | H | $SO_3H$ | $SO_3H$ | H | F | | | | | |
| $1b^{21}$ | H | $SO_3H$ | H | H | $SO_3H$ | H | 6-$SO_3H$ | H | $CONH_2$ | Methyl | Pentyl |
| $1b^{22}$ | H | H | $SO_3H$ | $SO_3H$ | H | H | | | | | |
| $1b^{23}$ | Methyl | H | $SO_3H$ | $SO_3H$ | H | Methyl | | | | | |
| $1b^{24}$ | OMe | H | $SO_3H$ | $SO_3H$ | H | OMe | | | | | |
| $1b^{25}$ | F | H | $SO_3H$ | $SO_3H$ | H | F | | | | | |
| $1b^{26}$ | H | $SO_3H$ | H | H | $SO_3H$ | H | 6-$SO_3H$ | H | $CONH_2$ | Methyl | Methyl |
| $1b^{27}$ | H | H | $SO_3H$ | $SO_3H$ | H | H | | | | | |
| $1b^{28}$ | Methyl | H | $SO_3H$ | $SO_3H$ | H | Methyl | | | | | |
| $1b^{29}$ | OMe | H | $SO_3H$ | $SO_3H$ | H | OMe | | | | | |
| $1b^{30}$ | F | H | $SO_3H$ | $SO_3H$ | H | F | | | | | |
| $1b^{31}$ | H | $SO_3H$ | H | H | $SO_3H$ | H | 6-$SO_3H$ | H | $CONH_2$ | Methyl | Ethyl |
| $1b^{32}$ | H | H | $SO_3H$ | $SO_3H$ | H | H | | | | | |
| $1b^{33}$ | Methyl | H | $SO_3H$ | $SO_3H$ | H | Methyl | | | | | |
| $1b^{34}$ | OMe | H | $SO_3H$ | $SO_3H$ | H | OMe | | | | | |
| $1b^{35}$ | F | H | $SO_3H$ | $SO_3H$ | H | F | | | | | |
| $1b^{36}$ | H | $SO_3H$ | H | H | $SO_3H$ | H | 6-$SO_3H$ | H | $CONH_2$ | Methyl | Propyl |
| $1b^{37}$ | H | H | $SO_3H$ | $SO_3H$ | H | H | | | | | |
| $1b^{38}$ | Methyl | H | $SO_3H$ | $SO_3H$ | H | Methyl | | | | | |
| $1b^{39}$ | OMe | H | $SO_3H$ | $SO_3H$ | H | OMe | | | | | |
| $1b^{40}$ | F | H | $SO_3H$ | $SO_3H$ | H | F | | | | | |
| $1b^{41}$ | H | $SO_3H$ | H | H | $SO_3H$ | H | 6-$SO_3H$ | H | CN | Methyl | Butyl |
| $1b^{42}$ | H | H | $SO_3H$ | $SO_3H$ | H | H | | | | | |
| $1b^{43}$ | Methyl | H | $SO_3H$ | $SO_3H$ | H | Methyl | | | | | |
| $1b^{44}$ | OMe | H | $SO_3H$ | $SO_3H$ | H | OMe | | | | | |
| $1b^{45}$ | F | H | $SO_3H$ | $SO_3H$ | H | F | | | | | |
| $1b^{46}$ | H | $SO_3H$ | H | H | $SO_3H$ | H | 6-$SO_3H$ | H | CN | Methyl | Pentyl |
| $1b^{47}$ | H | H | $SO_3H$ | $SO_3H$ | H | H | | | | | |
| $1b^{48}$ | Methyl | H | $SO_3H$ | $SO_3H$ | H | Methyl | | | | | |
| $1b^{49}$ | OMe | H | $SO_3H$ | $SO_3H$ | H | OMe | | | | | |
| $1b^{50}$ | F | H | $SO_3H$ | $SO_3H$ | H | F | | | | | |
| $1b^{51}$ | H | $SO_3H$ | H | H | $SO_3H$ | H | 6-$SO_3H$ | H | CN | Methyl | Cyclopentyl |
| $1b^{52}$ | H | H | $SO_3H$ | $SO_3H$ | H | H | | | | | |
| $1b^{53}$ | Methyl | H | $SO_3H$ | $SO_3H$ | H | Methyl | | | | | |
| $1b^{54}$ | OMe | H | $SO_3H$ | $SO_3H$ | H | OMe | | | | | |
| $1b^{55}$ | F | H | $SO_3H$ | $SO_3H$ | H | F | | | | | |
| $1b^{56}$ | H | $SO_3H$ | H | H | $SO_3H$ | H | 6-$SO_3H$ | H | CN | Methyl | Hexyl |
| $1b^{57}$ | H | H | $SO_3H$ | $SO_3H$ | H | H | | | | | |
| $1b^{58}$ | Methyl | H | $SO_3H$ | $SO_3H$ | H | Methyl | | | | | |
| $1b^{59}$ | OMe | H | $SO_3H$ | $SO_3H$ | H | OMe | | | | | |
| $1b^{60}$ | F | H | $SO_3H$ | $SO_3H$ | H | F | | | | | |
| $1b^{61}$ | H | $SO_3H$ | H | H | $SO_3H$ | H | 6-$SO_3H$ | H | CN | Methyl | Methyl |
| $1b^{62}$ | H | H | $SO_3H$ | $SO_3H$ | H | H | | | | | |
| $1b^{63}$ | Methyl | H | $SO_3H$ | $SO_3H$ | H | Methyl | | | | | |
| $1b^{64}$ | OMe | H | $SO_3H$ | $SO_3H$ | H | OMe | | | | | |
| $1b^{65}$ | F | H | $SO_3H$ | $SO_3H$ | H | F | | | | | |
| $1b^{66}$ | H | $SO_3H$ | H | H | $SO_3H$ | H | 6-$SO_3H$ | H | CN | Methyl | Ethyl |
| $1b^{67}$ | H | H | $SO_3H$ | $SO_3H$ | H | H | | | | | |
| $1b^{68}$ | Methyl | H | $SO_3H$ | $SO_3H$ | H | Methyl | | | | | |
| $1b^{69}$ | OMe | H | $SO_3H$ | $SO_3H$ | H | OMe | | | | | |
| $1b^{70}$ | F | H | $SO_3H$ | $SO_3H$ | H | F | | | | | |
| $1b^{71}$ | H | $SO_3H$ | H | H | $SO_3H$ | H | 6-$SO_3H$ | H | CN | Methyl | Propyl |
| $1b^{72}$ | H | H | $SO_3H$ | $SO_3H$ | H | H | | | | | |
| $1b^{73}$ | Methyl | H | $SO_3H$ | $SO_3H$ | H | Methyl | | | | | |
| $1b^{74}$ | OMe | H | $SO_3H$ | $SO_3H$ | H | OMe | | | | | |
| $1b^{75}$ | F | H | $SO_3H$ | $SO_3H$ | H | F | | | | | |

TABLE 2-continued

| Structure | $R^{1b}$ | $R^{3b}$ | $R^{4b}$ | $R^{5b}$ | $R^{6b}$ | $R^{8b}$ | $R^{9b}/R^{13b}$ | $R^{10b}/R^{14b}$ | $R^{18b}/R^{21b}$ | $R21^b$ | $R^{19b}/R^{22b}$ | $R22^b$ | $R^{17b}/R^{20b}$ |
|---|---|---|---|---|---|---|---|---|---|---|---|---|---|
| $1b^{76}$ | H | $SO_3H$ | H | H | $SO_3H$ | H | 6-$SO_3H$ | H | CN | | Methyl | | Butyl |
| $1b^{77}$ | H | H | $SO_3H$ | $SO_3H$ | H | H | | | | | | | |
| $1b^{78}$ | Methyl | H | $SO_3H$ | $SO_3H$ | H | Methyl | | | | | | | |
| $1b^{79}$ | OMe | H | $SO_3H$ | $SO_3H$ | H | OMe | | | | | | | |
| $1b^{80}$ | F | H | $SO_3H$ | $SO_3H$ | H | F | | | | | | | |
| $1b^{81}$ | H | $SO_3H$ | H | H | $SO_3H$ | H | 6-$SO_3H$ | H | CN | | Methyl | | Pentyl |
| $1b^{82}$ | H | H | $SO_3H$ | $SO_3H$ | H | H | | | | | | | |
| $1b^{83}$ | Methyl | H | $SO_3H$ | $SO_3H$ | H | Methyl | | | | | | | |
| $1b^{84}$ | OMe | H | $SO_3H$ | $SO_3H$ | H | OMe | | | | | | | |
| $1b^{85}$ | F | H | $SO_3H$ | $SO_3H$ | H | F | | | | | | | |
| $1b^{86}$ | H | $SO_3H$ | H | H | $SO_3H$ | H | 7-$SO_3H$ | H | $CONH_2$ | | Methyl | | Cyclohexyl |
| $1b^{87}$ | H | H | $SO_3H$ | $SO_3H$ | H | H | | | | | | | |
| $1b^{88}$ | Methyl | H | $SO_3H$ | $SO_3H$ | H | Methyl | | | | | | | |
| $1b^{89}$ | OMe | H | $SO_3H$ | $SO_3H$ | H | OMe | | | | | | | |
| $1b^{90}$ | F | H | $SO_3H$ | $SO_3H$ | H | F | | | | | | | |
| $1b^{91}$ | H | $SO_3H$ | H | H | $SO_3H$ | H | 7-$SO_3H$ | H | $CONH_2$ | | Methyl | | Hexyl |
| $1b^{92}$ | H | H | $SO_3H$ | $SO_3H$ | H | H | | | | | | | |
| $1b^{93}$ | Methyl | H | $SO_3H$ | $SO_3H$ | H | Methyl | | | | | | | |
| $1b^{94}$ | OMe | H | $SO_3H$ | $SO_3H$ | H | OMe | | | | | | | |
| $1b^{95}$ | F | H | $SO_3H$ | $SO_3H$ | H | F | | | | | | | |
| $1b^{96}$ | H | $SO_3H$ | H | H | $SO_3H$ | H | 7-$SO_3H$ | H | $CONH_2$ | | Methyl | | Methyl |
| $1b^{97}$ | H | H | $SO_3H$ | $SO_3H$ | H | H | | | | | | | |
| $1b^{98}$ | Methyl | H | $SO_3H$ | $SO_3H$ | H | Methyl | | | | | | | |
| $1b^{99}$ | OMe | H | $SO_3H$ | $SO_3H$ | H | OMe | | | | | | | |
| $1b^{100}$ | F | H | $SO_3H$ | $SO_3H$ | H | F | | | | | | | |
| $1b^{101}$ | H | $SO_3H$ | H | H | $SO_3H$ | H | 7-$SO_3H$ | H | $CONH_2$ | | Methyl | | Ethyl |
| $1b^{102}$ | H | H | $SO_3H$ | $SO_3H$ | H | H | | | | | | | |
| $1b^{103}$ | Methyl | H | $SO_3H$ | $SO_3H$ | H | Methyl | | | | | | | |
| $1b^{104}$ | OMe | H | $SO_3H$ | $SO_3H$ | H | OMe | | | | | | | |
| $1b^{105}$ | F | H | $SO_3H$ | $SO_3H$ | H | F | | | | | | | |
| $1b^{106}$ | H | $SO_3H$ | H | H | $SO_3H$ | H | 7-$SO_3H$ | H | $CONH_2$ | | Methyl | | Propyl |
| $1b^{107}$ | H | H | $SO_3H$ | $SO_3H$ | H | H | | | | | | | |
| $1b^{108}$ | Methyl | H | $SO_3H$ | $SO_3H$ | H | Methyl | | | | | | | |
| $1b^{109}$ | OMe | H | $SO_3H$ | $SO_3H$ | H | OMe | | | | | | | |
| $1b^{110}$ | F | H | $SO_3H$ | $SO_3H$ | H | F | | | | | | | |
| $1b^{111}$ | H | $SO_3H$ | H | H | $SO_3H$ | H | 7-$SO_3H$ | H | $CONH_2$ | | Methyl | | Butyl |
| $1b^{112}$ | H | H | $SO_3H$ | $SO_3H$ | H | H | | | | | | | |
| $1b^{113}$ | Methyl | H | $SO_3H$ | $SO_3H$ | H | Methyl | | | | | | | |
| $1b^{114}$ | OMe | H | $SO_3H$ | $SO_3H$ | H | OMe | | | | | | | |
| $1b^{115}$ | F | H | $SO_3H$ | $SO_3H$ | H | F | | | | | | | |
| $1b^{116}$ | H | $SO_3H$ | H | H | $SO_3H$ | H | 7-$SO_3H$ | H | CN | | Methyl | | Pentyl |
| $1b^{117}$ | H | H | $SO_3H$ | $SO_3H$ | H | H | | | | | | | |
| $1b^{118}$ | Methyl | H | $SO_3H$ | $SO_3H$ | H | Methyl | | | | | | | |
| $1b^{119}$ | OMe | H | $SO_3H$ | $SO_3H$ | H | OMe | | | | | | | |
| $1b^{120}$ | F | H | $SO_3H$ | $SO_3H$ | H | F | | | | | | | |
| $1b^{121}$ | H | $SO_3H$ | H | H | $SO_3H$ | H | 7-$SO_3H$ | H | CN | | Methyl | | Cyclohexyl |
| $1b^{122}$ | H | H | $SO_3H$ | $SO_3H$ | H | H | | | | | | | |
| $1b^{123}$ | Methyl | H | $SO_3H$ | $SO_3H$ | H | Methyl | | | | | | | |
| $1b^{124}$ | OMe | H | $SO_3H$ | $SO_3H$ | H | OMe | | | | | | | |
| $1b^{125}$ | F | H | $SO_3H$ | $SO_3H$ | H | F | | | | | | | |
| $1b^{126}$ | H | $SO_3H$ | H | H | $SO_3H$ | H | 7-$SO_3H$ | H | CN | | Methyl | | Hexyl |
| $1b^{127}$ | H | H | $SO_3H$ | $SO_3H$ | H | H | | | | | | | |
| $1b^{128}$ | Methyl | H | $SO_3H$ | $SO_3H$ | H | Methyl | | | | | | | |
| $1b^{129}$ | OMe | H | $SO_3H$ | $SO_3H$ | H | OMe | | | | | | | |
| $1b^{130}$ | F | H | $SO_3H$ | $SO_3H$ | H | F | | | | | | | |
| $1b^{131}$ | H | $SO_3H$ | H | H | $SO_3H$ | H | 7-$SO_3H$ | H | CN | | Methyl | | Methyl |
| $1b^{132}$ | H | H | $SO_3H$ | $SO_3H$ | H | H | | | | | | | |
| $1b^{133}$ | Methyl | H | $SO_3H$ | $SO_3H$ | H | Methyl | | | | | | | |
| $1b^{134}$ | OMe | H | $SO_3H$ | $SO_3H$ | H | OMe | | | | | | | |
| $1b^{135}$ | F | H | $SO_3H$ | $SO_3H$ | H | F | | | | | | | |
| $1b^{136}$ | H | $SO_3H$ | H | H | $SO_3H$ | H | 7-$SO_3H$ | H | CN | | Methyl | | Ethyl |
| $1b^{137}$ | H | H | $SO_3H$ | $SO_3H$ | H | H | | | | | | | |
| $1b^{138}$ | Methyl | H | $SO_3H$ | $SO_3H$ | H | Methyl | | | | | | | |
| $1b^{139}$ | OMe | H | $SO_3H$ | $SO_3H$ | H | OMe | | | | | | | |
| $1b^{140}$ | F | H | $SO_3H$ | $SO_3H$ | H | F | | | | | | | |
| $1b^{141}$ | H | $SO_3H$ | H | H | $SO_3H$ | H | 7-$SO_3H$ | H | CN | | Methyl | | Propyl |
| $1b^{142}$ | H | H | $SO_3H$ | $SO_3H$ | H | H | | | | | | | |
| $1b^{143}$ | Methyl | H | $SO_3H$ | $SO_3H$ | H | Methyl | | | | | | | |
| $1b^{144}$ | OMe | H | $SO_3H$ | $SO_3H$ | H | OMe | | | | | | | |
| $1b^{145}$ | F | H | $SO_3H$ | $SO_3H$ | H | F | | | | | | | |
| $1b^{146}$ | H | $SO_3H$ | H | H | $SO_3H$ | H | 7-$SO_3H$ | H | CN | | Methyl | | Butyl |
| $1b^{147}$ | H | H | $SO_3H$ | $SO_3H$ | H | H | | | | | | | |
| $1b^{148}$ | Methyl | H | $SO_3H$ | $SO_3H$ | H | Methyl | | | | | | | |
| $1b^{149}$ | OMe | H | $SO_3H$ | $SO_3H$ | H | OMe | | | | | | | |
| $1b^{150}$ | F | H | $SO_3H$ | $SO_3H$ | H | F | | | | | | | |

TABLE 2-continued

| Structure | $R^{1b}$ | $R^{3b}$ | $R^{4b}$ | $R^{5b}$ | $R^{6b}$ | $R^{8b}$ | $R^{9b}/R^{13b}$ | $R^{10b}/R^{14b}$ | $R^{18b}/R^{21b}$ | $R^{19b}/R^{22b}$ R22$^b$ | $R^{17b}/R^{20b}$ |
|---|---|---|---|---|---|---|---|---|---|---|---|
| 1b$^{151}$ | H | SO$_3$H | H | H | SO$_3$H | H | 7-SO$_3$H | H | CN | Methyl | Pentyl |
| 1b$^{152}$ | H | H | SO$_3$H | SO$_3$H | H | H | | | | | |
| 1b$^{153}$ | Methyl | H | SO$_3$H | SO$_3$H | H | Methyl | | | | | |
| 1b$^{154}$ | OMe | H | SO$_3$H | SO$_3$H | H | OMe | | | | | |
| 1b$^{155}$ | F | H | SO$_3$H | SO$_3$H | H | F | | | | | |
| 1b$^{156}$ | H | SO$_3$H | H | H | SO$_3$H | H | 7-SO$_3$H | H | CN | Methyl | Cyclohexyl |
| 1b$^{157}$ | H | H | SO$_3$H | SO$_3$H | H | H | | | | | |
| 1b$^{158}$ | Methyl | H | SO$_3$H | SO$_3$H | H | Methyl | | | | | |
| 1b$^{159}$ | OMe | H | SO$_3$H | SO$_3$H | H | OMe | | | | | |
| 1b$^{160}$ | F | H | SO$_3$H | SO$_3$H | H | F | | | | | |
| 1b$^{161}$ | H | SO$_3$H | H | H | SO$_3$H | H | 7-SO$_3$H | H | CN | Methyl | Hexyl |
| 1b$^{162}$ | H | H | SO$_3$H | SO$_3$H | H | H | | | | | |
| 1b$^{163}$ | Methyl | H | SO$_3$H | SO$_3$H | H | Methyl | | | | | |
| 1b$^{164}$ | OMe | H | SO$_3$H | SO$_3$H | H | OMe | | | | | |
| 1b$^{165}$ | F | H | SO$_3$H | SO$_3$H | H | F | | | | | |
| 1b$^{166}$ | H | SO$_3$H | H | H | SO$_3$H | H | 7-SO$_3$H | H | CN | Methyl | Methyl |
| 1b$^{167}$ | H | H | SO$_3$H | SO$_3$H | H | H | | | | | |
| 1b$^{168}$ | Methyl | H | SO$_3$H | SO$_3$H | H | Methyl | | | | | |
| 1b$^{169}$ | OMe | H | SO$_3$H | SO$_3$H | H | OMe | | | | | |
| 1b$^{170}$ | F | H | SO$_3$H | SO$_3$H | H | F | | | | | |

Another preferred embodiment are dye(s) of formula (2) and mixtures thereof

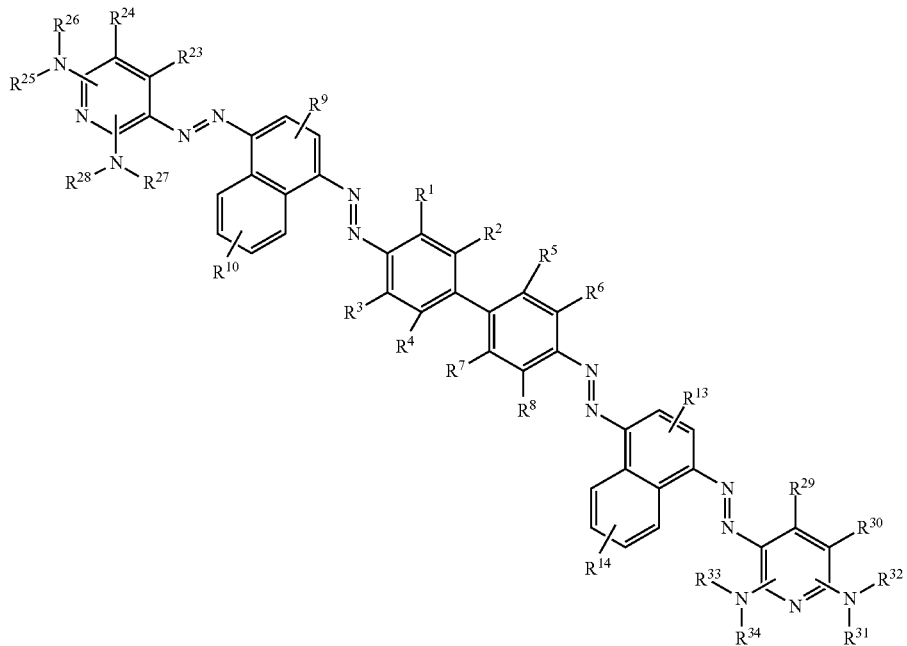

(2)

wherein
$R^1$, $R^2$, $R^3$, $R^4$, $R^5$, $R^6$, $R^7$ and $R^8$ independent of each other is hydrogen, alkyl, alkoxy, halogen, trifluoromethyl or SO$_3$M, whereby at least two of them are SO$_3$M,
$R^9$, $R^{10}$, $R^{13}$, $R^{14}$ independent of each other is hydrogen, alkyl, substituted alkyl, alkyl chain interrupted by one or two heteroatoms, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, alkylureido or SO$_3$M,
$R^{24}$ and $R^{30}$ independent of each other is cyano, carbamoyl, substituted carbamoyl, alkoxycarbonyl, trifluoromethyl, carbonyltrifluoromethyl or halogen,
$R^{23}$ and $R^{29}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, arylthio
or
is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido,
$R^{25}$, $R^{26}$, $R^{27}$, $R^{28}$, $R^{31}$, $R^{32}$, $R^{33}$ and $R^{34}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocyclo-alkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-di-aryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-mono-cycloalkyl-N-monoaryl-carbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, M is hydrogen, an alkali metal, ammonium, one equivalent of an alkali earth metal or a monovalent organic cation, the dyes of formula (2) have two to six sulfonic acid groups, and whereby the bonds with unfixed attachment points on the pyridine couplers mean that the amino rests bearing the substituents $R^{25}$, $R^{26}$, $R^{27}$ and $R^{28}$, respectively can be positioned ortho or para to $R^{24}$, meaning that when the amino rest bearing the substituents $R^{25}$ and $R^{26}$ is positioned ortho to $R^{24}$, the amino rest bearing the substituents $R^{27}$ to $R^{28}$ is positioned pare to $R^{24}$, and vice versa;

and the same applies to the amino rests bearing the substituents $R^{31}$, $R^{32}$, $R^{33}$ and $R^{34}$, respectively that can be positioned ortho or pare to $R^{30}$, meaning that when the amino rest bearing the substituents $R^{31}$ and $R^{32}$ is positioned ortho to $R^{30}$, the amino rest bearing the substituents $R^{33}$ to $R^{34}$ is positioned para to $R^{30}$, and vice versa.

Particularly preferred embodiments of the present invention are the dyes of formula (2a) and mixtures thereof

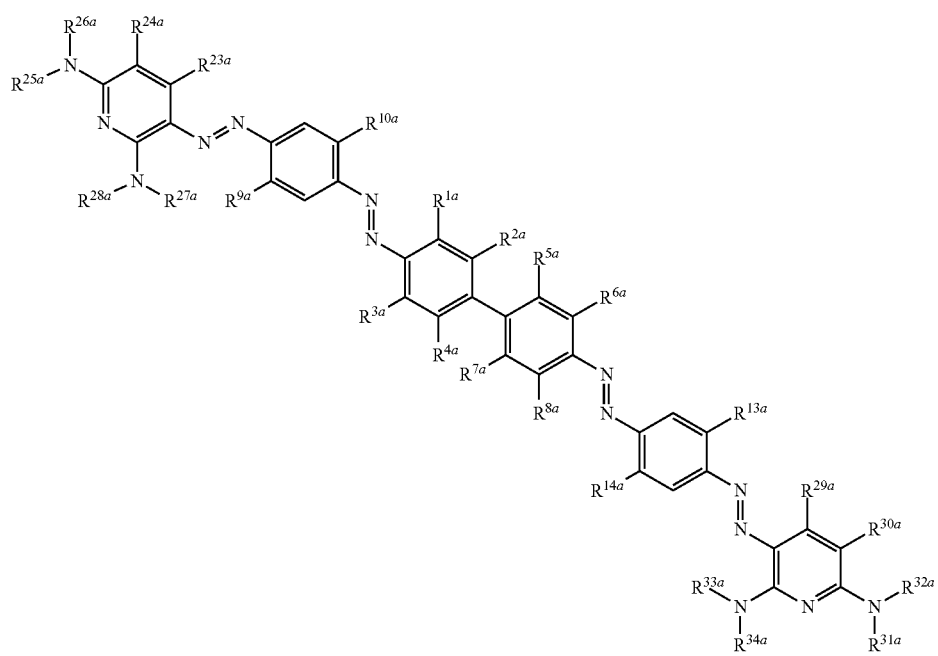

(2a)

wherein $R^{1a}$, $R^{2a}$, $R^{3a}$, $R^{4a}$, $R^{5a}$, $R^{6a}$, $R^{7a}$ and $R^{8a}$ independent of each other is hydrogen, alkyl, alkoxy, halogen, trifluoromethyl or $SO_3M$,—whereby at least two of them are $SO_3M$, $R^{9a}$, $R^{10a}$, $R^{13a}$ and $R^{14a}$ independent of each other is hydrogen, $(C_1-C_4)$-alkyl, $(C_1-C_4)$-alkoxy, halogen, trifluoromethyl$(C_1-C_4)$-acylamino or $SO_3M$, $R^{23a}$ and $R^{29a}$ Independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl, $R^{24a}$ and $R^{30a}$ independent of each other is cyano, carbamoyl or alkoxycarbonyl, $R^{25a}$, $R^{26a}$, $R^{27a}$, $R^{28a}$, $R^{31a}$, $R^{32a}$, $R^{33a}$ and $R^{34a}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-mono-cycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

In especially preferred dyes of formula (2a)

$R^{1a}$, $R^{3a}$, $R^{4a}$, $R^{5a}$, $R^{6a}$ and $R^{8a}$ independent of each other is $SO_3M$, hydrogen, alkyl, alkoxy or halogen,—whereby at least two of them are $SO_3M$, $R^{2a}$ and $R^{7a}$ is hydrogen, $R^{9a}$, $R^{10a}$, $R^{13a}$ and $R^{14a}$ independent of each other is hydrogen, methyl, halogen, $SO_3M$ or acetylamino, $R^{23a}$ and $R^{29a}$ is methyl, $R^{24a}$ and $R^{30a}$ independent of each other is cyano or carbamoyl, $R^{25a}$, $R^{26a}$, $R^{27a}$, $R^{28a}$, $R^{31a}$, $R^{32a}$, $R^{33a}$ and $R^{34a}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfonyl)-ethyl, 2-(2-tertbutylsulfanylethanesulfonyl)-ethyl, 2-(2-hydroxyethoxy)propyl, 2-(2-hydroxy ethoxy)ethyl, 3-(4-hydroxybutoxy)propyl, 2-(2-hydroxyethanesulfonyl)-ethyl, 3-(2-phenoxy-ethoxy)-propyl, 3-isopropoxy-propyl, 3-ethoxy-propyl, 3-ethoxybutyl or $(C_2-C_6)$-alkyl substituted by COOM or by $SO_3M$ and M is hydrogen, sodium, potassium, lithium or ammonium.

Examples of preferred dyes of formula (2a) are the compounds of formulae $(2a^1$ to $2a^{2594})$ and mixtures thereof (Table 3): hereby $R^{1a}$, $R^{2a}$, $R^{7a}$, and $R^{8a}$ are hydrogen

TABLE 3

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^1$ | $SO_3H$ | H | H | $SO_3H$ | Methyl | Methyl | CN | Methyl | H | Methyl | H |
| $2a^2$ | H | $SO_3H$ | $SO_3H$ | H | | | | | | | |
| $2a^3$ | $SO_3H$ | H | H | $SO_3H$ | Methyl | Methyl | CN | Ethyl | H | Ethyl | H |
| $2a^4$ | H | $SO_3H$ | $SO_3H$ | H | | | | | | | |
| $2a^5$ | $SO_3H$ | H | H | $SO_3H$ | Methyl | Methyl | CN | Propyl | H | Propyl | H |
| $2a^6$ | H | $SO_3H$ | $SO_3H$ | H | | | | | | | |
| $2a^7$ | $SO_3H$ | H | H | $SO_3H$ | Methyl | Methyl | CN | Butyl | H | Butyl | H |
| $2a^8$ | H | $SO_3H$ | $SO_3H$ | H | | | | | | | |
| $2a^9$ | $SO_3H$ | H | H | $SO_3H$ | Methyl | Methyl | CN | Pentyl | H | Pentyl | H |
| $2a^{10}$ | H | $SO_3H$ | $SO_3H$ | H | | | | | | | |
| $2a^{11}$ | $SO_3H$ | H | H | $SO_3H$ | Methyl | Methyl | CN | Hexyl | H | Hexyl | H |
| $2a^{12}$ | H | $SO_3H$ | $SO_3H$ | H | | | | | | | |
| $2a^{13}$ | $SO_3H$ | H | H | $SO_3H$ | Methyl | Methyl | CN | Cyclobutyl | H | Cyclobutyl | H |
| $2a^{14}$ | H | $SO_3H$ | $SO_3H$ | H | | | | | | | |
| $2a^{15}$ | $SO_3H$ | H | H | $SO_3H$ | Methyl | Methyl | CN | Cyclopentyl | H | Cyclopentyl | H |
| $2a^{16}$ | H | $SO_3H$ | $SO_3H$ | H | | | | | | | |
| $2a^{17}$ | $SO_3H$ | H | H | $SO_3H$ | Methyl | Methyl | CN | Cyclohexyl | H | Cyclohexyl | H |
| $2a^{18}$ | H | $SO_3H$ | $SO_3H$ | H | | | | | | | |
| $2a^{19}$ | $SO_3H$ | H | H | $SO_3H$ | Methyl | Methyl | CN | 2-Methyl cyclohexyl | H | 2-Methyl cyclohexyl | H |
| $2a^{20}$ | H | $SO_3H$ | $SO_3H$ | H | | | | | | | |
| $2a^{21}$ | $SO_3H$ | H | H | $SO_3H$ | Methyl | Methyl | CN | 3-Methyl cyclohexyl | H | 3-Methyl cyclohexyl | H |
| $2a^{22}$ | H | $SO_3H$ | $SO_3H$ | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{23}$ | SO$_3$H | H | H | SO$_3$H | Methyl | Methyl | CN | Isopropyl | H | Isopropyl | H |
| 2a$^{24}$ | H | SO$_3$H | SO$_3$H | H | | | | | | | |
| 2a$^{25}$ | SO$_3$H | H | H | SO$_3$H | Methyl | Methyl | CN | Sec-butyl | H | Sec-butyl | H |
| 2a$^{26}$ | H | SO$_3$H | SO$_3$H | H | | | | | | | |
| 2a$^{27}$ | SO$_3$H | H | H | SO$_3$H | Methyl | Methyl | CN | 2-Methyl butyl | H | 2-Methyl butyl | H |
| 2a$^{28}$ | H | SO$_3$H | SO$_3$H | H | | | | | | | |
| 2a$^{29}$ | SO$_3$H | H | H | SO$_3$H | Methyl | Methyl | CN | 1-Ethyl propyl | H | 1-Ethyl propyl | H |
| 2a$^{30}$ | H | SO$_3$H | SO$_3$H | H | | | | | | | |
| 2a$^{31}$ | SO$_3$H | H | H | SO$_3$H | Methyl | Methyl | CN | 1,2-Dimethyl propyl | H | 1,2-Dimethyl propyl | H |
| 2a$^{32}$ | H | SO$_3$H | SO$_3$H | H | | | | | | | |
| 2a$^{33}$ | SO$_3$H | H | H | SO$_3$H | Methyl | Methyl | CN | Tert-butyl | H | Tert-butyl | H |
| 2a$^{34}$ | H | SO$_3$H | SO$_3$H | H | | | | | | | |
| 2a$^{35}$ | SO$_3$H | H | H | SO$_3$H | Methyl | Methyl | CN | 3-Methyl butyl | H | 3-Methyl butyl | H |
| 2a$^{36}$ | H | SO$_3$H | SO$_3$H | H | | | | | | | |
| 2a$^{37}$ | SO$_3$H | H | H | SO$_3$H | Methyl | Methyl | CN | Pentan-2-yl | H | Pentan-2-yl | H |
| 2a$^{38}$ | H | SO$_3$H | SO$_3$H | H | | | | | | | |
| 2a$^{39}$ | SO$_3$H | H | H | SO$_3$H | Methyl | Methyl | CN | 2-Ethylhexyl | H | 2-Ethylhexyl | H |
| 2a$^{40}$ | H | SO$_3$H | SO$_3$H | H | | | | | | | |
| 2a$^{41}$ | SO$_3$H | H | H | SO$_3$H | Methyl | Methyl | CN | 2,2-Dimethyl propyl | H | 2,2-Dimethyl propyl | H |
| 2a$^{42}$ | H | SO$_3$H | SO$_3$H | H | | | | | | | |
| 2a$^{43}$ | SO$_3$H | H | H | SO$_3$H | Methyl | Methyl | CN | Phenyl | H | Phenyl | H |
| 2a$^{44}$ | H | SO$_3$H | SO$_3$H | H | | | | | | | |
| 2a$^{45}$ | SO$_3$H | H | H | SO$_3$H | Methyl | Methyl | CN | Benzyl | H | Benzyl | H |
| 2a$^{46}$ | H | SO$_3$H | SO$_3$H | H | | | | | | | |
| 2a$^{47}$ | SO$_3$H | H | H | SO$_3$H | NHCOCH$_3$ | OMe | CN | Methyl | H | Methyl | H |
| 2a$^{48}$ | H | SO$_3$H | SO$_3$H | H | | | | | | | |
| 2a$^{49}$ | SO$_3$H | H | H | SO$_3$H | NHCOCH$_3$ | OMe | CN | Ethyl | H | Ethyl | H |
| 2a$^{50}$ | H | SO$_3$H | SO$_3$H | H | | | | | | | |
| 2a$^{51}$ | SO$_3$H | H | H | SO$_3$H | NHCOCH$_3$ | OMe | CN | Propyl | H | Propyl | H |
| 2a$^{52}$ | H | SO$_3$H | SO$_3$H | H | | | | | | | |
| 2a$^{53}$ | SO$_3$H | H | H | SO$_3$H | NHCOCH$_3$ | OMe | CN | Butyl | H | Butyl | H |
| 2a$^{54}$ | H | SO$_3$H | SO$_3$H | H | | | | | | | |
| 2a$^{55}$ | SO$_3$H | H | H | SO$_3$H | NHCOCH$_3$ | OMe | CN | Pentyl | H | Pentyl | H |
| 2a$^{56}$ | H | SO$_3$H | SO$_3$H | H | | | | | | | |
| 2a$^{57}$ | SO$_3$H | H | H | SO$_3$H | NHCOCH$_3$ | OMe | CN | Hexyl | H | Hexyl | H |
| 2a$^{58}$ | H | SO$_3$H | SO$_3$H | H | | | | | | | |
| 2a$^{59}$ | SO$_3$H | H | H | SO$_3$H | NHCOCH$_3$ | OMe | CN | Cyclobutyl | H | Cyclobutyl | H |
| 2a$^{60}$ | H | SO$_3$H | SO$_3$H | H | | | | | | | |
| 2a$^{61}$ | SO$_3$H | H | H | SO$_3$H | NHCOCH$_3$ | OMe | CN | Cyclopentyl | H | Cyclopentyl | H |
| 2a$^{62}$ | H | SO$_3$H | SO$_3$H | H | | | | | | | |
| 2a$^{63}$ | SO$_3$H | H | H | SO$_3$H | NHCOCH$_3$ | OMe | CN | Cyclohexyl | H | Cyclohexyl | H |
| 2a$^{64}$ | H | SO$_3$H | SO$_3$H | H | | | | | | | |
| 2a$^{65}$ | SO$_3$H | H | H | SO$_3$H | NHCOCH$_3$ | OMe | CN | 2-Methyl cyclohexyl | H | 2-Methyl cyclohexyl | H |
| 2a$^{66}$ | H | SO$_3$H | SO$_3$H | H | | | | | | | |
| 2a$^{67}$ | SO$_3$H | H | H | SO$_3$H | NHCOCH$_3$ | OMe | CN | 3-Methyl cyclohexyl | H | 3-Methyl cyclohexyl | H |
| 2a$^{68}$ | H | SO$_3$H | SO$_3$H | H | | | | | | | |
| 2a$^{69}$ | SO$_3$H | H | H | SO$_3$H | NHCOCH$_3$ | OMe | CN | Isopropyl | H | Isopropyl | H |
| 2a$^{70}$ | H | SO$_3$H | SO$_3$H | H | | | | | | | |
| 2a$^{71}$ | SO$_3$H | H | H | SO$_3$H | NHCOCH$_3$ | OMe | CN | Sec-butyl | H | Sec-butyl | H |
| 2a$^{72}$ | H | SO$_3$H | SO$_3$H | H | | | | | | | |
| 2a$^{73}$ | SO$_3$H | H | H | SO$_3$H | NHCOCH$_3$ | OMe | CN | 2-Methyl butyl | H | 2-Methyl butyl | H |
| 2a$^{74}$ | H | SO$_3$H | SO$_3$H | H | | | | | | | |
| 2a$^{75}$ | SO$_3$H | H | H | SO$_3$H | NHCOCH$_3$ | OMe | CN | 1-Ethyl propyl | H | 1-Ethyl propyl | H |
| 2a$^{76}$ | H | SO$_3$H | SO$_3$H | H | | | | | | | |
| 2a$^{77}$ | SO$_3$H | H | H | SO$_3$H | NHCOCH$_3$ | OMe | CN | 1,2-Dimethyl propyl | H | 1,2-Dimethyl propyl | H |
| 2a$^{78}$ | H | SO$_3$H | SO$_3$H | H | | | | | | | |
| 2a$^{79}$ | SO$_3$H | H | H | SO$_3$H | NHCOCH$_3$ | OMe | CN | Tert-butyl | H | Tert-butyl | H |
| 2a$^{80}$ | H | SO$_3$H | SO$_3$H | H | | | | | | | |
| 2a$^{81}$ | SO$_3$H | H | H | SO$_3$H | NHCOCH$_3$ | OMe | CN | 3-Methyl butyl | H | 3-Methyl butyl | H |
| 2a$^{82}$ | H | SO$_3$H | SO$_3$H | H | | | | | | | |
| 2a$^{83}$ | SO$_3$H | H | H | SO$_3$H | NHCOCH$_3$ | OMe | CN | Pentan-2-yl | H | Pentan-2-yl | H |
| 2a$^{84}$ | H | SO$_3$H | SO$_3$H | H | | | | | | | |
| 2a$^{85}$ | SO$_3$H | H | H | SO$_3$H | NHCOCH$_3$ | OMe | CN | 2-Ethylhexyl | H | 2-Ethylhexyl | H |
| 2a$^{86}$ | H | SO$_3$H | SO$_3$H | H | | | | | | | |
| 2a$^{87}$ | SO$_3$H | H | H | SO$_3$H | NHCOCH$_3$ | OMe | CN | 2,2-Dimethyl propyl | H | 2,2-Dimethyl propyl | H |
| 2a$^{88}$ | H | SO$_3$H | SO$_3$H | H | | | | | | | |
| 2a$^{89}$ | SO$_3$H | H | H | SO$_3$H | NHCOCH$_3$ | OMe | CN | Phenyl | H | Phenyl | H |
| 2a$^{90}$ | H | SO$_3$H | SO$_3$H | H | | | | | | | |
| 2a$^{91}$ | SO$_3$H | H | H | SO$_3$H | NHCOCH$_3$ | OMe | CN | Benzyl | H | Benzyl | H |
| 2a$^{92}$ | H | SO$_3$H | SO$_3$H | H | | | | | | | |
| 2a$^{93}$ | SO$_3$H | H | H | SO$_3$H | Methyl | Methyl | CONH$_2$ | Methyl | H | Methyl | H |
| 2a$^{94}$ | H | SO$_3$H | SO$_3$H | H | | | | | | | |
| 2a$^{95}$ | SO$_3$H | H | H | SO$_3$H | Methyl | Methyl | CONH$_2$ | Ethyl | H | Ethyl | H |
| 2a$^{96}$ | H | SO$_3$H | SO$_3$H | H | | | | | | | |
| 2a$^{97}$ | SO$_3$H | H | H | SO$_3$H | Methyl | Methyl | CONH$_2$ | Propyl | H | Propyl | H |
| 2a$^{98}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{99}$ | SO$_3$H | H | H | SO$_3$H | Methyl | Methyl | CONH$_2$ | Butyl | H | Butyl | H |
| 2a$^{100}$ | H | SO$_3$H | SO$_3$H | H | Methyl | Methyl | CONH$_2$ | Butyl | H | Butyl | H |
| 2a$^{101}$ | SO$_3$H | H | H | SO$_3$H | Methyl | Methyl | CONH$_2$ | Pentyl | H | Pentyl | H |
| 2a$^{102}$ | H | SO$_3$H | SO$_3$H | H | Methyl | Methyl | CONH$_2$ | Pentyl | H | Pentyl | H |
| 2a$^{103}$ | SO$_3$H | H | H | SO$_3$H | Methyl | Methyl | CONH$_2$ | Hexyl | H | Hexyl | H |
| 2a$^{104}$ | H | SO$_3$H | SO$_3$H | H | Methyl | Methyl | CONH$_2$ | Hexyl | H | Hexyl | H |
| 2a$^{105}$ | SO$_3$H | H | H | SO$_3$H | Methyl | Methyl | CONH$_2$ | Cyclobutyl | H | Cyclobutyl | H |
| 2a$^{106}$ | H | SO$_3$H | SO$_3$H | H | Methyl | Methyl | CONH$_2$ | Cyclobutyl | H | Cyclobutyl | H |
| 2a$^{107}$ | SO$_3$H | H | H | SO$_3$H | Methyl | Methyl | CONH$_2$ | Cyclopentyl | H | Cyclopentyl | H |
| 2a$^{108}$ | H | SO$_3$H | SO$_3$H | H | Methyl | Methyl | CONH$_2$ | Cyclopentyl | H | Cyclopentyl | H |
| 2a$^{109}$ | SO$_3$H | H | H | SO$_3$H | Methyl | Methyl | CONH$_2$ | Cyclohexyl | H | Cyclohexyl | H |
| 2a$^{110}$ | H | SO$_3$H | SO$_3$H | H | Methyl | Methyl | CONH$_2$ | Cyclohexyl | H | Cyclohexyl | H |
| 2a$^{111}$ | SO$_3$H | H | H | SO$_3$H | Methyl | Methyl | CONH$_2$ | 2-Methyl cyclohexyl | H | 2-Methyl cyclohexyl | H |
| 2a$^{112}$ | H | SO$_3$H | SO$_3$H | H | Methyl | Methyl | CONH$_2$ | 2-Methyl cyclohexyl | H | 2-Methyl cyclohexyl | H |
| 2a$^{113}$ | SO$_3$H | H | H | SO$_3$H | Methyl | Methyl | CONH$_2$ | 3-Methyl cyclohexyl | H | 3-Methyl cyclohexyl | H |
| 2a$^{114}$ | H | SO$_3$H | SO$_3$H | H | Methyl | Methyl | CONH$_2$ | 3-Methyl cyclohexyl | H | 3-Methyl cyclohexyl | H |
| 2a$^{115}$ | SO$_3$H | H | H | SO$_3$H | Methyl | Methyl | CONH$_2$ | Isopropyl | H | Isopropyl | H |
| 2a$^{116}$ | H | SO$_3$H | SO$_3$H | H | Methyl | Methyl | CONH$_2$ | Isopropyl | H | Isopropyl | H |
| 2a$^{117}$ | SO$_3$H | H | H | SO$_3$H | Methyl | Methyl | CONH$_2$ | Sec-butyl | H | Sec-butyl | H |
| 2a$^{118}$ | H | SO$_3$H | SO$_3$H | H | Methyl | Methyl | CONH$_2$ | Sec-butyl | H | Sec-butyl | H |
| 2a$^{119}$ | SO$_3$H | H | H | SO$_3$H | Methyl | Methyl | CONH$_2$ | 2-Methyl butyl | H | 2-Methyl butyl | H |
| 2a$^{120}$ | H | SO$_3$H | SO$_3$H | H | Methyl | Methyl | CONH$_2$ | 2-Methyl butyl | H | 2-Methyl butyl | H |
| 2a$^{121}$ | SO$_3$H | H | H | SO$_3$H | Methyl | Methyl | CONH$_2$ | 1-Ethyl propyl | H | 1-Ethyl propyl | H |
| 2a$^{122}$ | H | SO$_3$H | SO$_3$H | H | Methyl | Methyl | CONH$_2$ | 1-Ethyl propyl | H | 1-Ethyl propyl | H |
| 2a$^{123}$ | SO$_3$H | H | H | SO$_3$H | Methyl | Methyl | CONH$_2$ | 1,2-Dimethyl propyl | H | 1,2-Dimethyl propyl | H |
| 2a$^{124}$ | H | SO$_3$H | SO$_3$H | H | Methyl | Methyl | CONH$_2$ | 1,2-Dimethyl propyl | H | 1,2-Dimethyl propyl | H |
| 2a$^{125}$ | SO$_3$H | H | H | SO$_3$H | Methyl | Methyl | CONH$_2$ | Tert-butyl | H | Tert-butyl | H |
| 2a$^{126}$ | H | SO$_3$H | SO$_3$H | H | Methyl | Methyl | CONH$_2$ | Tert-butyl | H | Tert-butyl | H |
| 2a$^{127}$ | SO$_3$H | H | H | SO$_3$H | Methyl | Methyl | CONH$_2$ | 3-Methyl butyl | H | 3-Methyl butyl | H |
| 2a$^{128}$ | H | SO$_3$H | SO$_3$H | H | Methyl | Methyl | CONH$_2$ | 3-Methyl butyl | H | 3-Methyl butyl | H |
| 2a$^{129}$ | SO$_3$H | H | H | SO$_3$H | Methyl | Methyl | CONH$_2$ | Pentan-2-yl | H | Pentan-2-yl | H |
| 2a$^{130}$ | H | SO$_3$H | SO$_3$H | H | Methyl | Methyl | CONH$_2$ | Pentan-2-yl | H | Pentan-2-yl | H |
| 2a$^{131}$ | SO$_3$H | H | H | SO$_3$H | Methyl | Methyl | CONH$_2$ | 2-Ethylhexyl | H | 2-Ethylhexyl | H |
| 2a$^{132}$ | H | SO$_3$H | SO$_3$H | H | Methyl | Methyl | CONH$_2$ | 2-Ethylhexyl | H | 2-Ethylhexyl | H |
| 2a$^{133}$ | SO$_3$H | H | H | SO$_3$H | Methyl | Methyl | CONH$_2$ | 2,2-Dimethyl propyl | H | 2,2-Dimethyl propyl | H |
| 2a$^{134}$ | H | SO$_3$H | SO$_3$H | H | Methyl | Methyl | CONH$_2$ | 2,2-Dimethyl propyl | H | 2,2-Dimethyl propyl | H |
| 2a$^{135}$ | SO$_3$H | H | H | SO$_3$H | Methyl | Methyl | CONH$_2$ | Phenyl | H | Phenyl | H |
| 2a$^{136}$ | H | SO$_3$H | SO$_3$H | H | Methyl | Methyl | CONH$_2$ | Phenyl | H | Phenyl | H |
| 2a$^{137}$ | SO$_3$H | H | H | SO$_3$H | Methyl | Methyl | CONH$_2$ | Benzyl | H | Benzyl | H |
| 2a$^{138}$ | H | SO$_3$H | SO$_3$H | H | Methyl | Methyl | CONH$_2$ | Benzyl | H | Benzyl | H |
| 2a$^{139}$ | SO$_3$H | H | H | SO$_3$H | NHCOCH$_3$ | OMe | CONH$_2$ | Methyl | H | Methyl | H |
| 2a$^{140}$ | H | SO$_3$H | SO$_3$H | H | NHCOCH$_3$ | OMe | CONH$_2$ | Methyl | H | Methyl | H |
| 2a$^{141}$ | SO$_3$H | H | H | SO$_3$H | NHCOCH$_3$ | OMe | CONH$_2$ | Ethyl | H | Ethyl | H |
| 2a$^{142}$ | H | SO$_3$H | SO$_3$H | H | NHCOCH$_3$ | OMe | CONH$_2$ | Ethyl | H | Ethyl | H |
| 2a$^{143}$ | SO$_3$H | H | H | SO$_3$H | NHCOCH$_3$ | OMe | CONH$_2$ | Propyl | H | Propyl | H |
| 2a$^{144}$ | H | SO$_3$H | SO$_3$H | H | NHCOCH$_3$ | OMe | CONH$_2$ | Propyl | H | Propyl | H |
| 2a$^{145}$ | SO$_3$H | H | H | SO$_3$H | NHCOCH$_3$ | OMe | CONH$_2$ | Butyl | H | Butyl | H |
| 2a$^{146}$ | H | SO$_3$H | SO$_3$H | H | NHCOCH$_3$ | OMe | CONH$_2$ | Butyl | H | Butyl | H |
| 2a$^{147}$ | SO$_3$H | H | H | SO$_3$H | NHCOCH$_3$ | OMe | CONH$_2$ | Pentyl | H | Pentyl | H |
| 2a$^{148}$ | H | SO$_3$H | SO$_3$H | H | NHCOCH$_3$ | OMe | CONH$_2$ | Pentyl | H | Pentyl | H |
| 2a$^{149}$ | SO$_3$H | H | H | SO$_3$H | NHCOCH$_3$ | OMe | CONH$_2$ | Hexyl | H | Hexyl | H |
| 2a$^{150}$ | H | SO$_3$H | SO$_3$H | H | NHCOCH$_3$ | OMe | CONH$_2$ | Hexyl | H | Hexyl | H |
| 2a$^{151}$ | SO$_3$H | H | H | SO$_3$H | NHCOCH$_3$ | OMe | CONH$_2$ | Cyclobutyl | H | Cyclobutyl | H |
| 2a$^{152}$ | H | SO$_3$H | SO$_3$H | H | NHCOCH$_3$ | OMe | CONH$_2$ | Cyclobutyl | H | Cyclobutyl | H |
| 2a$^{153}$ | SO$_3$H | H | H | SO$_3$H | NHCOCH$_3$ | OMe | CONH$_2$ | Cyclopentyl | H | Cyclopentyl | H |
| 2a$^{154}$ | H | SO$_3$H | SO$_3$H | H | NHCOCH$_3$ | OMe | CONH$_2$ | Cyclopentyl | H | Cyclopentyl | H |
| 2a$^{155}$ | SO$_3$H | H | H | SO$_3$H | NHCOCH$_3$ | OMe | CONH$_2$ | Cyclohexyl | H | Cyclohexyl | H |
| 2a$^{156}$ | H | SO$_3$H | SO$_3$H | H | NHCOCH$_3$ | OMe | CONH$_2$ | Cyclohexyl | H | Cyclohexyl | H |
| 2a$^{157}$ | SO$_3$H | H | H | SO$_3$H | NHCOCH$_3$ | OMe | CONH$_2$ | 2-Methyl cyclohexyl | H | 2-Methyl cyclohexyl | H |
| 2a$^{158}$ | H | SO$_3$H | SO$_3$H | H | NHCOCH$_3$ | OMe | CONH$_2$ | 2-Methyl cyclohexyl | H | 2-Methyl cyclohexyl | H |
| 2a$^{159}$ | SO$_3$H | H | H | SO$_3$H | NHCOCH$_3$ | OMe | CONH$_2$ | 3-Methyl cyclohexyl | H | 3-Methyl cyclohexyl | H |
| 2a$^{160}$ | H | SO$_3$H | SO$_3$H | H | NHCOCH$_3$ | OMe | CONH$_2$ | 3-Methyl cyclohexyl | H | 3-Methyl cyclohexyl | H |
| 2a$^{161}$ | SO$_3$H | H | H | SO$_3$H | NHCOCH$_3$ | OMe | CONH$_2$ | Isopropyl | H | Isopropyl | H |
| 2a$^{162}$ | H | SO$_3$H | SO$_3$H | H | NHCOCH$_3$ | OMe | CONH$_2$ | Isopropyl | H | Isopropyl | H |
| 2a$^{163}$ | SO$_3$H | H | H | SO$_3$H | NHCOCH$_3$ | OMe | CONH$_2$ | Sec-butyl | H | Sec-butyl | H |
| 2a$^{164}$ | H | SO$_3$H | SO$_3$H | H | NHCOCH$_3$ | OMe | CONH$_2$ | Sec-butyl | H | Sec-butyl | H |
| 2a$^{165}$ | SO$_3$H | H | H | SO$_3$H | NHCOCH$_3$ | OMe | CONH$_2$ | 2-Methyl butyl | H | 2-Methyl butyl | H |
| 2a$^{166}$ | H | SO$_3$H | SO$_3$H | H | NHCOCH$_3$ | OMe | CONH$_2$ | 2-Methyl butyl | H | 2-Methyl butyl | H |
| 2a$^{167}$ | SO$_3$H | H | H | SO$_3$H | NHCOCH$_3$ | OMe | CONH$_2$ | 1-Ethyl propyl | H | 1-Ethyl propyl | H |
| 2a$^{168}$ | H | SO$_3$H | SO$_3$H | H | NHCOCH$_3$ | OMe | CONH$_2$ | 1-Ethyl propyl | H | 1-Ethyl propyl | H |
| 2a$^{169}$ | SO$_3$H | H | H | SO$_3$H | NHCOCH$_3$ | OMe | CONH$_2$ | 1,2-Dimethyl propyl | H | 1,2-Dimethyl propyl | H |
| 2a$^{170}$ | H | SO$_3$H | SO$_3$H | H | NHCOCH$_3$ | OMe | CONH$_2$ | 1,2-Dimethyl propyl | H | 1,2-Dimethyl propyl | H |
| 2a$^{171}$ | SO$_3$H | H | H | SO$_3$H | NHCOCH$_3$ | OMe | CONH$_2$ | Tert-butyl | H | Tert-butyl | H |
| 2a$^{172}$ | H | SO$_3$H | SO$_3$H | H | NHCOCH$_3$ | OMe | CONH$_2$ | Tert-butyl | H | Tert-butyl | H |
| 2a$^{173}$ | SO$_3$H | H | H | SO$_3$H | NHCOCH$_3$ | OMe | CONH$_2$ | 3-Methyl butyl | H | 3-Methyl butyl | H |
| 2a$^{174}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{175}$ | SO$_3$H | H | H | SO$_3$H | NHCOCH$_3$ | OMe | CONH$_2$ | Pentan-2-yl | H | Pentan-2-yl | H |
| 2a$^{176}$ | H | SO$_3$H | SO$_3$H | H | | | | | | | |
| 2a$^{177}$ | SO$_3$H | H | H | SO$_3$H | NHCOCH$_3$ | OMe | CONH$_2$ | 2-Ethylhexyl | H | 2-Ethylhexyl | H |
| 2a$^{178}$ | H | SO$_3$H | SO$_3$H | H | | | | | | | |
| 2a$^{179}$ | SO$_3$H | H | H | SO$_3$H | NHCOCH$_3$ | OMe | CONH$_2$ | 2,2-Dimethyl propyl | H | 2,2-Dimethyl propyl | H |
| 2a$^{180}$ | H | SO$_3$H | SO$_3$H | H | | | | | | | |
| 2a$^{181}$ | SO$_3$H | H | H | SO$_3$H | NHCOCH$_3$ | OMe | CONH$_2$ | Phenyl | H | Phenyl | H |
| 2a$^{182}$ | H | SO$_3$H | SO$_3$H | H | | | | | | | |
| 2a$^{183}$ | SO$_3$H | H | H | SO$_3$H | NHCOCH$_3$ | OMe | CONH$_2$ | Benzyl | H | Benzyl | H |
| 2a$^{184}$ | H | SO$_3$H | SO$_3$H | H | | | | | | | |
| 2a$^{185}$ | SO$_3$H | H | H | SO$_3$H | Methyl | Methyl | CN | Allyl | H | Allyl | H |
| 2a$^{186}$ | H | SO$_3$H | SO$_3$H | H | | | | | | | |
| 2a$^{187}$ | SO$_3$H | H | H | SO$_3$H | Methyl | Methyl | CN | 2-Methoxy ethyl | H | Butyl | H |
| 2a$^{188}$ | H | SO$_3$H | SO$_3$H | H | | | | | | | |
| 2a$^{189}$ | SO$_3$H | H | H | SO$_3$H | Methyl | Methyl | CN | 3-Methoxy propyl | H | 3-Methoxy propyl | H |
| 2a$^{190}$ | H | SO$_3$H | SO$_3$H | H | | | | | | | |
| 2a$^{191}$ | SO$_3$H | H | H | SO$_3$H | Methyl | Methyl | CN | 3-Methoxy propyl | H | Butyl | H |
| 2a$^{192}$ | H | SO$_3$H | SO$_3$H | H | | | | | | | |
| 2a$^{193}$ | SO$_3$H | H | H | SO$_3$H | Methyl | Methyl | CN | 2-Methyl thioethyl | H | Sec-butyl | H |
| 2a$^{194}$ | H | SO$_3$H | SO$_3$H | H | | | | | | | |
| 2a$^{195}$ | SO$_3$H | H | H | SO$_3$H | Methyl | Methyl | CN | 2-Methyl thioethyl | H | 2-Hydroxyethyl | H |
| 2a$^{196}$ | H | SO$_3$H | SO$_3$H | H | | | | | | | |
| 2a$^{197}$ | SO$_3$H | H | H | SO$_3$H | Methyl | Methyl | CN | Butyl | Butyl | 2-Hydroxyethyl | H |
| 2a$^{198}$ | H | SO$_3$H | SO$_3$H | H | | | | | | | |
| 2a$^{199}$ | SO$_3$H | H | H | SO$_3$H | Methyl | Methyl | CN | Isopropyl | Isopropyl | 2-Hydroxyethyl | H |
| 2a$^{200}$ | H | SO$_3$H | SO$_3$H | H | | | | | | | |
| 2a$^{201}$ | SO$_3$H | H | H | SO$_3$H | Methyl | Methyl | CN | 2-Fluoro ethyl | H | Butyl | H |
| 2a$^{202}$ | H | SO$_3$H | SO$_3$H | H | | | | | | | |
| 2a$^{203}$ | SO$_3$H | H | H | SO$_3$H | Methyl | Methyl | CN | 2-Chloro ethyl | H | 2-Ethylhexyl | H |
| 2a$^{204}$ | H | SO$_3$H | SO$_3$H | H | | | | | | | |
| 2a$^{205}$ | SO$_3$H | H | H | SO$_3$H | Methyl | Methyl | CN | 3-Chloro propyl | H | 2-Ethylhexyl | H |
| 2a$^{206}$ | H | SO$_3$H | SO$_3$H | H | | | | | | | |
| 2a$^{207}$ | SO$_3$H | H | H | SO$_3$H | Methyl | Methyl | CN | 2-(2-Hydroxy-ethyl sulfanyl)-ethyl] | H | Butyl | H |
| 2a$^{208}$ | H | SO$_3$H | SO$_3$H | H | | | | | | | |
| 2a$^{209}$ | SO$_3$H | H | H | SO$_3$H | Methyl | Methyl | CN | 2-(2-tert-Butyl sulfanyl-ethane sulfonyl)-ethyl | H | Butyl | H |
| 2a$^{210}$ | H | SO$_3$H | SO$_3$H | H | | | | | | | |
| 2a$^{211}$ | SO$_3$H | H | H | SO$_3$H | Methyl | Methyl | CN | 2-(2-Hydroxy ethoxy)propyl | H | Butyl | H |
| 2a$^{212}$ | H | SO$_3$H | SO$_3$H | H | | | | | | | |
| 2a$^{213}$ | SO3H | H | H | SO3H | Methyl | Methyl | CN | 2-(2-Hydroxy ethoxy)ethyl | H | Butyl | H |
| 2a$^{214}$ | H | SO3H | SO3H | H | | | | | | | |
| 2a$^{215}$ | SO$_3$H | H | H | SO$_3$H | Methyl | Methyl | CN | 2-(2-Hydroxy-ethanesulfonyl)-ethyl | H | Butyl | H |
| 2a$^{216}$ | H | SO$_3$H | SO$_3$H | H | | | | | | | |
| 2a$^{217}$ | SO$_3$H | H | H | SO$_3$H | Methyl | Methyl | CN | H | H | 3-(4-Hydroxy-butoxy)-propyl | H |
| 2a$^{218}$ | H | SO$_3$H | SO$_3$H | H | | | | | | | |
| 2a$^{219}$ | SO$_3$H | H | H | SO$_3$H | Methyl | Methyl | CN | H | H | 2-(2-Hydroxy ethoxy)ethyl | H |
| 2a$^{220}$ | H | SO$_3$H | SO$_3$H | H | | | | | | | |
| 2a$^{221}$ | SO$_3$H | H | H | SO$_3$H | Methyl | Methyl | CN | 3-(4-Hydroxy butoxy)-propyl | H | H | H |
| 2a$^{222}$ | H | SO$_3$H | SO$_3$H | H | | | | | | | |
| 2a$^{223}$ | SO$_3$H | H | H | SO$_3$H | Methyl | Methyl | CN | 2-(2-Hydroxy ethoxy)ethyl | H | H | H |
| 2a$^{224}$ | H | SO$_3$H | SO$_3$H | H | | | | | | | |
| 2a$^{225}$ | SO$_3$H | H | H | SO$_3$H | Methyl | Methyl | CN | Phenyl | H | 2-(2-Hydroxy ethoxy)ethyl | H |
| 2a$^{226}$ | H | SO$_3$H | SO$_3$H | H | | | | | | | |
| 2a$^{227}$ | SO$_3$H | H | H | SO$_3$H | Methyl | Methyl | CN | 3-(2-Phenoxy-ethoxy)-propyl | H | H | H |
| 2a$^{228}$ | H | SO$_3$H | SO$_3$H | H | | | | | | | |
| 2a$^{229}$ | SO$_3$H | H | H | SO$_3$H | Methyl | Methyl | CN | 3-Isopropoxy-propyl | H | 3-Isopropoxy-propyl | H |
| 2a$^{230}$ | H | SO$_3$H | SO$_3$H | H | | | | | | | |
| 2a$^{231}$ | SO$_3$H | H | H | SO$_3$H | Methyl | Methyl | CN | 3-Isopropoxy-propyl | H | H | H |
| 2a$^{232}$ | H | SO$_3$H | SO$_3$H | H | | | | | | | |
| 2a$^{233}$ | SO$_3$H | H | H | SO$_3$H | Methyl | Methyl | CN | 3-Isopropoxy-propyl | H | Phenyl | H |
| 2a$^{234}$ | H | SO$_3$H | SO$_3$H | H | | | | | | | |
| 2a$^{235}$ | SO$_3$H | H | H | SO$_3$H | Methyl | Methyl | CN | 3-Ethoxy-propyl | H | 3-Ethoxy-propyl | H |
| 2a$^{236}$ | H | SO$_3$H | SO$_3$H | H | | | | | | | |
| 2a$^{237}$ | SO$_3$H | H | H | SO$_3$H | Methyl | Methyl | CN | 3-Ethoxy-propyl | H | H | H |
| 2a$^{238}$ | H | SO$_3$H | SO$_3$H | H | | | | | | | |
| 2a$^{239}$ | SO$_3$H | H | H | SO$_3$H | Methyl | Methyl | CN | 3-Ethoxy-propyl | H | Phenyl | H |
| 2a$^{240}$ | H | SO$_3$H | SO$_3$H | H | | | | | | | |
| 2a$^{241}$ | SO$_3$H | H | H | SO$_3$H | Methyl | Methyl | CN | 3-Ethoxybutyl | H | 3-Ethoxy butyl | H |
| 2a$^{242}$ | H | SO$_3$H | SO$_3$H | H | | | | | | | |
| 2a$^{243}$ | SO$_3$H | H | H | SO$_3$H | Methyl | Methyl | CN | 3-Ethoxybutyl | H | H | H |
| 2a$^{244}$ | H | SO$_3$H | SO$_3$H | H | | | | | | | |
| 2a$^{245}$ | SO$_3$H | H | H | SO$_3$H | Methyl | Methyl | CN | 3-Ethoxybutyl | H | Phenyl | H |
| 2a$^{246}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{247}$ | SO$_3$H | H | H | SO$_3$H | Methyl | Methyl | CN | 4-(2-Hydroxy ethane sulfonyl)-phenyl | H | H | H |
| $2a^{248}$ | H | SO$_3$H | SO$_3$H | H | | | | | | | |
| $2a^{249}$ | SO$_3$H | H | H | SO$_3$H | NHCOCH$_3$ | OMe | CN | Allyl | H | Allyl | H |
| $2a^{250}$ | H | SO$_3$H | SO$_3$H | H | | | | | | | |
| $2a^{251}$ | SO$_3$H | H | H | SO$_3$H | NHCOCH$_3$ | OMe | CN | 2-Methoxy ethyl | H | Butyl | H |
| $2a^{252}$ | H | SO$_3$H | SO$_3$H | H | | | | | | | |
| $2a^{253}$ | SO$_3$H | H | H | SO$_3$H | NHCOCH$_3$ | OMe | CN | 3-Methoxy propyl | H | Butyl | H |
| $2a^{254}$ | H | SO$_3$H | SO$_3$H | H | | | | | | | |
| $2a^{255}$ | SO$_3$H | H | H | SO$_3$H | NHCOCH$_3$ | OMe | CN | 2-Methyl thioethyl | H | Sec-butyl | H |
| $2a^{256}$ | H | SO$_3$H | SO$_3$H | H | | | | | | | |
| $2a^{257}$ | SO$_3$H | H | H | SO$_3$H | NHCOCH$_3$ | OMe | CN | 2-Methyl thioethyl | H | 2-Hydroxyethyl | H |
| $2a^{258}$ | H | SO$_3$H | SO$_3$H | H | | | | | | | |
| $2a^{259}$ | SO$_3$H | H | H | SO$_3$H | NHCOCH$_3$ | OMe | CN | Butyl | Butyl | 2-Hydroxyethyl | H |
| $2a^{260}$ | H | SO$_3$H | SO$_3$H | H | | | | | | | |
| $2a^{261}$ | SO$_3$H | H | H | SO$_3$H | NHCOCH$_3$ | OMe | CN | Isopropyl | Isopropyl | 2-Hydroxyethyl | H |
| $2a^{262}$ | H | SO$_3$H | SO$_3$H | H | | | | | | | |
| $2a^{263}$ | SO$_3$H | H | H | SO$_3$H | NHCOCH$_3$ | OMe | CN | 2-Fluoro ethyl | H | Butyl | H |
| $2a^{264}$ | H | SO$_3$H | SO$_3$H | H | | | | | | | |
| $2a^{265}$ | SO$_3$H | H | H | SO$_3$H | NHCOCH$_3$ | OMe | CN | 2-Chloro ethyl | H | 2-Ethylhexyl | H |
| $2a^{266}$ | H | SO$_3$H | SO$_3$H | H | | | | | | | |
| $2a^{267}$ | SO$_3$H | H | H | SO$_3$H | NHCOCH$_3$ | OMe | CN | 3-Chloro propyl | H | 2-Ethylhexyl | H |
| $2a^{268}$ | H | SO$_3$H | SO$_3$H | H | | | | | | | |
| $2a^{269}$ | SO$_3$H | H | H | SO$_3$H | NHCOCH$_3$ | OMe | CN | 2-(2-Hydroxy-ethyl sulfanyl)-ethyl | H | Butyl | H |
| $2a^{270}$ | H | SO$_3$H | SO$_3$H | H | | | | | | | |
| $2a^{271}$ | SO$_3$H | H | H | SO$_3$H | NHCOCH$_3$ | OMe | CN | 2-(2-tert-Butyl sulfanyl-ethane sulfonyl)-ethyl | H | Butyl | H |
| $2a^{272}$ | H | SO$_3$H | SO$_3$H | H | | | | | | | |
| $2a^{273}$ | SO$_3$H | H | H | SO$_3$H | NHCOCH$_3$ | OMe | CN | 2-(2-Hydroxy ethoxy)propyl | H | Butyl | H |
| $2a^{274}$ | H | SO$_3$H | SO$_3$H | H | | | | | | | |
| $2a^{275}$ | SO3H | H | H | SO3H | NHCOCH$_3$ | OMe | CN | 2-(2-Hydroxy ethoxy)ethyl | H | Butyl | H |
| $2a^{276}$ | H | SO3H | SO3H | H | | | | | | | |
| $2a^{277}$ | SO$_3$H | H | H | SO$_3$H | NHCOCH$_3$ | OMe | CN | 2-(Ethyl sulfonyl) ethanol | H | Butyl | H |
| $2a^{278}$ | H | SO$_3$H | SO$_3$H | H | | | | | | | |
| $2a^{279}$ | SO$_3$H | H | H | SO$_3$H | NHCOCH$_3$ | OMe | CN | H | H | 3-(4-Hydroxy butoxy)propyl | H |
| $2a^{280}$ | H | SO$_3$H | SO$_3$H | H | | | | | | | |
| $2a^{281}$ | SO$_3$H | H | H | SO$_3$H | NHCOCH$_3$ | OMe | CN | H | H | 2-(2-Hydroxy ethoxy)ethyl | H |
| $2a^{282}$ | H | SO$_3$H | SO$_3$H | H | | | | | | | |
| $2a^{283}$ | SO$_3$H | H | H | SO$_3$H | NHCOCH$_3$ | OMe | CN | 3-(4-Hydroxy butoxy)propyl | H | H | H |
| $2a^{284}$ | H | SO$_3$H | SO$_3$H | H | | | | | | | |
| $2a^{285}$ | SO$_3$H | H | H | SO$_3$H | NHCOCH$_3$ | OMe | CN | 2-(2-Hydroxy ethoxy)ethyl | H | H | H |
| $2a^{286}$ | H | SO$_3$H | SO$_3$H | H | | | | | | | |
| $2a^{287}$ | SO$_3$H | H | H | SO$_3$H | NHCOCH$_3$ | OMe | CN | Phenyl | H | (2-Hydroxy ethoxy)ethyl | H |
| $2a^{288}$ | H | SO$_3$H | SO$_3$H | H | | | | | | | |
| $2a^{289}$ | SO$_3$H | H | H | SO$_3$H | NHCOCH$_3$ | OMe | CN | 3-(2-Phenoxy-ethoxy)-propyl | H | H | H |
| $2a^{290}$ | H | SO$_3$H | SO$_3$H | H | | | | | | | |
| $2a^{291}$ | SO$_3$H | H | H | SO$_3$H | NHCOCH$_3$ | OMe | CN | 3-Isopropoxy-propyl | H | 3-Isopropoxy-propyl | H |
| $2a^{292}$ | H | SO$_3$H | SO$_3$H | H | | | | | | | |
| $2a^{293}$ | SO$_3$H | H | H | SO$_3$H | NHCOCH$_3$ | OMe | CN | 3-Isopropoxy-propyl | H | H | H |
| $2a^{294}$ | H | SO$_3$H | SO$_3$H | H | | | | | | | |
| $2a^{295}$ | SO$_3$H | H | H | SO$_3$H | NHCOCH$_3$ | OMe | CN | 3-Isopropoxy-propyl | H | Phenyl | H |
| $2a^{296}$ | H | SO$_3$H | SO$_3$H | H | | | | | | | |
| $2a^{297}$ | SO$_3$H | H | H | SO$_3$H | NHCOCH$_3$ | OMe | CN | 3-Ethoxy-propyl | H | 3-Ethoxy-propyl | H |
| $2a^{298}$ | H | SO$_3$H | SO$_3$H | H | | | | | | | |
| $2a^{299}$ | SO$_3$H | H | H | SO$_3$H | NHCOCH$_3$ | OMe | CN | 3-Ethoxy-propyl | H | H | H |
| $2a^{300}$ | H | SO$_3$H | SO$_3$H | H | | | | | | | |
| $2a^{301}$ | SO$_3$H | H | H | SO$_3$H | NHCOCH$_3$ | OMe | CN | 3-Ethoxy-propyl | H | Phenyl | H |
| $2a^{302}$ | H | SO$_3$H | SO$_3$H | H | | | | | | | |
| $2a^{303}$ | SO$_3$H | H | H | SO$_3$H | NHCOCH$_3$ | OMe | CN | 3-Ethoxybutyl | H | 3-Ethoxybutyl | H |
| $2a^{304}$ | H | SO$_3$H | SO$_3$H | H | | | | | | | |
| $2a^{305}$ | SO$_3$H | H | H | SO$_3$H | NHCOCH$_3$ | OMe | CN | 3-Ethoxybutyl | H | H | H |
| $2a^{306}$ | H | SO$_3$H | SO$_3$H | H | | | | | | | |
| $2a^{307}$ | SO$_3$H | H | H | SO$_3$H | NHCOCH$_3$ | OMe | CN | 3-Ethoxybutyl | H | Phenyl | H |
| $2a^{308}$ | H | SO$_3$H | SO$_3$H | H | | | | | | | |
| $2a^{309}$ | SO$_3$H | H | H | SO$_3$H | NHCOCH$_3$ | OMe | CN | 4-(2-Hydroxy ethane sulfonyl)-phenyl | H | H | H |
| $2a^{312}$ | H | SO$_3$H | SO$_3$H | H | | | | | | | |
| $2a^{311}$ | SO$_3$H | H | H | SO$_3$H | Methyl | Methyl | CONH$_2$ | Allyl | H | Allyl | H |
| $2a^{312}$ | H | SO$_3$H | SO$_3$H | H | | | | | | | |
| $2a^{313}$ | SO$_3$H | H | H | SO$_3$H | Methyl | Methyl | CONH$_2$ | 2-Methoxy ethyl | H | Butyl | H |
| $2a^{314}$ | H | SO$_3$H | SO$_3$H | H | | | | | | | |
| $2a^{315}$ | SO$_3$H | H | H | SO$_3$H | Methyl | Methyl | CONH$_2$ | 3-Methoxy propyl | H | 3-Methoxy propyl | H |
| $2a^{316}$ | H | SO$_3$H | SO$_3$H | H | | | | | | | |
| $2a^{317}$ | SO$_3$H | H | H | SO$_3$H | Methyl | Methyl | CONH$_2$ | 3-Methoxy propyl | H | Butyl | H |
| $2a^{318}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a319 | SO3H | H | H | SO3H | Methyl | Methyl | CONH2 | 2-Methyl thioethyl | H | Sec-butyl | H |
| 2a320 | H | SO3H | SO3H | H | | | | | | | |
| 2a321 | SO3H | H | H | SO3H | Methyl | Methyl | CONH2 | 2-Methyl thioethyl | H | 2-Hydroxyethyl | H |
| 2a322 | H | SO3H | SO3H | H | | | | | | | |
| 2a323 | SO3H | H | H | SO3H | Methyl | Methyl | CONH2 | Butyl | Butyl | 2-Hydroxyethyl | H |
| 2a324 | H | SO3H | SO3H | H | | | | | | | |
| 2a325 | SO3H | H | H | SO3H | Methyl | Methyl | CONH2 | Isopropyl | Isopropyl | 2-Hydroxyethyl | H |
| 2a326 | H | SO3H | SO3H | H | | | | | | | |
| 2a327 | SO3H | H | H | SO3H | Methyl | Methyl | CONH2 | 2-Fluoro ethyl | H | Butyl | H |
| 2a328 | H | SO3H | SO3H | H | | | | | | | |
| 2a329 | SO3H | H | H | SO3H | Methyl | Methyl | CONH2 | 2-Chloro ethyl | H | 2-Ethylhexyl | H |
| 2a330 | H | SO3H | SO3H | H | | | | | | | |
| 2a331 | SO3H | H | H | SO3H | Methyl | Methyl | CONH2 | 3-Chloro propyl | H | 2-Ethylhexyl | H |
| 2a332 | H | SO3H | SO3H | H | | | | | | | |
| 2a333 | SO3H | H | H | SO3H | Methyl | Methyl | CONH2 | 2-(2-Hydroxy-ethyl sulfanyl)-ethyl] | H | Butyl | H |
| 2a334 | H | SO3H | SO3H | H | | | | | | | |
| 2a335 | SO3H | H | H | SO3H | Methyl | Methyl | CONH2 | 2-(2-tert-Butyl sulfanyl-ethane sulfonyl)-ethyl | H | Butyl | H |
| 2a336 | H | SO3H | SO3H | H | | | | | | | |
| 2a337 | SO3H | H | H | SO3H | Methyl | Methyl | CONH2 | 2-(2-Hydroxy ethoxy) propyl | H | Butyl | H |
| 2a338 | H | SO3H | SO3H | H | | | | | | | |
| 2a339 | SO3H | H | H | SO3H | Methyl | Methyl | CONH2 | 2-(2-Hydroxy ethoxy) ethyl | H | Butyl | H |
| 2a340 | H | SO3H | SO3H | H | | | | | | | |
| 2a341 | SO3H | H | H | SO3H | Methyl | Methyl | CONH2 | 2-(2-Hydroxy-ethanesulfonyl)-ethyl | H | Butyl | H |
| 2a342 | H | SO3H | SO3H | H | | | | | | | |
| 2a343 | SO3H | H | H | SO3H | Methyl | Methyl | CONH2 | H | H | 3-(4-Hydroxy-butoxy)-propyl | H |
| 2a344 | H | SO3H | SO3H | H | | | | | | | |
| 2a345 | SO3H | H | H | SO3H | Methyl | Methyl | CONH2 | H | H | 2-(2-Hydroxy ethoxy)ethyl | H |
| 2a346 | H | SO3H | SO3H | H | | | | | | | |
| 2a347 | SO3H | H | H | SO3H | Methyl | Methyl | CONH2 | 3-(4-Hydroxy butoxy)-propyl | H | H | H |
| 2a348 | H | SO3H | SO3H | H | | | | | | | |
| 2a349 | SO3H | H | H | SO3H | Methyl | Methyl | CONH2 | 2-(2-Hydroxy ethoxy) ethyl | H | H | H |
| 2a350 | H | SO3H | SO3H | H | | | | | | | |
| 2a351 | SO3H | H | H | SO3H | Methyl | Methyl | CONH2 | Phenyl | H | 2-(2-Hydroxy ethoxy)ethyl | H |
| 2a352 | H | SO3H | SO3H | H | | | | | | | |
| 2a353 | SO3H | H | H | SO3H | Methyl | Methyl | CONH2 | 3-(2-Phenoxy-ethoxy)-propyl | H | H | H |
| 2a354 | H | SO3H | SO3H | H | | | | | | | |
| 2a355 | SO3H | H | H | SO3H | Methyl | Methyl | CONH2 | 3-Isopropoxy-propyl | H | 3-Isopropoxy-propyl | H |
| 2a356 | H | SO3H | SO3H | H | | | | | | | |
| 2a357 | SO3H | H | H | SO3H | Methyl | Methyl | CONH2 | 3-Isopropoxy-propyl | H | H | H |
| 2a358 | H | SO3H | SO3H | H | | | | | | | |
| 2a359 | SO3H | H | H | SO3H | Methyl | Methyl | CONH2 | 3-Isopropoxy-propyl | H | Phenyl | H |
| 2a360 | H | SO3H | SO3H | H | | | | | | | |
| 2a361 | SO3H | H | H | SO3H | Methyl | Methyl | CONH2 | 3-Ethoxy-propyl | H | 3-Ethoxy-propyl | H |
| 2a362 | H | SO3H | SO3H | H | | | | | | | |
| 2a363 | SO3H | H | H | SO3H | Methyl | Methyl | CONH2 | 3-Ethoxy-propyl | H | H | H |
| 2a364 | H | SO3H | SO3H | H | | | | | | | |
| 2a365 | SO3H | H | H | SO3H | Methyl | Methyl | CONH2 | 3-Ethoxy-propyl | H | Phenyl | H |
| 2a366 | H | SO3H | SO3H | H | | | | | | | |
| 2a367 | SO3H | H | H | SO3H | Methyl | Methyl | CONH2 | 3-Ethoxybutyl | H | 3-Ethoxy butyl | H |
| 2a368 | H | SO3H | SO3H | H | | | | | | | |
| 2a369 | SO3H | H | H | SO3H | Methyl | Methyl | CONH2 | 3-Ethoxybutyl | H | H | H |
| 2a370 | H | SO3H | SO3H | H | | | | | | | |
| 2a371 | SO3H | H | H | SO3H | Methyl | Methyl | CONH2 | 3-Ethoxybutyl | H | Phenyl | H |
| 2a372 | H | SO3H | SO3H | H | | | | | | | |
| 2a373 | SO3H | H | H | SO3H | Methyl | Methyl | CONH2 | 4-(2-Hydroxy ethane sulfonyl)-phenyl | H | H | H |
| 2a374 | H | SO3H | SO3H | H | | | | | | | |
| 2a375 | SO3H | H | H | SO3H | NHCOCH3 | OMe | CONH2 | Allyl | H | Allyl | H |
| 2a376 | H | SO3H | SO3H | H | | | | | | | |
| 2a377 | SO3H | H | H | SO3H | NHCOCH3 | OMe | CONH2 | 2-Methoxy ethyl | H | Butyl | H |
| 2a378 | H | SO3H | SO3H | H | | | | | | | |
| 2a379 | SO3H | H | H | SO3H | NHCOCH3 | OMe | CONH2 | 3-Methoxy propyl | H | Butyl | H |
| 2a380 | H | SO3H | SO3H | H | | | | | | | |
| 2a381 | SO3H | H | H | SO3H | NHCOCH3 | OMe | CONH2 | 2-Methyl thioethyl | H | Sec-butyl | H |
| 2a382 | H | SO3H | SO3H | H | | | | | | | |
| 2a383 | SO3H | H | H | SO3H | NHCOCH3 | OMe | CONH2 | 2-Methyl thioethyl | H | 2-Hydroxyethyl | H |
| 2a384 | H | SO3H | SO3H | H | | | | | | | |
| 2a385 | SO3H | H | H | SO3H | NHCOCH3 | OMe | CONH2 | Butyl | Butyl | 2-Hydroxyethyl | H |
| 2a386 | H | SO3H | SO3H | H | | | | | | | |
| 2a387 | SO3H | H | H | SO3H | NHCOCH3 | OMe | CONH2 | Isopropyl | Isopropyl | 2-Hydroxyethyl | H |
| 2a388 | H | SO3H | SO3H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{389}$ | SO$_3$H | H | H | SO$_3$H | NHCOCH$_3$ | OMe | CONH$_2$ | 2-Fluoro ethyl | H | Butyl | H |
| $2a^{390}$ | H | SO$_3$H | SO$_3$H | H | | | | | | | |
| $2a^{391}$ | SO$_3$H | H | H | SO$_3$H | NHCOCH$_3$ | OMe | CONH$_2$ | 2-Chloro ethyl | H | 2-ethylhexyl | H |
| $2a^{392}$ | H | SO$_3$H | SO$_3$H | H | | | | | | | |
| $2a^{393}$ | SO$_3$H | H | H | SO$_3$H | NHCOCH$_3$ | OMe | CONH$_2$ | 3-Chloro propyl | H | 2-ethylhexyl | H |
| $2a^{394}$ | H | SO$_3$H | SO$_3$H | H | | | | | | | |
| $2a^{395}$ | SO$_3$H | H | H | SO$_3$H | NHCOCH$_3$ | OMe | CONH$_2$ | 2-(2-Hydroxy-ethyl sulfanyl)-ethyl | H | Butyl | H |
| $2a^{396}$ | H | SO$_3$H | SO$_3$H | H | | | | | | | |
| $2a^{397}$ | SO$_3$H | H | H | SO$_3$H | NHCOCH$_3$ | OMe | CONH$_2$ | 2-(2-tert-Butyl sulfanyl-ethane sulfonyl)-ethyl | H | Butyl | H |
| $2a^{398}$ | H | SO$_3$H | SO$_3$H | H | | | | | | | |
| $2a^{399}$ | SO$_3$H | H | H | SO$_3$H | NHCOCH$_3$ | OMe | CONH$_2$ | 2-(2-Hydroxy ethoxy)propyl | H | Butyl | H |
| $2a^{400}$ | H | SO$_3$H | SO$_3$H | H | | | | | | | |
| $2a^{401}$ | SO3H | H | H | SO3H | NHCOCH$_3$ | OMe | CONH$_2$ | 2-(2-Hydroxy ethoxy)ethyl | H | Butyl | H |
| $2a^{402}$ | H | SO3H | SO3H | H | | | | | | | |
| $2a^{403}$ | SO$_3$H | H | H | SO$_3$H | NHCOCH$_3$ | OMe | CONH$_2$ | 2-(Ethyl sulfonyl) ethanol | H | Butyl | H |
| $2a^{404}$ | H | SO$_3$H | SO$_3$H | H | | | | | | | |
| $2a^{405}$ | SO$_3$H | H | H | SO$_3$H | NHCOCH$_3$ | OMe | CONH$_2$ | H | H | 3-(4-Hydroxy butoxy)propyl | H |
| $2a^{406}$ | H | SO$_3$H | SO$_3$H | H | | | | | | | |
| $2a^{407}$ | SO$_3$H | H | H | SO$_3$H | NHCOCH$_3$ | OMe | CONH$_2$ | H | H | 2-(2-Hydroxy ethoxy)ethyl | H |
| $2a^{408}$ | H | SO$_3$H | SO$_3$H | H | | | | | | | |
| $2a^{409}$ | SO$_3$H | H | H | SO$_3$H | NHCOCH$_3$ | OMe | CONH$_2$ | 3-(4-Hydroxy butoxy)propyl | H | H | H |
| $2a^{410}$ | H | SO$_3$H | SO$_3$H | H | | | | | | | |
| $2a^{411}$ | SO$_3$H | H | H | SO$_3$H | NHCOCH$_3$ | OMe | CONH$_2$ | 2-(2-Hydroxy ethoxy)ethyl | H | H | H |
| $2a^{412}$ | H | SO$_3$H | SO$_3$H | H | | | | | | | |
| $2a^{413}$ | SO$_3$H | H | H | SO$_3$H | NHCOCH$_3$ | OMe | CONH$_2$ | Phenyl | H | (2-Hydroxy ethoxy)ethyl | H |
| $2a^{414}$ | H | SO$_3$H | SO$_3$H | H | | | | | | | |
| $2a^{415}$ | SO$_3$H | H | H | SO$_3$H | NHCOCH$_3$ | OMe | CONH$_2$ | 3-(2-Phenoxy-ethoxy)-propyl | H | H | H |
| $2a^{416}$ | H | SO$_3$H | SO$_3$H | H | | | | | | | |
| $2a^{417}$ | SO$_3$H | H | H | SO$_3$H | NHCOCH$_3$ | OMe | CONH$_2$ | 3-Isopropoxy-propyl | H | 3-Isopropoxy-propyl | H |
| $2a^{418}$ | H | SO$_3$H | SO$_3$H | H | | | | | | | |
| $2a^{419}$ | SO$_3$H | H | H | SO$_3$H | NHCOCH$_3$ | OMe | CONH$_2$ | 3-Isopropoxy-propyl | H | H | H |
| $2a^{420}$ | H | SO$_3$H | SO$_3$H | H | | | | | | | |
| $2a^{421}$ | SO$_3$H | H | H | SO$_3$H | NHCOCH$_3$ | OMe | CONH$_2$ | 3-Isopropoxy-propyl | H | Phenyl | H |
| $2a^{422}$ | H | SO$_3$H | SO$_3$H | H | | | | | | | |
| $2a^{423}$ | SO$_3$H | H | H | SO$_3$H | NHCOCH$_3$ | OMe | CONH$_2$ | 3-Ethoxy-propyl | H | 3-Ethoxy-propyl | H |
| $2a^{424}$ | H | SO$_3$H | SO$_3$H | H | | | | | | | |
| $2a^{425}$ | SO$_3$H | H | H | SO$_3$H | NHCOCH$_3$ | OMe | CONH$_2$ | 3-Ethoxy-propyl | H | H | H |
| $2a^{426}$ | H | SO$_3$H | SO$_3$H | H | | | | | | | |
| $2a^{427}$ | SO$_3$H | H | H | SO$_3$H | NHCOCH$_3$ | OMe | CONH$_2$ | 3-Ethoxy-propyl | H | Phenyl | H |
| $2a^{428}$ | H | SO$_3$H | SO$_3$H | H | | | | | | | |
| $2a^{429}$ | SO$_3$H | H | H | SO$_3$H | NHCOCH$_3$ | OMe | CONH$_2$ | 3-Ethoxybutyl | H | 3-Ethoxybutyl | H |
| $2a^{430}$ | H | SO$_3$H | SO$_3$H | H | | | | | | | |
| $2a^{431}$ | SO$_3$H | H | H | SO$_3$H | NHCOCH$_3$ | OMe | CONH$_2$ | 3-Ethoxybutyl | H | H | H |
| $2a^{432}$ | H | SO$_3$H | SO$_3$H | H | | | | | | | |
| $2a^{433}$ | SO$_3$H | H | H | SO$_3$H | NHCOCH$_3$ | OMe | CONH$_2$ | 3-Ethoxybutyl | H | Phenyl | H |
| $2a^{434}$ | H | SO$_3$H | SO$_3$H | H | | | | | | | |
| $2a^{435}$ | SO$_3$H | H | H | SO$_3$H | NHCOCH$_3$ | OMe | CONH$_2$ | 4-(2-Hydroxy ethane sulfonyl)-phenyl | H | H | H |
| $2a^{436}$ | H | SO$_3$H | SO$_3$H | H | | | | | | | |
| $2a^{437}$ | SO$_3$H | H | H | SO$_3$H | Methyl | Methyl | CN | 2-Sulfoethyl | H | Methyl | H |
| $2a^{438}$ | H | SO$_3$H | SO$_3$H | H | | | | | | | |
| $2a^{439}$ | SO$_3$H | H | H | SO$_3$H | Methyl | Methyl | CN | 2-Sulfoethyl | H | Ethyl | H |
| $2a^{440}$ | H | SO$_3$H | SO$_3$H | H | | | | | | | |
| $2a^{441}$ | SO$_3$H | H | H | SO$_3$H | Methyl | Methyl | CN | 2-Sulfoethyl | H | n-Propyl | H |
| $2a^{442}$ | H | SO$_3$H | SO$_3$H | H | | | | | | | |
| $2a^{443}$ | SO$_3$H | H | H | SO$_3$H | Methyl | Methyl | CN | 2-Sulfoethyl | H | Isopropyl | H |
| $2a^{444}$ | H | SO$_3$H | SO$_3$H | H | | | | | | | |
| $2a^{445}$ | SO$_3$H | H | H | SO$_3$H | Methyl | Methyl | CN | 2-Sulfoethyl | H | 1-Ethyl propyl | H |
| $2a^{446}$ | H | SO$_3$H | SO$_3$H | H | | | | | | | |
| $2a^{447}$ | SO$_3$H | H | H | SO$_3$H | Methyl | Methyl | CN | 2-Sulfoethyl | H | 1,2-Dimethyl propyl | H |
| $2a^{448}$ | H | SO$_3$H | SO$_3$H | H | | | | | | | |
| $2a^{449}$ | SO$_3$H | H | H | SO$_3$H | Methyl | Methyl | CN | 2-Sulfoethyl | H | 2,2-Dimethyl propyl | H |
| $2a^{450}$ | H | SO$_3$H | SO$_3$H | H | | | | | | | |
| $2a^{451}$ | SO$_3$H | H | H | SO$_3$H | Methyl | Methyl | CN | 2-Sulfoethyl | H | Butyl | H |
| $2a^{452}$ | H | SO$_3$H | SO$_3$H | H | | | | | | | |
| $2a^{453}$ | SO$_3$H | H | H | SO$_3$H | Methyl | Methyl | CN | 2-Sulfoethyl | H | 2-Methyl butyl | H |
| $2a^{454}$ | H | SO$_3$H | SO$_3$H | H | | | | | | | |
| $2a^{455}$ | SO$_3$H | H | H | SO$_3$H | Methyl | Methyl | CN | 2-Sulfoethyl | H | Tert butyl | H |
| $2a^{456}$ | H | SO$_3$H | SO$_3$H | H | | | | | | | |
| $2a^{457}$ | SO$_3$H | H | H | SO$_3$H | Methyl | Methyl | CN | 2-Sulfoethyl | H | 3-Methyl butyl | H |
| $2a^{458}$ | H | SO$_3$H | SO$_3$H | H | | | | | | | |
| $2a^{459}$ | SO$_3$H | H | H | SO$_3$H | Methyl | Methyl | CN | 2-Sulfoethyl | H | Sec butyl | H |
| $2a^{460}$ | H | SO$_3$H | SO$_3$H | H | | | | | | | |
| $2a^{461}$ | SO$_3$H | H | H | SO$_3$H | Methyl | Methyl | CN | 2-Sulfoethyl | H | Pentyl | H |
| $2a^{462}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a463 | SO3H | H | H | SO3H | Methyl | Methyl | CN | 2-Sulfoethyl | H | Hexyl | H |
| 2a464 | H | SO3H | SO3H | H | | | | | | | |
| 2a465 | SO3H | H | H | SO3H | Methyl | Methyl | CN | 2-Sulfoethyl | H | Cyclobutyl | H |
| 2a466 | H | SO3H | SO3H | H | | | | | | | |
| 2a467 | SO3H | H | H | SO3H | Methyl | Methyl | CN | 2-Sulfoethyl | H | Cyclopentyl | H |
| 2a468 | H | SO3H | SO3H | H | | | | | | | |
| 2a469 | SO3H | H | H | SO3H | Methyl | Methyl | CN | 2-Sulfoethyl | H | Cyclohexyl | H |
| 2a470 | H | SO3H | SO3H | H | | | | | | | |
| 2a471 | SO3H | H | H | SO3H | Methyl | Methyl | CN | 2-Sulfoethyl | H | 2-Methyl cyclohexyl | H |
| 2a472 | H | SO3H | SO3H | H | | | | | | | |
| 2a473 | SO3H | H | H | SO3H | Methyl | Methyl | CN | 2-Sulfoethyl | H | 3-Methyl cyclohexyl | H |
| 2a474 | H | SO3H | SO3H | H | | | | | | | |
| 2a475 | SO3H | H | H | SO3H | Methyl | Methyl | CN | 2-Sulfoethyl | H | Pentan-2-yl | H |
| 2a476 | H | SO3H | SO3H | H | | | | | | | |
| 2a477 | SO3H | H | H | SO3H | Methyl | Methyl | CN | 2-Sulfoethyl | H | 2-Ethylhexyl | H |
| 2a478 | H | SO3H | SO3H | H | | | | | | | |
| 2a479 | SO3H | H | H | SO3H | Methyl | Methyl | CN | 2-Sulfoethyl | H | Phenyl | H |
| 2a480 | H | SO3H | SO3H | H | | | | | | | |
| 2a481 | SO3H | H | H | SO3H | Methyl | Methyl | CN | 2-Sulfoethyl | H | Benzyl | H |
| 2a482 | H | SO3H | SO3H | H | | | | | | | |
| 2a483 | SO3H | H | H | SO3H | Methyl | Methyl | CN | 2-Sulfoethyl | H | Allyl | H |
| 2a484 | H | SO3H | SO3H | H | | | | | | | |
| 2a485 | SO3H | H | H | SO3H | Methyl | Methyl | CN | 2-Sulfoethyl | H | 2-Methoxy ethyl | H |
| 2a486 | H | SO3H | SO3H | H | | | | | | | |
| 2a487 | SO3H | H | H | SO3H | Methyl | Methyl | CN | 2-Sulfoethyl | H | 3-Methoxy propyl | H |
| 2a488 | H | SO3H | SO3H | H | | | | | | | |
| 2a489 | SO3H | H | H | SO3H | Methyl | Methyl | CN | 2-Sulfoethyl | H | 3-Chloropropyl | H |
| 2a490 | H | SO3H | SO3H | H | | | | | | | |
| 2a491 | SO3H | H | H | SO3H | Methyl | Methyl | CN | 2-Sulfoethyl | H | 2-Methyl thioethyl | H |
| 2a492 | H | SO3H | SO3H | H | | | | | | | |
| 2a493 | SO3H | H | H | SO3H | Methyl | Methyl | CN | 2-Sulfoethyl | H | 2-Fluoroethyl | H |
| 2a494 | H | SO3H | SO3H | H | | | | | | | |
| 2a495 | SO3H | H | H | SO3H | Methyl | Methyl | CN | 2-Sulfoethyl | H | 2-Chloro ethyl | H |
| 2a496 | H | SO3H | SO3H | H | | | | | | | |
| 2a497 | SO3H | H | H | SO3H | Methyl | Methyl | CN | 2-Sulfoethyl | H | 2-(2-Hydroxy ethyl sulfonyl)ethyl | H |
| 2a498 | H | SO3H | SO3H | H | | | | | | | |
| 2a499 | SO3H | H | H | SO3H | Methyl | Methyl | CN | 2-Sulfoethyl | H | 2-(2-tert Butyl sulfanyl ethyl sulfonyl)ethyl | H |
| 2a500 | H | SO3H | SO3H | H | | | | | | | |
| 2a501 | SO3H | H | H | SO3H | Methyl | Methyl | CN | 2-Sulfoethyl | H | 2-(2-Hydroxy ethoxy)propyl | H |
| 2a502 | H | SO3H | SO3H | H | | | | | | | |
| 2a503 | SO3H | H | H | SO3H | Methyl | Methyl | CN | 2-Sulfoethyl | H | 2-(2-Hydroxy ethoxy)ethyl | H |
| 2a504 | H | SO3H | SO3H | H | | | | | | | |
| 2a505 | SO3H | H | H | SO3H | Methyl | Methyl | CN | 2-Sulfoethyl | H | 3-(4-Hydroxy butoxy)propyl | H |
| 2a506 | H | SO3H | SO3H | H | | | | | | | |
| 2a507 | SO3H | H | H | SO3H | Methyl | Methyl | CN | 2-Sulfoethyl | H | 3-(2-Phenoxy ethoxyl)propyl | H |
| 2a508 | H | SO3H | SO3H | H | | | | | | | |
| 2a509 | SO3H | H | H | SO3H | Methyl | Methyl | CN | 2-Sulfoethyl | H | 3-Isopropxy propyl | H |
| 2a510 | H | SO3H | SO3H | H | | | | | | | |
| 2a511 | SO3H | H | H | SO3H | Methyl | Methyl | CN | 2-Sulfoethyl | H | 3-Ethoxy propyl | H |
| 2a512 | H | SO3H | SO3H | H | | | | | | | |
| 2a513 | SO3H | H | H | SO3H | Methyl | Methyl | CN | 2-Sulfoethyl | H | 3-Ethoxy butyl | H |
| 2a514 | H | SO3H | SO3H | H | | | | | | | |
| 2a515 | SO3H | H | H | SO3H | Methyl | Methyl | CN | 2-Sulfoethyl | H | 4-(2-Hydroxy ethane sulfonyl)phenyl | H |
| 2a516 | H | SO3H | SO3H | H | | | | | | | |
| 2a517 | SO3H | H | H | SO3H | Methyl | Methyl | CONH2 | 2-Sulfoethyl | H | Methyl | H |
| 2a518 | H | SO3H | SO3H | H | | | | | | | |
| 2a519 | SO3H | H | H | SO3H | Methyl | Methyl | CONH2 | 2-Sulfoethyl | H | Ethyl | H |
| 2a520 | H | SO3H | SO3H | H | | | | | | | |
| 2a521 | SO3H | H | H | SO3H | Methyl | Methyl | CONH2 | 2-Sulfoethyl | H | n-Propyl | H |
| 2a522 | H | SO3H | SO3H | H | | | | | | | |
| 2a523 | SO3H | H | H | SO3H | Methyl | Methyl | CONH2 | 2-Sulfoethyl | H | Isopropyl | H |
| 2a524 | H | SO3H | SO3H | H | | | | | | | |
| 2a525 | SO3H | H | H | SO3H | Methyl | Methyl | CONH2 | 2-Sulfoethyl | H | 1-Ethyl propyl | H |
| 2a526 | H | SO3H | SO3H | H | | | | | | | |
| 2a527 | SO3H | H | H | SO3H | Methyl | Methyl | CONH2 | 2-Sulfoethyl | H | 1,2-Dimethyl propyl | H |
| 2a528 | H | SO3H | SO3H | H | | | | | | | |
| 2a529 | SO3H | H | H | SO3H | Methyl | Methyl | CONH2 | 2-Sulfoethyl | H | 2,2-Dimethyl propyl | H |
| 2a530 | H | SO3H | SO3H | H | | | | | | | |
| 2a531 | SO3H | H | H | SO3H | Methyl | Methyl | CONH2 | 2-Sulfoethyl | H | Butyl | H |
| 2a532 | H | SO3H | SO3H | H | | | | | | | |
| 2a533 | SO3H | H | H | SO3H | Methyl | Methyl | CONH2 | 2-Sulfoethyl | H | 2-Methyl butyl | H |
| 2a534 | H | SO3H | SO3H | H | | | | | | | |
| 2a535 | SO3H | H | H | SO3H | Methyl | Methyl | CONH2 | 2-Sulfoethyl | H | Tert butyl | H |
| 2a536 | H | SO3H | SO3H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{537}$ | SO$_3$H | H | H | SO$_3$H | Methyl | Methyl | CONH$_2$ | 2-Sulfoethyl | H | 3-Methyl butyl | H |
| 2a$^{538}$ | H | SO$_3$H | SO$_3$H | H | | | | | | | |
| 2a$^{539}$ | SO$_3$H | H | H | SO$_3$H | Methyl | Methyl | CONH$_2$ | 2-Sulfoethyl | H | Sec butyl | H |
| 2a$^{540}$ | H | SO$_3$H | SO$_3$H | H | | | | | | | |
| 2a$^{541}$ | SO$_3$H | H | H | SO$_3$H | Methyl | Methyl | CONH$_2$ | 2-Sulfoethyl | H | Pentyl | H |
| 2a$^{542}$ | H | SO$_3$H | SO$_3$H | H | | | | | | | |
| 2a$^{543}$ | SO$_3$H | H | H | SO$_3$H | Methyl | Methyl | CONH$_2$ | 2-Sulfoethyl | H | Hexyl | H |
| 2a$^{544}$ | H | SO$_3$H | SO$_3$H | H | | | | | | | |
| 2a$^{545}$ | SO$_3$H | H | H | SO$_3$H | Methyl | Methyl | CONH$_2$ | 2-Sulfoethyl | H | Cyclobutyl | H |
| 2a$^{546}$ | H | SO$_3$H | SO$_3$H | H | | | | | | | |
| 2a$^{547}$ | SO$_3$H | H | H | SO$_3$H | Methyl | Methyl | CONH$_2$ | 2-Sulfoethyl | H | Cyclopentyl | H |
| 2a$^{548}$ | H | SO$_3$H | SO$_3$H | H | | | | | | | |
| 2a$^{549}$ | SO$_3$H | H | H | SO$_3$H | Methyl | Methyl | CONH$_2$ | 2-Sulfoethyl | H | Cyclohexyl | H |
| 2a$^{550}$ | H | SO$_3$H | SO$_3$H | H | | | | | | | |
| 2a$^{551}$ | SO$_3$H | H | H | SO$_3$H | Methyl | Methyl | CONH$_2$ | 2-Sulfoethyl | H | 2-Methyl cyclohexyl | H |
| 2a$^{552}$ | H | SO$_3$H | SO$_3$H | H | | | | | | | |
| 2a$^{553}$ | SO$_3$H | H | H | SO$_3$H | Methyl | Methyl | CONH$_2$ | 2-Sulfoethyl | H | 3-Methyl cyclohexyl | H |
| 2a$^{554}$ | H | SO$_3$H | SO$_3$H | H | | | | | | | |
| 2a$^{555}$ | SO$_3$H | H | H | SO$_3$H | Methyl | Methyl | CONH$_2$ | 2-Sulfoethyl | H | Pentan-2-yl | H |
| 2a$^{556}$ | H | SO$_3$H | SO$_3$H | H | | | | | | | |
| 2a$^{557}$ | SO$_3$H | H | H | SO$_3$H | Methyl | Methyl | CONH$_2$ | 2-Sulfoethyl | H | 2-Ethylhexyl | H |
| 2a$^{558}$ | H | SO$_3$H | SO$_3$H | H | | | | | | | |
| 2a$^{559}$ | SO$_3$H | H | H | SO$_3$H | Methyl | Methyl | CONH$_2$ | 2-Sulfoethyl | H | Phenyl | H |
| 2a$^{560}$ | H | SO$_3$H | SO$_3$H | H | | | | | | | |
| 2a$^{561}$ | SO$_3$H | H | H | SO$_3$H | Methyl | Methyl | CONH$_2$ | 2-Sulfoethyl | H | Benzyl | H |
| 2a$^{562}$ | H | SO$_3$H | SO$_3$H | H | | | | | | | |
| 2a$^{563}$ | SO$_3$H | H | H | SO$_3$H | Methyl | Methyl | CONH$_2$ | 2-Sulfoethyl | H | Allyl | H |
| 2a$^{564}$ | H | SO$_3$H | SO$_3$H | H | | | | | | | |
| 2a$^{565}$ | SO$_3$H | H | H | SO$_3$H | Methyl | Methyl | CONH$_2$ | 2-Sulfoethyl | H | 2-Methoxy ethyl | H |
| 2a$^{566}$ | H | SO$_3$H | SO$_3$H | H | | | | | | | |
| 2a$^{567}$ | SO$_3$H | H | H | SO$_3$H | Methyl | Methyl | CONH$_2$ | 2-Sulfoethyl | H | 3-Methoxy propyl | H |
| 2a$^{568}$ | H | SO$_3$H | SO$_3$H | H | | | | | | | |
| 2a$^{569}$ | SO$_3$H | H | H | SO$_3$H | Methyl | Methyl | CONH$_2$ | 2-Sulfoethyl | H | 3-Chloropropyl | H |
| 2a$^{570}$ | H | SO$_3$H | SO$_3$H | H | | | | | | | |
| 2a$^{571}$ | SO$_3$H | H | H | SO$_3$H | Methyl | Methyl | CONH$_2$ | 2-Sulfoethyl | H | 2-Methyl thioethyl | H |
| 2a$^{572}$ | H | SO$_3$H | SO$_3$H | H | | | | | | | |
| 2a$^{573}$ | SO$_3$H | H | H | SO$_3$H | Methyl | Methyl | CONH$_2$ | 2-Sulfoethyl | H | 2-Fluoroethyl | H |
| 2a$^{574}$ | H | SO$_3$H | SO$_3$H | H | | | | | | | |
| 2a$^{575}$ | SO$_3$H | H | H | SO$_3$H | Methyl | Methyl | CONH$_2$ | 2-Sulfoethyl | H | 2-Chloro ethyl | H |
| 2a$^{576}$ | H | SO$_3$H | SO$_3$H | H | | | | | | | |
| 2a$^{577}$ | SO$_3$H | H | H | SO$_3$H | Methyl | Methyl | CONH$_2$ | 2-Sulfoethyl | H | 2-(2-Hydroxy ethyl sulfonyl)ethyl | H |
| 2a$^{578}$ | H | SO$_3$H | SO$_3$H | H | | | | | | | |
| 2a$^{579}$ | SO$_3$H | H | H | SO$_3$H | Methyl | Methyl | CONH$_2$ | 2-Sulfoethyl | H | 2-(2-tert Butyl sulfanyl ethyl sulfonyl)ethyl | H |
| 2a$^{580}$ | H | SO$_3$H | SO$_3$H | H | | | | | | | |
| 2a$^{581}$ | SO$_3$H | H | H | SO$_3$H | Methyl | Methyl | CONH$_2$ | 2-Sulfoethyl | H | 2-(2-Hydroxy ethoxy)propyl | H |
| 2a$^{582}$ | H | SO$_3$H | SO$_3$H | H | | | | | | | |
| 2a$^{583}$ | SO$_3$H | H | H | SO$_3$H | Methyl | Methyl | CONH$_2$ | 2-Sulfoethyl | H | 2-(2-Hydroxy ethoxy)ethyl | H |
| 2a$^{584}$ | H | SO$_3$H | SO$_3$H | H | | | | | | | |
| 2a$^{585}$ | SO$_3$H | H | H | SO$_3$H | Methyl | Methyl | CONH$_2$ | 2-Sulfoethyl | H | 3-(4-Hydroxy butoxy)propyl | H |
| 2a$^{586}$ | H | SO$_3$H | SO$_3$H | H | | | | | | | |
| 2a$^{587}$ | SO$_3$H | H | H | SO$_3$H | Methyl | Methyl | CONH$_2$ | 2-Sulfoethyl | H | 3-(2-Phenoxy ethoxyl)propyl | H |
| 2a$^{588}$ | H | SO$_3$H | SO$_3$H | H | | | | | | | |
| 2a$^{589}$ | SO$_3$H | H | H | SO$_3$H | Methyl | Methyl | CONH$_2$ | 2-Sulfoethyl | H | 3-Isopropxy propyl | H |
| 2a$^{590}$ | H | SO$_3$H | SO$_3$H | H | | | | | | | |
| 2a$^{591}$ | SO$_3$H | H | H | SO$_3$H | Methyl | Methyl | CONH$_2$ | 2-Sulfoethyl | H | 3-Ethoxy propyl | H |
| 2a$^{592}$ | H | SO$_3$H | SO$_3$H | H | | | | | | | |
| 2a$^{593}$ | SO$_3$H | H | H | SO$_3$H | Methyl | Methyl | CONH$_2$ | 2-Sulfoethyl | H | 3-Ethoxy butyl | H |
| 2a$^{594}$ | H | SO$_3$H | SO$_3$H | H | | | | | | | |
| 2a$^{595}$ | SO$_3$H | H | H | SO$_3$H | Methyl | Methyl | CONH$_2$ | 2-Sulfoethyl | H | 4-(2-Hydroxy ethane sulfonyl)phenyl | H |
| 2a$^{596}$ | H | SO$_3$H | SO$_3$H | H | | | | | | | |
| 2a$^{597}$ | SO$_3$H | H | H | SO$_3$H | NHCOCH$_3$ | OMe | CN | 2-Sulfoethyl | H | Methyl | H |
| 2a$^{598}$ | H | SO$_3$H | SO$_3$H | H | | | | | | | |
| 2a$^{599}$ | SO$_3$H | H | H | SO$_3$H | NHCOCH$_3$ | OMe | CN | 2-Sulfoethyl | H | Ethyl | H |
| 2a$^{600}$ | H | SO$_3$H | SO$_3$H | H | | | | | | | |
| 2a$^{601}$ | SO$_3$H | H | H | SO$_3$H | NHCOCH$_3$ | OMe | CN | 2-Sulfoethyl | H | n-Propyl | H |
| 2a$^{602}$ | H | SO$_3$H | SO$_3$H | H | | | | | | | |
| 2a$^{603}$ | SO$_3$H | H | H | SO$_3$H | NHCOCH$_3$ | OMe | CN | 2-Sulfoethyl | H | Isopropyl | H |
| 2a$^{604}$ | H | SO$_3$H | SO$_3$H | H | | | | | | | |
| 2a$^{605}$ | SO$_3$H | H | H | SO$_3$H | NHCOCH$_3$ | OMe | CN | 2-Sulfoethyl | H | 1-Ethyl propyl | H |
| 2a$^{606}$ | H | SO$_3$H | SO$_3$H | H | | | | | | | |
| 2a$^{607}$ | SO$_3$H | H | H | SO$_3$H | NHCOCH$_3$ | OMe | CN | 2-Sulfoethyl | H | 1,2-Dimethyl propyl | H |
| 2a$^{608}$ | H | SO$_3$H | SO$_3$H | H | | | | | | | |
| 2a$^{609}$ | SO$_3$H | H | H | SO$_3$H | NHCOCH$_3$ | OMe | CN | 2-Sulfoethyl | H | 2,2-Dimethyl propyl | H |
| 2a$^{610}$ | H | SO$_3$H | SO$_3$H | H | | | | | | | |

TABLE 3-continued

| S/No | R³ᵃ | R⁴ᵃ | R⁵ᵃ | R⁶ᵃ | R¹⁰ᵃ/R¹⁴ᵃ | R⁹ᵃ/R¹³ᵃ | R²⁴ᵃ/R³⁰ᵃ | R²⁷ᵃ/R³³ᵃ | R²⁶ᵃ/R³⁴ᵃ | R²⁵ᵃ/R³¹ᵃ | R²⁶ᵃ/R³²ᵃ |
|---|---|---|---|---|---|---|---|---|---|---|---|
| 2a⁶¹¹ | SO₃H | H | H | SO₃H | NHCOCH₃ | OMe | CN | 2-Sulfoethyl | H | Butyl | H |
| 2a⁶¹² | H | SO₃H | SO₃H | H | | | | | | | |
| 2a⁶¹³ | SO₃H | H | H | SO₃H | NHCOCH₃ | OMe | CN | 2-Sulfoethyl | H | 2-Methyl butyl | H |
| 2a⁶¹⁴ | H | SO₃H | SO₃H | H | | | | | | | |
| 2a⁶¹⁵ | SO₃H | H | H | SO₃H | NHCOCH₃ | OMe | CN | 2-Sulfoethyl | H | Tert butyl | H |
| 2a⁶¹⁶ | H | SO₃H | SO₃H | H | | | | | | | |
| 2a⁶¹⁷ | SO₃H | H | H | SO₃H | NHCOCH₃ | OMe | CN | 2-Sulfoethyl | H | 3-Methyl butyl | H |
| 2a⁶¹⁸ | H | SO₃H | SO₃H | H | | | | | | | |
| 2a⁶¹⁹ | SO₃H | H | H | SO₃H | NHCOCH₃ | OMe | CN | 2-Sulfoethyl | H | Sec butyl | H |
| 2a⁶²⁰ | H | SO₃H | SO₃H | H | | | | | | | |
| 2a⁶²¹ | SO₃H | H | H | SO₃H | NHCOCH₃ | OMe | CN | 2-Sulfoethyl | H | Pentyl | H |
| 2a⁶²² | H | SO₃H | SO₃H | H | | | | | | | |
| 2a⁶²³ | SO₃H | H | H | SO₃H | NHCOCH₃ | OMe | CN | 2-Sulfoethyl | H | Hexyl | H |
| 2a⁶²⁴ | H | SO₃H | SO₃H | H | | | | | | | |
| 2a⁶²⁵ | SO₃H | H | H | SO₃H | NHCOCH₃ | OMe | CN | 2-Sulfoethyl | H | Cyclobutyl | H |
| 2a⁶²⁶ | H | SO₃H | SO₃H | H | | | | | | | |
| 2a⁶²⁷ | SO₃H | H | H | SO₃H | NHCOCH₃ | OMe | CN | 2-Sulfoethyl | H | Cyclopentyl | H |
| 2a⁶²⁸ | H | SO₃H | SO₃H | H | | | | | | | |
| 2a⁶²⁹ | SO₃H | H | H | SO₃H | NHCOCH₃ | OMe | CN | 2-Sulfoethyl | H | Cyclohexyl | H |
| 2a⁶³⁰ | H | SO₃H | SO₃H | H | | | | | | | |
| 2a⁶³¹ | SO₃H | H | H | SO₃H | NHCOCH₃ | OMe | CN | 2-Sulfoethyl | H | 2-Methyl cyclohexyl | H |
| 2a⁶³² | H | SO₃H | SO₃H | H | | | | | | | |
| 2a⁶³³ | SO₃H | H | H | SO₃H | NHCOCH₃ | OMe | CN | 2-Sulfoethyl | H | 3-Methyl cyclohexyl | H |
| 2a⁶³⁴ | H | SO₃H | SO₃H | H | | | | | | | |
| 2a⁶³⁵ | SO₃H | H | H | SO₃H | NHCOCH₃ | OMe | CN | 2-Sulfoethyl | H | Pentan-2-yl | H |
| 2a⁶³⁶ | H | SO₃H | SO₃H | H | | | | | | | |
| 2a⁶³⁷ | SO₃H | H | H | SO₃H | NHCOCH₃ | OMe | CN | 2-Sulfoethyl | H | 2-Ethylhexyl | H |
| 2a⁶³⁸ | H | SO₃H | SO₃H | H | | | | | | | |
| 2a⁶³⁹ | SO₃H | H | H | SO₃H | NHCOCH₃ | OMe | CN | 2-Sulfoethyl | H | Phenyl | H |
| 2a⁶⁴⁰ | H | SO₃H | SO₃H | H | | | | | | | |
| 2a⁶⁴¹ | SO₃H | H | H | SO₃H | NHCOCH₃ | OMe | CN | 2-Sulfoethyl | H | Benzyl | H |
| 2a⁶⁴² | H | SO₃H | SO₃H | H | | | | | | | |
| 2a⁶⁴³ | SO₃H | H | H | SO₃H | NHCOCH₃ | OMe | CN | 2-Sulfoethyl | H | Allyl | H |
| 2a⁶⁴⁴ | H | SO₃H | SO₃H | H | | | | | | | |
| 2a⁶⁴⁵ | SO₃H | H | H | SO₃H | NHCOCH₃ | OMe | CN | 2-Sulfoethyl | H | 2-Methoxy ethyl | H |
| 2a⁶⁴⁶ | H | SO₃H | SO₃H | H | | | | | | | |
| 2a⁶⁴⁷ | SO₃H | H | H | SO₃H | NHCOCH₃ | OMe | CN | 2-Sulfoethyl | H | 3-Methoxy propyl | H |
| 2a⁶⁴⁸ | H | SO₃H | SO₃H | H | | | | | | | |
| 2a⁶⁴⁹ | SO₃H | H | H | SO₃H | NHCOCH₃ | OMe | CN | 2-Sulfoethyl | H | 3-Chloropropyl | H |
| 2a⁶⁵⁰ | H | SO₃H | SO₃H | H | | | | | | | |
| 2a⁶⁵¹ | SO₃H | H | H | SO₃H | NHCOCH₃ | OMe | CN | 2-Sulfoethyl | H | 2-Methyl thioethyl | H |
| 2a⁶⁵² | H | SO₃H | SO₃H | H | | | | | | | |
| 2a⁶⁵³ | SO₃H | H | H | SO₃H | NHCOCH₃ | OMe | CN | 2-Sulfoethyl | H | 2-Fluoroethyl | H |
| 2a⁶⁵⁴ | H | SO₃H | SO₃H | H | | | | | | | |
| 2a⁶⁵⁵ | SO₃H | H | H | SO₃H | NHCOCH₃ | OMe | CN | 2-Sulfoethyl | H | 2-Chloro ethyl | H |
| 2a⁶⁵⁶ | H | SO₃H | SO₃H | H | | | | | | | |
| 2a⁶⁵⁷ | SO₃H | H | H | SO₃H | NHCOCH₃ | OMe | CN | 2-Sulfoethyl | H | 2-(2-Hydroxy ethyl sulfonyl)ethyl | H |
| 2a⁶⁵⁸ | H | SO₃H | SO₃H | H | | | | | | | |
| 2a⁶⁵⁹ | SO₃H | H | H | SO₃H | NHCOCH₃ | OMe | CN | 2-Sulfoethyl | H | 2-(2-tert Butyl sulfanyl ethyl sulfonyl)ethyl | H |
| 2a⁶⁶⁰ | H | SO₃H | SO₃H | H | | | | | | | |
| 2a⁶⁶¹ | SO₃H | H | H | SO₃H | NHCOCH₃ | OMe | CN | 2-Sulfoethyl | H | 2-(2-Hydroxy ethoxy)propyl | H |
| 2a⁶⁶² | H | SO₃H | SO₃H | H | | | | | | | |
| 2a⁶⁶³ | SO₃H | H | H | SO₃H | NHCOCH₃ | OMe | CN | 2-Sulfoethyl | H | 2-(2-Hydroxy ethoxy)ethyl | H |
| 2a⁶⁶⁴ | H | SO₃H | SO₃H | H | | | | | | | |
| 2a⁶⁶⁵ | SO₃H | H | H | SO₃H | NHCOCH₃ | OMe | CN | 2-Sulfoethyl | H | 3-(4-Hydroxy butoxy)propyl | H |
| 2a⁶⁶⁶ | H | SO₃H | SO₃H | H | | | | | | | |
| 2a⁶⁶⁷ | SO₃H | H | H | SO₃H | NHCOCH₃ | OMe | CN | 2-Sulfoethyl | H | 3-(2-Phenoxy ethoxyl)propyl | H |
| 2a⁶⁶⁸ | H | SO₃H | SO₃H | H | | | | | | | |
| 2a⁶⁶⁹ | SO₃H | H | H | SO₃H | NHCOCH₃ | OMe | CN | 2-Sulfoethyl | H | 3-Isopropxy propyl | H |
| 2a⁶⁷⁰ | H | SO₃H | SO₃H | H | | | | | | | |
| 2a⁶⁷¹ | SO₃H | H | H | SO₃H | NHCOCH₃ | OMe | CN | 2-Sulfoethyl | H | 3-Ethoxy propyl | H |
| 2a⁶⁷² | H | SO₃H | SO₃H | H | | | | | | | |
| 2a⁶⁷³ | SO₃H | H | H | SO₃H | NHCOCH₃ | OMe | CN | 2-Sulfoethyl | H | 3-Ethoxy butyl | H |
| 2a⁶⁷⁴ | H | SO₃H | SO₃H | H | | | | | | | |
| 2a⁶⁷⁵ | SO₃H | H | H | SO₃H | NHCOCH₃ | OMe | CN | 2-Sulfoethyl | H | 4-(2-Hydroxy ethane sulfonyl)phenyl | H |
| 2a⁶⁷⁶ | H | SO₃H | SO₃H | H | | | | | | | |
| 2a⁶⁷⁷ | SO₃H | H | H | SO₃H | NHCOCH₃ | OMe | CONH₂ | 2-Sulfoethyl | H | Methyl | H |
| 2a⁶⁷⁸ | H | SO₃H | SO₃H | H | | | | | | | |
| 2a⁶⁷⁹ | SO₃H | H | H | SO₃H | NHCOCH₃ | OMe | CONH₂ | 2-Sulfoethyl | H | Ethyl | H |
| 2a⁶⁸⁰ | H | SO₃H | SO₃H | H | | | | | | | |
| 2a⁶⁸¹ | SO₃H | H | H | SO₃H | NHCOCH₃ | OMe | CONH₂ | 2-Sulfoethyl | H | n-Propyl | H |
| 2a⁶⁸² | H | SO₃H | SO₃H | H | | | | | | | |
| 2a⁶⁸³ | SO₃H | H | H | SO₃H | NHCOCH₃ | OMe | CONH₂ | 2-Sulfoethyl | H | Isopropyl | H |
| 2a⁶⁸⁴ | H | SO₃H | SO₃H | H | | | | | | | |

TABLE 3-continued

| S/No | R$^{3a}$ | R$^{4a}$ | R$^{5a}$ | R$^{6a}$ | R$^{10a}$/R$^{14a}$ | R$^{9a}$/R$^{13a}$ | R$^{24a}$/R$^{30a}$ | R$^{27a}$/R$^{33a}$ | R$^{26a}$/R$^{34a}$ | R$^{25a}$/R$^{31a}$ | R$^{26a}$/R$^{32a}$ |
|---|---|---|---|---|---|---|---|---|---|---|---|
| 2a$^{685}$ | SO$_3$H | H | H | SO$_3$H | NHCOCH$_3$ | OMe | CONH$_2$ | 2-Sulfoethyl | H | 1-Ethyl propyl | H |
| 2a$^{686}$ | H | SO$_3$H | SO$_3$H | H | | | | | | | |
| 2a$^{687}$ | SO$_3$H | H | H | SO$_3$H | NHCOCH$_3$ | OMe | CONH$_2$ | 2-Sulfoethyl | H | 1,2-Dimethyl propyl | H |
| 2a$^{688}$ | H | SO$_3$H | SO$_3$H | H | | | | | | | |
| 2a$^{689}$ | SO$_3$H | H | H | SO$_3$H | NHCOCH$_3$ | OMe | CONH$_2$ | 2-Sulfoethyl | H | 2,2-Dimethyl propyl | H |
| 2a$^{690}$ | H | SO$_3$H | SO$_3$H | H | | | | | | | |
| 2a$^{691}$ | SO$_3$H | H | H | SO$_3$H | NHCOCH$_3$ | OMe | CONH$_2$ | 2-Sulfoethyl | H | Butyl | H |
| 2a$^{692}$ | H | SO$_3$H | SO$_3$H | H | | | | | | | |
| 2a$^{693}$ | SO$_3$H | H | H | SO$_3$H | NHCOCH$_3$ | OMe | CONH$_2$ | 2-Sulfoethyl | H | 2-Methyl butyl | H |
| 2a$^{694}$ | H | SO$_3$H | SO$_3$H | H | | | | | | | |
| 2a$^{695}$ | SO$_3$H | H | H | SO$_3$H | NHCOCH$_3$ | OMe | CONH$_2$ | 2-Sulfoethyl | H | Tert butyl | H |
| 2a$^{696}$ | H | SO$_3$H | SO$_3$H | H | | | | | | | |
| 2a$^{697}$ | SO$_3$H | H | H | SO$_3$H | NHCOCH$_3$ | OMe | CONH$_2$ | 2-Sulfoethyl | H | 3-Methyl butyl | H |
| 2a$^{698}$ | H | SO$_3$H | SO$_3$H | H | | | | | | | |
| 2a$^{699}$ | SO$_3$H | H | H | SO$_3$H | NHCOCH$_3$ | OMe | CONH$_2$ | 2-Sulfoethyl | H | Sec butyl | H |
| 2a$^{700}$ | H | SO$_3$H | SO$_3$H | H | | | | | | | |
| 2a$^{701}$ | SO$_3$H | H | H | SO$_3$H | NHCOCH$_3$ | OMe | CONH$_2$ | 2-Sulfoethyl | H | Pentyl | H |
| 2a$^{702}$ | H | SO$_3$H | SO$_3$H | H | | | | | | | |
| 2a$^{703}$ | SO$_3$H | H | H | SO$_3$H | NHCOCH$_3$ | OMe | CONH$_2$ | 2-Sulfoethyl | H | Hexyl | H |
| 2a$^{704}$ | H | SO$_3$H | SO$_3$H | H | | | | | | | |
| 2a$^{705}$ | SO$_3$H | H | H | SO$_3$H | NHCOCH$_3$ | OMe | CONH$_2$ | 2-Sulfoethyl | H | Cyclobutyl | H |
| 2a$^{706}$ | H | SO$_3$H | SO$_3$H | H | | | | | | | |
| 2a$^{707}$ | SO$_3$H | H | H | SO$_3$H | NHCOCH$_3$ | OMe | CONH$_2$ | 2-Sulfoethyl | H | Cyclopentyl | H |
| 2a$^{708}$ | H | SO$_3$H | SO$_3$H | H | | | | | | | |
| 2a$^{709}$ | SO$_3$H | H | H | SO$_3$H | NHCOCH$_3$ | OMe | CONH$_2$ | 2-Sulfoethyl | H | Cyclohexyl | H |
| 2a$^{710}$ | H | SO$_3$H | SO$_3$H | H | | | | | | | |
| 2a$^{711}$ | SO$_3$H | H | H | SO$_3$H | NHCOCH$_3$ | OMe | CONH$_2$ | 2-Sulfoethyl | H | 2-Methyl cyclohexyl | H |
| 2a$^{712}$ | H | SO$_3$H | SO$_3$H | H | | | | | | | |
| 2a$^{713}$ | SO$_3$H | H | H | SO$_3$H | NHCOCH$_3$ | OMe | CONH$_2$ | 2-Sulfoethyl | H | 3-Methyl cyclohexyl | H |
| 2a$^{714}$ | H | SO$_3$H | SO$_3$H | H | | | | | | | |
| 2a$^{715}$ | SO$_3$H | H | H | SO$_3$H | NHCOCH$_3$ | OMe | CONH$_2$ | 2-Sulfoethyl | H | Pentan-2-yl | H |
| 2a$^{716}$ | H | SO$_3$H | SO$_3$H | H | | | | | | | |
| 2a$^{717}$ | SO$_3$H | H | H | SO$_3$H | NHCOCH$_3$ | OMe | CONH$_2$ | 2-Sulfoethyl | H | 2-Ethylhexyl | H |
| 2a$^{718}$ | H | SO$_3$H | SO$_3$H | H | | | | | | | |
| 2a$^{719}$ | SO$_3$H | H | H | SO$_3$H | NHCOCH$_3$ | OMe | CONH$_2$ | 2-Sulfoethyl | H | Phenyl | H |
| 2a$^{720}$ | H | SO$_3$H | SO$_3$H | H | | | | | | | |
| 2a$^{721}$ | SO$_3$H | H | H | SO$_3$H | NHCOCH$_3$ | OMe | CONH$_2$ | 2-Sulfoethyl | H | Benzyl | H |
| 2a$^{722}$ | H | SO$_3$H | SO$_3$H | H | | | | | | | |
| 2a$^{723}$ | SO$_3$H | H | H | SO$_3$H | NHCOCH$_3$ | OMe | CONH$_2$ | 2-Sulfoethyl | H | Allyl | H |
| 2a$^{724}$ | H | SO$_3$H | SO$_3$H | H | | | | | | | |
| 2a$^{725}$ | SO$_3$H | H | H | SO$_3$H | NHCOCH$_3$ | OMe | CONH$_2$ | 2-Sulfoethyl | H | 2-Methoxy ethyl | H |
| 2a$^{726}$ | H | SO$_3$H | SO$_3$H | H | | | | | | | |
| 2a$^{727}$ | SO$_3$H | H | H | SO$_3$H | NHCOCH$_3$ | OMe | CONH$_2$ | 2-Sulfoethyl | H | 3-Methoxy propyl | H |
| 2a$^{728}$ | H | SO$_3$H | SO$_3$H | H | | | | | | | |
| 2a$^{729}$ | SO$_3$H | H | H | SO$_3$H | NHCOCH$_3$ | OMe | CONH$_2$ | 2-Sulfoethyl | H | 3-Chloropropyl | H |
| 2a$^{730}$ | H | SO$_3$H | SO$_3$H | H | | | | | | | |
| 2a$^{731}$ | SO$_3$H | H | H | SO$_3$H | NHCOCH$_3$ | OMe | CONH$_2$ | 2-Sulfoethyl | H | 2-Methyl thioethyl | H |
| 2a$^{732}$ | H | SO$_3$H | SO$_3$H | H | | | | | | | |
| 2a$^{733}$ | SO$_3$H | H | H | SO$_3$H | NHCOCH$_3$ | OMe | CONH$_2$ | 2-Sulfoethyl | H | 2-Fluoroethyl | H |
| 2a$^{734}$ | H | SO$_3$H | SO$_3$H | H | | | | | | | |
| 2a$^{735}$ | SO$_3$H | H | H | SO$_3$H | NHCOCH$_3$ | OMe | CONH$_2$ | 2-Sulfoethyl | H | 2-Chloro ethyl | H |
| 2a$^{736}$ | H | SO$_3$H | SO$_3$H | H | | | | | | | |
| 2a$^{737}$ | SO$_3$H | H | H | SO$_3$H | NHCOCH$_3$ | OMe | CONH$_2$ | 2-Sulfoethyl | H | 2-(2-Hydroxy ethyl sulfonyl)ethyl | H |
| 2a$^{738}$ | H | SO$_3$H | SO$_3$H | H | | | | | | | |
| 2a$^{739}$ | SO$_3$H | H | H | SO$_3$H | NHCOCH$_3$ | OMe | CONH$_2$ | 2-Sulfoethyl | H | 2-(2-tert Butyl sulfanyl ethyl sulfonyl)ethyl | H |
| 2a$^{740}$ | H | SO$_3$H | SO$_3$H | H | | | | | | | |
| 2a$^{741}$ | SO$_3$H | H | H | SO$_3$H | NHCOCH$_3$ | OMe | CONH$_2$ | 2-Sulfoethyl | H | 2-(2-Hydroxy ethoxy)propyl | H |
| 2a$^{742}$ | H | SO$_3$H | SO$_3$H | H | | | | | | | |
| 2a$^{743}$ | SO$_3$H | H | H | SO$_3$H | NHCOCH$_3$ | OMe | CONH$_2$ | 2-Sulfoethyl | H | 2-(2-Hydroxy ethoxy)ethyl | H |
| 2a$^{744}$ | H | SO$_3$H | SO$_3$H | H | | | | | | | |
| 2a$^{745}$ | SO$_3$H | H | H | SO$_3$H | NHCOCH$_3$ | OMe | CONH$_2$ | 2-Sulfoethyl | H | 3-(4-Hydroxy butoxy)propyl | H |
| 2a$^{746}$ | H | SO$_3$H | SO$_3$H | H | | | | | | | |
| 2a$^{747}$ | SO$_3$H | H | H | SO$_3$H | NHCOCH$_3$ | OMe | CONH$_2$ | 2-Sulfoethyl | H | 3-(2-Phenoxy ethoxyl)propyl | H |
| 2a$^{748}$ | H | SO$_3$H | SO$_3$H | H | | | | | | | |
| 2a$^{749}$ | SO$_3$H | H | H | SO$_3$H | NHCOCH$_3$ | OMe | CONH$_2$ | 2-Sulfoethyl | H | 3-Isopropxy propyl | H |
| 2a$^{750}$ | H | SO$_3$H | SO$_3$H | H | | | | | | | |
| 2a$^{751}$ | SO$_3$H | H | H | SO$_3$H | NHCOCH$_3$ | OMe | CONH$_2$ | 2-Sulfoethyl | H | 3-Ethoxy propyl | H |
| 2a$^{752}$ | H | SO$_3$H | SO$_3$H | H | | | | | | | |
| 2a$^{753}$ | SO$_3$H | H | H | SO$_3$H | NHCOCH$_3$ | OMe | CONH$_2$ | 2-Sulfoethyl | H | 3-Ethoxy butyl | H |
| 2a$^{754}$ | H | SO$_3$H | SO$_3$H | H | | | | | | | |
| 2a$^{755}$ | SO$_3$H | H | H | SO$_3$H | NHCOCH$_3$ | OMe | CONH$_2$ | 2-Sulfoethyl | H | 4-(2-Hydroxy ethane sulfonyl)phenyl | H |
| 2a$^{756}$ | H | SO$_3$H | SO$_3$H | H | | | | | | | |
| 2a$^{757}$ | SO$_3$H | H | H | SO$_3$H | Methyl | Methyl | CN | 2-Sulfoethyl | Methyl | Methyl | H |
| 2a$^{758}$ | H | SO$_3$H | SO$_3$H | H | | | | | | | |

TABLE 3-continued

| S/No | R³ᵃ | R⁴ᵃ | R⁵ᵃ | R⁶ᵃ | R¹⁰ᵃ/R¹⁴ᵃ | R⁹ᵃ/R¹³ᵃ | R²⁴ᵃ/R³⁰ᵃ | R²⁷ᵃ/R³³ᵃ | R²⁶ᵃ/R³⁴ᵃ | R²⁵ᵃ/R³¹ᵃ | R²⁶ᵃ/R³²ᵃ |
|---|---|---|---|---|---|---|---|---|---|---|---|
| 2a⁷⁵⁹ | SO₃H | H | H | SO₃H | Methyl | Methyl | CN | 2-Sulfoethyl | Methyl | Ethyl | H |
| 2a⁷⁶⁰ | H | SO₃H | SO₃H | H | | | | | | | |
| 2a⁷⁶¹ | SO₃H | H | H | SO₃H | Methyl | Methyl | CN | 2-Sulfoethyl | Methyl | n-Propyl | H |
| 2a⁷⁶² | H | SO₃H | SO₃H | H | | | | | | | |
| 2a⁷⁶³ | SO₃H | H | H | SO₃H | Methyl | Methyl | CN | 2-Sulfoethyl | Methyl | Isopropyl | H |
| 2a⁷⁶⁴ | H | SO₃H | SO₃H | H | | | | | | | |
| 2a⁷⁶⁵ | SO₃H | H | H | SO₃H | Methyl | Methyl | CN | 2-Sulfoethyl | Methyl | 1-Ethyl propyl | H |
| 2a⁷⁶⁶ | H | SO₃H | SO₃H | H | | | | | | | |
| 2a⁷⁶⁷ | SO₃H | H | H | SO₃H | Methyl | Methyl | CN | 2-Sulfoethyl | Methyl | 1,2-Dimethyl propyl | H |
| 2a⁷⁶⁸ | H | SO₃H | SO₃H | H | | | | | | | |
| 2a⁷⁶⁹ | SO₃H | H | H | SO₃H | Methyl | Methyl | CN | 2-Sulfoethyl | Methyl | 2,2-Dimethyl propyl | H |
| 2a⁷⁷⁰ | H | SO₃H | SO₃H | H | | | | | | | |
| 2a⁷⁷¹ | SO₃H | H | H | SO₃H | Methyl | Methyl | CN | 2-Sulfoethyl | Methyl | Butyl | H |
| 2a⁷⁷² | H | SO₃H | SO₃H | H | | | | | | | |
| 2a⁷⁷³ | SO₃H | H | H | SO₃H | Methyl | Methyl | CN | 2-Sulfoethyl | Methyl | 2-Methyl butyl | H |
| 2a⁷⁷⁴ | H | SO₃H | SO₃H | H | | | | | | | |
| 2a⁷⁷⁵ | SO₃H | H | H | SO₃H | Methyl | Methyl | CN | 2-Sulfoethyl | Methyl | Tert butyl | H |
| 2a⁷⁷⁶ | H | SO₃H | SO₃H | H | | | | | | | |
| 2a⁷⁷⁷ | SO₃H | H | H | SO₃H | Methyl | Methyl | CN | 2-Sulfoethyl | Methyl | 3-Methyl butyl | H |
| 2a⁷⁷⁸ | H | SO₃H | SO₃H | H | | | | | | | |
| 2a⁷⁷⁹ | SO₃H | H | H | SO₃H | Methyl | Methyl | CN | 2-Sulfoethyl | Methyl | Sec butyl | H |
| 2a⁷⁸⁰ | H | SO₃H | SO₃H | H | | | | | | | |
| 2a⁷⁸¹ | SO₃H | H | H | SO₃H | Methyl | Methyl | CN | 2-Sulfoethyl | Methyl | Pentyl | H |
| 2a⁷⁸² | H | SO₃H | SO₃H | H | | | | | | | |
| 2a⁷⁸³ | SO₃H | H | H | SO₃H | Methyl | Methyl | CN | 2-Sulfoethyl | Methyl | Hexyl | H |
| 2a⁷⁸⁴ | H | SO₃H | SO₃H | H | | | | | | | |
| 2a⁷⁸⁵ | SO₃H | H | H | SO₃H | Methyl | Methyl | CN | 2-Sulfoethyl | Methyl | Cyclobutyl | H |
| 2a⁷⁸⁶ | H | SO₃H | SO₃H | H | | | | | | | |
| 2a⁷⁸⁷ | SO₃H | H | H | SO₃H | Methyl | Methyl | CN | 2-Sulfoethyl | Methyl | Cyclopentyl | H |
| 2a⁷⁸⁸ | H | SO₃H | SO₃H | H | | | | | | | |
| 2a⁷⁸⁹ | SO₃H | H | H | SO₃H | Methyl | Methyl | CN | 2-Sulfoethyl | Methyl | Cyclohexyl | H |
| 2a⁷⁹⁰ | H | SO₃H | SO₃H | H | | | | | | | |
| 2a⁷⁹¹ | SO₃H | H | H | SO₃H | Methyl | Methyl | CN | 2-Sulfoethyl | Methyl | 2-Methyl cyclohexyl | H |
| 2a⁷⁹² | H | SO₃H | SO₃H | H | | | | | | | |
| 2a⁷⁹³ | SO₃H | H | H | SO₃H | Methyl | Methyl | CN | 2-Sulfoethyl | Methyl | 3-Methyl cyclohexyl | H |
| 2a⁷⁹⁴ | H | SO₃H | SO₃H | H | | | | | | | |
| 2a⁷⁹⁵ | SO₃H | H | H | SO₃H | Methyl | Methyl | CN | 2-Sulfoethyl | Methyl | Pentan-2-yl | H |
| 2a⁷⁹⁶ | H | SO₃H | SO₃H | H | | | | | | | |
| 2a⁷⁹⁷ | SO₃H | H | H | SO₃H | Methyl | Methyl | CN | 2-Sulfoethyl | Methyl | 2-Ethylhexyl | H |
| 2a⁷⁹⁸ | H | SO₃H | SO₃H | H | | | | | | | |
| 2a⁷⁹⁹ | SO₃H | H | H | SO₃H | Methyl | Methyl | CN | 2-Sulfoethyl | Methyl | Phenyl | H |
| 2a⁸⁰⁰ | H | SO₃H | SO₃H | H | | | | | | | |
| 2a⁸⁰¹ | SO₃H | H | H | SO₃H | Methyl | Methyl | CN | 2-Sulfoethyl | Methyl | Benzyl | H |
| 2a⁸⁰² | H | SO₃H | SO₃H | H | | | | | | | |
| 2a⁸⁰³ | SO₃H | H | H | SO₃H | Methyl | Methyl | CN | 2-Sulfoethyl | Methyl | Allyl | H |
| 2a⁸⁰⁴ | H | SO₃H | SO₃H | H | | | | | | | |
| 2a⁸⁰⁵ | SO₃H | H | H | SO₃H | Methyl | Methyl | CN | 2-Sulfoethyl | Methyl | 2-Methoxy ethyl | H |
| 2a⁸⁰⁶ | H | SO₃H | SO₃H | H | | | | | | | |
| 2a⁸⁰⁷ | SO₃H | H | H | SO₃H | Methyl | Methyl | CN | 2-Sulfoethyl | Methyl | 3-Methoxy propyl | H |
| 2a⁸⁰⁸ | H | SO₃H | SO₃H | H | | | | | | | |
| 2a⁸⁰⁹ | SO₃H | H | H | SO₃H | Methyl | Methyl | CN | 2-Sulfoethyl | Methyl | 3-Chloropropyl | H |
| 2a⁸¹⁰ | H | SO₃H | SO₃H | H | | | | | | | |
| 2a⁸¹¹ | SO₃H | H | H | SO₃H | Methyl | Methyl | CN | 2-Sulfoethyl | Methyl | 2-Methyl thioethyl | H |
| 2a⁸¹² | H | SO₃H | SO₃H | H | | | | | | | |
| 2a⁸¹³ | SO₃H | H | H | SO₃H | Methyl | Methyl | CN | 2-Sulfoethyl | Methyl | 2-Fluoroethyl | H |
| 2a⁸¹⁴ | H | SO₃H | SO₃H | H | | | | | | | |
| 2a⁸¹⁵ | SO₃H | H | H | SO₃H | Methyl | Methyl | CN | 2-Sulfoethyl | Methyl | 2-Chloro ethyl | H |
| 2a⁸¹⁶ | H | SO₃H | SO₃H | H | | | | | | | |
| 2a⁸¹⁷ | SO₃H | H | H | SO₃H | Methyl | Methyl | CN | 2-Sulfoethyl | Methyl | 2-(2-Hydroxy ethyl sulfonyl)ethyl | H |
| 2a⁸¹⁸ | H | SO₃H | SO₃H | H | | | | | | | |
| 2a⁸¹⁹ | SO₃H | H | H | SO₃H | Methyl | Methyl | CN | 2-Sulfoethyl | Methyl | 2-(2-tert Butyl sulfanyl ethyl sulfonyl)ethyl | H |
| 2a⁸²⁰ | H | SO₃H | SO₃H | H | | | | | | | |
| 2a⁸²¹ | SO₃H | H | H | SO₃H | Methyl | Methyl | CN | 2-Sulfoethyl | Methyl | 2-(2-Hydroxy ethoxy)propyl | H |
| 2a⁸²² | H | SO₃H | SO₃H | H | | | | | | | |
| 2a⁸²³ | SO₃H | H | H | SO₃H | Methyl | Methyl | CN | 2-Sulfoethyl | Methyl | 2-(2-Hydroxy ethoxy)ethyl | H |
| 2a⁸²⁴ | H | SO₃H | SO₃H | H | | | | | | | |
| 2a⁸²⁵ | SO₃H | H | H | SO₃H | Methyl | Methyl | CN | 2-Sulfoethyl | Methyl | 3-(4-Hydroxy butoxy)propyl | H |
| 2a⁸²⁶ | H | SO₃H | SO₃H | H | | | | | | | |
| 2a⁸²⁷ | SO₃H | H | H | SO₃H | Methyl | Methyl | CN | 2-Sulfoethyl | Methyl | 3-(2-Phenoxy ethoxyl)propyl | H |
| 2a⁸²⁸ | H | SO₃H | SO₃H | H | | | | | | | |
| 2a⁸²⁹ | SO₃H | H | H | SO₃H | Methyl | Methyl | CN | 2-Sulfoethyl | Methyl | 3-Isopropxy propyl | H |
| 2a⁸³⁰ | H | SO₃H | SO₃H | H | | | | | | | |
| 2a⁸³¹ | SO₃H | H | H | SO₃H | Methyl | Methyl | CN | 2-Sulfoethyl | Methyl | 3-Ethoxy propyl | H |
| 2a⁸³² | H | SO₃H | SO₃H | H | | | | | | | |

TABLE 3-continued

| S/No | R³ᵃ | R⁴ᵃ | R⁵ᵃ | R⁶ᵃ | R¹⁰ᵃ/R¹⁴ᵃ | R⁹ᵃ/R¹³ᵃ | R²⁴ᵃ/R³⁰ᵃ | R²⁷ᵃ/R³³ᵃ | R²⁶ᵃ/R³⁴ᵃ | R²⁵ᵃ/R³¹ᵃ | R²⁶ᵃ/R³²ᵃ |
|---|---|---|---|---|---|---|---|---|---|---|---|
| 2a⁸³³ | SO₃H | H | H | SO₃H | Methyl | Methyl | CN | 2-Sulfoethyl | Methyl | 3-Ethoxy butyl | H |
| 2a⁸³⁴ | H | SO₃H | SO₃H | H | | | | | | | |
| 2a⁸³⁵ | SO₃H | H | H | SO₃H | Methyl | Methyl | CN | 2-Sulfoethyl | Methyl | 4-(2-Hydroxy ethane sulfonyl)phenyl | H |
| 2a⁸³⁶ | H | SO₃H | SO₃H | H | | | | | | | |
| 2a⁸³⁷ | SO₃H | H | H | SO₃H | Methyl | Methyl | CONH₂ | 2-Sulfoethyl | Methyl | Methyl | H |
| 2a⁸³⁸ | H | SO₃H | SO₃H | H | | | | | | | |
| 2a⁸³⁹ | SO₃H | H | H | SO₃H | Methyl | Methyl | CONH₂ | 2-Sulfoethyl | Methyl | Ethyl | H |
| 2a⁸⁴⁰ | H | SO₃H | SO₃H | H | | | | | | | |
| 2a⁸⁴¹ | SO₃H | H | H | SO₃H | Methyl | Methyl | CONH₂ | 2-Sulfoethyl | Methyl | n-Propyl | H |
| 2a⁸⁴² | H | SO₃H | SO₃H | H | | | | | | | |
| 2a⁸⁴³ | SO₃H | H | H | SO₃H | Methyl | Methyl | CONH₂ | 2-Sulfoethyl | Methyl | Isopropyl | H |
| 2a⁸⁴⁴ | H | SO₃H | SO₃H | H | | | | | | | |
| 2a⁸⁴⁵ | SO₃H | H | H | SO₃H | Methyl | Methyl | CONH₂ | 2-Sulfoethyl | Methyl | 1-Ethyl propyl | H |
| 2a⁸⁴⁶ | H | SO₃H | SO₃H | H | | | | | | | |
| 2a⁸⁴⁷ | SO₃H | H | H | SO₃H | Methyl | Methyl | CONH₂ | 2-Sulfoethyl | Methyl | 1,2-Dimethyl propyl | H |
| 2a⁸⁴⁸ | H | SO₃H | SO₃H | H | | | | | | | |
| 2a⁸⁴⁹ | SO₃H | H | H | SO₃H | Methyl | Methyl | CONH₂ | 2-Sulfoethyl | Methyl | 2,2-Dimethyl propyl | H |
| 2a⁸⁵⁰ | H | SO₃H | SO₃H | H | | | | | | | |
| 2a⁸⁵¹ | SO₃H | H | H | SO₃H | Methyl | Methyl | CONH₂ | 2-Sulfoethyl | Methyl | Butyl | H |
| 2a⁸⁵² | H | SO₃H | SO₃H | H | | | | | | | |
| 2a⁸⁵³ | SO₃H | H | H | SO₃H | Methyl | Methyl | CONH₂ | 2-Sulfoethyl | Methyl | 2-Methyl butyl | H |
| 2a⁸⁵⁴ | H | SO₃H | SO₃H | H | | | | | | | |
| 2a⁸⁵⁵ | SO₃H | H | H | SO₃H | Methyl | Methyl | CONH₂ | 2-Sulfoethyl | Methyl | Tert butyl | H |
| 2a⁸⁵⁶ | H | SO₃H | SO₃H | H | | | | | | | |
| 2a⁸⁵⁷ | SO₃H | H | H | SO₃H | Methyl | Methyl | CONH₂ | 2-Sulfoethyl | Methyl | 3-Methyl butyl | H |
| 2a⁸⁵⁸ | H | SO₃H | SO₃H | H | | | | | | | |
| 2a⁸⁵⁹ | SO₃H | H | H | SO₃H | Methyl | Methyl | CONH₂ | 2-Sulfoethyl | Methyl | Sec butyl | H |
| 2a⁸⁶⁰ | H | SO₃H | SO₃H | H | | | | | | | |
| 2a⁸⁶¹ | SO₃H | H | H | SO₃H | Methyl | Methyl | CONH₂ | 2-Sulfoethyl | Methyl | Pentyl | H |
| 2a⁸⁶² | H | SO₃H | SO₃H | H | | | | | | | |
| 2a⁸⁶³ | SO₃H | H | H | SO₃H | Methyl | Methyl | CONH₂ | 2-Sulfoethyl | Methyl | Hexyl | H |
| 2a⁸⁶⁴ | H | SO₃H | SO₃H | H | | | | | | | |
| 2a⁸⁶⁵ | SO₃H | H | H | SO₃H | Methyl | Methyl | CONH₂ | 2-Sulfoethyl | Methyl | Cyclobutyl | H |
| 2a⁸⁶⁶ | H | SO₃H | SO₃H | H | | | | | | | |
| 2a⁸⁶⁷ | SO₃H | H | H | SO₃H | Methyl | Methyl | CONH₂ | 2-Sulfoethyl | Methyl | Cyclopentyl | H |
| 2a⁸⁶⁸ | H | SO₃H | SO₃H | H | | | | | | | |
| 2a⁸⁶⁹ | SO₃H | H | H | SO₃H | Methyl | Methyl | CONH₂ | 2-Sulfoethyl | Methyl | Cyclohexyl | H |
| 2a⁸⁷⁰ | H | SO₃H | SO₃H | H | | | | | | | |
| 2a⁸⁷¹ | SO₃H | H | H | SO₃H | Methyl | Methyl | CONH₂ | 2-Sulfoethyl | Methyl | 2-Methyl cyclohexyl | H |
| 2a⁸⁷² | H | SO₃H | SO₃H | H | | | | | | | |
| 2a⁸⁷³ | SO₃H | H | H | SO₃H | Methyl | Methyl | CONH₂ | 2-Sulfoethyl | Methyl | 3-Methyl cyclohexyl | H |
| 2a⁸⁷⁴ | H | SO₃H | SO₃H | H | | | | | | | |
| 2a⁸⁷⁵ | SO₃H | H | H | SO₃H | Methyl | Methyl | CONH₂ | 2-Sulfoethyl | Methyl | Pentan-2-yl | H |
| 2a⁸⁷⁶ | H | SO₃H | SO₃H | H | | | | | | | |
| 2a⁸⁷⁷ | SO₃H | H | H | SO₃H | Methyl | Methyl | CONH₂ | 2-Sulfoethyl | Methyl | 2-Ethylhexyl | H |
| 2a⁸⁷⁸ | H | SO₃H | SO₃H | H | | | | | | | |
| 2a⁸⁷⁹ | SO₃H | H | H | SO₃H | Methyl | Methyl | CONH₂ | 2-Sulfoethyl | Methyl | Phenyl | H |
| 2a⁸⁸⁰ | H | SO₃H | SO₃H | H | | | | | | | |
| 2a⁸⁸¹ | SO₃H | H | H | SO₃H | Methyl | Methyl | CONH₂ | 2-Sulfoethyl | Methyl | Benzyl | H |
| 2a⁸⁸² | H | SO₃H | SO₃H | H | | | | | | | |
| 2a⁸⁸³ | SO₃H | H | H | SO₃H | Methyl | Methyl | CONH₂ | 2-Sulfoethyl | Methyl | Allyl | H |
| 2a⁸⁸⁴ | H | SO₃H | SO₃H | H | | | | | | | |
| 2a⁸⁸⁵ | SO₃H | H | H | SO₃H | Methyl | Methyl | CONH₂ | 2-Sulfoethyl | Methyl | 2-Methoxy ethyl | H |
| 2a⁸⁸⁶ | H | SO₃H | SO₃H | H | | | | | | | |
| 2a⁸⁸⁷ | SO₃H | H | H | SO₃H | Methyl | Methyl | CONH₂ | 2-Sulfoethyl | Methyl | 3-Methoxy propyl | H |
| 2a⁸⁸⁸ | H | SO₃H | SO₃H | H | | | | | | | |
| 2a⁸⁸⁹ | SO₃H | H | H | SO₃H | Methyl | Methyl | CONH₂ | 2-Sulfoethyl | Methyl | 3-Chloropropyl | H |
| 2a⁸⁹⁰ | H | SO₃H | SO₃H | H | | | | | | | |
| 2a⁸⁹¹ | SO₃H | H | H | SO₃H | Methyl | Methyl | CONH₂ | 2-Sulfoethyl | Methyl | 2-Methyl thioethyl | H |
| 2a⁸⁹² | H | SO₃H | SO₃H | H | | | | | | | |
| 2a⁸⁹³ | SO₃H | H | H | SO₃H | Methyl | Methyl | CONH₂ | 2-Sulfoethyl | Methyl | 2-Fluoroethyl | H |
| 2a⁸⁹⁴ | H | SO₃H | SO₃H | H | | | | | | | |
| 2a⁸⁹⁵ | SO₃H | H | H | SO₃H | Methyl | Methyl | CONH₂ | 2-Sulfoethyl | Methyl | 2-Chloro ethyl | H |
| 2a⁸⁹⁶ | H | SO₃H | SO₃H | H | | | | | | | |
| 2a⁸⁹⁷ | SO₃H | H | H | SO₃H | Methyl | Methyl | CONH₂ | 2-Sulfoethyl | Methyl | 2-(2-Hydroxy ethyl sulfonyl)ethyl | H |
| 2a⁸⁹⁸ | H | SO₃H | SO₃H | H | | | | | | | |
| 2a⁸⁹⁹ | SO₃H | H | H | SO₃H | Methyl | Methyl | CONH₂ | 2-Sulfoethyl | Methyl | 2-(2-tert Butyl sulfanyl ethyl sulfonyl)ethyl | H |
| 2a⁹⁰⁰ | H | SO₃H | SO₃H | H | | | | | | | |
| 2a⁹⁰¹ | SO₃H | H | H | SO₃H | Methyl | Methyl | CONH₂ | 2-Sulfoethyl | Methyl | 2-(2-Hydroxy ethoxy)propyl | H |
| 2a⁹⁰² | H | SO₃H | SO₃H | H | | | | | | | |
| 2a⁹⁰³ | SO₃H | H | H | SO₃H | Methyl | Methyl | CONH₂ | 2-Sulfoethyl | Methyl | 2-(2-Hydroxy ethoxy)ethyl | H |
| 2a⁹⁰⁴ | H | SO₃H | SO₃H | H | | | | | | | |
| 2a⁹⁰⁵ | SO₃H | H | H | SO₃H | Methyl | Methyl | CONH₂ | 2-Sulfoethyl | Methyl | 3-(4-Hydroxy butoxy)propyl | H |
| 2a⁹⁰⁶ | H | SO₃H | SO₃H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{907}$ | SO$_3$H | H | H | SO$_3$H | Methyl | Methyl | CONH$_2$ | 2-Sulfoethyl | Methyl | 3-(2-Phenoxy ethoxyl)propyl | H |
| 2a$^{908}$ | H | SO$_3$H | SO$_3$H | H | | | | | | | |
| 2a$^{909}$ | SO$_3$H | H | H | SO$_3$H | Methyl | Methyl | CONH$_2$ | 2-Sulfoethyl | Methyl | 3-Isopropxy propyl | H |
| 2a$^{910}$ | H | SO$_3$H | SO$_3$H | H | | | | | | | |
| 2a$^{911}$ | SO$_3$H | H | H | SO$_3$H | Methyl | Methyl | CONH$_2$ | 2-Sulfoethyl | Methyl | 3-Ethoxy propyl | H |
| 2a$^{912}$ | H | SO$_3$H | SO$_3$H | H | | | | | | | |
| 2a$^{913}$ | SO$_3$H | H | H | SO$_3$H | Methyl | Methyl | CONH$_2$ | 2-Sulfoethyl | Methyl | 3-Ethoxy butyl | H |
| 2a$^{914}$ | H | SO$_3$H | SO$_3$H | H | | | | | | | |
| 2a$^{915}$ | SO$_3$H | H | H | SO$_3$H | Methyl | Methyl | CONH$_2$ | 2-Sulfoethyl | Methyl | 4-(2-Hydroxy ethane2-sulfonyl)-phenyl | H |
| 2a$^{916}$ | H | SO$_3$H | SO$_3$H | H | | | | | | | |
| 2a$^{917}$ | SO$_3$H | H | H | SO$_3$H | NHCOCH$_3$ | OMe | CN | 2-Sulfoethyl | Methyl | Methyl | H |
| 2a$^{918}$ | H | SO$_3$H | SO$_3$H | H | | | | | | | |
| 2a$^{919}$ | SO$_3$H | H | H | SO$_3$H | NHCOCH$_3$ | OMe | CN | 2-Sulfoethyl | Methyl | Ethyl | H |
| 2a$^{920}$ | H | SO$_3$H | SO$_3$H | H | | | | | | | |
| 2a$^{921}$ | SO$_3$H | H | H | SO$_3$H | NHCOCH$_3$ | OMe | CN | 2-Sulfoethyl | Methyl | n-Propyl | H |
| 2a$^{922}$ | H | SO$_3$H | SO$_3$H | H | | | | | | | |
| 2a$^{923}$ | SO$_3$H | H | H | SO$_3$H | NHCOCH$_3$ | OMe | CN | 2-Sulfoethyl | Methyl | Isopropyl | H |
| 2a$^{924}$ | H | SO$_3$H | SO$_3$H | H | | | | | | | |
| 2a$^{925}$ | SO$_3$H | H | H | SO$_3$H | NHCOCH$_3$ | OMe | CN | 2-Sulfoethyl | Methyl | 1-Ethyl propyl | H |
| 2a$^{926}$ | H | SO$_3$H | SO$_3$H | H | | | | | | | |
| 2a$^{927}$ | SO$_3$H | H | H | SO$_3$H | NHCOCH$_3$ | OMe | CN | 2-Sulfoethyl | Methyl | 1,2-Dimethyl propyl | H |
| 2a$^{928}$ | H | SO$_3$H | SO$_3$H | H | | | | | | | |
| 2a$^{929}$ | SO$_3$H | H | H | SO$_3$H | NHCOCH$_3$ | OMe | CN | 2-Sulfoethyl | Methyl | 2,2-Dimethyl propyl | H |
| 2a$^{930}$ | H | SO$_3$H | SO$_3$H | H | | | | | | | |
| 2a$^{931}$ | SO$_3$H | H | H | SO$_3$H | NHCOCH$_3$ | OMe | CN | 2-Sulfoethyl | Methyl | Butyl | H |
| 2a$^{932}$ | H | SO$_3$H | SO$_3$H | H | | | | | | | |
| 2a$^{933}$ | SO$_3$H | H | H | SO$_3$H | NHCOCH$_3$ | OMe | CN | 2-Sulfoethyl | Methyl | 2-Methyl butyl | H |
| 2a$^{934}$ | H | SO$_3$H | SO$_3$H | H | | | | | | | |
| 2a$^{935}$ | SO$_3$H | H | H | SO$_3$H | NHCOCH$_3$ | OMe | CN | 2-Sulfoethyl | Methyl | Tert butyl | H |
| 2a$^{936}$ | H | SO$_3$H | SO$_3$H | H | | | | | | | |
| 2a$^{937}$ | SO$_3$H | H | H | SO$_3$H | NHCOCH$_3$ | OMe | CN | 2-Sulfoethyl | Methyl | 3-Methyl butyl | H |
| 2a$^{938}$ | H | SO$_3$H | SO$_3$H | H | | | | | | | |
| 2a$^{939}$ | SO$_3$H | H | H | SO$_3$H | NHCOCH$_3$ | OMe | CN | 2-Sulfoethyl | Methyl | Sec butyl | H |
| 2a$^{940}$ | H | SO$_3$H | SO$_3$H | H | | | | | | | |
| 2a$^{941}$ | SO$_3$H | H | H | SO$_3$H | NHCOCH$_3$ | OMe | CN | 2-Sulfoethyl | Methyl | Pentyl | H |
| 2a$^{942}$ | H | SO$_3$H | SO$_3$H | H | | | | | | | |
| 2a$^{943}$ | SO$_3$H | H | H | SO$_3$H | NHCOCH$_3$ | OMe | CN | 2-Sulfoethyl | Methyl | Hexyl | H |
| 2a$^{944}$ | H | SO$_3$H | SO$_3$H | H | | | | | | | |
| 2a$^{945}$ | SO$_3$H | H | H | SO$_3$H | NHCOCH$_3$ | OMe | CN | 2-Sulfoethyl | Methyl | Cyclobutyl | H |
| 2a$^{946}$ | H | SO$_3$H | SO$_3$H | H | | | | | | | |
| 2a$^{947}$ | SO$_3$H | H | H | SO$_3$H | NHCOCH$_3$ | OMe | CN | 2-Sulfoethyl | Methyl | Cyclopentyl | H |
| 2a$^{948}$ | H | SO$_3$H | SO$_3$H | H | | | | | | | |
| 2a$^{949}$ | SO$_3$H | H | H | SO$_3$H | NHCOCH$_3$ | OMe | CN | 2-Sulfoethyl | Methyl | Cyclohexyl | H |
| 2a$^{950}$ | H | SO$_3$H | SO$_3$H | H | | | | | | | |
| 2a$^{951}$ | SO$_3$H | H | H | SO$_3$H | NHCOCH$_3$ | OMe | CN | 2-Sulfoethyl | Methyl | 2-Methyl cyclohexyl | H |
| 2a$^{952}$ | H | SO$_3$H | SO$_3$H | H | | | | | | | |
| 2a$^{953}$ | SO$_3$H | H | H | SO$_3$H | NHCOCH$_3$ | OMe | CN | 2-Sulfoethyl | Methyl | 3-Methyl cyclohexyl | H |
| 2a$^{954}$ | H | SO$_3$H | SO$_3$H | H | | | | | | | |
| 2a$^{955}$ | SO$_3$H | H | H | SO$_3$H | NHCOCH$_3$ | OMe | CN | 2-Sulfoethyl | Methyl | Pentan-2-yl | H |
| 2a$^{956}$ | H | SO$_3$H | SO$_3$H | H | | | | | | | |
| 2a$^{957}$ | SO$_3$H | H | H | SO$_3$H | NHCOCH$_3$ | OMe | CN | 2-Sulfoethyl | Methyl | 2-Ethylhexyl | H |
| 2a$^{958}$ | H | SO$_3$H | SO$_3$H | H | | | | | | | |
| 2a$^{959}$ | SO$_3$H | H | H | SO$_3$H | NHCOCH$_3$ | OMe | CN | 2-Sulfoethyl | Methyl | Phenyl | H |
| 2a$^{960}$ | H | SO$_3$H | SO$_3$H | H | | | | | | | |
| 2a$^{961}$ | SO$_3$H | H | H | SO$_3$H | NHCOCH$_3$ | OMe | CN | 2-Sulfoethyl | Methyl | Benzyl | H |
| 2a$^{962}$ | H | SO$_3$H | SO$_3$H | H | | | | | | | |
| 2a$^{963}$ | SO$_3$H | H | H | SO$_3$H | NHCOCH$_3$ | OMe | CN | 2-Sulfoethyl | Methyl | Allyl | H |
| 2a$^{964}$ | H | SO$_3$H | SO$_3$H | H | | | | | | | |
| 2a$^{965}$ | SO$_3$H | H | H | SO$_3$H | NHCOCH$_3$ | OMe | CN | 2-Sulfoethyl | Methyl | 2-Methoxy ethyl | H |
| 2a$^{966}$ | H | SO$_3$H | SO$_3$H | H | | | | | | | |
| 2a$^{967}$ | SO$_3$H | H | H | SO$_3$H | NHCOCH$_3$ | OMe | CN | 2-Sulfoethyl | Methyl | 3-Methoxy propyl | H |
| 2a$^{968}$ | H | SO$_3$H | SO$_3$H | H | | | | | | | |
| 2a$^{969}$ | SO$_3$H | H | H | SO$_3$H | NHCOCH$_3$ | OMe | CN | 2-Sulfoethyl | Methyl | 3-Chloropropyl | H |
| 2a$^{970}$ | H | SO$_3$H | SO$_3$H | H | | | | | | | |
| 2a$^{971}$ | SO$_3$H | H | H | SO$_3$H | NHCOCH$_3$ | OMe | CN | 2-Sulfoethyl | Methyl | 2-Methyl thioethyl | H |
| 2a$^{972}$ | H | SO$_3$H | SO$_3$H | H | | | | | | | |
| 2a$^{973}$ | SO$_3$H | H | H | SO$_3$H | NHCOCH$_3$ | OMe | CN | 2-Sulfoethyl | Methyl | 2-Fluoroethyl | H |
| 2a$^{974}$ | H | SO$_3$H | SO$_3$H | H | | | | | | | |
| 2a$^{975}$ | SO$_3$H | H | H | SO$_3$H | NHCOCH$_3$ | OMe | CN | 2-Sulfoethyl | Methyl | 2-Chloro ethyl | H |
| 2a$^{976}$ | H | SO$_3$H | SO$_3$H | H | | | | | | | |
| 2a$^{977}$ | SO$_3$H | H | H | SO$_3$H | NHCOCH$_3$ | OMe | CN | 2-Sulfoethyl | Methyl | 2-(2-Hydroxy ethyl sulfonyl)ethyl | H |
| 2a$^{978}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{979}$ | SO$_3$H | H | H | SO$_3$H | NHCOCH$_3$ | OMe | CN | 2-Sulfoethyl | Methyl | 2-(2-tert Butyl sulfanyl ethyl sulfonyl)ethyl | H |
| 2a$^{980}$ | H | SO$_3$H | SO$_3$H | H | | | | | | | |
| 2a$^{981}$ | SO$_3$H | H | H | SO$_3$H | NHCOCH$_3$ | OMe | CN | 2-Sulfoethyl | Methyl | 2-(2-Hydroxy ethoxy)propyl | H |
| 2a$^{982}$ | H | SO$_3$H | SO$_3$H | H | | | | | | | |
| 2a$^{983}$ | SO$_3$H | H | H | SO$_3$H | NHCOCH$_3$ | OMe | CN | 2-Sulfoethyl | Methyl | 2-(2-Hydroxy ethoxy)ethyl | H |
| 2a$^{984}$ | H | SO$_3$H | SO$_3$H | H | | | | | | | |
| 2a$^{985}$ | SO$_3$H | H | H | SO$_3$H | NHCOCH$_3$ | OMe | CN | 2-Sulfoethyl | Methyl | 3-(4-Hydroxy butoxy)propyl | H |
| 2a$^{986}$ | H | SO$_3$H | SO$_3$H | H | | | | | | | |
| 2a$^{987}$ | SO$_3$H | H | H | SO$_3$H | NHCOCH$_3$ | OMe | CN | 2-Sulfoethyl | Methyl | 3-(2-Phenoxy ethoxyl)propyl | H |
| 2a$^{988}$ | H | SO$_3$H | SO$_3$H | H | | | | | | | |
| 2a$^{989}$ | SO$_3$H | H | H | SO$_3$H | NHCOCH$_3$ | OMe | CN | 2-Sulfoethyl | Methyl | 3-Isopropxy propyl | H |
| 2a$^{990}$ | H | SO$_3$H | SO$_3$H | H | | | | | | | |
| 2a$^{991}$ | SO$_3$H | H | H | SO$_3$H | NHCOCH$_3$ | OMe | CN | 2-Sulfoethyl | Methyl | 3-Ethoxy propyl | H |
| 2a$^{992}$ | H | SO$_3$H | SO$_3$H | H | | | | | | | |
| 2a$^{993}$ | SO$_3$H | H | H | SO$_3$H | NHCOCH$_3$ | OMe | CN | 2-Sulfoethyl | Methyl | 3-Ethoxy butyl | H |
| 2a$^{994}$ | H | SO$_3$H | SO$_3$H | H | | | | | | | |
| 2a$^{995}$ | SO$_3$H | H | H | SO$_3$H | NHCOCH$_3$ | OMe | CN | 2-Sulfoethyl | Methyl | 4-(2-Hydroxy ethane sulfonyl)phenyl | H |
| 2a$^{996}$ | H | SO$_3$H | SO$_3$H | H | | | | | | | |
| 2a$^{997}$ | SO$_3$H | H | H | SO$_3$H | NHCOCH$_3$ | OMe | CONH$_2$ | 2-Sulfoethyl | Methyl | Methyl | H |
| 2a$^{998}$ | H | SO$_3$H | SO$_3$H | H | | | | | | | |
| 2a$^{999}$ | SO$_3$H | H | H | SO$_3$H | NHCOCH$_3$ | OMe | CONH$_2$ | 2-Sulfoethyl | Methyl | Ethyl | H |
| 2a$^{1000}$ | H | SO$_3$H | SO$_3$H | H | | | | | | | |
| 2a$^{1001}$ | SO$_3$H | H | H | SO$_3$H | NHCOCH$_3$ | OMe | CONH$_2$ | 2-Sulfoethyl | Methyl | n-Propyl | H |
| 2a$^{1002}$ | H | SO$_3$H | SO$_3$H | H | | | | | | | |
| 2a$^{1003}$ | SO$_3$H | H | H | SO$_3$H | NHCOCH$_3$ | OMe | CONH$_2$ | 2-Sulfoethyl | Methyl | Isopropyl | H |
| 2a$^{1004}$ | H | SO$_3$H | SO$_3$H | H | | | | | | | |
| 2a$^{1005}$ | SO$_3$H | H | H | SO$_3$H | NHCOCH$_3$ | OMe | CONH$_2$ | 2-Sulfoethyl | Methyl | 1-Ethyl propyl | H |
| 2a$^{1006}$ | H | SO$_3$H | SO$_3$H | H | | | | | | | |
| 2a$^{1007}$ | SO$_3$H | H | H | SO$_3$H | NHCOCH$_3$ | OMe | CONH$_2$ | 2-Sulfoethyl | Methyl | 1,2-Dimethyl propyl | H |
| 2a$^{1008}$ | H | SO$_3$H | SO$_3$H | H | | | | | | | |
| 2a$^{1009}$ | SO$_3$H | H | H | SO$_3$H | NHCOCH$_3$ | OMe | CONH$_2$ | 2-Sulfoethyl | Methyl | 2,2-Dimethyl propyl | H |
| 2a$^{1010}$ | H | SO$_3$H | SO$_3$H | H | | | | | | | |
| 2a$^{1011}$ | SO$_3$H | H | H | SO$_3$H | NHCOCH$_3$ | OMe | CONH$_2$ | 2-Sulfoethyl | Methyl | Butyl | H |
| 2a$^{1012}$ | H | SO$_3$H | SO$_3$H | H | | | | | | | |
| 2a$^{1013}$ | SO$_3$H | H | H | SO$_3$H | NHCOCH$_3$ | OMe | CONH$_2$ | 2-Sulfoethyl | Methyl | 2-Methyl butyl | H |
| 2a$^{1014}$ | H | SO$_3$H | SO$_3$H | H | | | | | | | |
| 2a$^{1015}$ | SO$_3$H | H | H | SO$_3$H | NHCOCH$_3$ | OMe | CONH$_2$ | 2-Sulfoethyl | Methyl | Tert butyl | H |
| 2a$^{1016}$ | H | SO$_3$H | SO$_3$H | H | | | | | | | |
| 2a$^{1017}$ | SO$_3$H | H | H | SO$_3$H | NHCOCH$_3$ | OMe | CONH$_2$ | 2-Sulfoethyl | Methyl | 3-Methyl butyl | H |
| 2a$^{1018}$ | H | SO$_3$H | SO$_3$H | H | | | | | | | |
| 2a$^{1019}$ | SO$_3$H | H | H | SO$_3$H | NHCOCH$_3$ | OMe | CONH$_2$ | 2-Sulfoethyl | Methyl | Sec butyl | H |
| 2a$^{1020}$ | H | SO$_3$H | SO$_3$H | H | | | | | | | |
| 2a$^{1021}$ | SO$_3$H | H | H | SO$_3$H | NHCOCH$_3$ | OMe | CONH$_2$ | 2-Sulfoethyl | Methyl | Pentyl | H |
| 2a$^{1022}$ | H | SO$_3$H | SO$_3$H | H | | | | | | | |
| 2a$^{1023}$ | SO$_3$H | H | H | SO$_3$H | NHCOCH$_3$ | OMe | CONH$_2$ | 2-Sulfoethyl | Methyl | Hexyl | H |
| 2a$^{1024}$ | H | SO$_3$H | SO$_3$H | H | | | | | | | |
| 2a$^{1025}$ | SO$_3$H | H | H | SO$_3$H | NHCOCH$_3$ | OMe | CONH$_2$ | 2-Sulfoethyl | Methyl | Cyclobutyl | H |
| 2a$^{1026}$ | H | SO$_3$H | SO$_3$H | H | | | | | | | |
| 2a$^{1027}$ | SO$_3$H | H | H | SO$_3$H | NHCOCH$_3$ | OMe | CONH$_2$ | 2-Sulfoethyl | Methyl | Cyclopentyl | H |
| 2a$^{1028}$ | H | SO$_3$H | SO$_3$H | H | | | | | | | |
| 2a$^{1029}$ | SO$_3$H | H | H | SO$_3$H | NHCOCH$_3$ | OMe | CONH$_2$ | 2-Sulfoethyl | Methyl | Cyclohexyl | H |
| 2a$^{1030}$ | H | SO$_3$H | SO$_3$H | H | | | | | | | |
| 2a$^{1031}$ | SO$_3$H | H | H | SO$_3$H | NHCOCH$_3$ | OMe | CONH$_2$ | 2-Sulfoethyl | Methyl | 2-Methyl cyclohexyl | H |
| 2a$^{1032}$ | H | SO$_3$H | SO$_3$H | H | | | | | | | |
| 2a$^{1033}$ | SO$_3$H | H | H | SO$_3$H | NHCOCH$_3$ | OMe | CONH$_2$ | 2-Sulfoethyl | Methyl | 3-Methyl cyclohexyl | H |
| 2a$^{1034}$ | H | SO$_3$H | SO$_3$H | H | | | | | | | |
| 2a$^{1035}$ | SO$_3$H | H | H | SO$_3$H | NHCOCH$_3$ | OMe | CONH$_2$ | 2-Sulfoethyl | Methyl | Pentan-2-yl | H |
| 2a$^{1036}$ | H | SO$_3$H | SO$_3$H | H | | | | | | | |
| 2a$^{1037}$ | SO$_3$H | H | H | SO$_3$H | NHCOCH$_3$ | OMe | CONH$_2$ | 2-Sulfoethyl | Methyl | 2-Ethylhexyl | H |
| 2a$^{1038}$ | H | SO$_3$H | SO$_3$H | H | | | | | | | |
| 2a$^{1039}$ | SO$_3$H | H | H | SO$_3$H | NHCOCH$_3$ | OMe | CONH$_2$ | 2-Sulfoethyl | Methyl | Phenyl | H |
| 2a$^{1040}$ | H | SO$_3$H | SO$_3$H | H | | | | | | | |
| 2a$^{1041}$ | SO$_3$H | H | H | SO$_3$H | NHCOCH$_3$ | OMe | CONH$_2$ | 2-Sulfoethyl | Methyl | Benzyl | H |
| 2a$^{1042}$ | H | SO$_3$H | SO$_3$H | H | | | | | | | |
| 2a$^{1043}$ | SO$_3$H | H | H | SO$_3$H | NHCOCH$_3$ | OMe | CONH$_2$ | 2-Sulfoethyl | Methyl | Allyl | H |
| 2a$^{1044}$ | H | SO$_3$H | SO$_3$H | H | | | | | | | |
| 2a$^{1045}$ | SO$_3$H | H | H | SO$_3$H | NHCOCH$_3$ | OMe | CONH$_2$ | 2-Sulfoethyl | Methyl | 2-Methoxy ethyl | H |
| 2a$^{1046}$ | H | SO$_3$H | SO$_3$H | H | | | | | | | |
| 2a$^{1047}$ | SO$_3$H | H | H | SO$_3$H | NHCOCH$_3$ | OMe | CONH$_2$ | 2-Sulfoethyl | Methyl | 3-Methoxy propyl | H |
| 2a$^{1048}$ | H | SO$_3$H | SO$_3$H | H | | | | | | | |
| 2a$^{1049}$ | SO$_3$H | H | H | SO$_3$H | NHCOCH$_3$ | OMe | CONH$_2$ | 2-Sulfoethyl | Methyl | 3-Chloropropyl | H |
| 2a$^{1050}$ | H | SO$_3$H | SO$_3$H | H | | | | | | | |
| 2a$^{1051}$ | SO$_3$H | H | H | SO$_3$H | NHCOCH$_3$ | OMe | CONH$_2$ | 2-Sulfoethyl | Methyl | 2-Methyl thioethyl | H |
| 2a$^{1052}$ | H | SO$_3$H | SO$_3$H | H | | | | | | | |

TABLE 3-continued

| S/No | R³ᵃ | R⁴ᵃ | R⁵ᵃ | R⁶ᵃ | R¹⁰ᵃ/R¹⁴ᵃ | R⁹ᵃ/R¹³ᵃ | R²⁴ᵃ/R³⁰ᵃ | R²⁷ᵃ/R³³ᵃ | R²⁶ᵃ/R³⁴ᵃ | R²⁵ᵃ/R³¹ᵃ | R²⁶ᵃ/R³²ᵃ |
|---|---|---|---|---|---|---|---|---|---|---|---|
| 2a¹⁰⁵³ | SO₃H | H | H | SO₃H | NHCOCH₃ | OMe | CONH₂ | 2-Sulfoethyl | Methyl | 2-Fluoroethyl | H |
| 2a¹⁰⁵⁴ | H | SO₃H | SO₃H | H | | | | | | | |
| 2a¹⁰⁵⁵ | SO₃H | H | H | SO₃H | NHCOCH₃ | OMe | CONH₂ | 2-Sulfoethyl | Methyl | 2-Chloro ethyl | H |
| 2a¹⁰⁵⁶ | H | SO₃H | SO₃H | H | | | | | | | |
| 2a¹⁰⁵⁷ | SO₃H | H | H | SO₃H | NHCOCH₃ | OMe | CONH₂ | 2-Sulfoethyl | Methyl | 2-(2-Hydroxy ethyl sulfonyl)ethyl | H |
| 2a¹⁰⁵⁸ | H | SO₃H | SO₃H | H | | | | | | | |
| 2a¹⁰⁵⁹ | SO₃H | H | H | SO₃H | NHCOCH₃ | OMe | CONH₂ | 2-Sulfoethyl | Methyl | 2-(2-tert Butyl sulfanyl ethyl sulfonyl)ethyl | H |
| 2a¹⁰⁶⁰ | H | SO₃H | SO₃H | H | | | | | | | |
| 2a¹⁰⁶¹ | SO₃H | H | H | SO₃H | NHCOCH₃ | OMe | CONH₂ | 2-Sulfoethyl | Methyl | 2-(2-Hydroxy ethoxy)propyl | H |
| 2a¹⁰⁶² | H | SO₃H | SO₃H | H | | | | | | | |
| 2a¹⁰⁶³ | SO₃H | H | H | SO₃H | NHCOCH₃ | OMe | CONH₂ | 2-Sulfoethyl | Methyl | 2-(2-Hydroxy ethoxy)ethyl | H |
| 2a¹⁰⁶⁴ | H | SO₃H | SO₃H | H | | | | | | | |
| 2a¹⁰⁶⁵ | SO₃H | H | H | SO₃H | NHCOCH₃ | OMe | CONH₂ | 2-Sulfoethyl | Methyl | 3-(4-Hydroxy butoxy)propyl | H |
| 2a¹⁰⁶⁶ | H | SO₃H | SO₃H | H | | | | | | | |
| 2a¹⁰⁶⁷ | SO₃H | H | H | SO₃H | NHCOCH₃ | OMe | CONH₂ | 2-Sulfoethyl | Methyl | 3-(2-Phenoxy ethoxyl)propyl | H |
| 2a¹⁰⁶⁸ | H | SO₃H | SO₃H | H | | | | | | | |
| 2a¹⁰⁶⁹ | SO₃H | H | H | SO₃H | NHCOCH₃ | OMe | CONH₂ | 2-Sulfoethyl | Methyl | 3-Isopropxy propyl | H |
| 2a¹⁰⁷⁰ | H | SO₃H | SO₃H | H | | | | | | | |
| 2a¹⁰⁷¹ | SO₃H | H | H | SO₃H | NHCOCH₃ | OMe | CONH₂ | 2-Sulfoethyl | Methyl | 3-Ethoxy propyl | H |
| 2a¹⁰⁷² | H | SO₃H | SO₃H | H | | | | | | | |
| 2a¹⁰⁷³ | SO₃H | H | H | SO₃H | NHCOCH₃ | OMe | CONH₂ | 2-Sulfoethyl | Methyl | 3-Ethoxy butyl | H |
| 2a¹⁰⁷⁴ | H | SO₃H | SO₃H | H | | | | | | | |
| 2a¹⁰⁷⁵ | SO₃H | H | H | SO₃H | NHCOCH₃ | OMe | CONH₂ | 2-Sulfoethyl | Methyl | 4-(2-Hydroxy ethane sulfonyl)phenyl | H |
| 2a¹⁰⁷⁶ | H | SO₃H | SO₃H | H | | | | | | | |
| 2a¹⁰⁷⁷ | SO₃H | H | H | SO₃H | Methyl | Methyl | CN | 2-Carboxyethyl | H | Methyl | H |
| 2a¹⁰⁷⁸ | H | SO₃H | SO₃H | H | | | | | | | |
| 2a¹⁰⁷⁹ | SO₃H | H | H | SO₃H | Methyl | Methyl | CN | 2-Carboxyethyl | H | Ethyl | H |
| 2a¹⁰⁸⁰ | H | SO₃H | SO₃H | H | | | | | | | |
| 2a¹⁰⁸¹ | SO₃H | H | H | SO₃H | Methyl | Methyl | CN | 2-Carboxyethyl | H | n-Propyl | H |
| 2a¹⁰⁸² | H | SO₃H | SO₃H | H | | | | | | | |
| 2a¹⁰⁸³ | SO₃H | H | H | SO₃H | Methyl | Methyl | CN | 2-Carboxyethyl | H | Isopropyl | H |
| 2a¹⁰⁸⁴ | H | SO₃H | SO₃H | H | | | | | | | |
| 2a¹⁰⁸⁵ | SO₃H | H | H | SO₃H | Methyl | Methyl | CN | 2-Carboxyethyl | H | 1-Ethyl propyl | H |
| 2a¹⁰⁸⁶ | H | SO₃H | SO₃H | H | | | | | | | |
| 2a¹⁰⁸⁷ | SO₃H | H | H | SO₃H | Methyl | Methyl | CN | 2-Carboxyethyl | H | 1,2-Dimethyl propyl | H |
| 2a¹⁰⁸⁸ | H | SO₃H | SO₃H | H | | | | | | | |
| 2a¹⁰⁸⁹ | SO₃H | H | H | SO₃H | Methyl | Methyl | CN | 2-Carboxyethyl | H | 2,2-Dimethyl propyl | H |
| 2a¹⁰⁹¹ | H | SO₃H | SO₃H | H | | | | | | | |
| 2a¹⁰⁹² | SO₃H | H | H | SO₃H | Methyl | Methyl | CN | 2-Carboxyethyl | H | Butyl | H |
| 2a¹⁰⁹³ | H | SO₃H | SO₃H | H | | | | | | | |
| 2a¹⁰⁹⁴ | SO₃H | H | H | SO₃H | Methyl | Methyl | CN | 2-Carboxyethyl | H | 2-Methyl butyl | H |
| 2a¹⁰⁹⁵ | H | SO₃H | SO₃H | H | | | | | | | |
| 2a¹⁰⁹⁶ | SO₃H | H | H | SO₃H | Methyl | Methyl | CN | 2-Carboxyethyl | H | Tert butyl | H |
| 2a¹⁰⁹⁷ | H | SO₃H | SO₃H | H | | | | | | | |
| 2a¹⁰⁹⁸ | SO₃H | H | H | SO₃H | Methyl | Methyl | CN | 2-Carboxyethyl | H | 3-Methyl butyl | H |
| 2a¹⁰⁹⁹ | H | SO₃H | SO₃H | H | | | | | | | |
| 2a¹¹⁰⁰ | SO₃H | H | H | SO₃H | Methyl | Methyl | CN | 2-Carboxyethyl | H | Sec butyl | H |
| 2a¹¹⁰¹ | H | SO₃H | SO₃H | H | | | | | | | |
| 2a¹¹⁰² | SO₃H | H | H | SO₃H | Methyl | Methyl | CN | 2-Carboxyethyl | H | Pentyl | H |
| 2a¹¹⁰³ | H | SO₃H | SO₃H | H | | | | | | | |
| 2a¹¹⁰⁴ | SO₃H | H | H | SO₃H | Methyl | Methyl | CN | 2-Carboxyethyl | H | Hexyl | H |
| 2a¹¹⁰⁵ | H | SO₃H | SO₃H | H | | | | | | | |
| 2a¹¹⁰⁶ | SO₃H | H | H | SO₃H | Methyl | Methyl | CN | 2-Carboxyethyl | H | Cyclobutyl | H |
| 2a¹¹⁰⁷ | H | SO₃H | SO₃H | H | | | | | | | |
| 2a¹¹⁰⁸ | SO₃H | H | H | SO₃H | Methyl | Methyl | CN | 2-Carboxyethyl | H | Cyclopentyl | H |
| 2a¹¹⁰⁹ | H | SO₃H | SO₃H | H | | | | | | | |
| 2a¹¹¹⁰ | SO₃H | H | H | SO₃H | Methyl | Methyl | CN | 2-Carboxyethyl | H | Cyclohexyl | H |
| 2a¹¹¹¹ | H | SO₃H | SO₃H | H | | | | | | | |
| 2a¹¹¹² | SO₃H | H | H | SO₃H | Methyl | Methyl | CN | 2-Carboxyethyl | H | 2-Methyl cyclohexyl | H |
| 2a¹¹¹³ | H | SO₃H | SO₃H | H | | | | | | | |
| 2a¹¹¹⁴ | SO₃H | H | H | SO₃H | Methyl | Methyl | CN | 2-Carboxyethyl | H | 3-Methyl cyclohexyl | H |
| 2a¹¹¹⁵ | H | SO₃H | SO₃H | H | | | | | | | |
| 2a¹¹¹⁶ | SO₃H | H | H | SO₃H | Methyl | Methyl | CN | 2-Carboxyethyl | H | Pentan-2-yl | H |
| 2a¹¹¹⁷ | H | SO₃H | SO₃H | H | | | | | | | |
| 2a¹¹¹⁸ | SO₃H | H | H | SO₃H | Methyl | Methyl | CN | 2-Carboxyethyl | H | 2-Ethylhexyl | H |
| 2a¹¹¹⁹ | H | SO₃H | SO₃H | H | | | | | | | |
| 2a¹¹²⁰ | SO₃H | H | H | SO₃H | Methyl | methyl | CN | 2-Carboxyethyl | H | Phenyl | H |
| 2a¹¹²¹ | H | SO₃H | SO₃H | H | | | | | | | |
| 2a¹¹²² | SO₃H | H | H | SO₃H | Methyl | methyl | CN | 2-Carboxyethyl | H | Benzyl | H |
| 2a¹¹²³ | H | SO₃H | SO₃H | H | | | | | | | |
| 2a¹¹²⁴ | SO₃H | H | H | SO₃H | Methyl | Methyl | CN | 2-Carboxyethyl | H | Allyl | H |
| 2a¹¹²⁵ | H | SO₃H | SO₃H | H | | | | | | | |
| 2a¹¹²⁶ | SO₃H | H | H | SO₃H | Methyl | Methyl | CN | 2-Carboxyethyl | H | 2-Methoxy ethyl | H |
| 2a¹¹²⁷ | H | SO₃H | SO₃H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{1128}$ | SO$_3$H | H | H | SO$_3$H | Methyl | Methyl | CN | 2-Carboxyethyl | H | 3-Methoxy propyl | H |
| $2a^{1129}$ | H | SO$_3$H | SO$_3$H | H | | | | | | | |
| $2a^{1130}$ | SO$_3$H | H | H | SO$_3$H | Methyl | Methyl | CN | 2-Carboxyethyl | H | 3-Chloropropyl | H |
| $2a^{1131}$ | H | SO$_3$H | SO$_3$H | H | | | | | | | |
| $2a^{1132}$ | SO$_3$H | H | H | SO$_3$H | Methyl | Methyl | CN | 2-Carboxyethyl | H | 2-Methyl thioethyl | H |
| $2a^{1133}$ | H | SO$_3$H | SO$_3$H | H | | | | | | | |
| $2a^{1134}$ | SO$_3$H | H | H | SO$_3$H | Methyl | Methyl | CN | 2-Carboxyethyl | H | 2-Fluoroethyl | H |
| $2a^{1135}$ | H | SO$_3$H | SO$_3$H | H | | | | | | | |
| $2a^{1136}$ | SO$_3$H | H | H | SO$_3$H | Methyl | Methyl | CN | 2-Carboxyethyl | H | 2-Chloro ethyl | H |
| $2a^{1137}$ | H | SO$_3$H | SO$_3$H | H | | | | | | | |
| $2a^{1138}$ | SO$_3$H | H | H | SO$_3$H | Methyl | Methyl | CN | 2-Carboxyethyl | H | 2-(2-Hydroxy ethyl sulfonyl)ethyl | H |
| $2a^{1139}$ | H | SO$_3$H | SO$_3$H | H | | | | | | | |
| $2a^{1140}$ | SO$_3$H | H | H | SO$_3$H | Methyl | Methyl | CN | 2-Carboxyethyl | H | 2-(2-tert Butyl sulfanyl ethyl sulfonyl)ethyl | H |
| $2a^{1141}$ | H | SO$_3$H | SO$_3$H | H | | | | | | | |
| $2a^{1142}$ | SO$_3$H | H | H | SO$_3$H | Methyl | Methyl | CN | 2-Carboxyethyl | H | 2-(2-Hydroxy ethoxy)propyl | H |
| $2a^{1143}$ | H | SO$_3$H | SO$_3$H | H | | | | | | | |
| $2a^{1144}$ | SO$_3$H | H | H | SO$_3$H | Methyl | Methyl | CN | 2-Carboxyethyl | H | 2-(2-Hydroxy ethoxy)ethyl | H |
| $2a^{1145}$ | H | SO$_3$H | SO$_3$H | H | | | | | | | |
| $2a^{1146}$ | SO$_3$H | H | H | SO$_3$H | Methyl | Methyl | CN | 2-Carboxyethyl | H | 3-(4-Hydroxy butoxy)propyl | H |
| $2a^{1147}$ | H | SO$_3$H | SO$_3$H | H | | | | | | | |
| $2a^{1148}$ | SO$_3$H | H | H | SO$_3$H | Methyl | Methyl | CN | 2-Carboxyethyl | H | 3-(2-Phenoxy ethoxyl)propyl | H |
| $2a^{1149}$ | H | SO$_3$H | SO$_3$H | H | | | | | | | |
| $2a^{1150}$ | SO$_3$H | H | H | SO$_3$H | Methyl | Methyl | CN | 2-Carboxyethyl | H | 3-Isopropxy propyl | H |
| $2a^{1151}$ | H | SO$_3$H | SO$_3$H | H | | | | | | | |
| $2a^{1152}$ | SO$_3$H | H | H | SO$_3$H | Methyl | Methyl | CN | 2-Carboxyethyl | H | 3-Ethoxy propyl | H |
| $2a^{1153}$ | H | SO$_3$H | SO$_3$H | H | | | | | | | |
| $2a^{1154}$ | SO$_3$H | H | H | SO$_3$H | Methyl | Methyl | CN | 2-Carboxyethyl | H | 3-Ethoxy butyl | H |
| $2a^{1155}$ | H | SO$_3$H | SO$_3$H | H | | | | | | | |
| $2a^{1156}$ | SO$_3$H | H | H | SO$_3$H | Methyl | Methyl | CN | 2-Carboxyethyl | H | 4-(2-Hydroxy ethane sulfonyl)phenyl | H |
| $2a^{1157}$ | H | SO$_3$H | SO$_3$H | H | | | | | | | |
| $2a^{1158}$ | SO$_3$H | H | H | SO$_3$H | Methyl | Methyl | CONH$_2$ | 2-Carboxyethyl | H | Methyl | H |
| $2a^{1159}$ | H | SO$_3$H | SO$_3$H | H | | | | | | | |
| $2a^{1160}$ | SO$_3$H | H | H | SO$_3$H | Methyl | Methyl | CONH$_2$ | 2-Carboxyethyl | H | Ethyl | H |
| $2a^{1161}$ | H | SO$_3$H | SO$_3$H | H | | | | | | | |
| $2a^{1162}$ | SO$_3$H | H | H | SO$_3$H | Methyl | Methyl | CONH$_2$ | 2-Carboxyethyl | H | n-Propyl | H |
| $2a^{1163}$ | H | SO$_3$H | SO$_3$H | H | | | | | | | |
| $2a^{1164}$ | SO$_3$H | H | H | SO$_3$H | Methyl | Methyl | CONH$_2$ | 2-Carboxyethyl | H | Isopropyl | H |
| $2a^{1165}$ | H | SO$_3$H | SO$_3$H | H | | | | | | | |
| $2a^{1166}$ | SO$_3$H | H | H | SO$_3$H | Methyl | Methyl | CONH$_2$ | 2-Carboxyethyl | H | 1-Ethyl propyl | H |
| $2a^{1167}$ | H | SO$_3$H | SO$_3$H | H | | | | | | | |
| $2a^{1168}$ | SO$_3$H | H | H | SO$_3$H | Methyl | Methyl | CONH$_2$ | 2-Carboxyethyl | H | 1,2-Dimethyl propyl | H |
| $2a^{1169}$ | H | SO$_3$H | SO$_3$H | H | | | | | | | |
| $2a^{1170}$ | SO$_3$H | H | H | SO$_3$H | Methyl | Methyl | CONH$_2$ | 2-Carboxyethyl | H | 2,2-Dimethyl propyl | H |
| $2a^{1171}$ | H | SO$_3$H | SO$_3$H | H | | | | | | | |
| $2a^{1172}$ | SO$_3$H | H | H | SO$_3$H | Methyl | Methyl | CONH$_2$ | 2-Carboxyethyl | H | Butyl | H |
| $2a^{1173}$ | H | SO$_3$H | SO$_3$H | H | | | | | | | |
| $2a^{1174}$ | SO$_3$H | H | H | SO$_3$H | Methyl | Methyl | CONH$_2$ | 2-Carboxyethyl | H | 2-Methyl butyl | H |
| $2a^{1175}$ | H | SO$_3$H | SO$_3$H | H | | | | | | | |
| $2a^{1176}$ | SO$_3$H | H | H | SO$_3$H | Methyl | Methyl | CONH$_2$ | 2-Carboxyethyl | H | Tert butyl | H |
| $2a^{1177}$ | H | SO$_3$H | SO$_3$H | H | | | | | | | |
| $2a^{1178}$ | SO$_3$H | H | H | SO$_3$H | Methyl | Methyl | CONH$_2$ | 2-Carboxyethyl | H | 3-Methyl butyl | H |
| $2a^{1179}$ | H | SO$_3$H | SO$_3$H | H | | | | | | | |
| $2a^{1180}$ | SO$_3$H | H | H | SO$_3$H | Methyl | Methyl | CONH$_2$ | 2-Carboxyethyl | H | Sec butyl | H |
| $2a^{1181}$ | H | SO$_3$H | SO$_3$H | H | | | | | | | |
| $2a^{1182}$ | SO$_3$H | H | H | SO$_3$H | Methyl | Methyl | CONH$_2$ | 2-Carboxyethyl | H | Pentyl | H |
| $2a^{1183}$ | H | SO$_3$H | SO$_3$H | H | | | | | | | |
| $2a^{1184}$ | SO$_3$H | H | H | SO$_3$H | Methyl | Methyl | CONH$_2$ | 2-Carboxyethyl | H | Hexyl | H |
| $2a^{1185}$ | H | SO$_3$H | SO$_3$H | H | | | | | | | |
| $2a^{1186}$ | SO$_3$H | H | H | SO$_3$H | Methyl | Methyl | CONH$_2$ | 2-Carboxyethyl | H | Cyclobutyl | H |
| $2a^{1187}$ | H | SO$_3$H | SO$_3$H | H | | | | | | | |
| $2a^{1188}$ | SO$_3$H | H | H | SO$_3$H | Methyl | Methyl | CONH$_2$ | 2-Carboxyethyl | H | Cyclopentyl | H |
| $2a^{1189}$ | H | SO$_3$H | SO$_3$H | H | | | | | | | |
| $2a^{1190}$ | SO$_3$H | H | H | SO$_3$H | Methyl | Methyl | CONH$_2$ | 2-Carboxyethyl | H | Cyclohexyl | H |
| $2a^{1191}$ | H | SO$_3$H | SO$_3$H | H | | | | | | | |
| $2a^{1192}$ | SO$_3$H | H | H | SO$_3$H | Methyl | Methyl | CONH$_2$ | 2-Carboxyethyl | H | 2-Methyl cyclohexyl | H |
| $2a^{1193}$ | H | SO$_3$H | SO$_3$H | H | | | | | | | |
| $2a^{1194}$ | SO$_3$H | H | H | SO$_3$H | Methyl | Methyl | CONH$_2$ | 2-Carboxyethyl | H | 3-Methyl cyclohexyl | H |
| $2a^{1195}$ | H | SO$_3$H | SO$_3$H | H | | | | | | | |
| $2a^{1196}$ | SO$_3$H | H | H | SO$_3$H | Methyl | Methyl | CONH$_2$ | 2-Carboxyethyl | H | Pentan-2-yl | H |
| $2a^{1197}$ | H | SO$_3$H | SO$_3$H | H | | | | | | | |
| $2a^{1198}$ | SO$_3$H | H | H | SO$_3$H | Methyl | Methyl | CONH$_2$ | 2-Carboxyethyl | H | 2-Ethylhexyl | H |
| $2a^{1199}$ | H | SO$_3$H | SO$_3$H | H | | | | | | | |
| $2a^{1200}$ | SO$_3$H | H | H | SO$_3$H | Methyl | Methyl | CONH$_2$ | 2-Carboxyethyl | H | Phenyl | H |
| $2a^{1201}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a[1202] | SO$_3$H | H | H | SO$_3$H | Methyl | Methyl | CONH$_2$ | 2-Carboxyethyl | H | Benzyl | H |
| 2a[1203] | H | SO$_3$H | SO$_3$H | H | | | | | | | |
| 2a[1204] | SO$_3$H | H | H | SO$_3$H | Methyl | Methyl | CONH$_2$ | 2-Carboxyethyl | H | Allyl | H |
| 2a[1205] | H | SO$_3$H | SO$_3$H | H | | | | | | | |
| 2a[1206] | SO$_3$H | H | H | SO$_3$H | Methyl | Methyl | CONH$_2$ | 2-Carboxyethyl | H | 2-Methoxy ethyl | H |
| 2a[1207] | H | SO$_3$H | SO$_3$H | H | | | | | | | |
| 2a[1208] | SO$_3$H | H | H | SO$_3$H | Methyl | Methyl | CONH$_2$ | 2-Carboxyethyl | H | 3-Methoxy propyl | H |
| 2a[1209] | H | SO$_3$H | SO$_3$H | H | | | | | | | |
| 2a[1210] | SO$_3$H | H | H | SO$_3$H | Methyl | Methyl | CONH$_2$ | 2-Carboxyethyl | H | 3-Chloropropyl | H |
| 2a[1211] | H | SO$_3$H | SO$_3$H | H | | | | | | | |
| 2a[1212] | SO$_3$H | H | H | SO$_3$H | Methyl | Methyl | CONH$_2$ | 2-Carboxyethyl | H | 2-Methyl thioethyl | H |
| 2a[1213] | H | SO$_3$H | SO$_3$H | H | | | | | | | |
| 2a[1214] | SO$_3$H | H | H | SO$_3$H | Methyl | Methyl | CONH$_2$ | 2-Carboxyethyl | H | 2-Fluoroethyl | H |
| 2a[1215] | H | SO$_3$H | SO$_3$H | H | | | | | | | |
| 2a[1216] | SO$_3$H | H | H | SO$_3$H | Methyl | Methyl | CONH$_2$ | 2-Carboxyethyl | H | 2-Chloro ethyl | H |
| 2a[1217] | H | SO$_3$H | SO$_3$H | H | | | | | | | |
| 2a[1218] | SO$_3$H | H | H | SO$_3$H | Methyl | Methyl | CONH$_2$ | 2-Carboxyethyl | H | 2-(2-Hydroxy ethyl sulfonyl)ethyl | H |
| 2a[1219] | H | SO$_3$H | SO$_3$H | H | | | | | | | |
| 2a[1220] | SO$_3$H | H | H | SO$_3$H | Methyl | Methyl | CONH$_2$ | 2-Carboxyethyl | H | 2-(2-tert Butyl sulfanyl ethyl sulfonyl)ethyl | H |
| 2a[1221] | H | SO$_3$H | SO$_3$H | H | | | | | | | |
| 2a[1222] | SO$_3$H | H | H | SO$_3$H | Methyl | Methyl | CONH$_2$ | 2-Carboxyethyl | H | 2-(2-Hydroxy ethoxy)propyl | H |
| 2a[1223] | H | SO$_3$H | SO$_3$H | H | | | | | | | |
| 2a[1224] | SO$_3$H | H | H | SO$_3$H | Methyl | Methyl | CONH$_2$ | 2-Carboxyethyl | H | 2-(2-Hydroxy ethoxy)ethyl | H |
| 2a[1225] | H | SO$_3$H | SO$_3$H | H | | | | | | | |
| 2a[1226] | SO$_3$H | H | H | SO$_3$H | Methyl | Methyl | CONH$_2$ | 2-Carboxyethyl | H | 3-(4-Hydroxy butoxy)propyl | H |
| 2a[1227] | H | SO$_3$H | SO$_3$H | H | | | | | | | |
| 2a[1228] | SO$_3$H | H | H | SO$_3$H | Methyl | Methyl | CONH$_2$ | 2-Carboxyethyl | H | 3-(2-Phenoxy ethoxyl)propyl | H |
| 2a[1229] | H | SO$_3$H | SO$_3$H | H | | | | | | | |
| 2a[1230] | SO$_3$H | H | H | SO$_3$H | Methyl | Methyl | CONH$_2$ | 2-Carboxyethyl | H | 3-Isopropxy propyl | H |
| 2a[1231] | H | SO$_3$H | SO$_3$H | H | | | | | | | |
| 2a[1232] | SO$_3$H | H | H | SO$_3$H | Methyl | Methyl | CONH$_2$ | 2-Carboxyethyl | H | 3-Ethoxy propyl | H |
| 2a[1233] | H | SO$_3$H | SO$_3$H | H | | | | | | | |
| 2a[1234] | SO$_3$H | H | H | SO$_3$H | Methyl | Methyl | CONH$_2$ | 2-Carboxyethyl | H | 3-Ethoxy butyl | H |
| 2a[1235] | H | SO$_3$H | SO$_3$H | H | | | | | | | |
| 2a[1236] | SO$_3$H | H | H | SO$_3$H | Methyl | Methyl | CONH$_2$ | 2-Carboxyethyl | H | 4-(2-Hydroxy ethane sulfonyl)phenyl | H |
| 2a[1237] | H | SO$_3$H | SO$_3$H | H | | | | | | | |
| 2a[1238] | SO$_3$H | H | H | SO$_3$H | NHCOCH$_3$ | OMe | CN | 2-Carboxyethyl | H | Methyl | H |
| 2a[1239] | H | SO$_3$H | SO$_3$H | H | | | | | | | |
| 2a[1240] | SO$_3$H | H | H | SO$_3$H | NHCOCH$_3$ | OMe | CN | 2-Carboxyethyl | H | Ethyl | H |
| 2a[1241] | H | SO$_3$H | SO$_3$H | H | | | | | | | |
| 2a[1242] | SO$_3$H | H | H | SO$_3$H | NHCOCH$_3$ | OMe | CN | 2-Carboxyethyl | H | n-Propyl | H |
| 2a[1243] | H | SO$_3$H | SO$_3$H | H | | | | | | | |
| 2a[1244] | SO$_3$H | H | H | SO$_3$H | NHCOCH$_3$ | OMe | CN | 2-Carboxyethyl | H | Isopropyl | H |
| 2a[1245] | H | SO$_3$H | SO$_3$H | H | | | | | | | |
| 2a[1246] | SO$_3$H | H | H | SO$_3$H | NHCOCH$_3$ | OMe | CN | 2-Carboxyethyl | H | 1-Ethyl propyl | H |
| 2a[1247] | H | SO$_3$H | SO$_3$H | H | | | | | | | |
| 2a[1248] | SO$_3$H | H | H | SO$_3$H | NHCOCH$_3$ | OMe | CN | 2-Carboxyethyl | H | 1,2-Dimethyl propyl | H |
| 2a[1249] | H | SO$_3$H | SO$_3$H | H | | | | | | | |
| 2a[1250] | SO$_3$H | H | H | SO$_3$H | NHCOCH$_3$ | OMe | CN | 2-Carboxyethyl | H | 2,2-Dimethyl propyl | H |
| 2a[1251] | H | SO$_3$H | SO$_3$H | H | | | | | | | |
| 2a[1252] | SO$_3$H | H | H | SO$_3$H | NHCOCH$_3$ | OMe | CN | 2-Carboxyethyl | H | Butyl | H |
| 2a[1253] | H | SO$_3$H | SO$_3$H | H | | | | | | | |
| 2a[1252] | SO$_3$H | H | H | SO$_3$H | NHCOCH$_3$ | OMe | CN | 2-Carboxyethyl | H | 2-Methyl butyl | H |
| 2a[1255] | H | SO$_3$H | SO$_3$H | H | | | | | | | |
| 2a[1256] | SO$_3$H | H | H | SO$_3$H | NHCOCH$_3$ | OMe | CN | 2-Carboxyethyl | H | Tert butyl | H |
| 2a[1257] | H | SO$_3$H | SO$_3$H | H | | | | | | | |
| 2a[1258] | SO$_3$H | H | H | SO$_3$H | NHCOCH$_3$ | OMe | CN | 2-Carboxyethyl | H | 3-Methyl butyl | H |
| 2a[1259] | H | SO$_3$H | SO$_3$H | H | | | | | | | |
| 2a[1260] | SO$_3$H | H | H | SO$_3$H | NHCOCH$_3$ | OMe | CN | 2-Carboxyethyl | H | Sec butyl | H |
| 2a[1261] | H | SO$_3$H | SO$_3$H | H | | | | | | | |
| 2a[1262] | SO$_3$H | H | H | SO$_3$H | NHCOCH$_3$ | OMe | CN | 2-Carboxyethyl | H | Pentyl | H |
| 2a[1263] | H | SO$_3$H | SO$_3$H | H | | | | | | | |
| 2a[1264] | SO$_3$H | H | H | SO$_3$H | NHCOCH$_3$ | OMe | CN | 2-Carboxyethyl | H | Hexyl | H |
| 2a[1265] | H | SO$_3$H | SO$_3$H | H | | | | | | | |
| 2a[1266] | SO$_3$H | H | H | SO$_3$H | NHCOCH$_3$ | OMe | CN | 2-Carboxyethyl | H | Cyclobutyl | H |
| 2a[1267] | H | SO$_3$H | SO$_3$H | H | | | | | | | |
| 2a[1268] | SO$_3$H | H | H | SO$_3$H | NHCOCH$_3$ | OMe | CN | 2-Carboxyethyl | H | Cyclopentyl | H |
| 2a[1269] | H | SO$_3$H | SO$_3$H | H | | | | | | | |
| 2a[1270] | SO$_3$H | H | H | SO$_3$H | NHCOCH$_3$ | OMe | CN | 2-Carboxyethyl | H | Cyclohexyl | H |
| 2a[1271] | H | SO$_3$H | SO$_3$H | H | | | | | | | |
| 2a[1272] | SO$_3$H | H | H | SO$_3$H | NHCOCH$_3$ | OMe | CN | 2-Carboxyethyl | H | 2-Methyl cyclohexyl | H |
| 2a[1273] | H | SO$_3$H | SO$_3$H | H | | | | | | | |
| 2a[1274] | SO$_3$H | H | H | SO$_3$H | NHCOCH$_3$ | OMe | CN | 2-Carboxyethyl | H | 3-Methyl cyclohexyl | H |
| 2a[1275] | H | SO$_3$H | SO$_3$H | H | | | | | | | |

TABLE 3-continued

| S/No | R³ᵃ | R⁴ᵃ | R⁵ᵃ | R⁶ᵃ | R¹⁰ᵃ/R¹⁴ᵃ | R⁹ᵃ/R¹³ᵃ | R²⁴ᵃ/R³⁰ᵃ | R²⁷ᵃ/R³³ᵃ | R²⁶ᵃ/R³⁴ᵃ | R²⁵ᵃ/R³¹ᵃ | R²⁶ᵃ/R³²ᵃ |
|---|---|---|---|---|---|---|---|---|---|---|---|
| 2a¹²⁷⁶ | SO₃H | H | H | SO₃H | NHCOCH₃ | OMe | CN | 2-Carboxyethyl | H | Pentan-2-yl | H |
| 2a¹²⁷⁷ | H | SO₃H | SO₃H | H | | | | | | | |
| 2a¹²⁷⁸ | SO₃H | H | H | SO₃H | NHCOCH₃ | OMe | CN | 2-Carboxyethyl | H | 2-Ethylhexyl | H |
| 2a¹²⁷⁹ | H | SO₃H | SO₃H | H | | | | | | | |
| 2a¹²⁸⁰ | SO₃H | H | H | SO₃H | NHCOCH₃ | OMe | CN | 2-Carboxyethyl | H | Phenyl | H |
| 2a¹²⁸¹ | H | SO₃H | SO₃H | H | | | | | | | |
| 2a¹²⁸² | SO₃H | H | H | SO₃H | NHCOCH₃ | OMe | CN | 2-Carboxyethyl | H | Benzyl | H |
| 2a¹²⁸³ | H | SO₃H | SO₃H | H | | | | | | | |
| 2a¹²⁸⁴ | SO₃H | H | H | SO₃H | NHCOCH₃ | OMe | CN | 2-Carboxyethyl | H | Allyl | H |
| 2a¹²⁸⁵ | H | SO₃H | SO₃H | H | | | | | | | |
| 2a¹²⁸⁶ | SO₃H | H | H | SO₃H | NHCOCH₃ | OMe | CN | 2-Carboxyethyl | H | 2-Methoxy ethyl | H |
| 2a¹²⁸⁷ | H | SO₃H | SO₃H | H | | | | | | | |
| 2a¹²⁸⁸ | SO₃H | H | H | SO₃H | NHCOCH₃ | OMe | CN | 2-Carboxyethyl | H | 3-Methoxy propyl | H |
| 2a¹²⁸⁹ | H | SO₃H | SO₃H | H | | | | | | | |
| 2a¹²⁹⁰ | SO₃H | H | H | SO₃H | NHCOCH₃ | OMe | CN | 2-Carboxyethyl | H | 3-Chloropropyl | H |
| 2a¹²⁹¹ | H | SO₃H | SO₃H | H | | | | | | | |
| 2a¹²⁹² | SO₃H | H | H | SO₃H | NHCOCH₃ | OMe | CN | 2-Carboxyethyl | H | 2-Methyl thioethyl | H |
| 2a¹²⁹³ | H | SO₃H | SO₃H | H | | | | | | | |
| 2a¹²⁹⁴ | SO₃H | H | H | SO₃H | NHCOCH₃ | OMe | CN | 2-Carboxyethyl | H | 2-Fluoroethyl | H |
| 2a¹²⁹⁵ | H | SO₃H | SO₃H | H | | | | | | | |
| 2a¹²⁹⁶ | SO₃H | H | H | SO₃H | NHCOCH₃ | OMe | CN | 2-Carboxyethyl | H | 2-Chloro ethyl | H |
| 2a¹²⁹⁷ | H | SO₃H | SO₃H | H | | | | | | | |
| 2a¹²⁹⁸ | SO₃H | H | H | SO₃H | NHCOCH₃ | OMe | CN | 2-Carboxyethyl | H | 2-(2-Hydroxy ethyl sulfonyl)ethyl | H |
| 2a¹²⁹⁹ | H | SO₃H | SO₃H | H | | | | | | | |
| 2a¹³⁰⁰ | SO₃H | H | H | SO₃H | NHCOCH₃ | OMe | CN | 2-Carboxyethyl | H | 2-(2-tert Butyl sulfanyl ethyl sulfonyl)ethyl | H |
| 2a¹³⁰¹ | H | SO₃H | SO₃H | H | | | | | | | |
| 2a¹³⁰² | SO₃H | H | H | SO₃H | NHCOCH₃ | OMe | CN | 2-Carboxyethyl | H | 2-(2-Hydroxy ethoxy)propyl | H |
| 2a¹³⁰³ | H | SO₃H | SO₃H | H | | | | | | | |
| 2a¹³⁰⁴ | SO₃H | H | H | SO₃H | NHCOCH₃ | OMe | CN | 2-Carboxyethyl | H | 2-(2-Hydroxy ethoxy)ethyl | H |
| 2a¹³⁰⁵ | H | SO₃H | SO₃H | H | | | | | | | |
| 2a¹³⁰⁶ | SO₃H | H | H | SO₃H | NHCOCH₃ | OMe | CN | 2-Carboxyethyl | H | 3-(4-Hydroxy butoxy)propyl | H |
| 2a¹³⁰⁷ | H | SO₃H | SO₃H | H | | | | | | | |
| 2a¹³⁰⁸ | SO₃H | H | H | SO₃H | NHCOCH₃ | OMe | CN | 2-Carboxyethyl | H | 3-(2-Phenoxy ethoxyl)propyl | H |
| 2a¹³⁰⁹ | H | SO₃H | SO₃H | H | | | | | | | |
| 2a¹³¹⁰ | SO₃H | H | H | SO₃H | NHCOCH₃ | OMe | CN | 2-Carboxyethyl | H | 3-Isopropxy propyl | H |
| 2a¹³¹¹ | H | SO₃H | SO₃H | H | | | | | | | |
| 2a¹³¹² | SO₃H | H | H | SO₃H | NHCOCH₃ | OMe | CN | 2-Carboxyethyl | H | 3-Ethoxy propyl | H |
| 2a¹³¹³ | H | SO₃H | SO₃H | H | | | | | | | |
| 2a¹³¹⁴ | SO₃H | H | H | SO₃H | NHCOCH₃ | OMe | CN | 2-Carboxyethyl | H | 3-Ethoxy butyl | H |
| 2a¹³¹⁵ | H | SO₃H | SO₃H | H | | | | | | | |
| 2a¹³¹⁶ | SO₃H | H | H | SO₃H | NHCOCH₃ | OMe | CN | 2-Carboxyethyl | H | 4-(2-Hydroxy ethane sulfonyl)phenyl | H |
| 2a¹³¹⁷ | H | SO₃H | SO₃H | H | | | | | | | |
| 2a¹³¹⁸ | SO₃H | H | H | SO₃H | NHCOCH₃ | OMe | CONH₂ | 2-Carboxyethyl | H | Methyl | H |
| 2a¹³¹⁹ | H | SO₃H | SO₃H | H | | | | | | | |
| 2a¹³²⁰ | SO₃H | H | H | SO₃H | NHCOCH₃ | OMe | CONH₂ | 2-Carboxyethyl | H | Ethyl | H |
| 2a¹³²¹ | H | SO₃H | SO₃H | H | | | | | | | |
| 2a¹³²² | SO₃H | H | H | SO₃H | NHCOCH₃ | OMe | CONH₂ | 2-Carboxyethyl | H | n-Propyl | H |
| 2a¹³²³ | H | SO₃H | SO₃H | H | | | | | | | |
| 2a¹³²⁴ | SO₃H | H | H | SO₃H | NHCOCH₃ | OMe | CONH₂ | 2-Carboxyethyl | H | Isopropyl | H |
| 2a¹³²⁵ | H | SO₃H | SO₃H | H | | | | | | | |
| 2a¹³²⁶ | SO₃H | H | H | SO₃H | NHCOCH₃ | OMe | CONH₂ | 2-Carboxyethyl | H | 1-Ethyl propyl | H |
| 2a¹³²⁷ | H | SO₃H | SO₃H | H | | | | | | | |
| 2a¹³²⁸ | SO₃H | H | H | SO₃H | NHCOCH₃ | OMe | CONH₂ | 2-Carboxyethyl | H | 1,2-Dimethyl propyl | H |
| 2a¹³²⁹ | H | SO₃H | SO₃H | H | | | | | | | |
| 2a¹³³⁰ | SO₃H | H | H | SO₃H | NHCOCH₃ | OMe | CONH₂ | 2-Carboxyethyl | H | 2,2-Dimethyl propyl | H |
| 2a¹³³¹ | H | SO₃H | SO₃H | H | | | | | | | |
| 2a¹³³² | SO₃H | H | H | SO₃H | NHCOCH₃ | OMe | CONH₂ | 2-Carboxyethyl | H | Butyl | H |
| 2a¹³³³ | H | SO₃H | SO₃H | H | | | | | | | |
| 2a¹³³⁴ | SO₃H | H | H | SO₃H | NHCOCH₃ | OMe | CONH₂ | 2-Carboxyethyl | H | 2-Methyl butyl | H |
| 2a¹³³⁵ | H | SO₃H | SO₃H | H | | | | | | | |
| 2a¹³³⁶ | SO₃H | H | H | SO₃H | NHCOCH₃ | OMe | CONH₂ | 2-Carboxyethyl | H | Tert butyl | H |
| 2a¹³³⁷ | H | SO₃H | SO₃H | H | | | | | | | |
| 2a¹³³⁸ | SO₃H | H | H | SO₃H | NHCOCH₃ | OMe | CONH₂ | 2-Carboxyethyl | H | 3-Methyl butyl | H |
| 2a¹³³⁹ | H | SO₃H | SO₃H | H | | | | | | | |
| 2a¹³⁴⁰ | SO₃H | H | H | SO₃H | NHCOCH₃ | OMe | CONH₂ | 2-Carboxyethyl | H | Sec butyl | H |
| 2a¹³⁴¹ | H | SO₃H | SO₃H | H | | | | | | | |
| 2a¹³⁴² | SO₃H | H | H | SO₃H | NHCOCH₃ | OMe | CONH₂ | 2-Carboxyethyl | H | Pentyl | H |
| 2a¹³⁴³ | H | SO₃H | SO₃H | H | | | | | | | |
| 2a¹³⁴⁴ | SO₃H | H | H | SO₃H | NHCOCH₃ | OMe | CONH₂ | 2-Carboxyethyl | H | Hexyl | H |
| 2a¹³⁴⁵ | H | SO₃H | SO₃H | H | | | | | | | |
| 2a¹³⁴⁶ | SO₃H | H | H | SO₃H | NHCOCH₃ | OMe | CONH₂ | 2-Carboxyethyl | H | Cyclobutyl | H |
| 2a¹³⁴⁷ | H | SO₃H | SO₃H | H | | | | | | | |
| 2a¹³⁴⁸ | SO₃H | H | H | SO₃H | NHCOCH₃ | OMe | CONH₂ | 2-Carboxyethyl | H | Cyclopentyl | H |
| 2a¹³⁴⁹ | H | SO₃H | SO₃H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{1350}$ | SO$_3$H | H | H | SO$_3$H | NHCOCH$_3$ | OMe | CONH$_2$ | 2-Carboxyethyl | H | Cyclohexyl | H |
| 2a$^{1351}$ | H | SO$_3$H | SO$_3$H | H | | | | | | | |
| 2a$^{1352}$ | SO$_3$H | H | H | SO$_3$H | NHCOCH$_3$ | OMe | CONH$_2$ | 2-Carboxyethyl | H | 2-Methyl cyclohexyl | H |
| 2a$^{1353}$ | H | SO$_3$H | SO$_3$H | H | | | | | | | |
| 2a$^{1354}$ | SO$_3$H | H | H | SO$_3$H | NHCOCH$_3$ | OMe | CONH$_2$ | 2-Carboxyethyl | H | 3-Methyl cyclohexyl | H |
| 2a$^{1355}$ | H | SO$_3$H | SO$_3$H | H | | | | | | | |
| 2a$^{1356}$ | SO$_3$H | H | H | SO$_3$H | NHCOCH$_3$ | OMe | CONH$_2$ | 2-Carboxyethyl | H | Pentan-2-yl | H |
| 2a$^{1357}$ | H | SO$_3$H | SO$_3$H | H | | | | | | | |
| 2a$^{1358}$ | SO$_3$H | H | H | SO$_3$H | NHCOCH$_3$ | OMe | CONH$_2$ | 2-Carboxyethyl | H | 2-ethylhexyl | H |
| 2a$^{1359}$ | H | SO$_3$H | SO$_3$H | H | | | | | | | |
| 2a$^{1360}$ | SO$_3$H | H | H | SO$_3$H | NHCOCH$_3$ | OMe | CONH$_2$ | 2-Carboxyethyl | H | Phenyl | H |
| 2a$^{1361}$ | H | SO$_3$H | SO$_3$H | H | | | | | | | |
| 2a$^{1362}$ | SO$_3$H | H | H | SO$_3$H | NHCOCH$_3$ | OMe | CONH$_2$ | 2-Carboxyethyl | H | Benzyl | H |
| 2a$^{1363}$ | H | SO$_3$H | SO$_3$H | H | | | | | | | |
| 2a$^{1364}$ | SO$_3$H | H | H | SO$_3$H | NHCOCH$_3$ | OMe | CONH$_2$ | 2-Carboxyethyl | H | Allyl | H |
| 2a$^{1365}$ | H | SO$_3$H | SO$_3$H | H | | | | | | | |
| 2a$^{1366}$ | SO$_3$H | H | H | SO$_3$H | NHCOCH$_3$ | OMe | CONH$_2$ | 2-Carboxyethyl | H | 2-Methoxy ethyl | H |
| 2a$^{1367}$ | H | SO$_3$H | SO$_3$H | H | | | | | | | |
| 2a$^{1368}$ | SO$_3$H | H | H | SO$_3$H | NHCOCH$_3$ | OMe | CONH$_2$ | 2-Carboxyethyl | H | 3-Methoxy propyl | H |
| 2a$^{1369}$ | H | SO$_3$H | SO$_3$H | H | | | | | | | |
| 2a$^{1370}$ | SO$_3$H | H | H | SO$_3$H | NHCOCH$_3$ | OMe | CONH$_2$ | 2-Carboxyethyl | H | 3-Chloropropyl | H |
| 2a$^{1371}$ | H | SO$_3$H | SO$_3$H | H | | | | | | | |
| 2a$^{1372}$ | SO$_3$H | H | H | SO$_3$H | NHCOCH$_3$ | OMe | CONH$_2$ | 2-Carboxyethyl | H | 2-Methyl thioethyl | H |
| 2a$^{1373}$ | H | SO$_3$H | SO$_3$H | H | | | | | | | |
| 2a$^{1374}$ | SO$_3$H | H | H | SO$_3$H | NHCOCH$_3$ | OMe | CONH$_2$ | 2-Carboxyethyl | H | 2-Fluoroethyl | H |
| 2a$^{1375}$ | H | SO$_3$H | SO$_3$H | H | | | | | | | |
| 2a$^{1376}$ | SO$_3$H | H | H | SO$_3$H | NHCOCH$_3$ | OMe | CONH$_2$ | 2-Carboxyethyl | H | 2-Chloro ethyl | H |
| 2a$^{1377}$ | H | SO$_3$H | SO$_3$H | H | | | | | | | |
| 2a$^{1378}$ | SO$_3$H | H | H | SO$_3$H | NHCOCH$_3$ | OMe | CONH$_2$ | 2-Carboxyethyl | H | 2-(2-Hydroxy ethyl sulfonyl)ethyl | H |
| 2a$^{1379}$ | H | SO$_3$H | SO$_3$H | H | | | | | | | |
| 2a$^{1380}$ | SO$_3$H | H | H | SO$_3$H | NHCOCH$_3$ | OMe | CONH$_2$ | 2-Carboxyethyl | H | 2-(2-tert Butyl sulfanyl ethyl sulfonyl)ethyl | H |
| 2a$^{1381}$ | H | SO$_3$H | SO$_3$H | H | | | | | | | |
| 2a$^{1382}$ | SO$_3$H | H | H | SO$_3$H | NHCOCH$_3$ | OMe | CONH$_2$ | 2-Carboxyethyl | H | 2-(2-Hydroxy ethoxy)propyl | H |
| 2a$^{1383}$ | H | SO$_3$H | SO$_3$H | H | | | | | | | |
| 2a$^{1384}$ | SO$_3$H | H | H | SO$_3$H | NHCOCH$_3$ | OMe | CONH$_2$ | 2-Carboxyethyl | H | 2-(2-Hydroxy ethoxy)ethyl | H |
| 2a$^{1385}$ | H | SO$_3$H | SO$_3$H | H | | | | | | | |
| 2a$^{1386}$ | SO$_3$H | H | H | SO$_3$H | NHCOCH$_3$ | OMe | CONH$_2$ | 2-Carboxyethyl | H | 3-(4-Hydroxy butoxy)propyl | H |
| 2a$^{1387}$ | H | SO$_3$H | SO$_3$H | H | | | | | | | |
| 2a$^{1388}$ | SO$_3$H | H | H | SO$_3$H | NHCOCH$_3$ | OMe | CONH$_2$ | 2-Carboxyethyl | H | 3-(2-Phenoxy ethoxyl)propyl | H |
| 2a$^{1389}$ | H | SO$_3$H | SO$_3$H | H | | | | | | | |
| 2a$^{1390}$ | SO$_3$H | H | H | SO$_3$H | NHCOCH$_3$ | OMe | CONH$_2$ | 2-Carboxyethyl | H | 3-Isopropxy propyl | H |
| 2a$^{1391}$ | H | SO$_3$H | SO$_3$H | H | | | | | | | |
| 2a$^{1392}$ | SO$_3$H | H | H | SO$_3$H | NHCOCH$_3$ | OMe | CONH$_2$ | 2-Carboxyethyl | H | 3-Ethoxy propyl | H |
| 2a$^{1393}$ | H | SO$_3$H | SO$_3$H | H | | | | | | | |
| 2a$^{1394}$ | SO$_3$H | H | H | SO$_3$H | NHCOCH$_3$ | OMe | CONH$_2$ | 2-Carboxyethyl | H | 3-Ethoxy butyl | H |
| 2a$^{1395}$ | H | SO$_3$H | SO$_3$H | H | | | | | | | |
| 2a$^{1396}$ | SO$_3$H | H | H | SO$_3$H | NHCOCH$_3$ | OMe | CONH$_2$ | 2-Carboxyethyl | H | 4-(2-Hydroxy ethane sulfonyl)phenyl | H |
| 2a$^{1397}$ | H | SO$_3$H | SO$_3$H | H | | | | | | | |
| 2a$^{1397}$ | SO$_3$H | H | H | SO$_3$H | Methyl | Methyl | CN | 2-Sulfoethyl | H | Ethyl | Ethyl |
| 2a$^{1398}$ | H | SO$_3$H | SO$_3$H | H | | | | | | | |
| 2a$^{1399}$ | SO$_3$H | H | H | SO$_3$H | Methyl | Methyl | CN | 2-Sulfoethyl | H | Propyl | Propyl |
| 2a$^{1400}$ | H | SO$_3$H | SO$_3$H | H | | | | | | | |
| 2a$^{1401}$ | SO$_3$H | H | H | SO$_3$H | Methyl | Methyl | CN | 2-Sulfoethyl | H | Butyl | Butyl |
| 2a$^{1402}$ | H | SO$_3$H | SO$_3$H | H | | | | | | | |
| 2a$^{1403}$ | SO$_3$H | H | H | SO$_3$H | Methyl | Methyl | CN | 2-Sulfoethyl | H | 2-Hydroxy ethyl | 2-Hydroxy ethyl |
| 2a$^{1404}$ | H | SO$_3$H | SO$_3$H | H | | | | | | | |
| 2a$^{1405}$ | SO$_3$H | H | H | SO$_3$H | Methyl | Methyl | CN | 2-Sulfoethyl | H | Hexyl | Hexyl |
| 2a$^{1406}$ | H | SO$_3$H | SO$_3$H | H | | | | | | | |
| 2a$^{1407}$ | SO$_3$H | H | H | SO$_3$H | Methyl | Methyl | CN | 2-Sulfoethyl | H | Butyl | Methyl |
| 2a$^{1408}$ | H | SO$_3$H | SO$_3$H | H | | | | | | | |
| 2a$^{1409}$ | SO$_3$H | H | H | SO$_3$H | Methyl | Methyl | CN | 2-Sulfoethyl | H | Butyl | Ethyl |
| 2a$^{1410}$ | H | SO$_3$H | SO$_3$H | H | | | | | | | |
| 2a$^{1411}$ | SO$_3$H | H | H | SO$_3$H | Methyl | Methyl | CN | 2-Sulfoethyl | H | Cyclohexyl | Methyl |
| 2a$^{1412}$ | H | SO$_3$H | SO$_3$H | H | | | | | | | |
| 2a$^{1413}$ | SO$_3$H | H | H | SO$_3$H | Methyl | Methyl | CN | 2-Sulfoethyl | H | Cyclohexyl | Ethyl |
| 2a$^{1414}$ | H | SO$_3$H | SO$_3$H | H | | | | | | | |
| 2a$^{1415}$ | SO$_3$H | H | H | SO$_3$H | Methyl | Methyl | CN | 2-Sulfoethyl | H | Cyclohexyl | 2-Hydroxyl ethyl |
| 2a$^{1416}$ | H | SO$_3$H | SO$_3$H | H | | | | | | | |
| 2a$^{1417}$ | SO$_3$H | H | H | SO$_3$H | Methyl | Methyl | CONH$_2$ | 2-Sulfoethyl | H | Ethyl | Ethyl |
| 2a$^{1418}$ | H | SO$_3$H | SO$_3$H | H | | | | | | | |
| 2a$^{1419}$ | SO$_3$H | H | H | SO$_3$H | Methyl | Methyl | CONH$_2$ | 2-Sulfoethyl | H | Propyl | Propyl |
| 2a$^{1420}$ | H | SO$_3$H | SO$_3$H | H | | | | | | | |
| 2a$^{1421}$ | SO$_3$H | H | H | SO$_3$H | Methyl | Methyl | CONH$_2$ | 2-Sulfoethyl | H | Butyl | Butyl |
| 2a$^{1422}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{1423}$ | SO$_3$H | H | H | SO$_3$H | Methyl | Methyl | CONH$_2$ | 2-Sulfoethyl | H | 2-Hydroxy ethyl | 2-Hydroxy ethyl |
| 2a$^{1424}$ | H | SO$_3$H | SO$_3$H | H | | | | | | | |
| 2a$^{1425}$ | SO$_3$H | H | H | SO$_3$H | Methyl | Methyl | CONH$_2$ | 2-Sulfoethyl | H | Hexyl | Hexyl |
| 2a$^{1426}$ | H | SO$_3$H | SO$_3$H | H | | | | | | | |
| 2a$^{1427}$ | SO$_3$H | H | H | SO$_3$H | Methyl | Methyl | CONH$_2$ | 2-Sulfoethyl | H | Butyl | Methyl |
| 2a$^{1428}$ | H | SO$_3$H | SO$_3$H | H | | | | | | | |
| 2a$^{1429}$ | SO$_3$H | H | H | SO$_3$H | Methyl | Methyl | CONH$_2$ | 2-Sulfoethyl | H | Butyl | Ethyl |
| 2a$^{1430}$ | H | SO$_3$H | SO$_3$H | H | | | | | | | |
| 2a$^{1431}$ | SO$_3$H | H | H | SO$_3$H | Methyl | Methyl | CONH$_2$ | 2-Sulfoethyl | H | Cyclohexyl | Methyl |
| 2a$^{1432}$ | H | SO$_3$H | SO$_3$H | H | | | | | | | |
| 2a$^{1433}$ | SO$_3$H | H | H | SO$_3$H | Methyl | Methyl | CONH$_2$ | 2-Sulfoethyl | H | Cyclohexyl | Ethyl |
| 2a$^{1434}$ | H | SO$_3$H | SO$_3$H | H | | | | | | | |
| 2a$^{1435}$ | SO$_3$H | H | H | SO$_3$H | Methyl | Methyl | CONH$_2$ | 2-Sulfoethyl | H | Cyclohexyl | 2-Hydroxyl ethyl |
| 2a$^{1436}$ | H | SO$_3$H | SO$_3$H | H | | | | | | | |
| 2a$^{1437}$ | SO$_3$H | H | H | SO$_3$H | NHCOCH$_3$ | OMe | CN | 2-Sulfoethyl | H | Ethyl | Ethyl |
| 2a$^{1438}$ | H | SO$_3$H | SO$_3$H | H | | | | | | | |
| 2a$^{1439}$ | SO$_3$H | H | H | SO$_3$H | NHCOCH$_3$ | OMe | CN | 2-Sulfoethyl | H | Propyl | Propyl |
| 2a$^{1440}$ | H | SO$_3$H | SO$_3$H | H | | | | | | | |
| 2a$^{1441}$ | SO$_3$H | H | H | SO$_3$H | NHCOCH$_3$ | OMe | CN | 2-Sulfoethyl | H | Butyl | Butyl |
| 2a$^{1442}$ | H | SO$_3$H | SO$_3$H | H | | | | | | | |
| 2a$^{1443}$ | SO$_3$H | H | H | SO$_3$H | NHCOCH$_3$ | OMe | CN | 2-Sulfoethyl | H | 2-Hydroxy ethyl | 2-Hydroxy ethyl |
| 2a$^{1444}$ | H | SO$_3$H | SO$_3$H | H | | | | | | | |
| 2a$^{1445}$ | SO$_3$H | H | H | SO$_3$H | NHCOCH$_3$ | OMe | CN | 2-Sulfoethyl | H | Hexyl | Hexyl |
| 2a$^{1446}$ | H | SO$_3$H | SO$_3$H | | | | | | | | |
| 2a$^{1447}$ | SO$_3$H | H | H | SO$_3$H | NHCOCH$_3$ | OMe | CN | 2-Sulfoethyl | H | Butyl | Methyl |
| 2a$^{1448}$ | H | SO$_3$H | SO$_3$H | H | | | | | | | |
| 2a$^{1449}$ | SO$_3$H | H | H | SO$_3$H | NHCOCH$_3$ | OMe | CN | 2-Sulfoethyl | H | Butyl | Ethyl |
| 2a$^{1450}$ | H | SO$_3$H | SO$_3$H | H | | | | | | | |
| 2a$^{1451}$ | SO$_3$H | H | H | SO$_3$H | NHCOCH$_3$ | OMe | CN | 2-Sulfoethyl | H | Cyclohexyl | Methyl |
| 2a$^{1452}$ | H | SO$_3$H | SO$_3$H | H | | | | | | | |
| 2a$^{1453}$ | SO$_3$H | H | H | SO$_3$H | NHCOCH$_3$ | OMe | CN | 2-Sulfoethyl | H | Cyclohexyl | Ethyl |
| 2a$^{1454}$ | H | SO$_3$H | SO$_3$H | H | | | | | | | |
| 2a$^{1455}$ | SO$_3$H | H | H | SO$_3$H | NHCOCH$_3$ | OMe | CN | 2-Sulfoethyl | H | Cyclohexyl | 2-Hydroxyl ethyl |
| 2a$^{1456}$ | H | SO$_3$H | SO$_3$H | H | | | | | | | |
| 2a$^{1457}$ | SO$_3$H | H | H | SO$_3$H | NHCOCH$_3$ | OMe | CONH2 | 2-Sulfoethyl | H | Ethyl | Ethyl |
| 2a$^{1458}$ | H | SO$_3$H | SO$_3$H | H | | | | | | | |
| 2a$^{1459}$ | SO$_3$H | H | H | SO$_3$H | NHCOCH$_3$ | OMe | CONH2 | 2-Sulfoethyl | H | Propyl | Propyl |
| 2a$^{1460}$ | H | SO$_3$H | SO$_3$H | H | | | | | | | |
| 2a$^{1461}$ | SO$_3$H | H | H | SO$_3$H | NHCOCH$_3$ | OMe | CONH2 | 2-Sulfoethyl | H | Butyl | Butyl |
| 2a$^{1462}$ | H | SO$_3$H | SO$_3$H | H | | | | | | | |
| 2a$^{1463}$ | SO$_3$H | H | H | SO$_3$H | NHCOCH$_3$ | OMe | CONH2 | 2-Sulfoethyl | H | 2-Hydroxy ethyl | 2-Hydroxy ethyl |
| 2a$^{1464}$ | H | SO$_3$H | SO$_3$H | H | | | | | | | |
| 2a$^{1465}$ | SO$_3$H | H | H | SO$_3$H | NHCOCH$_3$ | OMe | CONH2 | 2-Sulfoethyl | H | Hexyl | Hexyl |
| 2a$^{1466}$ | H | SO$_3$H | SO$_3$H | H | | | | | | | |
| 2a$^{1467}$ | SO$_3$H | H | H | SO$_3$H | NHCOCH$_3$ | OMe | CONH2 | 2-Sulfoethyl | H | Butyl | Methyl |
| 2a$^{1468}$ | H | SO$_3$H | SO$_3$H | H | | | | | | | |
| 2a$^{1469}$ | SO$_3$H | H | H | SO$_3$H | NHCOCH$_3$ | OMe | CONH2 | 2-Sulfoethyl | H | Butyl | Ethyl |
| 2a$^{1470}$ | H | SO$_3$H | SO$_3$H | H | | | | | | | |
| 2a$^{1471}$ | SO$_3$H | H | H | SO$_3$H | NHCOCH$_3$ | OMe | CONH2 | 2-Sulfoethyl | H | Cyclohexyl | Methyl |
| 2a$^{1472}$ | H | SO$_3$H | SO$_3$H | H | | | | | | | |
| 2a$^{1473}$ | SO$_3$H | H | H | SO$_3$H | NHCOCH$_3$ | OMe | CONH2 | 2-Sulfoethyl | H | Cyclohexyl | Ethyl |
| 2a$^{1474}$ | H | SO$_3$H | SO$_3$H | H | | | | | | | |
| 2a$^{1475}$ | SO$_3$H | H | H | SO$_3$H | NHCOCH$_3$ | OMe | CONH2 | 2-Sulfoethyl | H | Cyclohexyl | 2-Hydroxyl ethyl |
| 2a$^{1476}$ | H | SO$_3$H | SO$_3$H | H | | | | | | | |
| 2a$^{1477}$ | SO$_3$H | H | H | SO$_3$H | Methyl | Methyl | CN | 2-Sulfoethyl | Methyl | Ethyl | Ethyl |
| 2a$^{1478}$ | H | SO$_3$H | SO$_3$H | H | | | | | | | |
| 2a$^{1479}$ | SO$_3$H | H | H | SO$_3$H | Methyl | Methyl | CN | 2-Sulfoethyl | Methyl | Propyl | Propyl |
| 2a$^{1480}$ | H | SO$_3$H | SO$_3$H | H | | | | | | | |
| 2a$^{1481}$ | SO$_3$H | H | H | SO$_3$H | Methyl | Methyl | CN | 2-Sulfoethyl | Methyl | Butyl | Butyl |
| 2a$^{1482}$ | H | SO$_3$H | SO$_3$H | H | | | | | | | |
| 2a$^{1483}$ | SO$_3$H | H | H | SO$_3$H | Methyl | Methyl | CN | 2-Sulfoethyl | Methyl | 2-Hydroxy ethyl | 2-Hydroxy ethyl |
| 2a$^{1484}$ | H | SO$_3$H | SO$_3$H | H | | | | | | | |
| 2a$^{1485}$ | SO$_3$H | H | H | SO$_3$H | Methyl | Methyl | CN | 2-Sulfoethyl | Methyl | Hexyl | Hexyl |
| 2a$^{1486}$ | H | SO$_3$H | SO$_3$H | H | | | | | | | |
| 2a$^{1487}$ | SO$_3$H | H | H | SO$_3$H | Methyl | Methyl | CN | 2-Sulfoethyl | Methyl | Butyl | Methyl |
| 2a$^{1488}$ | H | SO$_3$H | SO$_3$H | H | | | | | | | |
| 2a$^{1489}$ | SO$_3$H | H | H | SO$_3$H | Methyl | Methyl | CN | 2-Sulfoethyl | Methyl | Butyl | Ethyl |
| 2a$^{1490}$ | H | SO$_3$H | SO$_3$H | H | | | | | | | |
| 2a$^{1491}$ | SO$_3$H | H | H | SO$_3$H | Methyl | Methyl | CN | 2-Sulfoethyl | Methyl | Cyclohexyl | Methyl |
| 2a$^{1492}$ | H | SO$_3$H | SO$_3$H | H | | | | | | | |
| 2a$^{1493}$ | SO$_3$H | H | H | SO$_3$H | Methyl | Methyl | CN | 2-Sulfoethyl | Methyl | Cyclohexyl | Ethyl |
| 2a$^{1494}$ | H | SO$_3$H | SO$_3$H | H | | | | | | | |
| 2a$^{1495}$ | SO$_3$H | H | H | SO$_3$H | Methyl | Methyl | CN | 2-Sulfoethyl | Methyl | Cyclohexyl | 2-Hydroxyl ethyl |
| 2a$^{1496}$ | H | SO$_3$H | SO$_3$H | H | | | | | | | |
| 2a$^{1497}$ | SO$_3$H | H | H | SO$_3$H | Methyl | Methyl | CONH$_2$ | 2-Sulfoethyl | Methyl | Ethyl | Ethyl |
| 2a$^{1498}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{1499}$ | SO₃H | H | H | SO₃H | Methyl | Methyl | CONH₂ | 2-Sulfoethyl | Methyl | Propyl | Propyl |
| $2a^{1500}$ | H | SO₃H | SO₃H | H | | | | | | | |
| $2a^{1501}$ | SO₃H | H | H | SO₃H | Methyl | Methyl | CONH₂ | 2-Sulfoethyl | Methyl | Butyl | Butyl |
| $2a^{1502}$ | H | SO₃H | SO₃H | H | | | | | | | |
| $2a^{1503}$ | SO₃H | H | H | SO₃H | Methyl | Methyl | CONH₂ | 2-Sulfoethyl | Methyl | 2-Hydroxy ethyl | 2-Hydroxy ethyl |
| $2a^{1504}$ | H | SO₃H | SO₃H | H | | | | | | | |
| $2a^{1505}$ | SO₃H | H | H | SO₃H | Methyl | Methyl | CONH₂ | 2-Sulfoethyl | Methyl | Hexyl | Hexyl |
| $2a^{1506}$ | H | SO₃H | SO₃H | H | | | | | | | |
| $2a^{1507}$ | SO₃H | H | H | SO₃H | Methyl | Methyl | CONH₂ | 2-Sulfoethyl | Methyl | Butyl | Methyl |
| $2a^{1508}$ | H | SO₃H | SO₃H | H | | | | | | | |
| $2a^{1509}$ | SO₃H | H | H | SO₃H | Methyl | Methyl | CONH₂ | 2-Sulfoethyl | Methyl | Butyl | Ethyl |
| $2a^{1510}$ | H | SO₃H | SO₃H | H | | | | | | | |
| $2a^{1511}$ | SO₃H | H | H | SO₃H | Methyl | Methyl | CONH₂ | 2-Sulfoethyl | Methyl | Cyclohexyl | Methyl |
| $2a^{1512}$ | H | SO₃H | SO₃H | H | | | | | | | |
| $2a^{1513}$ | SO₃H | H | H | SO₃H | Methyl | Methyl | CONH₂ | 2-Sulfoethyl | Methyl | Cyclohexyl | Ethyl |
| $2a^{1514}$ | H | SO₃H | SO₃H | H | | | | | | | |
| $2a^{1515}$ | SO₃H | H | H | SO₃H | Methyl | Methyl | CONH₂ | 2-Sulfoethyl | Methyl | Cyclohexyl | 2-Hydroxyl ethyl |
| $2a^{1516}$ | H | SO₃H | SO₃H | H | | | | | | | |
| $2a^{1517}$ | SO₃H | H | H | SO₃H | NHCOCH₃ | OMe | CN | 2-Sulfoethyl | Methyl | Ethyl | Ethyl |
| $2a^{1518}$ | H | SO₃H | SO₃H | H | | | | | | | |
| $2a^{1519}$ | SO₃H | H | H | SO₃H | NHCOCH₃ | OMe | CN | 2-Sulfoethyl | Methyl | Propyl | Propyl |
| $2a^{1520}$ | H | SO₃H | SO₃H | H | | | | | | | |
| $2a^{1521}$ | SO₃H | H | H | SO₃H | NHCOCH₃ | OMe | CN | 2-Sulfoethyl | Methyl | Butyl | Butyl |
| $2a^{1522}$ | H | SO₃H | SO₃H | H | | | | | | | |
| $2a^{1523}$ | SO₃H | H | H | SO₃H | NHCOCH₃ | OMe | CN | 2-Sulfoethyl | Methyl | 2-Hydroxy ethyl | 2-Hydroxy ethyl |
| $2a^{1524}$ | H | SO₃H | SO₃H | H | | | | | | | |
| $2a^{1525}$ | SO₃H | H | H | SO₃H | NHCOCH₃ | OMe | CN | 2-Sulfoethyl | Methyl | Hexyl | Hexyl |
| $2a^{1526}$ | H | SO₃H | SO₃H | H | | | | | | | |
| $2a^{1527}$ | SO₃H | H | H | SO₃H | NHCOCH₃ | OMe | CN | 2-Sulfoethyl | Methyl | Butyl | Methyl |
| $2a^{1528}$ | H | SO₃H | SO₃H | H | | | | | | | |
| $2a^{1529}$ | SO₃H | H | H | SO₃H | NHCOCH₃ | OMe | CN | 2-Sulfoethyl | Methyl | Butyl | Ethyl |
| $2a^{1530}$ | H | SO₃H | SO₃H | H | | | | | | | |
| $2a^{1531}$ | SO₃H | H | H | SO₃H | NHCOCH₃ | OMe | CN | 2-Sulfoethyl | Methyl | Cyclohexyl | Methyl |
| $2a^{1532}$ | H | SO₃H | SO₃H | H | | | | | | | |
| $2a^{1533}$ | SO₃H | H | H | SO₃H | NHCOCH₃ | OMe | CN | 2-Sulfoethyl | Methyl | Cyclohexyl | Ethyl |
| $2a^{1534}$ | H | SO₃H | SO₃H | H | | | | | | | |
| $2a^{1535}$ | SO₃H | H | H | SO₃H | NHCOCH₃ | OMe | CN | 2-Sulfoethyl | Methyl | Cyclohexyl | 2-Hydroxyl ethyl |
| $2a^{1536}$ | H | SO₃H | SO₃H | H | | | | | | | |
| $2a^{1537}$ | SO₃H | H | H | SO₃H | NHCOCH₃ | OMe | CONH₂ | 2-Sulfoethyl | Methyl | Ethyl | Ethyl |
| $2a^{1538}$ | H | SO₃H | SO₃H | H | | | | | | | |
| $2a^{1539}$ | SO₃H | H | H | SO₃H | NHCOCH₃ | OMe | CONH₂ | 2-Sulfoethyl | Methyl | Propyl | Propyl |
| $2a^{1540}$ | H | SO₃H | SO₃H | H | | | | | | | |
| $2a^{1541}$ | SO₃H | H | H | SO₃H | NHCOCH₃ | OMe | CONH₂ | 2-Sulfoethyl | Methyl | Butyl | Butyl |
| $2a^{1542}$ | H | SO₃H | SO₃H | H | | | | | | | |
| $2a^{1543}$ | SO₃H | H | H | SO₃H | NHCOCH₃ | OMe | CONH₂ | 2-Sulfoethyl | Methyl | 2-Hydroxy ethyl | 2-Hydroxy ethyl |
| $2a^{1544}$ | H | SO₃H | SO₃H | H | | | | | | | |
| $2a^{1545}$ | SO₃H | H | H | SO₃H | NHCOCH₃ | OMe | CONH₂ | 2-Sulfoethyl | Methyl | Hexyl | Hexyl |
| $2a^{1546}$ | H | SO₃H | SO₃H | H | | | | | | | |
| $2a^{1547}$ | SO₃H | H | H | SO₃H | NHCOCH₃ | OMe | CONH₂ | 2-Sulfoethyl | Methyl | Butyl | Methyl |
| $2a^{1548}$ | H | SO₃H | SO₃H | H | | | | | | | |
| $2a^{1549}$ | SO₃H | H | H | SO₃H | NHCOCH₃ | OMe | CONH₂ | 2-Sulfoethyl | Methyl | Butyl | Ethyl |
| $2a^{1550}$ | H | SO₃H | SO₃H | H | | | | | | | |
| $2a^{1551}$ | SO₃H | H | H | SO₃H | NHCOCH₃ | OMe | CONH₂ | 2-Sulfoethyl | Methyl | Cyclohexyl | Methyl |
| $2a^{1552}$ | H | SO₃H | SO₃H | H | | | | | | | |
| $2a^{1553}$ | SO₃H | H | H | SO₃H | NHCOCH₃ | OMe | CONH₂ | 2-Sulfoethyl | Methyl | Cyclohexyl | Ethyl |
| $2a^{1553}$ | H | SO₃H | SO₃H | H | | | | | | | |
| $2a^{1555}$ | SO₃H | H | H | SO₃H | NHCOCH₃ | OMe | CONH₂ | 2-Sulfoethyl | Methyl | Cyclohexyl | 2-Hydroxy ethyl |
| $2a^{1556}$ | H | SO₃H | SO₃H | H | | | | | | | |
| $2a^{1557}$ | SO₃H | H | H | SO₃H | Methyl | Methyl | CN | 2-Carboxy ethyl | H | Ethyl | Ethyl |
| $2a^{1558}$ | H | SO₃H | SO₃H | H | | | | | | | |
| $2a^{1559}$ | SO₃H | H | H | SO₃H | Methyl | Methyl | CN | 2-Carboxy ethyl | H | Propyl | Propyl |
| $2a^{1560}$ | H | SO₃H | SO₃H | H | | | | | | | |
| $2a^{1561}$ | SO₃H | H | H | SO₃H | Methyl | Methyl | CN | 2-Carboxy ethyl | H | Butyl | Butyl |
| $2a^{1562}$ | H | SO₃H | SO₃H | H | | | | | | | |
| $2a^{1563}$ | SO₃H | H | H | SO₃H | Methyl | Methyl | CN | 2-Carboxy ethyl | H | 2-Hydroxy ethyl | 2-Hydroxy ethyl |
| $2a^{1564}$ | H | SO₃H | SO₃H | H | | | | | | | |
| $2a^{1565}$ | SO₃H | H | H | SO₃H | Methyl | Methyl | CN | 2-Carboxy ethyl | H | Hexyl | Hexyl |
| $2a^{1566}$ | H | SO₃H | SO₃H | H | | | | | | | |
| $2a^{1567}$ | SO₃H | H | H | SO₃H | Methyl | Methyl | CN | 2-Carboxy ethyl | H | Butyl | Methyl |
| $2a^{1568}$ | H | SO₃H | SO₃H | H | | | | | | | |
| $2a^{1569}$ | SO₃H | H | H | SO₃H | Methyl | Methyl | CN | 2-Carboxy ethyl | H | Butyl | Ethyl |
| $2a^{1570}$ | H | SO₃H | SO₃H | H | | | | | | | |
| $2a^{1571}$ | SO₃H | H | H | SO₃H | Methyl | Methyl | CN | 2-Carboxy ethyl | H | Cyclohexyl | Methyl |
| $2a^{1572}$ | H | SO₃H | SO₃H | H | | | | | | | |
| $2a^{1573}$ | SO₃H | H | H | SO₃H | Methyl | Methyl | CN | 2-Carboxy ethyl | H | Cyclohexyl | Ethyl |
| $2a^{1574}$ | H | SO₃H | SO₃H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{1575}$ | SO$_3$H | H | H | SO$_3$H | Methyl | Methyl | CN | 2-Carboxy ethyl | H | Cyclohexyl | 2-Hydroxy ethyl |
| 2a$^{1576}$ | H | SO$_3$H | SO$_3$H | H | | | | | | | |
| 2a$^{1577}$ | SO$_3$H | H | H | SO$_3$H | Methyl | Methyl | CONH$_2$ | 2-Carboxy ethyl | H | Ethyl | Ethyl |
| 2a$^{1578}$ | H | SO$_3$H | SO$_3$H | H | | | | | | | |
| 2a$^{1579}$ | SO$_3$H | H | H | SO$_3$H | Methyl | Methyl | CONH$_2$ | 2-Carboxy ethyl | H | Propyl | Propyl |
| 2a$^{1580}$ | H | SO$_3$H | SO$_3$H | H | | | | | | | |
| 2a$^{1581}$ | SO$_3$H | H | H | SO$_3$H | Methyl | Methyl | CONH$_2$ | 2-Carboxy ethyl | H | Butyl | Butyl |
| 2a$^{1582}$ | H | SO$_3$H | SO$_3$H | H | | | | | | | |
| 2a$^{1583}$ | SO$_3$H | H | H | SO$_3$H | Methyl | Methyl | CONH$_2$ | 2-Carboxy ethyl | H | 2-Hydroxy ethyl | 2-Hydroxy ethyl |
| 2a$^{1584}$ | H | SO$_3$H | SO$_3$H | H | | | | | | | |
| 2a$^{1585}$ | SO$_3$H | H | H | SO$_3$H | Methyl | Methyl | CONH$_2$ | 2-Carboxy ethyl | H | Hexyl | Hexyl |
| 2a$^{1586}$ | H | SO$_3$H | SO$_3$H | H | | | | | | | |
| 2a$^{1587}$ | SO$_3$H | H | H | SO$_3$H | Methyl | Methyl | CONH$_2$ | 2-Carboxy ethyl | H | Butyl | Methyl |
| 2a$^{1588}$ | H | SO$_3$H | SO$_3$H | H | | | | | | | |
| 2a$^{1589}$ | SO$_3$H | H | H | SO$_3$H | Methyl | Methyl | CONH$_2$ | 2-Carboxy ethyl | H | Butyl | Ethyl |
| 2a$^{1590}$ | H | SO$_3$H | SO$_3$H | H | | | | | | | |
| 2a$^{1591}$ | SO$_3$H | H | H | SO$_3$H | Methyl | Methyl | CONH$_2$ | 2-Carboxy ethyl | H | Cyclohexyl | Methyl |
| 2a$^{1592}$ | H | SO$_3$H | SO$_3$H | H | | | | | | | |
| 2a$^{1593}$ | SO$_3$H | H | H | SO$_3$H | Methyl | Methyl | CONH$_2$ | 2-Carboxy ethyl | H | Cyclohexyl | Ethyl |
| 2a$^{1594}$ | H | SO$_3$H | SO$_3$H | H | | | | | | | |
| 2a$^{1595}$ | SO$_3$H | H | H | SO$_3$H | Methyl | Methyl | CONH$_2$ | 2-Carboxy ethyl | H | Cyclohexyl | 2-Hydroxy ethyl |
| 2a$^{1596}$ | H | SO$_3$H | SO$_3$H | H | | | | | | | |
| 2a$^{1597}$ | SO$_3$H | H | H | SO$_3$H | NHCOCH$_3$ | OMe | CN | 2-Carboxy ethyl | H | Ethyl | Ethyl |
| 2a$^{1598}$ | H | SO$_3$H | SO$_3$H | H | | | | | | | |
| 2a$^{1599}$ | SO$_3$H | H | H | SO$_3$H | NHCOCH$_3$ | OMe | CN | 2-Carboxy ethyl | H | Propyl | Propyl |
| 2a$^{1600}$ | H | SO$_3$H | SO$_3$H | H | | | | | | | |
| 2a$^{1601}$ | SO$_3$H | H | H | SO$_3$H | NHCOCH$_3$ | OMe | CN | 2-Carboxy ethyl | H | Butyl | Butyl |
| 2a$^{1602}$ | H | SO$_3$H | SO$_3$H | H | | | | | | | |
| 2a$^{1603}$ | SO$_3$H | H | H | SO$_3$H | NHCOCH$_3$ | OMe | CN | 2-Carboxy ethyl | H | 2-Hydroxy ethyl | 2-Hydroxy ethyl |
| 2a$^{1604}$ | H | SO$_3$H | SO$_3$H | H | | | | | | | |
| 2a$^{1605}$ | SO$_3$H | H | H | SO$_3$H | NHCOCH$_3$ | OMe | CN | 2-Carboxy ethyl | H | Hexyl | Hexyl |
| 2a$^{1606}$ | H | SO$_3$H | SO$_3$H | H | | | | | | | |
| 2a$^{1607}$ | SO$_3$H | H | H | SO$_3$H | NHCOCH$_3$ | OMe | CN | 2-Carboxy ethyl | H | Butyl | Methyl |
| 2a$^{1608}$ | H | SO$_3$H | SO$_3$H | H | | | | | | | |
| 2a$^{1609}$ | SO$_3$H | H | H | SO$_3$H | NHCOCH$_3$ | OMe | CN | 2-Carboxy ethyl | H | Butyl | Ethyl |
| 2a$^{1610}$ | H | SO$_3$H | SO$_3$H | H | | | | | | | |
| 2a$^{1611}$ | SO$_3$H | H | H | SO$_3$H | NHCOCH$_3$ | OMe | CN | 2-Carboxy ethyl | H | Cyclohexyl | Methyl |
| 2a$^{1612}$ | H | SO$_3$H | SO$_3$H | H | | | | | | | |
| 2a$^{1613}$ | SO$_3$H | H | H | SO$_3$H | NHCOCH$_3$ | OMe | CN | 2-Carboxy ethyl | H | Cyclohexyl | Ethyl |
| 2a$^{1614}$ | H | SO$_3$H | SO$_3$H | H | | | | | | | |
| 2a$^{1615}$ | SO$_3$H | H | H | SO$_3$H | NHCOCH$_3$ | OMe | CN | 2-Carboxy ethyl | H | Cyclohexyl | 2-Hydroxy ethyl |
| 2a$^{1616}$ | H | SO$_3$H | SO$_3$H | H | | | | | | | |
| 2a$^{1617}$ | SO$_3$H | H | H | SO$_3$H | NHCOCH$_3$ | OMe | CONH$_2$ | 2-Carboxy ethyl | H | Ethyl | Ethyl |
| 2a$^{1618}$ | H | SO$_3$H | SO$_3$H | H | | | | | | | |
| 2a$^{1619}$ | SO$_3$H | H | H | SO$_3$H | NHCOCH$_3$ | OMe | CONH$_2$ | 2-Carboxy ethyl | H | Propyl | Propyl |
| 2a$^{1620}$ | H | SO$_3$H | SO$_3$H | H | | | | | | | |
| 2a$^{1621}$ | SO$_3$H | H | H | SO$_3$H | NHCOCH$_3$ | OMe | CONH$_2$ | 2-Carboxy ethyl | H | Butyl | Butyl |
| 2a$^{1622}$ | H | SO$_3$H | SO$_3$H | H | | | | | | | |
| 2a$^{1623}$ | SO$_3$H | H | H | SO$_3$H | NHCOCH$_3$ | OMe | CONH$_2$ | 2-Carboxy ethyl | H | 2-Hydroxy ethyl | 2-Hydroxy ethyl |
| 2a$^{1624}$ | H | SO$_3$H | SO$_3$H | H | | | | | | | |
| 2a$^{1625}$ | SO$_3$H | H | H | SO$_3$H | NHCOCH$_3$ | OMe | CONH$_2$ | 2-Carboxy ethyl | H | Hexyl | Hexyl |
| 2a$^{1626}$ | H | SO$_3$H | SO$_3$H | H | | | | | | | |
| 2a$^{1627}$ | SO$_3$H | H | H | SO$_3$H | NHCOCH$_3$ | OMe | CONH$_2$ | 2-Carboxy ethyl | H | Butyl | Methyl |
| 2a$^{1628}$ | H | SO$_3$H | SO$_3$H | H | | | | | | | |
| 2a$^{1629}$ | SO$_3$H | H | H | SO$_3$H | NHCOCH$_3$ | OMe | CONH$_2$ | 2-Carboxy ethyl | H | Butyl | Ethyl |
| 2a$^{1630}$ | H | SO$_3$H | SO$_3$H | H | | | | | | | |
| 2a$^{1631}$ | SO$_3$H | H | H | SO$_3$H | NHCOCH$_3$ | OMe | CONH$_2$ | 2-Carboxy ethyl | H | Cyclohexyl | Methyl |
| 2a$^{1632}$ | H | SO$_3$H | SO$_3$H | H | | | | | | | |
| 2a$^{1633}$ | SO$_3$H | H | H | SO$_3$H | NHCOCH$_3$ | OMe | CONH$_2$ | 2-Carboxy ethyl | H | Cyclohexyl | Ethyl |
| 2a$^{1634}$ | H | SO$_3$H | SO$_3$H | H | | | | | | | |
| 2a$^{1635}$ | SO$_3$H | H | H | SO$_3$H | NHCOCH$_3$ | OMe | CONH$_2$ | 2-Carboxy ethyl | H | Cyclohexyl | 2-Hydroxyl ethyl |
| 2a$^{1636}$ | H | SO$_3$H | SO$_3$H | H | | | | | | | |
| 2a$^{1637}$ | SO$_3$H | H | H | SO$_3$H | Methyl | Methyl | CN | 2-(4-Sulfophenyl) ethyl | H | Methyl | H |
| 2a$^{1638}$ | H | SO$_3$H | SO$_3$H | H | | | | | | | |
| 2a$^{1639}$ | SO$_3$H | H | H | SO$_3$H | Methyl | Methyl | CN | 2-(4-Sulfophenyl) ethyl | H | Ethyl | H |
| 2a$^{1640}$ | H | SO$_3$H | SO$_3$H | H | | | | | | | |
| 2a$^{1641}$ | SO$_3$H | H | H | SO$_3$H | Methyl | Methyl | CN | 2-(4-Sulfophenyl) ethyl | H | n-Propyl | H |
| 2a$^{1642}$ | H | SO$_3$H | SO$_3$H | H | | | | | | | |
| 2a$^{1643}$ | SO$_3$H | H | H | SO$_3$H | Methyl | Methyl | CN | 2-(4-Sulfophenyl) ethyl | H | Isopropyl | H |
| 2a$^{1644}$ | H | SO$_3$H | SO$_3$H | H | | | | | | | |
| 2a$^{1645}$ | SO$_3$H | H | H | SO$_3$H | Methyl | Methyl | CN | 2-(4-Sulfophenyl) ethyl | H | 1-Ethyl propyl | H |
| 2a$^{1646}$ | H | SO$_3$H | SO$_3$H | H | | | | | | | |
| 2a$^{1647}$ | SO$_3$H | H | H | SO$_3$H | Methyl | Methyl | CN | 2-(4-Sulfophenyl) ethyl | H | 1,2-Dimethyl propyl | H |
| 2a$^{1648}$ | H | SO$_3$H | SO$_3$H | H | | | | | | | |
| 2a$^{1649}$ | SO$_3$H | H | H | SO$_3$H | Methyl | Methyl | CN | 2-(4-Sulfophenyl) ethyl | H | 2,2-Dimethyl propyl | H |
| 2a$^{1650}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{1651}$ | SO$_3$H | H | H | SO$_3$H | Methyl | Methyl | CN | 2-(4-Sulfophenyl)ethyl | H | Butyl | H |
| $2a^{1652}$ | H | SO$_3$H | SO$_3$H | H | | | | | | | |
| $2a^{1653}$ | SO$_3$H | H | H | SO$_3$H | Methyl | Methyl | CN | 2-(4-Sulfophenyl)ethyl | H | 2-Methyl butyl | H |
| $2a^{1654}$ | H | SO$_3$H | SO$_3$H | H | | | | | | | |
| $2a^{1655}$ | SO$_3$H | H | H | SO$_3$H | Methyl | Methyl | CN | 2-(4-Sulfophenyl)ethyl | H | Tert butyl | H |
| $2a^{1656}$ | H | SO$_3$H | SO$_3$H | H | | | | | | | |
| $2a^{1657}$ | SO$_3$H | H | H | SO$_3$H | Methyl | Methyl | CN | 2-(4-Sulfophenyl)ethyl | H | 3-Methyl butyl | H |
| $2a^{1658}$ | H | SO$_3$H | SO$_3$H | H | | | | | | | |
| $2a^{1659}$ | SO$_3$H | H | H | SO$_3$H | Methyl | Methyl | CN | 2-(4-Sulfophenyl)ethyl | H | Sec butyl | H |
| $2a^{1660}$ | H | SO$_3$H | SO$_3$H | H | | | | | | | |
| $2a^{1661}$ | SO$_3$H | H | H | SO$_3$H | Methyl | Methyl | CN | 2-(4-Sulfophenyl)ethyl | H | Pentyl | H |
| $2a^{1662}$ | H | SO$_3$H | SO$_3$H | H | | | | | | | |
| $2a^{1663}$ | SO$_3$H | H | H | SO$_3$H | Methyl | Methyl | CN | 2-(4-Sulfophenyl)ethyl | H | Hexyl | H |
| $2a^{1664}$ | H | SO$_3$H | SO$_3$H | H | | | | | | | |
| $2a^{1665}$ | SO$_3$H | H | H | SO$_3$H | Methyl | Methyl | CN | 2-(4-Sulfophenyl)ethyl | H | Cyclobutyl | H |
| $2a^{1666}$ | H | SO$_3$H | SO$_3$H | H | | | | | | | |
| $2a^{1667}$ | SO$_3$H | H | H | SO$_3$H | Methyl | Methyl | CN | 2-(4-Sulfophenyl)ethyl | H | Cyclopentyl | H |
| $2a^{1668}$ | H | SO$_3$H | SO$_3$H | H | | | | | | | |
| $2a^{1669}$ | SO$_3$H | H | H | SO$_3$H | Methyl | Methyl | CN | 2-(4-Sulfophenyl)ethyl | H | Cyclohexyl | H |
| $2a^{1670}$ | H | SO$_3$H | SO$_3$H | H | | | | | | | |
| $2a^{1671}$ | SO$_3$H | H | H | SO$_3$H | Methyl | Methyl | CN | 2-(4-Sulfophenyl)ethyl | H | 2-Methyl cyclohexyl | H |
| $2a^{1672}$ | H | SO$_3$H | SO$_3$H | H | | | | | | | |
| $2a^{1673}$ | SO$_3$H | H | H | SO$_3$H | Methyl | Methyl | CN | 2-(4-Sulfophenyl)ethyl | H | 3-Methyl cyclohexyl | H |
| $2a^{1674}$ | H | SO$_3$H | SO$_3$H | H | | | | | | | |
| $2a^{1675}$ | SO$_3$H | H | H | SO$_3$H | Methyl | Methyl | CN | 2-(4-Sulfophenyl)ethyl | H | Pentan-2-yl | H |
| $2a^{1676}$ | H | SO$_3$H | SO$_3$H | H | | | | | | | |
| $2a^{1677}$ | SO$_3$H | H | H | SO$_3$H | Methyl | Methyl | CN | 2-(4-Sulfophenyl)ethyl | H | 2-Ethylhexyl | H |
| $2a^{1678}$ | H | SO$_3$H | SO$_3$H | H | | | | | | | |
| $2a^{1679}$ | SO$_3$H | H | H | SO$_3$H | Methyl | Methyl | CN | 2-(4-Sulfophenyl)ethyl | H | Phenyl | H |
| $2a^{1680}$ | H | SO$_3$H | SO$_3$H | H | | | | | | | |
| $2a^{1681}$ | SO$_3$H | H | H | SO$_3$H | Methyl | Methyl | CN | 2-(4-Sulfophenyl)ethyl | H | Benzyl | H |
| $2a^{1682}$ | H | SO$_3$H | SO$_3$H | H | | | | | | | |
| $2a^{1683}$ | SO$_3$H | H | H | SO$_3$H | Methyl | Methyl | CN | 2-(4-Sulfophenyl)ethyl | H | Allyl | H |
| $2a^{1684}$ | H | SO$_3$H | SO$_3$H | H | | | | | | | |
| $2a^{1685}$ | SO$_3$H | H | H | SO$_3$H | Methyl | Methyl | CN | 2-(4-Sulfophenyl)ethyl | H | 2-Methoxy ethyl | H |
| $2a^{1686}$ | H | SO$_3$H | SO$_3$H | H | | | | | | | |
| $2a^{1687}$ | SO$_3$H | H | H | SO$_3$H | Methyl | Methyl | CN | 2-(4-Sulfophenyl)ethyl | H | 3-Methoxy propyl | H |
| $2a^{1688}$ | H | SO$_3$H | SO$_3$H | H | | | | | | | |
| $2a^{1689}$ | SO$_3$H | H | H | SO$_3$H | Methyl | Methyl | CN | 2-(4-Sulfophenyl)ethyl | H | 3-Chloropropyl | H |
| $2a^{1690}$ | H | SO$_3$H | SO$_3$H | H | | | | | | | |
| $2a^{1691}$ | SO$_3$H | H | H | SO$_3$H | Methyl | Methyl | CN | 2-(4-Sulfophenyl)ethyl | H | 2-Methyl thioethyl | H |
| $2a^{1692}$ | H | SO$_3$H | SO$_3$H | H | | | | | | | |
| $2a^{1693}$ | SO$_3$H | H | H | SO$_3$H | Methyl | Methyl | CN | 2-(4-Sulfophenyl)ethyl | H | 2-Fluoroethyl | H |
| $2a^{1694}$ | H | SO$_3$H | SO$_3$H | H | | | | | | | |
| $2a^{1695}$ | SO$_3$H | H | H | SO$_3$H | Methyl | Methyl | CN | 2-(4-Sulfophenyl)ethyl | H | 2-Chloro ethyl | H |
| $2a^{1696}$ | H | SO$_3$H | SO$_3$H | H | | | | | | | |
| $2a^{1697}$ | SO$_3$H | H | H | SO$_3$H | Methyl | Methyl | CN | 2-(4-Sulfophenyl)ethyl | H | 2-(2-Hydroxy ethyl sulfonyl)ethyl | H |
| $2a^{1698}$ | H | SO$_3$H | SO$_3$H | H | | | | | | | |
| $2a^{1699}$ | SO$_3$H | H | H | SO$_3$H | Methyl | Methyl | CN | 2-(4-Sulfophenyl)ethyl | H | 2-(2-tert Butyl sulfanyl ethyl sulfonyl)ethyl | H |
| $2a^{1700}$ | H | SO$_3$H | SO$_3$H | H | | | | | | | |
| $2a^{1701}$ | SO$_3$H | H | H | SO$_3$H | Methyl | Methyl | CN | 2-(4-Sulfophenyl)ethyl | H | 2-(2-Hydroxy ethoxy)propyl | H |
| $2a^{1702}$ | H | SO$_3$H | SO$_3$H | H | | | | | | | |
| $2a^{1703}$ | SO$_3$H | H | H | SO$_3$H | Methyl | Methyl | CN | 2-(4-Sulfophenyl)ethyl | H | 2-(2-Hydroxy ethoxy)ethyl | H |
| $2a^{1704}$ | H | SO$_3$H | SO$_3$H | H | | | | | | | |
| $2a^{1705}$ | SO$_3$H | H | H | SO$_3$H | Methyl | Methyl | CN | 2-(4-Sulfophenyl)ethyl | H | 3-(4-Hydroxy butoxy)propyl | H |
| $2a^{1706}$ | H | SO$_3$H | SO$_3$H | H | | | | | | | |
| $2a^{1707}$ | SO$_3$H | H | H | SO$_3$H | Methyl | Methyl | CN | 2-(4-Sulfophenyl)ethyl | H | 3-(2-Phenoxy ethoxyl)propyl | H |
| $2a^{1708}$ | H | SO$_3$H | SO$_3$H | H | | | | | | | |
| $2a^{1709}$ | SO$_3$H | H | H | SO$_3$H | Methyl | Methyl | CN | 2-(4-Sulfophenyl)ethyl | H | 3-Isopropxy propyl | H |
| $2a^{1710}$ | H | SO$_3$H | SO$_3$H | H | | | | | | | |
| $2a^{1711}$ | SO$_3$H | H | H | SO$_3$H | Methyl | Methyl | CN | 2-(4-Sulfophenyl)ethyl | H | 3-Ethoxy propyl | H |
| $2a^{1712}$ | H | SO$_3$H | SO$_3$H | H | | | | | | | |
| $2a^{1713}$ | SO$_3$H | H | H | SO$_3$H | Methyl | Methyl | CN | 2-(4-Sulfophenyl)ethyl | H | 3-Ethoxy butyl | H |
| $2a^{1714}$ | H | SO$_3$H | SO$_3$H | H | | | | | | | |
| $2a^{1715}$ | SO$_3$H | H | H | SO$_3$H | Methyl | Methyl | CN | 2-(4-Sulfophenyl)ethyl | H | 4-(2-Hydroxy ethane sulfonyl)phenyl | H |
| $2a^{1716}$ | H | SO$_3$H | SO$_3$H | H | | | | | | | |
| $2a^{1717}$ | SO$_3$H | H | H | SO$_3$H | Methyl | Methyl | CONH$_2$ | 2-(4-Sulfophenyl)ethyl | H | Methyl | H |
| $2a^{1718}$ | H | SO$_3$H | SO$_3$H | H | | | | | | | |
| $2a^{1719}$ | SO$_3$H | H | H | SO$_3$H | Methyl | Methyl | CONH$_2$ | 2-(4-Sulfophenyl)ethyl | H | Ethyl | H |
| $2a^{1720}$ | H | SO$_3$H | SO$_3$H | H | | | | | | | |
| $2a^{1721}$ | SO$_3$H | H | H | SO$_3$H | Methyl | Methyl | CONH$_2$ | 2-(4-Sulfophenyl)ethyl | H | n-Propyl | H |
| $2a^{1722}$ | H | SO$_3$H | SO$_3$H | H | | | | | | | |
| $2a^{1723}$ | SO$_3$H | H | H | SO$_3$H | Methyl | Methyl | CONH$_2$ | 2-(4-Sulfophenyl)ethyl | H | Isopropyl | H |
| $2a^{1724}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{1725}$ | SO$_3$H | H | H | SO$_3$H | Methyl | Methyl | CONH$_2$ | 2-(4-Sulfophenyl)ethyl | H | 1-Ethyl propyl | H |
| $2a^{1726}$ | H | SO$_3$H | SO$_3$H | H | | | | | | | |
| $2a^{1727}$ | SO$_3$H | H | H | SO$_3$H | Methyl | Methyl | CONH$_2$ | 2-(4-Sulfophenyl)ethyl | H | 1,2-Dimethyl propyl | H |
| $2a^{1728}$ | H | SO$_3$H | SO$_3$H | H | | | | | | | |
| $2a^{1729}$ | SO$_3$H | H | H | SO$_3$H | Methyl | Methyl | CONH$_2$ | 2-(4-Sulfophenyl)ethyl | H | 2,2-Dimethyl propyl | H |
| $2a^{1730}$ | H | SO$_3$H | SO$_3$H | H | | | | | | | |
| $2a^{1731}$ | SO$_3$H | H | H | SO$_3$H | Methyl | Methyl | CONH$_2$ | 2-(4-Sulfophenyl)ethyl | H | Butyl | H |
| $2a^{1732}$ | H | SO$_3$H | SO$_3$H | H | | | | | | | |
| $2a^{1733}$ | SO$_3$H | H | H | SO$_3$H | Methyl | Methyl | CONH$_2$ | 2-(4-Sulfophenyl)ethyl | H | 2-Methyl butyl | H |
| $2a^{1734}$ | H | SO$_3$H | SO$_3$H | H | | | | | | | |
| $2a^{1735}$ | SO$_3$H | H | H | SO$_3$H | Methyl | Methyl | CONH$_2$ | 2-(4-Sulfophenyl)ethyl | H | Tert butyl | H |
| $2a^{1736}$ | H | SO$_3$H | SO$_3$H | H | | | | | | | |
| $2a^{1737}$ | SO$_3$H | H | H | SO$_3$H | Methyl | Methyl | CONH$_2$ | 2-(4-Sulfophenyl)ethyl | H | 3-Methyl butyl | H |
| $2a^{1738}$ | H | SO$_3$H | SO$_3$H | H | | | | | | | |
| $2a^{1739}$ | SO$_3$H | H | H | SO$_3$H | Methyl | Methyl | CONH$_2$ | 2-(4-Sulfophenyl)ethyl | H | Sec butyl | H |
| $2a^{1740}$ | H | SO$_3$H | SO$_3$H | H | | | | | | | |
| $2a^{1741}$ | SO$_3$H | H | H | SO$_3$H | Methyl | Methyl | CONH$_2$ | 2-(4-Sulfophenyl)ethyl | H | Pentyl | H |
| $2a^{1742}$ | H | SO$_3$H | SO$_3$H | H | | | | | | | |
| $2a^{1743}$ | SO$_3$H | H | H | SO$_3$H | Methyl | Methyl | CONH$_2$ | 2-(4-Sulfophenyl)ethyl | H | Hexyl | H |
| $2a^{1744}$ | H | SO$_3$H | SO$_3$H | H | | | | | | | |
| $2a^{1745}$ | SO$_3$H | H | H | SO$_3$H | Methyl | Methyl | CONH$_2$ | 2-(4-Sulfophenyl)ethyl | H | Cyclobutyl | H |
| $2a^{1746}$ | H | SO$_3$H | SO$_3$H | H | | | | | | | |
| $2a^{1747}$ | SO$_3$H | H | H | SO$_3$H | Methyl | Methyl | CONH$_2$ | 2-(4-Sulfophenyl)ethyl | H | Cyclopentyl | H |
| $2a^{1748}$ | H | SO$_3$H | SO$_3$H | H | | | | | | | |
| $2a^{1749}$ | SO$_3$H | H | H | SO$_3$H | Methyl | Methyl | CONH$_2$ | 2-(4-Sulfophenyl)ethyl | H | Cyclohexyl | H |
| $2a^{1750}$ | H | SO$_3$H | SO$_3$H | H | | | | | | | |
| $2a^{1751}$ | SO$_3$H | H | H | SO$_3$H | Methyl | Methyl | CONH$_2$ | 2-(4-Sulfophenyl)ethyl | H | 2-Methyl cyclohexyl | H |
| $2a^{1752}$ | H | SO$_3$H | SO$_3$H | H | | | | | | | |
| $2a^{1753}$ | SO$_3$H | H | H | SO$_3$H | Methyl | Methyl | CONH$_2$ | 2-(4-Sulfophenyl)ethyl | H | 3-Methyl cyclohexyl | H |
| $2a^{1754}$ | H | SO$_3$H | SO$_3$H | H | | | | | | | |
| $2a^{1755}$ | SO$_3$H | H | H | SO$_3$H | Methyl | Methyl | CONH$_2$ | 2-(4-Sulfophenyl)ethyl | H | Pentan-2-yl | H |
| $2a^{1756}$ | H | SO$_3$H | SO$_3$H | H | | | | | | | |
| $2a^{1757}$ | SO$_3$H | H | H | SO$_3$H | Methyl | Methyl | CONH$_2$ | 2-(4-Sulfophenyl)ethyl | H | 2-Ethylhexyl | H |
| $2a^{1758}$ | H | SO$_3$H | SO$_3$H | H | | | | | | | |
| $2a^{1759}$ | SO$_3$H | H | H | SO$_3$H | Methyl | Methyl | CONH$_2$ | 2-(4-Sulfophenyl)ethyl | H | Phenyl | H |
| $2a^{1760}$ | H | SO$_3$H | SO$_3$H | H | | | | | | | |
| $2a^{1761}$ | SO$_3$H | H | H | SO$_3$H | Methyl | Methyl | CONH$_2$ | 2-(4-Sulfophenyl)ethyl | H | Benzyl | H |
| $2a^{1762}$ | H | SO$_3$H | SO$_3$H | H | | | | | | | |
| $2a^{1763}$ | SO$_3$H | H | H | SO$_3$H | Methyl | Methyl | CONH$_2$ | 2-(4-Sulfophenyl)ethyl | H | Allyl | H |
| $2a^{1764}$ | H | SO$_3$H | SO$_3$H | H | | | | | | | |
| $2a^{1765}$ | SO$_3$H | H | H | SO$_3$H | Methyl | Methyl | CONH$_2$ | 2-(4-Sulfophenyl)ethyl | H | 2-Methoxy ethyl | H |
| $2a^{1766}$ | H | SO$_3$H | SO$_3$H | H | | | | | | | |
| $2a^{1767}$ | SO$_3$H | H | H | SO$_3$H | Methyl | Methyl | CONH$_2$ | 2-(4-Sulfophenyl)ethyl | H | 3-Methoxy propyl | H |
| $2a^{1768}$ | H | SO$_3$H | SO$_3$H | H | | | | | | | |
| $2a^{1769}$ | SO$_3$H | H | H | SO$_3$H | Methyl | Methyl | CONH$_2$ | 2-(4-Sulfophenyl)ethyl | H | 3-Chloropropyl | H |
| $2a^{1770}$ | H | SO$_3$H | SO$_3$H | H | | | | | | | |
| $2a^{1771}$ | SO$_3$H | H | H | SO$_3$H | Methyl | Methyl | CONH$_2$ | 2-(4-Sulfophenyl)ethyl | H | 2-Methyl thioethyl | H |
| $2a^{1772}$ | H | SO$_3$H | SO$_3$H | H | | | | | | | |
| $2a^{1773}$ | SO$_3$H | H | H | SO$_3$H | Methyl | Methyl | CONH$_2$ | 2-(4-Sulfophenyl)ethyl | H | 2-Fluoroethyl | H |
| $2a^{1774}$ | H | SO$_3$H | SO$_3$H | H | | | | | | | |
| $2a^{1775}$ | SO$_3$H | H | H | SO$_3$H | Methyl | Methyl | CONH$_2$ | 2-(4-Sulfophenyl)ethyl | H | 2-Chloro ethyl | H |
| $2a^{1776}$ | H | SO$_3$H | SO$_3$H | H | | | | | | | |
| $2a^{1777}$ | SO$_3$H | H | H | SO$_3$H | Methyl | Methyl | CONH$_2$ | 2-(4-Sulfophenyl)ethyl | H | 2-(2-Hydroxy ethyl sulfonyl)ethyl | H |
| $2a^{1778}$ | H | SO$_3$H | SO$_3$H | H | | | | | | | |
| $2a^{1779}$ | SO$_3$H | H | H | SO$_3$H | Methyl | Methyl | CONH$_2$ | 2-(4-Sulfophenyl)ethyl | H | 2-(2-tert Butyl sulfanyl ethyl sulfonyl)ethyl | H |
| $2a^{1780}$ | H | SO$_3$H | SO$_3$H | H | | | | | | | |
| $2a^{1781}$ | SO$_3$H | H | H | SO$_3$H | Methyl | Methyl | CONH$_2$ | 2-(4-Sulfophenyl)ethyl | H | 2-(2-Hydroxy ethoxy)propyl | H |
| $2a^{1782}$ | H | SO$_3$H | SO$_3$H | H | | | | | | | |
| $2a^{1783}$ | SO$_3$H | H | H | SO$_3$H | Methyl | Methyl | CONH$_2$ | 2-(4-Sulfophenyl)ethyl | H | 2-(2-Hydroxy ethoxy)ethyl | H |
| $2a^{1784}$ | H | SO$_3$H | SO$_3$H | H | | | | | | | |
| $2a^{1785}$ | SO$_3$H | H | H | SO$_3$H | Methyl | Methyl | CONH$_2$ | 2-(4-Sulfophenyl)ethyl | H | 3-(4-Hydroxy butoxy)propyl | H |
| $2a^{1786}$ | H | SO$_3$H | SO$_3$H | H | | | | | | | |
| $2a^{1787}$ | SO$_3$H | H | H | SO$_3$H | Methyl | Methyl | CONH$_2$ | 2-(4-Sulfophenyl)ethyl | H | 3-(2-Phenoxy ethoxyl)propyl | H |
| $2a^{1782}$ | H | SO$_3$H | SO$_3$H | H | | | | | | | |
| $2a^{1789}$ | SO$_3$H | H | H | SO$_3$H | Methyl | Methyl | CONH$_2$ | 2-(4-Sulfophenyl)ethyl | H | 3-Isopropxy propyl | H |
| $2a^{1790}$ | H | SO$_3$H | SO$_3$H | H | | | | | | | |
| $2a^{1791}$ | SO$_3$H | H | H | SO$_3$H | Methyl | Methyl | CONH$_2$ | 2-(4-Sulfophenyl)ethyl | H | 3-Ethoxy propyl | H |
| $2a^{1792}$ | H | SO$_3$H | SO$_3$H | H | | | | | | | |
| $2a^{1793}$ | SO$_3$H | H | H | SO$_3$H | Methyl | Methyl | CONH$_2$ | 2-(4-Sulfophenyl)ethyl | H | 3-Ethoxy butyl | H |
| $2a^{1794}$ | H | SO$_3$H | SO$_3$H | H | | | | | | | |
| $2a^{1795}$ | SO$_3$H | H | H | SO$_3$H | Methyl | Methyl | CONH$_2$ | 2-(4-Sulfophenyl)ethyl | H | 4-(2-Hydroxy ethane sulfonyl)phenyl | H |
| $2a^{1796}$ | H | SO$_3$H | SO$_3$H | H | | | | | | | |
| $2a^{1797}$ | SO$_3$H | H | H | SO$_3$H | NHCOCH$_3$ | OMe | CN | 2-(4-Sulfophenyl)ethyl | H | Methyl | H |
| $2a^{1798}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a¹⁷⁹⁹ | SO₃H | H | H | SO₃H | NHCOCH₃ | OMe | CN | 2-(4-Sulfophenyl) ethyl | H | Ethyl | H |
| 2a¹⁸⁰⁰ | H | SO₃H | SO₃H | H | | | | | | | |
| 2a¹⁸⁰¹ | SO₃H | H | H | SO₃H | NHCOCH₃ | OMe | CN | 2-(4-Sulfophenyl) ethyl | H | n-Propyl | H |
| 2a¹⁸⁰² | H | SO₃H | SO₃H | H | | | | | | | |
| 2a¹⁸⁰³ | SO₃H | H | H | SO₃H | NHCOCH₃ | OMe | CN | 2-(4-Sulfophenyl) ethyl | H | Isopropyl | H |
| 2a¹⁸⁰⁴ | H | SO₃H | SO₃H | H | | | | | | | |
| 2a¹⁸⁰⁵ | SO₃H | H | H | SO₃H | NHCOCH₃ | OMe | CN | 2-(4-Sulfophenyl) ethyl | H | 1-Ethyl propyl | H |
| 2a¹⁸⁰⁶ | H | SO₃H | SO₃H | H | | | | | | | |
| 2a¹⁸⁰⁷ | SO₃H | H | H | SO₃H | NHCOCH₃ | OMe | CN | 2-(4-Sulfophenyl) ethyl | H | 1,2-Dimethyl propyl | H |
| 2a¹⁸⁰⁸ | H | SO₃H | SO₃H | H | | | | | | | |
| 2a¹⁸⁰⁹ | SO₃H | H | H | SO₃H | NHCOCH₃ | OMe | CN | 2-(4-Sulfophenyl) ethyl | H | 2,2-Dimethyl propyl | H |
| 2a¹⁸¹⁰ | H | SO₃H | SO₃H | H | | | | | | | |
| 2a¹⁸¹¹ | SO₃H | H | H | SO₃H | NHCOCH₃ | OMe | CN | 2-(4-Sulfophenyl) ethyl | H | Butyl | H |
| 2a¹⁸¹² | H | SO₃H | SO₃H | H | | | | | | | |
| 2a¹⁸¹³ | SO₃H | H | H | SO₃H | NHCOCH₃ | OMe | CN | 2-(4-Sulfophenyl) ethyl | H | 2-Methyl butyl | H |
| 2a¹⁸¹⁴ | H | SO₃H | SO₃H | H | | | | | | | |
| 2a¹⁸¹⁵ | SO₃H | H | H | SO₃H | NHCOCH₃ | OMe | CN | 2-(4-Sulfophenyl) ethyl | H | Tert butyl | H |
| 2a¹⁸¹⁶ | H | SO₃H | SO₃H | H | | | | | | | |
| 2a¹⁸¹⁷ | SO₃H | H | H | SO₃H | NHCOCH₃ | OMe | CN | 2-(4-Sulfophenyl) ethyl | H | 3-Methyl butyl | H |
| 2a¹⁸¹⁸ | H | SO₃H | SO₃H | H | | | | | | | |
| 2a¹⁸¹⁹ | SO₃H | H | H | SO₃H | NHCOCH₃ | OMe | CN | 2-(4-Sulfophenyl) ethyl | H | Sec butyl | H |
| 2a¹⁸²⁰ | H | SO₃H | SO₃H | H | | | | | | | |
| 2a¹⁸²¹ | SO₃H | H | H | SO₃H | NHCOCH₃ | OMe | CN | 2-(4-Sulfophenyl) ethyl | H | Pentyl | H |
| 2a¹⁸²² | H | SO₃H | SO₃H | H | | | | | | | |
| 2a¹⁸²³ | SO₃H | H | H | SO₃H | NHCOCH₃ | OMe | CN | 2-(4-Sulfophenyl) ethyl | H | Hexyl | H |
| 2a¹⁸²⁴ | H | SO₃H | SO₃H | H | | | | | | | |
| 2a¹⁸²⁵ | SO₃H | H | H | SO₃H | NHCOCH₃ | OMe | CN | 2-(4-Sulfophenyl) ethyl | H | Cyclobutyl | H |
| 2a¹⁸²⁶ | H | SO₃H | SO₃H | H | | | | | | | |
| 2a¹⁸²⁷ | SO₃H | H | H | SO₃H | NHCOCH₃ | OMe | CN | 2-(4-Sulfophenyl) ethyl | H | Cyclopentyl | H |
| 2a¹⁸²⁸ | H | SO₃H | SO₃H | H | | | | | | | |
| 2a¹⁸²⁹ | SO₃H | H | H | SO₃H | NHCOCH₃ | OMe | CN | 2-(4-Sulfophenyl) ethyl | H | Cyclohexyl | H |
| 2a¹⁸³⁰ | H | SO₃H | SO₃H | H | | | | | | | |
| 2a¹⁸³¹ | SO₃H | H | H | SO₃H | NHCOCH₃ | OMe | CN | 2-(4-Sulfophenyl) ethyl | H | 2-Methyl cyclohexyl | H |
| 2a¹⁸³² | H | SO₃H | SO₃H | H | | | | | | | |
| 2a¹⁸³³ | SO₃H | H | H | SO₃H | NHCOCH₃ | OMe | CN | 2-(4-Sulfophenyl) ethyl | H | 3-Methyl cyclohexyl | H |
| 2a¹⁸³⁴ | H | SO₃H | SO₃H | H | | | | | | | |
| 2a¹⁸³⁵ | SO₃H | H | H | SO₃H | NHCOCH₃ | OMe | CN | 2-(4-Sulfophenyl) ethyl | H | Pentan-2-yl | H |
| 2a¹⁸³⁶ | H | SO₃H | SO₃H | H | | | | | | | |
| 2a¹⁸³⁷ | SO₃H | H | H | SO₃H | NHCOCH₃ | OMe | CN | 2-(4-Sulfophenyl) ethyl | H | 2-Ethylhexyl | H |
| 2a¹⁸³⁸ | H | SO₃H | SO₃H | H | | | | | | | |
| 2a¹⁸³⁹ | SO₃H | H | H | SO₃H | NHCOCH₃ | OMe | CN | 2-(4-Sulfophenyl) ethyl | H | Phenyl | H |
| 2a¹⁸⁴⁰ | H | SO₃H | SO₃H | H | | | | | | | |
| 2a¹⁸⁴¹ | SO₃H | H | H | SO₃H | NHCOCH₃ | OMe | CN | 2-(4-Sulfophenyl) ethyl | H | Benzyl | H |
| 2a¹⁸⁴² | H | SO₃H | SO₃H | H | | | | | | | |
| 2a¹⁸⁴³ | SO₃H | H | H | SO₃H | NHCOCH₃ | OMe | CN | 2-(4-Sulfophenyl) ethyl | H | Allyl | H |
| 2a¹⁸⁴⁴ | H | SO₃H | SO₃H | H | | | | | | | |
| 2a¹⁸⁴⁵ | SO₃H | H | H | SO₃H | NHCOCH₃ | OMe | CN | 2-(4-Sulfophenyl) ethyl | H | 2-Methoxy ethyl | H |
| 2a¹⁸⁴⁶ | H | SO₃H | SO₃H | H | | | | | | | |
| 2a¹⁸⁴⁷ | SO₃H | H | H | SO₃H | NHCOCH₃ | OMe | CN | 2-(4-Sulfophenyl) ethyl | H | 3-Methoxy propyl | H |
| 2a¹⁸⁴⁸ | H | SO₃H | SO₃H | H | | | | | | | |
| 2a¹⁸⁴⁹ | SO₃H | H | H | SO₃H | NHCOCH₃ | OMe | CN | 2-(4-Sulfophenyl) ethyl | H | 3-Chloropropyl | H |
| 2a¹⁸⁵⁰ | H | SO₃H | SO₃H | H | | | | | | | |
| 2a¹⁸⁵¹ | SO₃H | H | H | SO₃H | NHCOCH₃ | OMe | CN | 2-(4-Sulfophenyl) ethyl | H | 2-Methyl thioethyl | H |
| 2a¹⁸⁵² | H | SO₃H | SO₃H | H | | | | | | | |
| 2a¹⁸⁵³ | SO₃H | H | H | SO₃H | NHCOCH₃ | OMe | CN | 2-(4-Sulfophenyl) ethyl | H | 2-Fluoroethyl | H |
| 2a¹⁸⁵⁴ | H | SO₃H | SO₃H | H | | | | | | | |
| 2a¹⁸⁵⁵ | SO₃H | H | H | SO₃H | NHCOCH₃ | OMe | CN | 2-(4-Sulfophenyl) ethyl | H | 2-Chloro ethyl | H |
| 2a¹⁸⁵⁶ | H | SO₃H | SO₃H | H | | | | | | | |
| 2a¹⁸⁵⁷ | SO₃H | H | H | SO₃H | NHCOCH₃ | OMe | CN | 2-(4-Sulfophenyl) ethyl | H | 2-(2-Hydroxy ethyl sulfonyl)ethyl | H |
| 2a¹⁸⁵⁸ | H | SO₃H | SO₃H | H | | | | | | | |
| 2a¹⁸⁵⁹ | SO₃H | H | H | SO₃H | NHCOCH₃ | OMe | CN | 2-(4-Sulfophenyl) ethyl | H | 2-(2-tert Butyl sulfanyl ethyl sulfonyl)ethyl | H |
| 2a¹⁸⁶⁰ | H | SO₃H | SO₃H | H | | | | | | | |
| 2a¹⁸⁶¹ | SO₃H | H | H | SO₃H | NHCOCH₃ | OMe | CN | 2-(4-Sulfophenyl) ethyl | H | 2-(2-Hydroxy ethoxy)propyl | H |
| 2a¹⁸⁶² | H | SO₃H | SO₃H | H | | | | | | | |
| 2a¹⁸⁶³ | SO₃H | H | H | SO₃H | NHCOCH₃ | OMe | CN | 2-(4-Sulfophenyl) ethyl | H | 2-(2-Hydroxy ethoxy)ethyl | H |
| 2a¹⁸⁶⁴ | H | SO₃H | SO₃H | H | | | | | | | |
| 2a¹⁸⁶⁵ | SO₃H | H | H | SO₃H | NHCOCH₃ | OMe | CN | 2-(4-Sulfophenyl) ethyl | H | 3-(4-Hydroxy butoxy)propyl | H |
| 2a¹⁸⁶⁶ | H | SO₃H | SO₃H | H | | | | | | | |
| 2a¹⁸⁶⁷ | SO₃H | H | H | SO₃H | NHCOCH₃ | OMe | CN | 2-(4-Sulfophenyl) ethyl | H | 3-(2-Phenoxy ethoxyl)propyl | H |
| 2a¹⁸⁶⁸ | H | SO₃H | SO₃H | H | | | | | | | |
| 2a¹⁸⁶² | SO₃H | H | H | SO₃H | NHCOCH₃ | OMe | CN | 2-(4-Sulfophenyl) ethyl | H | 3-Isopropxy propyl | H |
| 2a¹⁸⁷⁰ | H | SO₃H | SO₃H | H | | | | | | | |
| 2a¹⁸⁷¹ | SO₃H | H | H | SO₃H | NHCOCH₃ | OMe | CN | 2-(4-Sulfophenyl) ethyl | H | 3-Ethoxy propyl | H |
| 2a¹⁸⁷² | H | SO₃H | SO₃H | H | | | | | | | |

TABLE 3-continued

| S/No | R$^{3a}$ | R$^{4a}$ | R$^{5a}$ | R$^{6a}$ | R$^{10a}$/R$^{14a}$ | R$^{9a}$/R$^{13a}$ | R$^{24a}$/R$^{30a}$ | R$^{27a}$/R$^{33a}$ | R$^{26a}$/R$^{34a}$ | R$^{25a}$/R$^{31a}$ | R$^{26a}$/R$^{32a}$ |
|---|---|---|---|---|---|---|---|---|---|---|---|
| 2a$^{1873}$ | SO$_3$H | H | H | SO$_3$H | NHCOCH$_3$ | OMe | CN | 2-(4-Sulfophenyl)ethyl | H | 3-Ethoxy butyl | H |
| 2a$^{1874}$ | H | SO$_3$H | SO$_3$H | H | | | | | | | |
| 2a$^{1875}$ | SO$_3$H | H | H | SO$_3$H | NHCOCH$_3$ | OMe | CN | 2-(4-Sulfophenyl)ethyl | H | 4-(2-Hydroxy ethane sulfonyl)phenyl | H |
| 2a$^{1876}$ | H | SO$_3$H | SO$_3$H | H | | | | | | | |
| 2a$^{1877}$ | SO$_3$H | H | H | SO$_3$H | NHCOCH$_3$ | OMe | CONH$_2$ | 2-(4-Sulfophenyl)ethyl | H | Methyl | H |
| 2a$^{1878}$ | H | SO$_3$H | SO$_3$H | H | | | | | | | |
| 2a$^{1879}$ | SO$_3$H | H | H | SO$_3$H | NHCOCH$_3$ | OMe | CONH$_2$ | 2-(4-Sulfophenyl)ethyl | H | Ethyl | H |
| 2a$^{1880}$ | H | SO$_3$H | SO$_3$H | H | | | | | | | |
| 2a$^{1881}$ | SO$_3$H | H | H | SO$_3$H | NHCOCH$_3$ | OMe | CONH$_2$ | 2-(4-Sulfophenyl)ethyl | H | n-Propyl | H |
| 2a$^{1882}$ | H | SO$_3$H | SO$_3$H | H | | | | | | | |
| 2a$^{1883}$ | SO$_3$H | H | H | SO$_3$H | NHCOCH$_3$ | OMe | CONH$_2$ | 2-(4-Sulfophenyl)ethyl | H | Isopropyl | H |
| 2a$^{1884}$ | H | SO$_3$H | SO$_3$H | H | | | | | | | |
| 2a$^{1885}$ | SO$_3$H | H | H | SO$_3$H | NHCOCH$_3$ | OMe | CONH$_2$ | 2-(4-Sulfophenyl)ethyl | H | 1-Ethyl propyl | H |
| 2a$^{1886}$ | H | SO$_3$H | SO$_3$H | H | | | | | | | |
| 2a$^{1887}$ | SO$_3$H | H | H | SO$_3$H | NHCOCH$_3$ | OMe | CONH$_2$ | 2-(4-Sulfophenyl)ethyl | H | 1,2-Dimethyl propyl | H |
| 2a$^{1888}$ | H | SO$_3$H | SO$_3$H | H | | | | | | | |
| 2a$^{1889}$ | SO$_3$H | H | H | SO$_3$H | NHCOCH$_3$ | OMe | CONH$_2$ | 2-(4-Sulfophenyl)ethyl | H | 2,2-Dimethyl propyl | H |
| 2a$^{1890}$ | H | SO$_3$H | SO$_3$H | H | | | | | | | |
| 2a$^{1891}$ | SO$_3$H | H | H | SO$_3$H | NHCOCH$_3$ | OMe | CONH$_2$ | 2-(4-Sulfophenyl)ethyl | H | Butyl | H |
| 2a$^{1892}$ | H | SO$_3$H | SO$_3$H | H | | | | | | | |
| 2a$^{1893}$ | SO$_3$H | H | H | SO$_3$H | NHCOCH$_3$ | OMe | CONH$_2$ | 2-(4-Sulfophenyl)ethyl | H | 2-Methyl butyl | H |
| 2a$^{1894}$ | H | SO$_3$H | SO$_3$H | H | | | | | | | |
| 2a$^{1895}$ | SO$_3$H | H | H | SO$_3$H | NHCOCH$_3$ | OMe | CONH$_2$ | 2-(4-Sulfophenyl)ethyl | H | Tert butyl | H |
| 2a$^{1896}$ | H | SO$_3$H | SO$_3$H | H | | | | | | | |
| 2a$^{1897}$ | SO$_3$H | H | H | SO$_3$H | NHCOCH$_3$ | OMe | CONH$_2$ | 2-(4-Sulfophenyl)ethyl | H | 3-Methyl butyl | H |
| 2a$^{1898}$ | H | SO$_3$H | SO$_3$H | H | | | | | | | |
| 2a$^{1899}$ | SO$_3$H | H | H | SO$_3$H | NHCOCH$_3$ | OMe | CONH$_2$ | 2-(4-Sulfophenyl)ethyl | H | Sec butyl | H |
| 2a$^{1900}$ | H | SO$_3$H | SO$_3$H | H | | | | | | | |
| 2a$^{1901}$ | SO$_3$H | H | H | SO$_3$H | NHCOCH$_3$ | OMe | CONH$_2$ | 2-(4-Sulfophenyl)ethyl | H | Pentyl | H |
| 2a$^{1902}$ | H | SO$_3$H | SO$_3$H | H | | | | | | | |
| 2a$^{1903}$ | SO$_3$H | H | H | SO$_3$H | NHCOCH$_3$ | OMe | CONH$_2$ | 2-(4-Sulfophenyl)ethyl | H | Hexyl | H |
| 2a$^{1904}$ | H | SO$_3$H | SO$_3$H | H | | | | | | | |
| 2a$^{1905}$ | SO$_3$H | H | H | SO$_3$H | NHCOCH$_3$ | OMe | CONH$_2$ | 2-(4-Sulfophenyl)ethyl | H | Cyclobutyl | H |
| 2a$^{1906}$ | H | SO$_3$H | SO$_3$H | H | | | | | | | |
| 2a$^{1907}$ | SO$_3$H | H | H | SO$_3$H | NHCOCH$_3$ | OMe | CONH$_2$ | 2-(4-Sulfophenyl)ethyl | H | Cyclopentyl | H |
| 2a$^{1908}$ | H | SO$_3$H | SO$_3$H | H | | | | | | | |
| 2a$^{1909}$ | SO$_3$H | H | H | SO$_3$H | NHCOCH$_3$ | OMe | CONH$_2$ | 2-(4-Sulfophenyl)ethyl | H | Cyclohexyl | H |
| 2a$^{1910}$ | H | SO$_3$H | SO$_3$H | H | | | | | | | |
| 2a$^{1911}$ | SO$_3$H | H | H | SO$_3$H | NHCOCH$_3$ | OMe | CONH$_2$ | 2-(4-Sulfophenyl)ethyl | H | 2-Methyl cyclohexyl | H |
| 2a$^{1912}$ | H | SO$_3$H | SO$_3$H | H | | | | | | | |
| 2a$^{1913}$ | SO$_3$H | H | H | SO$_3$H | NHCOCH$_3$ | OMe | CONH$_2$ | 2-(4-Sulfophenyl)ethyl | H | 3-Methyl cyclohexyl | H |
| 2a$^{1914}$ | H | SO$_3$H | SO$_3$H | H | | | | | | | |
| 2a$^{1915}$ | SO$_3$H | H | H | SO$_3$H | NHCOCH$_3$ | OMe | CONH$_2$ | 2-(4-Sulfophenyl)ethyl | H | Pentan-2-yl | H |
| 2a$^{1916}$ | H | SO$_3$H | SO$_3$H | H | | | | | | | |
| 2a$^{1917}$ | SO$_3$H | H | H | SO$_3$H | NHCOCH$_3$ | OMe | CONH$_2$ | 2-(4-Sulfophenyl)ethyl | H | 2-Ethylhexyl | H |
| 2a$^{1918}$ | H | SO$_3$H | SO$_3$H | H | | | | | | | |
| 2a$^{1919}$ | SO$_3$H | H | H | SO$_3$H | NHCOCH$_3$ | OMe | CONH$_2$ | 2-(4-Sulfophenyl)ethyl | H | Phenyl | H |
| 2a$^{1920}$ | H | SO$_3$H | SO$_3$H | H | | | | | | | |
| 2a$^{1921}$ | SO$_3$H | H | H | SO$_3$H | NHCOCH$_3$ | OMe | CONH$_2$ | 2-(4-Sulfophenyl)ethyl | H | Benzyl | H |
| 2a$^{1922}$ | H | SO$_3$H | SO$_3$H | H | | | | | | | |
| 2a$^{1923}$ | SO$_3$H | H | H | SO$_3$H | NHCOCH$_3$ | OMe | CONH$_2$ | 2-(4-Sulfophenyl)ethyl | H | Allyl | H |
| 2a$^{1924}$ | H | SO$_3$H | SO$_3$H | H | | | | | | | |
| 2a$^{1925}$ | SO$_3$H | H | H | SO$_3$H | NHCOCH$_3$ | OMe | CONH$_2$ | 2-(4-Sulfophenyl)ethyl | H | 2-Methoxy ethyl | H |
| 2a$^{1926}$ | H | SO$_3$H | SO$_3$H | H | | | | | | | |
| 2a$^{1927}$ | SO$_3$H | H | H | SO$_3$H | NHCOCH$_3$ | OMe | CONH$_2$ | 2-(4-Sulfophenyl)ethyl | H | 3-Methoxy propyl | H |
| 2a$^{1928}$ | H | SO$_3$H | SO$_3$H | H | | | | | | | |
| 2a$^{1929}$ | SO$_3$H | H | H | SO$_3$H | NHCOCH$_3$ | OMe | CONH$_2$ | 2-(4-Sulfophenyl)ethyl | H | 3-Chloropropyl | H |
| 2a$^{1930}$ | H | SO$_3$H | SO$_3$H | H | | | | | | | |
| 2a$^{1931}$ | SO$_3$H | H | H | SO$_3$H | NHCOCH$_3$ | OMe | CONH$_2$ | 2-(4-Sulfophenyl)ethyl | H | 2-Methyl thioethyl | H |
| 2a$^{1932}$ | H | SO$_3$H | SO$_3$H | H | | | | | | | |
| 2a$^{1933}$ | SO$_3$H | H | H | SO$_3$H | NHCOCH$_3$ | OMe | CONH$_2$ | 2-(4-Sulfophenyl)ethyl | H | 2-Fluoroethyl | H |
| 2a$^{1934}$ | H | SO$_3$H | SO$_3$H | H | | | | | | | |
| 2a$^{1935}$ | SO$_3$H | H | H | SO$_3$H | NHCOCH$_3$ | OMe | CONH$_2$ | 2-(4-Sulfophenyl)ethyl | H | 2-Chloro ethyl | H |
| 2a$^{1936}$ | H | SO$_3$H | SO$_3$H | H | | | | | | | |
| 2a$^{1937}$ | SO$_3$H | H | H | SO$_3$H | NHCOCH$_3$ | OMe | CONH$_2$ | 2-(4-Sulfophenyl)ethyl | H | 2-(2-Hydroxy ethyl sulfonyl)ethyl | H |
| 2a$^{1938}$ | H | SO$_3$H | SO$_3$H | H | | | | | | | |
| 2a$^{1939}$ | SO$_3$H | H | H | SO$_3$H | NHCOCH$_3$ | OMe | CONH$_2$ | 2-(4-Sulfophenyl)ethyl | H | 2-(2-tert Butyl sulfanyl ethyl sulfonyl)ethyl | H |
| 2a$^{1940}$ | H | SO$_3$H | SO$_3$H | H | | | | | | | |
| 2a$^{1941}$ | SO$_3$H | H | H | SO$_3$H | NHCOCH$_3$ | OMe | CONH$_2$ | 2-(4-Sulfophenyl)ethyl | H | 2-(2-Hydroxy ethoxy)propyl | H |
| 2a$^{1942}$ | H | SO$_3$H | SO$_3$H | H | | | | | | | |
| 2a$^{1943}$ | SO$_3$H | H | H | SO$_3$H | NHCOCH$_3$ | OMe | CONH$_2$ | 2-(4-Sulfophenyl)ethyl | H | 2-(2-Hydroxy ethoxy)ethyl | H |
| 2a$^{1944}$ | H | SO$_3$H | SO$_3$H | H | | | | | | | |
| 2a$^{1945}$ | SO$_3$H | H | H | SO$_3$H | NHCOCH$_3$ | OMe | CONH$_2$ | 2-(4-Sulfophenyl)ethyl | H | 3-(4-Hydroxy butoxy)propyl | H |
| 2a$^{1946}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{1947}$ | SO$_3$H | H | H | SO$_3$H | NHCOCH$_3$ | OMe | CONH$_2$ | 2-(4-Sulfophenyl)ethyl | H | 3-(2-Phenoxy ethoxyl)propyl | H |
| 2a$^{1948}$ | H | SO$_3$H | SO$_3$H | H | | | | | | | |
| 2a$^{1949}$ | SO$_3$H | H | H | SO$_3$H | NHCOCH$_3$ | OMe | CONH$_2$ | 2-(4-Sulfophenyl)ethyl | H | 3-Isopropxy propyl | H |
| 2a$^{1950}$ | H | SO$_3$H | SO$_3$H | H | | | | | | | |
| 2a$^{1951}$ | SO$_3$H | H | H | SO$_3$H | NHCOCH$_3$ | OMe | CONH$_2$ | 2-(4-Sulfophenyl)ethyl | H | 3-Ethoxy propyl | H |
| 2a$^{1952}$ | H | SO$_3$H | SO$_3$H | H | | | | | | | |
| 2a$^{1953}$ | SO$_3$H | H | H | SO$_3$H | NHCOCH$_3$ | OMe | CONH$_2$ | 2-(4-Sulfophenyl)ethyl | H | 3-Ethoxy butyl | H |
| 2a$^{1954}$ | H | SO$_3$H | SO$_3$H | H | | | | | | | |
| 2a$^{1955}$ | SO$_3$H | H | H | SO$_3$H | NHCOCH$_3$ | OMe | CONH$_2$ | 2-(4-Sulfophenyl)ethyl | H | 4-(2-Hydroxy ethane sulfonyl)phenyl | H |
| 2a$^{1956}$ | H | SO$_3$H | SO$_3$H | H | | | | | | | |
| 2a$^{1957}$ | SO$_3$H | H | H | SO$_3$H | Methyl | Methyl | CN | (4-Sulfophenyl)methyl | H | Methyl | H |
| 2a$^{1958}$ | H | SO$_3$H | SO$_3$H | H | | | | | | | |
| 2a$^{1959}$ | SO$_3$H | H | H | SO$_3$H | Methyl | Methyl | CN | (4-Sulfophenyl)methyl | H | Ethyl | H |
| 2a$^{1960}$ | H | SO$_3$H | SO$_3$H | H | | | | | | | |
| 2a$^{1961}$ | SO$_3$H | H | H | SO$_3$H | Methyl | Methyl | CN | (4-Sulfophenyl)methyl | H | n-Propyl | H |
| 2a$^{1962}$ | H | SO$_3$H | SO$_3$H | H | | | | | | | |
| 2a$^{1963}$ | SO$_3$H | H | H | SO$_3$H | Methyl | Methyl | CN | (4-Sulfophenyl)methyl | H | Isopropyl | H |
| 2a$^{1964}$ | H | SO$_3$H | SO$_3$H | H | | | | | | | |
| 2a$^{1965}$ | SO$_3$H | H | H | SO$_3$H | Methyl | Methyl | CN | (4-Sulfophenyl)methyl | H | 1-Ethyl propyl | H |
| 2a$^{1966}$ | H | SO$_3$H | SO$_3$H | H | | | | | | | |
| 2a$^{1967}$ | SO$_3$H | H | H | SO$_3$H | Methyl | Methyl | CN | (4-Sulfophenyl)methyl | H | 1,2-Dimethyl propyl | H |
| 2a$^{1968}$ | H | SO$_3$H | SO$_3$H | H | | | | | | | |
| 2a$^{1969}$ | SO$_3$H | H | H | SO$_3$H | Methyl | Methyl | CN | (4-Sulfophenyl)methyl | H | 2,2-Dimethyl propyl | H |
| 2a$^{1970}$ | H | SO$_3$H | SO$_3$H | H | | | | | | | |
| 2a$^{1971}$ | SO$_3$H | H | H | SO$_3$H | Methyl | Methyl | CN | (4-Sulfophenyl)methyl | H | Butyl | H |
| 2a$^{1972}$ | H | SO$_3$H | SO$_3$H | H | | | | | | | |
| 2a$^{1973}$ | SO$_3$H | H | H | SO$_3$H | Methyl | Methyl | CN | (4-Sulfophenyl)methyl | H | 2-Methyl butyl | H |
| 2a$^{1974}$ | H | SO$_3$H | SO$_3$H | H | | | | | | | |
| 2a$^{1975}$ | SO$_3$H | H | H | SO$_3$H | Methyl | Methyl | CN | (4-Sulfophenyl)methyl | H | Tert butyl | H |
| 2a$^{1976}$ | H | SO$_3$H | SO$_3$H | H | | | | | | | |
| 2a$^{1977}$ | SO$_3$H | H | H | SO$_3$H | Methyl | Methyl | CN | (4-Sulfophenyl)methyl | H | 3-Methyl butyl | H |
| 2a$^{1978}$ | H | SO$_3$H | SO$_3$H | H | | | | | | | |
| 2a$^{1979}$ | SO$_3$H | H | H | SO$_3$H | Methyl | Methyl | CN | (4-Sulfophenyl)methyl | H | Sec butyl | H |
| 2a$^{1980}$ | H | SO$_3$H | SO$_3$H | H | | | | | | | |
| 2a$^{1981}$ | SO$_3$H | H | H | SO$_3$H | Methyl | Methyl | CN | (4-Sulfophenyl)methyl | H | Pentyl | H |
| 2a$^{1982}$ | H | SO$_3$H | SO$_3$H | H | | | | | | | |
| 2a$^{1983}$ | SO$_3$H | H | H | SO$_3$H | Methyl | Methyl | CN | (4-Sulfophenyl)methyl | H | Hexyl | H |
| 2a$^{1984}$ | H | SO$_3$H | SO$_3$H | H | | | | | | | |
| 2a$^{1985}$ | SO$_3$H | H | H | SO$_3$H | Methyl | Methyl | CN | (4-Sulfophenyl)methyl | H | Cyclobutyl | H |
| 2a$^{1986}$ | H | SO$_3$H | SO$_3$H | H | | | | | | | |
| 2a$^{1987}$ | SO$_3$H | H | H | SO$_3$H | Methyl | Methyl | CN | (4-Sulfophenyl)methyl | H | Cyclopentyl | H |
| 2a$^{1988}$ | H | SO$_3$H | SO$_3$H | H | | | | | | | |
| 2a$^{1989}$ | SO$_3$H | H | H | SO$_3$H | Methyl | Methyl | CN | (4-Sulfophenyl)methyl | H | Cyclohexyl | H |
| 2a$^{1990}$ | H | SO$_3$H | SO$_3$H | H | | | | | | | |
| 2a$^{1991}$ | SO$_3$H | H | H | SO$_3$H | Methyl | Methyl | CN | (4-Sulfophenyl)methyl | H | 2-Methyl cyclohexyl | H |
| 2a$^{1992}$ | H | SO$_3$H | SO$_3$H | H | | | | | | | |
| 2a$^{1993}$ | SO$_3$H | H | H | SO$_3$H | Methyl | Methyl | CN | (4-Sulfophenyl)methyl | H | 3-Methyl cyclohexyl | H |
| 2a$^{1994}$ | H | SO$_3$H | SO$_3$H | H | | | | | | | |
| 2a$^{1995}$ | SO$_3$H | H | H | SO$_3$H | Methyl | Methyl | CN | (4-Sulfophenyl)methyl | H | Pentan-2-yl | H |
| 2a$^{1996}$ | H | SO$_3$H | SO$_3$H | H | | | | | | | |
| 2a$^{1997}$ | SO$_3$H | H | H | SO$_3$H | Methyl | Methyl | CN | (4-Sulfophenyl)methyl | H | 2-Ethylhexyl | H |
| 2a$^{1998}$ | H | SO$_3$H | SO$_3$H | H | | | | | | | |
| 2a$^{1999}$ | SO$_3$H | H | H | SO$_3$H | Methyl | Methyl | CN | (4-Sulfophenyl)methyl | H | Phenyl | H |
| 2a$^{2000}$ | H | SO$_3$H | SO$_3$H | H | | | | | | | |
| 2a$^{2001}$ | SO$_3$H | H | H | SO$_3$H | Methyl | Methyl | CN | (4-Sulfophenyl)methyl | H | Benzyl | H |
| 2a$^{2002}$ | H | SO$_3$H | SO$_3$H | H | | | | | | | |
| 2a$^{2003}$ | SO$_3$H | H | H | SO$_3$H | Methyl | Methyl | CN | (4-Sulfophenyl)methyl | H | Allyl | H |
| 2a$^{2004}$ | H | SO$_3$H | SO$_3$H | H | | | | | | | |
| 2a$^{2005}$ | SO$_3$H | H | H | SO$_3$H | Methyl | Methyl | CN | (4-Sulfophenyl)methyl | H | 2-Methoxy ethyl | H |
| 2a$^{2006}$ | H | SO$_3$H | SO$_3$H | H | | | | | | | |
| 2a$^{2007}$ | SO$_3$H | H | H | SO$_3$H | Methyl | Methyl | CN | (4-Sulfophenyl)methyl | H | 3-Methoxy propyl | H |
| 2a$^{2008}$ | H | SO$_3$H | SO$_3$H | H | | | | | | | |
| 2a$^{2009}$ | SO$_3$H | H | H | SO$_3$H | Methyl | Methyl | CN | (4-Sulfophenyl)methyl | H | 3-Chloropropyl | H |
| 2a$^{2010}$ | H | SO$_3$H | SO$_3$H | H | | | | | | | |
| 2a$^{2011}$ | SO$_3$H | H | H | SO$_3$H | Methyl | Methyl | CN | (4-Sulfophenyl)methyl | H | 2-Methyl thioethyl | H |
| 2a$^{2012}$ | H | SO$_3$H | SO$_3$H | H | | | | | | | |
| 2a$^{2013}$ | SO$_3$H | H | H | SO$_3$H | Methyl | Methyl | CN | (4-Sulfophenyl)methyl | H | 2-Fluoroethyl | H |
| 2a$^{2014}$ | H | SO$_3$H | SO$_3$H | H | | | | | | | |
| 2a$^{2015}$ | SO$_3$H | H | H | SO$_3$H | Methyl | Methyl | CN | (4-Sulfophenyl)methyl | H | 2-Chloro ethyl | H |
| 2a$^{2016}$ | H | SO$_3$H | SO$_3$H | H | | | | | | | |
| 2a$^{2017}$ | SO$_3$H | H | H | SO$_3$H | Methyl | Methyl | CN | (4-Sulfophenyl)methyl | H | 2-(2-Hydroxy ethyl sulfonyl)ethyl | H |
| 2a$^{2018}$ | H | SO$_3$H | SO$_3$H | H | | | | | | | |
| 2a$^{2019}$ | SO$_3$H | H | H | SO$_3$H | Methyl | Methyl | CN | (4-Sulfophenyl)methyl | H | 2-(2-tert Butyl sulfanyl ethyl sulfonyl)ethyl | H |
| 2a$^{2020}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{2021}$ | $SO_3H$ | H | H | $SO_3H$ | Methyl | Methyl | CN | (4-Sulfophenyl) methyl | H | 2-(2-Hydroxy ethoxy)propyl | H |
| $2a^{2022}$ | H | $SO_3H$ | $SO_3H$ | H | | | | | | | |
| $2a^{2023}$ | $SO_3H$ | H | H | $SO_3H$ | Methyl | Methyl | CN | (4-Sulfophenyl) methyl | H | 2-(2-Hydroxy ethoxy)ethyl | H |
| $2a^{2024}$ | H | $SO_3H$ | $SO_3H$ | H | | | | | | | |
| $2a^{2025}$ | $SO_3H$ | H | H | $SO_3H$ | Methyl | Methyl | CN | (4-Sulfophenyl) methyl | H | 3-(4-Hydroxy butoxy)propyl | H |
| $2a^{2026}$ | H | $SO_3H$ | $SO_3H$ | H | | | | | | | |
| $2a^{2027}$ | $SO_3H$ | H | H | $SO_3H$ | Methyl | Methyl | CN | (4-Sulfophenyl) methyl | H | 3-(2-Phenoxy ethoxyl)propyl | H |
| $2a^{2028}$ | H | $SO_3H$ | $SO_3H$ | H | | | | | | | |
| $1a^{2029}$ | $SO_3H$ | H | H | $SO_3H$ | Methyl | Methyl | CN | (4-Sulfophenyl) methyl | H | 3-Isopropxy propyl | H |
| $2a^{2032}$ | H | $SO_3H$ | $SO_3H$ | H | | | | | | | |
| $2a^{2031}$ | $SO_3H$ | H | H | $SO_3H$ | Methyl | Methyl | CN | (4-Sulfophenyl) methyl | H | 3-Ethoxy propyl | H |
| $2a^{2032}$ | H | $SO_3H$ | $SO_3H$ | H | | | | | | | |
| $2a^{2033}$ | $SO_3H$ | H | H | $SO_3H$ | Methyl | Methyl | CN | (4-Sulfophenyl) methyl | H | 3-Ethoxy butyl | H |
| $2a^{2034}$ | H | $SO_3H$ | $SO_3H$ | H | | | | | | | |
| $2a^{2035}$ | $SO_3H$ | H | H | $SO_3H$ | Methyl | Methyl | CN | (4-Sulfophenyl) methyl | H | 4-(2-Hydroxy ethane sulfonyl)phenyl | H |
| $2a^{2036}$ | H | $SO_3H$ | $SO_3H$ | H | | | | | | | |
| $2a^{2037}$ | $SO_3H$ | H | H | $SO_3H$ | Methyl | Methyl | $CONH_2$ | (4-Sulfophenyl) methyl | H | Methyl | H |
| $2a^{2038}$ | H | $SO_3H$ | $SO_3H$ | H | | | | | | | |
| $2a^{2039}$ | $SO_3H$ | H | H | $SO_3H$ | Methyl | Methyl | $CONH_2$ | (4-Sulfophenyl) methyl | H | Ethyl | H |
| $2a^{2040}$ | H | $SO_3H$ | $SO_3H$ | H | | | | | | | |
| $2a^{2041}$ | $SO_3H$ | H | H | $SO_3H$ | Methyl | Methyl | $CONH_2$ | (4-Sulfophenyl) methyl | H | n-propyl | H |
| $2a^{2042}$ | H | $SO_3H$ | $SO_3H$ | H | | | | | | | |
| $2a^{2043}$ | $SO_3H$ | H | H | $SO_3H$ | Methyl | Methyl | $CONH_2$ | (4-Sulfophenyl) methyl | H | Isopropyl | H |
| $2a^{2044}$ | H | $SO_3H$ | $SO_3H$ | H | | | | | | | |
| $2a^{2045}$ | $SO_3H$ | H | H | $SO_3H$ | Methyl | Methyl | $CONH_2$ | (4-Sulfophenyl) methyl | H | 1-Ethyl propyl | H |
| $2a^{2046}$ | H | $SO_3H$ | $SO_3H$ | H | | | | | | | |
| $2a^{2047}$ | $SO_3H$ | H | H | $SO_3H$ | Methyl | Methyl | $CONH_2$ | (4-Sulfophenyl) methyl | H | 1,2-Dimethyl propyl | H |
| $2a^{2048}$ | H | $SO_3H$ | $SO_3H$ | H | | | | | | | |
| $2a^{2049}$ | $SO_3H$ | H | H | $SO_3H$ | Methyl | Methyl | $CONH_2$ | (4-Sulfophenyl) methyl | H | 2,2-Dimethyl propyl | H |
| $2a^{2050}$ | H | $SO_3H$ | $SO_3H$ | H | | | | | | | |
| $2a^{2051}$ | $SO_3H$ | H | H | $SO_3H$ | Methyl | Methyl | $CONH_2$ | (4-Sulfophenyl) methyl | H | Butyl | H |
| $2a^{2052}$ | H | $SO_3H$ | $SO_3H$ | H | | | | | | | |
| $2a^{2053}$ | $SO_3H$ | H | H | $SO_3H$ | Methyl | Methyl | $CONH_2$ | (4-Sulfophenyl) methyl | H | 2-Methyl butyl | H |
| $2a^{2054}$ | H | $SO_3H$ | $SO_3H$ | H | | | | | | | |
| $2a^{2055}$ | $SO_3H$ | H | H | $SO_3H$ | Methyl | Methyl | $CONH_2$ | (4-Sulfophenyl) methyl | H | Tert butyl | H |
| $2a^{2056}$ | H | $SO_3H$ | $SO_3H$ | H | | | | | | | |
| $2a^{2057}$ | $SO_3H$ | H | H | $SO_3H$ | Methyl | Methyl | $CONH_2$ | (4-Sulfophenyl) methyl | H | 3-Methyl butyl | H |
| $2a^{2058}$ | H | $SO_3H$ | $SO_3H$ | H | | | | | | | |
| $2a^{2059}$ | $SO_3H$ | H | H | $SO_3H$ | Methyl | Methyl | $CONH_2$ | (4-Sulfophenyl) methyl | H | Sec butyl | H |
| $2a^{2060}$ | H | $SO_3H$ | $SO_3H$ | H | | | | | | | |
| $2a^{2061}$ | $SO_3H$ | H | H | $SO_3H$ | Methyl | Methyl | $CONH_2$ | (4-Sulfophenyl) methyl | H | Pentyl | H |
| $2a^{2062}$ | H | $SO_3H$ | $SO_3H$ | H | | | | | | | |
| $2a^{2063}$ | $SO_3H$ | H | H | $SO_3H$ | Methyl | Methyl | $CONH_2$ | (4-Sulfophenyl) methyl | H | Hexyl | H |
| $2a^{2064}$ | H | $SO_3H$ | $SO_3H$ | H | | | | | | | |
| $2a^{2065}$ | $SO_3H$ | H | H | $SO_3H$ | Methyl | Methyl | $CONH_2$ | (4-Sulfophenyl) methyl | H | Cyclobutyl | H |
| $2a^{2066}$ | H | $SO_3H$ | $SO_3H$ | H | | | | | | | |
| $2a^{2067}$ | $SO_3H$ | H | H | $SO_3H$ | Methyl | Methyl | $CONH_2$ | (4-Sulfophenyl) methyl | H | Cyclopentyl | H |
| $2a^{2068}$ | H | $SO_3H$ | $SO_3H$ | H | | | | | | | |
| $2a^{2069}$ | $SO_3H$ | H | H | $SO_3H$ | Methyl | Methyl | $CONH_2$ | (4-Sulfophenyl) methyl | H | Cyclohexyl | H |
| $2a^{2070}$ | H | $SO_3H$ | $SO_3H$ | H | | | | | | | |
| $2a^{2071}$ | $SO_3H$ | H | H | $SO_3H$ | Methyl | Methyl | $CONH_2$ | (4-Sulfophenyl) methyl | H | 2-Methyl cyclohexyl | H |
| $2a^{2072}$ | H | $SO_3H$ | $SO_3H$ | H | | | | | | | |
| $2a^{2073}$ | $SO_3H$ | H | H | $SO_3H$ | Methyl | Methyl | $CONH_2$ | (4-Sulfophenyl) methyl | H | 3-Methyl cyclohexyl | H |
| $2a^{2074}$ | H | $SO_3H$ | $SO_3H$ | H | | | | | | | |
| $2a^{2075}$ | $SO_3H$ | H | H | $SO_3H$ | Methyl | Methyl | $CONH_2$ | (4-Sulfophenyl) methyl | H | Pentan-2-yl | H |
| $2a^{2076}$ | H | $SO_3H$ | $SO_3H$ | H | | | | | | | |
| $2a^{2077}$ | $SO_3H$ | H | H | $SO_3H$ | Methyl | Methyl | $CONH_2$ | (4-Sulfophenyl) methyl | H | 2-Ethylhexyl | H |
| $2a^{2078}$ | H | $SO_3H$ | $SO_3H$ | H | | | | | | | |
| $2a^{2079}$ | $SO_3H$ | H | H | $SO_3H$ | Methyl | Methyl | $CONH_2$ | (4-Sulfophenyl) methyl | H | Phenyl | H |
| $2a^{2080}$ | H | $SO_3H$ | $SO_3H$ | H | | | | | | | |
| $2a^{2081}$ | $SO_3H$ | H | H | $SO_3H$ | Methyl | Methyl | $CONH_2$ | (4-Sulfophenyl) methyl | H | Benzyl | H |
| $2a^{2082}$ | H | $SO_3H$ | $SO_3H$ | H | | | | | | | |
| $2a^{2083}$ | $SO_3H$ | H | H | $SO_3H$ | Methyl | Methyl | $CONH_2$ | (4-Sulfophenyl) methyl | H | Allyl | H |
| $2a^{2084}$ | H | $SO_3H$ | $SO_3H$ | H | | | | | | | |
| $2a^{2085}$ | $SO_3H$ | H | H | $SO_3H$ | Methyl | Methyl | $CONH_2$ | (4-Sulfophenyl) methyl | H | 2-Methoxy ethyl | H |
| $2a^{2086}$ | H | $SO_3H$ | $SO_3H$ | H | | | | | | | |
| $2a^{2087}$ | $SO_3H$ | H | H | $SO_3H$ | Methyl | Methyl | $CONH_2$ | (4-Sulfophenyl) methyl | H | 3-Methoxy propyl | H |
| $2a^{2088}$ | H | $SO_3H$ | $SO_3H$ | H | | | | | | | |
| $2a^{2089}$ | $SO_3H$ | H | H | $SO_3H$ | Methyl | Methyl | $CONH_2$ | (4-Sulfophenyl) methyl | H | 3-Chloropropyl | H |
| $2a^{2090}$ | H | $SO_3H$ | $SO_3H$ | H | | | | | | | |
| $2a^{2091}$ | $SO_3H$ | H | H | $SO_3H$ | Methyl | Methyl | $CONH_2$ | (4-Sulfophenyl) methyl | H | 2-Methyl thioethyl | H |
| $2a^{2092}$ | H | $SO_3H$ | $SO_3H$ | H | | | | | | | |
| $2a^{2093}$ | $SO_3H$ | H | H | $SO_3H$ | Methyl | Methyl | $CONH_2$ | (4-Sulfophenyl) methyl | H | 2-Fluoroethyl | H |
| $2a^{2094}$ | H | $SO_3H$ | $SO_3H$ | H | | | | | | | |
| $2a^{2095}$ | $SO_3H$ | H | H | $SO_3H$ | Methyl | Methyl | $CONH_2$ | (4-Sulfophenyl) methyl | H | 2-Chloro ethyl | H |
| $2a^{2096}$ | H | $SO_3H$ | $SO_3H$ | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{2097}$ | SO$_3$H | H | H | SO$_3$H | Methyl | Methyl | CONH$_2$ | (4-Sulfophenyl) methyl | H | 2-(2-Hydroxy ethyl sulfonyl)ethyl | H |
| $2a^{2098}$ | H | SO$_3$H | SO$_3$H | H | | | | | | | |
| $2a^{2099}$ | SO$_3$H | H | H | SO$_3$H | Methyl | Methyl | CONH$_2$ | (4-Sulfophenyl) methyl | H | 2-(2-tert Butyl sulfanyl ethyl sulfonyl)ethyl | H |
| $2a^{2100}$ | H | SO$_3$H | SO$_3$H | H | | | | | | | |
| $2a^{2101}$ | SO$_3$H | H | H | SO$_3$H | Methyl | Methyl | CONH$_2$ | (4-Sulfophenyl) methyl | H | 2-(2-Hydroxy ethoxy)propyl | H |
| $2a^{2102}$ | H | SO$_3$H | SO$_3$H | H | | | | | | | |
| $2a^{2103}$ | SO$_3$H | H | H | SO$_3$H | Methyl | Methyl | CONH$_2$ | (4-Sulfophenyl) methyl | H | 2-(2-Hydroxy ethoxy)ethyl | H |
| $2a^{2104}$ | H | SO$_3$H | SO$_3$H | H | | | | | | | |
| $2a^{2105}$ | SO$_3$H | H | H | SO$_3$H | Methyl | Methyl | CONH$_2$ | (4-Sulfophenyl) methyl | H | 3-(4-Hydroxy butoxy)propyl | H |
| $2a^{2106}$ | H | SO$_3$H | SO$_3$H | H | | | | | | | |
| $2a^{2107}$ | SO$_3$H | H | H | SO$_3$H | Methyl | Methyl | CONH$_2$ | (4-Sulfophenyl) methyl | H | 3-(2-Phenoxy ethoxyl)propyl | H |
| $2a^{2108}$ | H | SO$_3$H | SO$_3$H | H | | | | | | | |
| $2a^{2109}$ | SO$_3$H | H | H | SO$_3$H | Methyl | Methyl | CONH$_2$ | (4-Sulfophenyl) methyl | H | 3-Isopropxy propyl | H |
| $2a^{2110}$ | H | SO$_3$H | SO$_3$H | H | | | | | | | |
| $2a^{2111}$ | SO$_3$H | H | H | SO$_3$H | Methyl | Methyl | CONH$_2$ | (4-Sulfophenyl) methyl | H | 3-Ethoxy propyl | H |
| $2a^{2112}$ | H | SO$_3$H | SO$_3$H | H | | | | | | | |
| $2a^{2113}$ | SO$_3$H | H | H | SO$_3$H | Methyl | Methyl | CONH$_2$ | (4-Sulfophenyl) methyl | H | 3-Ethoxy butyl | H |
| $2a^{2114}$ | H | SO$_3$H | SO$_3$H | H | | | | | | | |
| $2a^{2115}$ | SO$_3$H | H | H | SO$_3$H | Methyl | Methyl | CONH$_2$ | (4-Sulfophenyl) methyl | H | 4-(2-Hydroxy ethane sulfonyl)phenyl | H |
| $2a^{2116}$ | H | SO$_3$H | SO$_3$H | H | | | | | | | |
| $2a^{2117}$ | SO$_3$H | H | H | SO$_3$H | NHCOCH$_3$ | OMe | CN | (4-Sulfophenyl) methyl | H | Methyl | H |
| $2a^{2118}$ | H | SO$_3$H | SO$_3$H | H | | | | | | | |
| $2a^{2119}$ | SO$_3$H | H | H | SO$_3$H | NHCOCH$_3$ | OMe | CN | (4-Sulfophenyl) methyl | H | Ethyl | H |
| $2a^{2120}$ | H | SO$_3$H | SO$_3$H | H | | | | | | | |
| $2a^{2121}$ | SO$_3$H | H | H | SO$_3$H | NHCOCH$_3$ | OMe | CN | (4-Sulfophenyl) methyl | H | n-Propyl | H |
| $2a^{2122}$ | H | SO$_3$H | SO$_3$H | H | | | | | | | |
| $2a^{2123}$ | SO$_3$H | H | H | SO$_3$H | NHCOCH$_3$ | OMe | CN | (4-Sulfophenyl) methyl | H | Isopropyl | H |
| $2a^{2124}$ | H | SO$_3$H | SO$_3$H | H | | | | | | | |
| $2a^{2125}$ | SO$_3$H | H | H | SO$_3$H | NHCOCH$_3$ | OMe | CN | (4-Sulfophenyl) methyl | H | 1-Ethyl propyl | H |
| $2a^{2126}$ | H | SO$_3$H | SO$_3$H | H | | | | | | | |
| $2a^{2127}$ | SO$_3$H | H | H | SO$_3$H | NHCOCH$_3$ | OMe | CN | (4-Sulfophenyl) methyl | H | 1,2-Dimethyl propyl | H |
| $2a^{2128}$ | H | SO$_3$H | SO$_3$H | H | | | | | | | |
| $2a^{2129}$ | SO$_3$H | H | H | SO$_3$H | NHCOCH$_3$ | OMe | CN | (4-Sulfophenyl) methyl | H | 2,2-Dimethyl propyl | H |
| $2a^{2130}$ | H | SO$_3$H | SO$_3$H | H | | | | | | | |
| $2a^{2131}$ | SO$_3$H | H | H | SO$_3$H | NHCOCH$_3$ | OMe | CN | (4-Sulfophenyl) methyl | H | Butyl | H |
| $2a^{2132}$ | H | SO$_3$H | SO$_3$H | H | | | | | | | |
| $2a^{2133}$ | SO$_3$H | H | H | SO$_3$H | NHCOCH$_3$ | OMe | CN | (4-Sulfophenyl) methyl | H | 2-Methyl butyl | H |
| $2a^{2134}$ | H | SO$_3$H | SO$_3$H | H | | | | | | | |
| $2a^{2135}$ | SO$_3$H | H | H | SO$_3$H | NHCOCH$_3$ | OMe | CN | (4-Sulfophenyl) methyl | H | Tert butyl | H |
| $2a^{2136}$ | H | SO$_3$H | SO$_3$H | H | | | | | | | |
| $2a^{2137}$ | SO$_3$H | H | H | SO$_3$H | NHCOCH$_3$ | OMe | CN | (4-Sulfophenyl) methyl | H | 3-Methyl butyl | H |
| $2a^{2138}$ | H | SO$_3$H | SO$_3$H | H | | | | | | | |
| $2a^{2139}$ | SO$_3$H | H | H | SO$_3$H | NHCOCH$_3$ | OMe | CN | (4-Sulfophenyl) methyl | H | Sec butyl | H |
| $2a^{2140}$ | H | SO$_3$H | SO$_3$H | H | | | | | | | |
| $2a^{2141}$ | SO$_3$H | H | H | SO$_3$H | NHCOCH$_3$ | OMe | CN | (4-Sulfophenyl) methyl | H | Pentyl | H |
| $2a^{2142}$ | H | SO$_3$H | SO$_3$H | H | | | | | | | |
| $2a^{2143}$ | SO$_3$H | H | H | SO$_3$H | NHCOCH$_3$ | OMe | CN | (4-Sulfophenyl) methyl | H | Hexyl | H |
| $2a^{2144}$ | H | SO$_3$H | SO$_3$H | H | | | | | | | |
| $2a^{2145}$ | SO$_3$H | H | H | SO$_3$H | NHCOCH$_3$ | OMe | CN | (4-Sulfophenyl) methyl | H | Cyclobutyl | H |
| $2a^{2146}$ | H | SO$_3$H | SO$_3$H | H | | | | | | | |
| $2a^{2147}$ | SO$_3$H | H | H | SO$_3$H | NHCOCH$_3$ | OMe | CN | (4-Sulfophenyl) methyl | H | Cyclopentyl | H |
| $2a^{2148}$ | H | SO$_3$H | SO$_3$H | H | | | | | | | |
| $2a^{2149}$ | SO$_3$H | H | H | SO$_3$H | NHCOCH$_3$ | OMe | CN | (4-Sulfophenyl) methyl | H | Cyclohexyl | H |
| $2a^{2150}$ | H | SO$_3$H | SO$_3$H | H | | | | | | | |
| $2a^{2151}$ | SO$_3$H | H | H | SO$_3$H | NHCOCH$_3$ | OMe | CN | (4-Sulfophenyl) methyl | H | 2-Methyl cyclohexyl | H |
| $2a^{2152}$ | H | SO$_3$H | SO$_3$H | H | | | | | | | |
| $2a^{2153}$ | SO$_3$H | H | H | SO$_3$H | NHCOCH$_3$ | OMe | CN | (4-Sulfophenyl) methyl | H | 3-Methyl cyclohexyl | H |
| $2a^{2154}$ | H | SO$_3$H | SO$_3$H | H | | | | | | | |
| $2a^{2155}$ | SO$_3$H | H | H | SO$_3$H | NHCOCH$_3$ | OMe | CN | (4-Sulfophenyl) methyl | H | Pentan-2-yl | H |
| $2a^{2156}$ | H | SO$_3$H | SO$_3$H | H | | | | | | | |
| $2a^{2157}$ | SO$_3$H | H | H | SO$_3$H | NHCOCH$_3$ | OMe | CN | (4-Sulfophenyl) methyl | H | 2-Ethylhexyl | H |
| $2a^{2158}$ | H | SO$_3$H | SO$_3$H | H | | | | | | | |
| $2a^{2159}$ | SO$_3$H | H | H | SO$_3$H | NHCOCH$_3$ | OMe | CN | (4-Sulfophenyl) methyl | H | Phenyl | H |
| $2a^{2160}$ | H | SO$_3$H | SO$_3$H | H | | | | | | | |
| $2a^{2161}$ | SO$_3$H | H | H | SO$_3$H | NHCOCH$_3$ | OMe | CN | (4-Sulfophenyl) methyl | H | Benzyl | H |
| $2a^{2162}$ | H | SO$_3$H | SO$_3$H | H | | | | | | | |
| $2a^{2163}$ | SO$_3$H | H | H | SO$_3$H | NHCOCH$_3$ | OMe | CN | (4-Sulfophenyl) methyl | H | Allyl | H |
| $2a^{2164}$ | H | SO$_3$H | SO$_3$H | H | | | | | | | |
| $2a^{2165}$ | SO$_3$H | H | H | SO$_3$H | NHCOCH$_3$ | OMe | CN | (4-Sulfophenyl) methyl | H | 2-Methoxy ethyl | H |
| $2a^{2166}$ | H | SO$_3$H | SO$_3$H | H | | | | | | | |
| $2a^{2167}$ | SO$_3$H | H | H | SO$_3$H | NHCOCH$_3$ | OMe | CN | (4-Sulfophenyl) methyl | H | 3-Methoxy propyl | H |
| $2a^{2168}$ | H | SO$_3$H | SO$_3$H | H | | | | | | | |
| $2a^{2169}$ | SO$_3$H | H | H | SO$_3$H | NHCOCH$_3$ | OMe | CN | (4-Sulfophenyl) methyl | H | 3-Chloropropyl | H |
| $2a^{2170}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| $2a^{2171}$ | SO$_3$H | H | H | SO$_3$H | NHCOCH$_3$ | OMe | CN | (4-Sulfophenyl)methyl | H | 2-Methyl thioethyl | H |
| $2a^{2172}$ | H | SO$_3$H | SO$_3$H | H | | | | | | | |
| $2a^{2173}$ | SO$_3$H | H | H | SO$_3$H | NHCOCH$_3$ | OMe | CN | (4-Sulfophenyl)methyl | H | 2-Fluoroethyl | H |
| $2a^{2174}$ | H | SO$_3$H | SO$_3$H | H | | | | | | | |
| $2a^{2175}$ | SO$_3$H | H | H | SO$_3$H | NHCOCH$_3$ | OMe | CN | (4-Sulfophenyl)methyl | H | 2-Chloro ethyl | H |
| $2a^{2176}$ | H | SO$_3$H | SO$_3$H | H | | | | | | | |
| $2a^{2177}$ | SO$_3$H | H | H | SO$_3$H | NHCOCH$_3$ | OMe | CN | (4-Sulfophenyl)methyl | H | 2-(2-Hydroxy ethyl sulfonyl)ethyl | H |
| $2a^{2178}$ | H | SO$_3$H | SO$_3$H | H | | | | | | | |
| $2a^{2179}$ | SO$_3$H | H | H | SO$_3$H | NHCOCH$_3$ | OMe | CN | (4-Sulfophenyl)methyl | H | 2-(2-tert Butyl sulfonyl ethyl sulfonyl)ethyl | H |
| $2a^{2180}$ | H | SO$_3$H | SO$_3$H | H | | | | | | | |
| $2a^{2181}$ | SO$_3$H | H | H | SO$_3$H | NHCOCH$_3$ | OMe | CN | (4-Sulfophenyl)methyl | H | 2-(2-Hydroxy ethoxy)propyl | H |
| $2a^{2182}$ | H | SO$_3$H | SO$_3$H | H | | | | | | | |
| $2a^{2183}$ | SO$_3$H | H | H | SO$_3$H | NHCOCH$_3$ | OMe | CN | (4-Sulfophenyl)methyl | H | 2-(2-Hydroxy ethoxy)propyl | H |
| $2a^{2184}$ | H | SO$_3$H | SO$_3$H | H | | | | | | | |
| $2a^{2185}$ | SO$_3$H | H | H | SO$_3$H | NHCOCH$_3$ | OMe | CN | (4-Sulfophenyl)methyl | H | 3-(4-Hydroxy butoxy)propyl | H |
| $2a^{2186}$ | H | SO$_3$H | SO$_3$H | H | | | | | | | |
| $2a^{2187}$ | SO$_3$H | H | H | SO$_3$H | NHCOCH$_3$ | OMe | CN | (4-Sulfophenyl)methyl | H | 3-(2-Phenoxy ethoxy)propyl | H |
| $2a^{2188}$ | H | SO$_3$H | SO$_3$H | H | | | | | | | |
| $2a^{2189}$ | SO$_3$H | H | H | SO$_3$H | NHCOCH$_3$ | OMe | CN | (4-Sulfophenyl)methyl | H | 3-Isopropxy propyl | H |
| $2a^{2190}$ | H | SO$_3$H | SO$_3$H | H | | | | | | | |
| $2a^{2191}$ | SO$_3$H | H | H | SO$_3$H | NHCOCH$_3$ | OMe | CN | (4-Sulfophenyl)methyl | H | 3-Ethoxy propyl | H |
| $2a^{2192}$ | H | SO$_3$H | SO$_3$H | H | | | | | | | |
| $2a^{2193}$ | SO$_3$H | H | H | SO$_3$H | NHCOCH$_3$ | OMe | CN | (4-Sulfophenyl)methyl | H | 3-Ethoxy butyl | H |
| $2a^{2194}$ | H | SO$_3$H | SO$_3$H | H | | | | | | | |
| $2a^{2195}$ | SO$_3$H | H | H | SO$_3$H | NHCOCH$_3$ | OMe | CN | (4-Sulfophenyl)methyl | H | 4-(2-Hydroxy ethane sulfonyl)phenyl | H |
| $2a^{2196}$ | H | SO$_3$H | SO$_3$H | H | | | | | | | |
| $2a^{2197}$ | SO$_3$H | H | H | SO$_3$H | NHCOCH$_3$ | OMe | CONH$_2$ | (4-Sulfophenyl)methyl | H | Methyl | H |
| $2a^{2198}$ | H | SO$_3$H | SO$_3$H | H | | | | | | | |
| $2a^{2199}$ | SO$_3$H | H | H | SO$_3$H | NHCOCH$_3$ | OMe | CONH$_2$ | (4-Sulfophenyl)methyl | H | Ethyl | H |
| $2a^{2200}$ | H | SO$_3$H | SO$_3$H | H | | | | | | | |
| $2a^{2201}$ | SO$_3$H | H | H | SO$_3$H | NHCOCH$_3$ | OMe | CONH$_2$ | (4-Sulfophenyl)methyl | H | n-Propyl | H |
| $2a^{2202}$ | H | SO$_3$H | SO$_3$H | H | | | | | | | |
| $2a^{2203}$ | SO$_3$H | H | H | SO$_3$H | NHCOCH$_3$ | OMe | CONH$_2$ | (4-Sulfophenyl)methyl | H | Isopropyl | H |
| $2a^{2204}$ | H | SO$_3$H | SO$_3$H | H | | | | | | | |
| $2a^{2205}$ | SO$_3$H | H | H | SO$_3$H | NHCOCH$_3$ | OMe | CONH$_2$ | (4-Sulfophenyl)methyl | H | 1-Ethyl propyl | H |
| $2a^{2206}$ | H | SO$_3$H | SO$_3$H | H | | | | | | | |
| $2a^{2207}$ | SO$_3$H | H | H | SO$_3$H | NHCOCH$_3$ | OMe | CONH$_2$ | (4-Sulfophenyl)methyl | H | 1,2-Dimethyl propyl | H |
| $2a^{2208}$ | H | SO$_3$H | SO$_3$H | H | | | | | | | |
| $2a^{2209}$ | SO$_3$H | H | H | SO$_3$H | NHCOCH$_3$ | OMe | CONH$_2$ | (4-Sulfophenyl)methyl | H | 2,2-Dimethyl propyl | H |
| $2a^{2210}$ | H | SO$_3$H | SO$_3$H | H | | | | | | | |
| $2a^{2211}$ | SO$_3$H | H | H | SO$_3$H | NHCOCH$_3$ | OMe | CONH$_2$ | (4-Sulfophenyl)methyl | H | Butyl | H |
| $2a^{2212}$ | H | SO$_3$H | SO$_3$H | H | | | | | | | |
| $2a^{2213}$ | SO$_3$H | H | H | SO$_3$H | NHCOCH$_3$ | OMe | CONH$_2$ | (4-Sulfophenyl)methyl | H | 2-Methyl butyl | H |
| $2a^{2214}$ | H | SO$_3$H | SO$_3$H | H | | | | | | | |
| $2a^{2215}$ | SO$_3$H | H | H | SO$_3$H | NHCOCH$_3$ | OMe | CONH$_2$ | (4-Sulfophenyl)methyl | H | Tert butyl | H |
| $2a^{2216}$ | H | SO$_3$H | SO$_3$H | H | | | | | | | |
| $2a^{2217}$ | SO$_3$H | H | H | SO$_3$H | NHCOCH$_3$ | OMe | CONH$_2$ | (4-Sulfophenyl)methyl | H | 3-Methyl butyl | H |
| $2a^{2218}$ | H | SO$_3$H | SO$_3$H | H | | | | | | | |
| $2a^{2219}$ | SO$_3$H | H | H | SO$_3$H | NHCOCH$_3$ | OMe | CONH$_2$ | (4-Sulfophenyl)methyl | H | Sec butyl | H |
| $2a^{2220}$ | H | SO$_3$H | SO$_3$H | H | | | | | | | |
| $2a^{2221}$ | SO$_3$H | H | H | SO$_3$H | NHCOCH$_3$ | OMe | CONH$_2$ | (4-Sulfophenyl)methyl | H | Pentyl | H |
| $2a^{2222}$ | H | SO$_3$H | SO$_3$H | H | | | | | | | |
| $2a^{2223}$ | SO$_3$H | H | H | SO$_3$H | NHCOCH$_3$ | OMe | CONH$_2$ | (4-Sulfophenyl)methyl | H | Hexyl | H |
| $2a^{2224}$ | H | SO$_3$H | SO$_3$H | H | | | | | | | |
| $2a^{2225}$ | SO$_3$H | H | H | SO$_3$H | NHCOCH$_3$ | OMe | CONH$_2$ | (4-Sulfophenyl)methyl | H | Cyclobutyl | H |
| $2a^{2226}$ | H | SO$_3$H | SO$_3$H | H | | | | | | | |
| $2a^{2227}$ | SO$_3$H | H | H | SO$_3$H | NHCOCH$_3$ | OMe | CONH$_2$ | (4-Sulfophenyl)methyl | H | Cyclopentyl | H |
| $2a^{2228}$ | H | SO$_3$H | SO$_3$H | H | | | | | | | |
| $2a^{2229}$ | SO$_3$H | H | H | SO$_3$H | NHCOCH$_3$ | OMe | CONH$_2$ | (4-Sulfophenyl)methyl | H | Cyclohexyl | H |
| $2a^{2230}$ | H | SO$_3$H | SO$_3$H | H | | | | | | | |
| $2a^{2231}$ | SO$_3$H | H | H | SO$_3$H | NHCOCH$_3$ | OMe | CONH$_2$ | (4-Sulfophenyl)methyl | H | 2-Methyl cyclohexyl | H |
| $2a^{2232}$ | H | SO$_3$H | SO$_3$H | H | | | | | | | |
| $2a^{2233}$ | SO$_3$H | H | H | SO$_3$H | NHCOCH$_3$ | OMe | CONH$_2$ | (4-Sulfophenyl)methyl | H | 3-Methyl cyclohexyl | H |
| $2a^{2234}$ | H | SO$_3$H | SO$_3$H | H | | | | | | | |
| $2a^{2235}$ | SO$_3$H | H | H | SO$_3$H | NHCOCH$_3$ | OMe | CONH$_2$ | (4-Sulfophenyl)methyl | H | Pentan-2-yl | H |
| $2a^{2236}$ | H | SO$_3$H | SO$_3$H | H | | | | | | | |
| $2a^{2237}$ | SO$_3$H | H | H | SO$_3$H | NHCOCH$_3$ | OMe | CONH$_2$ | (4-Sulfophenyl)methyl | H | 2-Ethylhexyl | H |
| $2a^{2238}$ | H | SO$_3$H | SO$_3$H | H | | | | | | | |
| $2a^{2239}$ | SO$_3$H | H | H | SO$_3$H | NHCOCH$_3$ | OMe | CONH$_2$ | (4-Sulfophenyl)methyl | H | Phenyl | H |
| $2a^{2240}$ | H | SO$_3$H | SO$_3$H | H | | | | | | | |
| $2a^{2241}$ | SO$_3$H | H | H | SO$_3$H | NHCOCH$_3$ | OMe | CONH$_2$ | (4-Sulfophenyl)methyl | H | Benzyl | H |
| $2a^{2242}$ | H | SO$_3$H | SO$_3$H | H | | | | | | | |
| $2a^{2243}$ | SO$_3$H | H | H | SO$_3$H | NHCOCH$_3$ | OMe | CONH$_2$ | (4-Sulfophenyl)methyl | H | Allyl | H |
| $2a^{2244}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{2245}$ | SO$_3$H | H | H | SO$_3$H | NHCOCH$_3$ | OMe | CONH$_2$ | (4-Sulfophenyl) methyl | H | 2-Methoxy ethyl | H |
| 2a$^{2246}$ | H | SO$_3$H | SO$_3$H | H | | | | | | | |
| 2a$^{2247}$ | SO$_3$H | H | H | SO$_3$H | NHCOCH$_3$ | OMe | CONH$_2$ | (4-Sulfophenyl) methyl | H | 3-Methoxy propyl | H |
| 2a$^{2248}$ | H | SO$_3$H | SO$_3$H | H | | | | | | | |
| 2a$^{2249}$ | SO$_3$H | H | H | SO$_3$H | NHCOCH$_3$ | OMe | CONH$_2$ | (4-Sulfophenyl) methyl | H | 3-Chloropropyl | H |
| 2a$^{2250}$ | H | SO$_3$H | SO$_3$H | H | | | | | | | |
| 2a$^{2251}$ | SO$_3$H | H | H | SO$_3$H | NHCOCH$_3$ | OMe | CONH$_2$ | (4-Sulfophenyl) methyl | H | 2-Methyl thioethyl | H |
| 2a$^{2252}$ | H | SO$_3$H | SO$_3$H | H | | | | | | | |
| 2a$^{2253}$ | SO$_3$H | H | H | SO$_3$H | NHCOCH$_3$ | OMe | CONH$_2$ | (4-Sulfophenyl) methyl | H | 2-Fluoroethyl | H |
| 2a$^{2254}$ | H | SO$_3$H | SO$_3$H | H | | | | | | | |
| 2a$^{2255}$ | SO$_3$H | H | H | SO$_3$H | NHCOCH$_3$ | OMe | CONH$_2$ | (4-Sulfophenyl) methyl | H | 2-Chloro ethyl | H |
| 2a$^{2256}$ | H | SO$_3$H | SO$_3$H | H | | | | | | | |
| 2a$^{2257}$ | SO$_3$H | H | H | SO$_3$H | NHCOCH$_3$ | OMe | CONH$_2$ | (4-Sulfophenyl) methyl | H | 2-(2-Hydroxy ethyl sulfonyl)ethyl | H |
| 2a$^{2258}$ | H | SO$_3$H | SO$_3$H | H | | | | | | | |
| 2a$^{2259}$ | SO$_3$H | H | H | SO$_3$H | NHCOCH$_3$ | OMe | CONH$_2$ | (4-Sulfophenyl) methyl | H | 2-(2-tert Butyl sulfanyl ethyl sulfonyl)ethyl | H |
| 2a$^{2260}$ | H | SO$_3$H | SO$_3$H | H | | | | | | | |
| 2a$^{2261}$ | SO$_3$H | H | H | SO$_3$H | NHCOCH$_3$ | OMe | CONH$_2$ | (4-Sulfophenyl) methyl | H | 2-(2-Hydroxy ethoxy)propyl | H |
| 2a$^{2262}$ | H | SO$_3$H | SO$_3$H | H | | | | | | | |
| 2a$^{2263}$ | SO$_3$H | H | H | SO$_3$H | NHCOCH$_3$ | OMe | CONH$_2$ | (4-Sulfophenyl) methyl | H | 2-(2-Hydroxy ethoxy)ethyl | H |
| 2a$^{2264}$ | H | SO$_3$H | SO$_3$H | H | | | | | | | |
| 2a$^{2265}$ | SO$_3$H | H | H | SO$_3$H | NHCOCH$_3$ | OMe | CONH$_2$ | (4-Sulfophenyl) methyl | H | 3-(4-Hydroxy butoxy)propyl | H |
| 2a$^{2266}$ | H | SO$_3$H | SO$_3$H | H | | | | | | | |
| 2a$^{2267}$ | SO$_3$H | H | H | SO$_3$H | NHCOCH$_3$ | OMe | CONH$_2$ | (4-Sulfophenyl) methyl | H | 3-(2-Phenoxy ethoxyl)propyl | H |
| 2a$^{2268}$ | H | SO$_3$H | SO$_3$H | H | | | | | | | |
| 2a$^{2269}$ | SO$_3$H | H | H | SO$_3$H | NHCOCH$_3$ | OMe | CONH$_2$ | (4-Sulfophenyl) methyl | H | 3-Isopropxy propyl | H |
| 2a$^{2270}$ | H | SO$_3$H | SO$_3$H | H | | | | | | | |
| 2a$^{2271}$ | SO$_3$H | H | H | SO$_3$H | NHCOCH$_3$ | OMe | CONH$_2$ | (4-Sulfophenyl) methyl | H | 3-Ethoxy propyl | H |
| 2a$^{2272}$ | H | SO$_3$H | SO$_3$H | H | | | | | | | |
| 2a$^{2273}$ | SO$_3$H | H | H | SO$_3$H | NHCOCH$_3$ | OMe | CONH$_2$ | (4-Sulfophenyl) methyl | H | 3-Ethoxy butyl | H |
| 2a$^{2274}$ | H | SO$_3$H | SO$_3$H | H | | | | | | | |
| 2a$^{2275}$ | SO$_3$H | H | H | SO$_3$H | NHCOCH$_3$ | OMe | CONH$_2$ | (4-Sulfophenyl) methyl | H | 4-(2-Hydroxy ethane sulfonyl)phenyl | H |
| 2a$^{2276}$ | SO$_3$H | H | H | SO$_3$H | Methyl | Methyl | CN | 3-Sulfophenyl | H | Methyl | H |
| 2a$^{2277}$ | H | SO$_3$H | SO$_3$H | H | | | | | | | |
| 2a$^{2278}$ | SO$_3$H | H | H | SO$_3$H | Methyl | Methyl | CN | 3-Sulfophenyl | H | Ethyl | H |
| 2a$^{2279}$ | H | SO$_3$H | SO$_3$H | H | | | | | | | |
| 2a$^{2280}$ | SO$_3$H | H | H | SO$_3$H | Methyl | Methyl | CN | 3-Sulfophenyl | H | n-Propyl | H |
| 2a$^{2281}$ | H | SO$_3$H | SO$_3$H | H | | | | | | | |
| 2a$^{2282}$ | SO$_3$H | H | H | SO$_3$H | Methyl | Methyl | CN | 3-Sulfophenyl | H | Isopropyl | H |
| 2a$^{2283}$ | H | SO$_3$H | SO$_3$H | H | | | | | | | |
| 2a$^{2284}$ | SO$_3$H | H | H | SO$_3$H | Methyl | Methyl | CN | 3-Sulfophenyl | H | 1-Ethyl propyl | H |
| 2a$^{2285}$ | H | SO$_3$H | SO$_3$H | H | | | | | | | |
| 2a$^{2286}$ | SO$_3$H | H | H | SO$_3$H | Methyl | Methyl | CN | 3-Sulfophenyl | H | 1,2-Dimethyl propyl | H |
| 2a$^{2287}$ | H | SO$_3$H | SO$_3$H | H | | | | | | | |
| 2a$^{2288}$ | SO$_3$H | H | H | SO$_3$H | Methyl | Methyl | CN | 3-Sulfophenyl | H | 2,2-Dimethyl propyl | H |
| 2a$^{2289}$ | H | SO$_3$H | SO$_3$H | H | | | | | | | |
| 2a$^{2290}$ | SO$_3$H | H | H | SO$_3$H | Methyl | Methyl | CN | 3-Sulfophenyl | H | Butyl | H |
| 2a$^{2291}$ | H | SO$_3$H | SO$_3$H | H | | | | | | | |
| 2a$^{2292}$ | SO$_3$H | H | H | SO$_3$H | Methyl | Methyl | CN | 3-Sulfophenyl | H | 2-Methyl butyl | H |
| 2a$^{2293}$ | H | SO$_3$H | SO$_3$H | H | | | | | | | |
| 2a$^{2294}$ | SO$_3$H | H | H | SO$_3$H | Methyl | Methyl | CN | 3-Sulfophenyl | H | Tert butyl | H |
| 2a$^{2295}$ | H | SO$_3$H | SO$_3$H | H | | | | | | | |
| 2a$^{2296}$ | SO$_3$H | H | H | SO$_3$H | Methyl | Methyl | CN | 3-Sulfophenyl | H | 3-Methyl butyl | H |
| 2a$^{2297}$ | H | SO$_3$H | SO$_3$H | H | | | | | | | |
| 2a$^{2298}$ | SO$_3$H | H | H | SO$_3$H | Methyl | Methyl | CN | 3-Sulfophenyl | H | Sec butyl | H |
| 2a$^{2299}$ | H | SO$_3$H | SO$_3$H | H | | | | | | | |
| 2a$^{2300}$ | SO$_3$H | H | H | SO$_3$H | Methyl | Methyl | CN | 3-Sulfophenyl | H | Pentyl | H |
| 2a$^{2301}$ | H | SO$_3$H | SO$_3$H | H | | | | | | | |
| 2a$^{2302}$ | SO$_3$H | H | H | SO$_3$H | Methyl | Methyl | CN | 3-Sulfophenyl | H | Hexyl | H |
| 2a$^{2303}$ | H | SO$_3$H | SO$_3$H | H | | | | | | | |
| 2a$^{2304}$ | SO$_3$H | H | H | SO$_3$H | Methyl | Methyl | CN | 3-Sulfophenyl | H | Cyclobutyl | H |
| 2a$^{2305}$ | H | SO$_3$H | SO$_3$H | H | | | | | | | |
| 2a$^{2306}$ | SO$_3$H | H | H | SO$_3$H | Methyl | Methyl | CN | 3-Sulfophenyl | H | Cyclopentyl | H |
| 2a$^{2307}$ | H | SO$_3$H | SO$_3$H | H | | | | | | | |
| 2a$^{2308}$ | SO$_3$H | H | H | SO$_3$H | Methyl | Methyl | CN | 3-Sulfophenyl | H | Cyclohexyl | H |
| 2a$^{2309}$ | H | SO$_3$H | SO$_3$H | H | | | | | | | |
| 2a$^{2310}$ | SO$_3$H | H | H | SO$_3$H | Methyl | Methyl | CN | 3-Sulfophenyl | H | 2-Methyl cyclohexyl | H |
| 2a$^{2311}$ | H | SO$_3$H | SO$_3$H | H | | | | | | | |
| 2a$^{2312}$ | SO$_3$H | H | H | SO$_3$H | Methyl | Methyl | CN | 3-Sulfophenyl | H | 3-Methyl cyclohexyl | H |
| 2a$^{2313}$ | H | SO$_3$H | SO$_3$H | H | | | | | | | |
| 2a$^{2314}$ | SO$_3$H | H | H | SO$_3$H | Methyl | Methyl | CN | 3-Sulfophenyl | H | Pentan-2-yl | H |
| 2a$^{2315}$ | H | SO$_3$H | SO$_3$H | H | | | | | | | |
| 2a$^{2316}$ | SO$_3$H | H | H | SO$_3$H | Methyl | Methyl | CN | 3-Sulfophenyl | H | 2-Ethylhexyl | H |
| 2a$^{2317}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{2318}$ | SO$_3$H | H | H | SO$_3$H | Methyl | methyl | CN | 3-Sulfophenyl | H | Phenyl | H |
| 2a$^{2319}$ | H | SO$_3$H | SO$_3$H | H | | | | | | | |
| 2a$^{2320}$ | SO$_3$H | H | H | SO$_3$H | Methyl | methyl | CN | 3-Sulfophenyl | H | Benzyl | H |
| 2a$^{2321}$ | H | SO$_3$H | SO$_3$H | H | | | | | | | |
| 2a$^{2322}$ | SO$_3$H | H | H | SO$_3$H | Methyl | Methyl | CN | 3-Sulfophenyl | H | Allyl | H |
| 2a$^{2323}$ | H | SO$_3$H | SO$_3$H | H | | | | | | | |
| 2a$^{2324}$ | SO$_3$H | H | H | SO$_3$H | Methyl | Methyl | CN | 3-Sulfophenyl | H | 2-Methoxy ethyl | H |
| 2a$^{2325}$ | H | SO$_3$H | SO$_3$H | H | | | | | | | |
| 2a$^{2326}$ | SO$_3$H | H | H | SO$_3$H | Methyl | Methyl | CN | 3-Sulfophenyl | H | 3-Methoxy propyl | H |
| 2a$^{2327}$ | H | SO$_3$H | SO$_3$H | H | | | | | | | |
| 2a$^{2328}$ | SO$_3$H | H | H | SO$_3$H | Methyl | Methyl | CN | 3-Sulfophenyl | H | 3-Chloropropyl | H |
| 2a$^{2329}$ | H | SO$_3$H | SO$_3$H | H | | | | | | | |
| 2a$^{2330}$ | SO$_3$H | H | H | SO$_3$H | Methyl | Methyl | CN | 3-Sulfophenyl | H | 2-Methyl thioethyl | H |
| 2a$^{2331}$ | H | SO$_3$H | SO$_3$H | H | | | | | | | |
| 2a$^{2332}$ | SO$_3$H | H | H | SO$_3$H | Methyl | Methyl | CN | 3-Sulfophenyl | H | 2-Fluoroethyl | H |
| 2a$^{2333}$ | H | SO$_3$H | SO$_3$H | H | | | | | | | |
| 2a$^{2334}$ | SO$_3$H | H | H | SO$_3$H | Methyl | Methyl | CN | 3-Sulfophenyl | H | 2-Chloro ethyl | H |
| 2a$^{2335}$ | H | SO$_3$H | SO$_3$H | H | | | | | | | |
| 2a$^{2336}$ | SO$_3$H | H | H | SO$_3$H | Methyl | Methyl | CN | 3-Sulfophenyl | H | 2-(2-Hydroxy ethyl sulfonyl)ethyl | H |
| 2a$^{2337}$ | H | SO$_3$H | SO$_3$H | H | | | | | | | |
| 2a$^{2338}$ | SO$_3$H | H | H | SO$_3$H | Methyl | Methyl | CN | 3-Sulfophenyl | H | 2-(2-tert Butyl sulfanyl ethyl sulfonyl)ethyl | H |
| 2a$^{2339}$ | H | SO$_3$H | SO$_3$H | H | | | | | | | |
| 2a$^{2340}$ | SO$_3$H | H | H | SO$_3$H | Methyl | Methyl | CN | 3-Sulfophenyl | H | 2-(2-Hydroxy ethoxy)propyl | H |
| 2a$^{2341}$ | H | SO$_3$H | SO$_3$H | H | | | | | | | |
| 2a$^{2342}$ | SO$_3$H | H | H | SO$_3$H | Methyl | Methyl | CN | 3-Sulfophenyl | H | 2-(2-Hydroxy ethoxy)ethyl | H |
| 2a$^{2343}$ | H | SO$_3$H | SO$_3$H | H | | | | | | | |
| 2a$^{2344}$ | SO$_3$H | H | H | SO$_3$H | Methyl | Methyl | CN | 3-Sulfophenyl | H | 3-(4-Hydroxy butoxy)propyl | H |
| 2a$^{2345}$ | H | SO$_3$H | SO$_3$H | H | | | | | | | |
| 2a$^{2346}$ | SO$_3$H | H | H | SO$_3$H | Methyl | Methyl | CN | 3-Sulfophenyl | H | 3-(2-Phenoxy ethoxyl)propyl | H |
| 2a$^{2347}$ | H | SO$_3$H | SO$_3$H | H | | | | | | | |
| 2a$^{2348}$ | SO$_3$H | H | H | SO$_3$H | Methyl | Methyl | CN | 3-Sulfophenyl | H | 3-Isopropxy propyl | H |
| 2a$^{2349}$ | H | SO$_3$H | SO$_3$H | H | | | | | | | |
| 2a$^{2350}$ | SO$_3$H | H | H | SO$_3$H | Methyl | Methyl | CN | 3-Sulfophenyl | H | 3-Ethoxy propyl | H |
| 2a$^{2351}$ | H | SO$_3$H | SO$_3$H | H | | | | | | | |
| 2a$^{2352}$ | SO$_3$H | H | H | SO$_3$H | Methyl | Methyl | CN | 3-Sulfophenyl | H | 3-Ethoxy butyl | H |
| 2a$^{2353}$ | H | SO$_3$H | SO$_3$H | H | | | | | | | |
| 2a$^{2354}$ | SO$_3$H | H | H | SO$_3$H | Methyl | Methyl | CN | 3-Sulfophenyl | H | 4-(2-Hydroxy ethane sulfonyl)phenyl | H |
| 2a$^{2355}$ | H | SO$_3$H | SO$_3$H | H | | | | | | | |
| 2a$^{2356}$ | SO$_3$H | H | H | SO$_3$H | Methyl | Methyl | CONH$_2$ | 3-Sulfophenyl | H | Methyl | H |
| 2a$^{2357}$ | H | SO$_3$H | SO$_3$H | H | | | | | | | |
| 2a$^{2358}$ | SO$_3$H | H | H | SO$_3$H | Methyl | Methyl | CONH$_2$ | 3-Sulfophenyl | H | Ethyl | H |
| 2a$^{2359}$ | H | SO$_3$H | SO$_3$H | H | | | | | | | |
| 2a$^{2360}$ | SO$_3$H | H | H | SO$_3$H | Methyl | Methyl | CONH$_2$ | 3-Sulfophenyl | H | n-Propyl | H |
| 2a$^{2361}$ | H | SO$_3$H | SO$_3$H | H | | | | | | | |
| 2a$^{2362}$ | SO$_3$H | H | H | SO$_3$H | Methyl | Methyl | CONH$_2$ | 3-Sulfophenyl | H | Isopropyl | H |
| 2a$^{2363}$ | H | SO$_3$H | SO$_3$H | H | | | | | | | |
| 2a$^{2364}$ | SO$_3$H | H | H | SO$_3$H | Methyl | Methyl | CONH$_2$ | 3-Sulfophenyl | H | 1-Ethyl propyl | H |
| 2a$^{2365}$ | H | SO$_3$H | SO$_3$H | H | | | | | | | |
| 2a$^{2366}$ | SO$_3$H | H | H | SO$_3$H | Methyl | Methyl | CONH$_2$ | 3-Sulfophenyl | H | 1,2-Dimethyl propyl | H |
| 2a$^{2367}$ | H | SO$_3$H | SO$_3$H | H | | | | | | | |
| 2a$^{2368}$ | SO$_3$H | H | H | SO$_3$H | Methyl | Methyl | CONH$_2$ | 3-Sulfophenyl | H | 2,2-Dimethyl propyl | H |
| 2a$^{2369}$ | H | SO$_3$H | SO$_3$H | H | | | | | | | |
| 2a$^{2370}$ | SO$_3$H | H | H | SO$_3$H | Methyl | Methyl | CONH$_2$ | 3-Sulfophenyl | H | Butyl | H |
| 2a$^{2371}$ | H | SO$_3$H | SO$_3$H | H | | | | | | | |
| 2a$^{2372}$ | SO$_3$H | H | H | SO$_3$H | Methyl | Methyl | CONH$_2$ | 3-Sulfophenyl | H | 2-Methyl butyl | H |
| 2a$^{2373}$ | H | SO$_3$H | SO$_3$H | H | | | | | | | |
| 2a$^{2374}$ | SO$_3$H | H | H | SO$_3$H | Methyl | Methyl | CONH$_2$ | 3-Sulfophenyl | H | Tert butyl | H |
| 2a$^{2375}$ | H | SO$_3$H | SO$_3$H | H | | | | | | | |
| 2a$^{2376}$ | SO$_3$H | H | H | SO$_3$H | Methyl | Methyl | CONH$_2$ | 3-Sulfophenyl | H | 3-Methyl butyl | H |
| 2a$^{2377}$ | H | SO$_3$H | SO$_3$H | H | | | | | | | |
| 2a$^{2378}$ | SO$_3$H | H | H | SO$_3$H | Methyl | Methyl | CONH$_2$ | 3-Sulfophenyl | H | Sec butyl | H |
| 2a$^{2379}$ | H | SO$_3$H | SO$_3$H | H | | | | | | | |
| 2a$^{2380}$ | SO$_3$H | H | H | SO$_3$H | Methyl | Methyl | CONH$_2$ | 3-Sulfophenyl | H | Pentyl | H |
| 2a$^{2381}$ | H | SO$_3$H | SO$_3$H | H | | | | | | | |
| 2a$^{2382}$ | SO$_3$H | H | H | SO$_3$H | Methyl | Methyl | CONH$_2$ | 3-Sulfophenyl | H | Hexyl | H |
| 2a$^{2383}$ | H | SO$_3$H | SO$_3$H | H | | | | | | | |
| 2a$^{2384}$ | SO$_3$H | H | H | SO$_3$H | Methyl | Methyl | CONH$_2$ | 3-Sulfophenyl | H | Cyclobutyl | H |
| 2a$^{2385}$ | H | SO$_3$H | SO$_3$H | H | | | | | | | |
| 2a$^{2386}$ | SO$_3$H | H | H | SO$_3$H | Methyl | Methyl | CONH$_2$ | 3-Sulfophenyl | H | Cyclopentyl | H |
| 2a$^{2387}$ | H | SO$_3$H | SO$_3$H | H | | | | | | | |
| 2a$^{2388}$ | SO$_3$H | H | H | SO$_3$H | Methyl | Methyl | CONH$_2$ | 3-Sulfophenyl | H | Cyclohexyl | H |
| 2a$^{2389}$ | H | SO$_3$H | SO$_3$H | H | | | | | | | |
| 2a$^{2390}$ | SO$_3$H | H | H | SO$_3$H | Methyl | Methyl | CONH$_2$ | 3-Sulfophenyl | H | 2-Methyl cyclohexyl | H |
| 2a$^{2391}$ | H | SO$_3$H | SO$_3$H | H | | | | | | | |

TABLE 3-continued

| S/No | R$^{3a}$ | R$^{4a}$ | R$^{5a}$ | R$^{6a}$ | R$^{10a}$/R$^{14a}$ | R$^{9a}$/R$^{13a}$ | R$^{24a}$/R$^{30a}$ | R$^{27a}$/R$^{33a}$ | R$^{26a}$/R$^{34a}$ | R$^{25a}$/R$^{31a}$ | R$^{26a}$/R$^{32a}$ |
|---|---|---|---|---|---|---|---|---|---|---|---|
| 2a$^{2392}$ | SO$_3$H | H | H | SO$_3$H | Methyl | Methyl | CONH$_2$ | 3-Sulfophenyl | H | 3-Methyl cyclohexyl | H |
| 2a$^{2393}$ | H | SO$_3$H | SO$_3$H | H | | | | | | | |
| 2a$^{2394}$ | SO$_3$H | H | H | SO$_3$H | Methyl | Methyl | CONH$_2$ | 3-Sulfophenyl | H | Pentan-2-yl | H |
| 2a$^{2395}$ | H | SO$_3$H | SO$_3$H | H | | | | | | | |
| 2a$^{2396}$ | SO$_3$H | H | H | SO$_3$H | Methyl | Methyl | CONH$_2$ | 3-Sulfophenyl | H | 2-Ethylhexyl | H |
| 2a$^{2397}$ | H | SO$_3$H | SO$_3$H | H | | | | | | | |
| 2a$^{2398}$ | SO$_3$H | H | H | SO$_3$H | Methyl | Methyl | CONH$_2$ | 3-Sulfophenyl | H | Phenyl | H |
| 2a$^{2399}$ | H | SO$_3$H | SO$_3$H | H | | | | | | | |
| 2a$^{2400}$ | SO$_3$H | H | H | SO$_3$H | Methyl | Methyl | CONH$_2$ | 3-Sulfophenyl | H | Benzyl | H |
| 2a$^{2401}$ | H | SO$_3$H | SO$_3$H | H | | | | | | | |
| 2a$^{2402}$ | SO$_3$H | H | H | SO$_3$H | Methyl | Methyl | CONH$_2$ | 3-Sulfophenyl | H | | |
| 2a$^{2403}$ | H | SO$_3$H | SO$_3$H | H | | | | | | | |
| 2a$^{2404}$ | SO$_3$H | H | H | SO$_3$H | Methyl | Methyl | CONH$_2$ | 3-Sulfophenyl | H | 2-Methoxy ethyl | H |
| 2a$^{2405}$ | H | SO$_3$H | SO$_3$H | H | | | | | | | |
| 2a$^{2406}$ | SO$_3$H | H | H | SO$_3$H | Methyl | Methyl | CONH$_2$ | 3-Sulfophenyl | H | 3-Methoxy propyl | H |
| 2a$^{2407}$ | H | SO$_3$H | SO$_3$H | H | | | | | | | |
| 2a$^{2408}$ | SO$_3$H | H | H | SO$_3$H | Methyl | Methyl | CONH$_2$ | 3-Sulfophenyl | H | 3-Chloropropyl | H |
| 2a$^{2409}$ | H | SO$_3$H | SO$_3$H | H | | | | | | | |
| 2a$^{2410}$ | SO$_3$H | H | H | SO$_3$H | Methyl | Methyl | CONH$_2$ | 3-Sulfophenyl | H | 2-Methyl thioethyl | H |
| 2a$^{2411}$ | H | SO$_3$H | SO$_3$H | H | | | | | | | |
| 2a$^{2412}$ | SO$_3$H | H | H | SO$_3$H | Methyl | Methyl | CONH$_2$ | 3-Sulfophenyl | H | 2-Fluoroethyl | H |
| 2a$^{2413}$ | H | SO$_3$H | SO$_3$H | H | | | | | | | |
| 2a$^{2414}$ | SO$_3$H | H | H | SO$_3$H | Methyl | Methyl | CONH$_2$ | 3-Sulfophenyl | H | 2-Chloro ethyl | H |
| 2a$^{2415}$ | H | SO$_3$H | SO$_3$H | H | | | | | | | |
| 2a$^{2416}$ | SO$_3$H | H | H | SO$_3$H | Methyl | Methyl | CONH$_2$ | 3-Sulfophenyl | H | 2-(2-Hydroxy ethyl sulfonyl)ethyl | H |
| 2a$^{2417}$ | H | SO$_3$H | SO$_3$H | H | | | | | | | |
| 2a$^{2418}$ | SO$_3$H | H | H | SO$_3$H | Methyl | Methyl | CONH$_2$ | 3-Sulfophenyl | H | 2-(2-tert Butyl sulfanyl ethyl sulfonyl)ethyl | H |
| 2a$^{2419}$ | H | SO$_3$H | SO$_3$H | H | | | | | | | |
| 2a$^{2420}$ | SO$_3$H | H | H | SO$_3$H | Methyl | Methyl | CONH$_2$ | 3-Sulfophenyl | H | 2-(2-Hydroxy ethoxy)propyl | H |
| 2a$^{2421}$ | H | SO$_3$H | SO$_3$H | H | | | | | | | |
| 2a$^{2422}$ | SO$_3$H | H | H | SO$_3$H | Methyl | Methyl | CONH$_2$ | 3-Sulfophenyl | H | 2-(2-Hydroxy ethoxy)ethyl | H |
| 2a$^{2423}$ | H | SO$_3$H | SO$_3$H | H | | | | | | | |
| 2a$^{2424}$ | SO$_3$H | H | H | SO$_3$H | Methyl | Methyl | CONH$_2$ | 3-Sulfophenyl | H | 3-(4-Hydroxy butoxy)propyl | H |
| 2a$^{2425}$ | H | SO$_3$H | SO$_3$H | H | | | | | | | |
| 2a$^{2426}$ | SO$_3$H | H | H | SO$_3$H | Methyl | Methyl | CONH$_2$ | 3-Sulfophenyl | H | 3-(2-Phenoxy ethoxyl)propyl | H |
| 2a$^{2427}$ | H | SO$_3$H | SO$_3$H | H | | | | | | | |
| 2a$^{2428}$ | SO$_3$H | H | H | SO$_3$H | Methyl | Methyl | CONH$_2$ | 3-Sulfophenyl | H | 3-Isopropxy propyl | H |
| 2a$^{2429}$ | H | SO$_3$H | SO$_3$H | H | | | | | | | |
| 2a$^{2430}$ | SO$_3$H | H | H | SO$_3$H | Methyl | Methyl | CONH$_2$ | 3-Sulfophenyl | H | 3-Ethoxy propyl | H |
| 2a$^{2431}$ | H | SO$_3$H | SO$_3$H | H | | | | | | | |
| 2a$^{2432}$ | SO$_3$H | H | H | SO$_3$H | Methyl | Methyl | CONH$_2$ | 3-Sulfophenyl | H | 3-Ethoxy butyl | H |
| 2a$^{2433}$ | H | SO$_3$H | SO$_3$H | H | | | | | | | |
| 2a$^{2434}$ | SO$_3$H | H | H | SO$_3$H | Methyl | Methyl | CONH$_2$ | 3-Sulfophenyl | H | 4-(2-Hydroxy ethane sulfonyl)phenyl | H |
| 2a$^{2435}$ | H | SO$_3$H | SO$_3$H | H | | | | | | | |
| 2a$^{2436}$ | SO$_3$H | H | H | SO$_3$H | NHCOCH$_3$ | OMe | CN | 3-Sulfophenyl | H | Methyl | H |
| 2a$^{2437}$ | H | SO$_3$H | SO$_3$H | H | | | | | | | |
| 2a$^{2438}$ | SO$_3$H | H | H | SO$_3$H | NHCOCH$_3$ | OMe | CN | 3-Sulfophenyl | H | Ethyl | H |
| 2a$^{2439}$ | H | SO$_3$H | SO$_3$H | H | | | | | | | |
| 2a$^{2440}$ | SO$_3$H | H | H | SO$_3$H | NHCOCH$_3$ | OMe | CN | 3-Sulfophenyl | H | n-propyl | H |
| 2a$^{2441}$ | H | SO$_3$H | SO$_3$H | H | | | | | | | |
| 2a$^{2442}$ | SO$_3$H | H | H | SO$_3$H | NHCOCH$_3$ | OMe | CN | 3-Sulfophenyl | H | Isopropyl | H |
| 2a$^{2443}$ | H | SO$_3$H | SO$_3$H | H | | | | | | | |
| 2a$^{2444}$ | SO$_3$H | H | H | SO$_3$H | NHCOCH$_3$ | OMe | CN | 3-Sulfophenyl | H | 1-Ethyl propyl | H |
| 2a$^{2445}$ | H | SO$_3$H | SO$_3$H | H | | | | | | | |
| 2a$^{2446}$ | SO$_3$H | H | H | SO$_3$H | NHCOCH$_3$ | OMe | CN | 3-Sulfophenyl | H | 1,2-Dimethyl propyl | H |
| 2a$^{2447}$ | H | SO$_3$H | SO$_3$H | H | | | | | | | |
| 2a$^{2448}$ | SO$_3$H | H | H | SO$_3$H | NHCOCH$_3$ | OMe | CN | 3-Sulfophenyl | H | 2,2-Dimethyl propyl | H |
| 2a$^{2449}$ | H | SO$_3$H | SO$_3$H | H | | | | | | | |
| 2a$^{2450}$ | SO$_3$H | H | H | SO$_3$H | NHCOCH$_3$ | OMe | CN | 3-Sulfophenyl | H | Butyl | H |
| 2a$^{2451}$ | H | SO$_3$H | SO$_3$H | H | | | | | | | |
| 2a$^{2452}$ | SO$_3$H | H | H | SO$_3$H | NHCOCH$_3$ | OMe | CN | 3-Sulfophenyl | H | 2-Methyl butyl | H |
| 2a$^{2453}$ | H | SO$_3$H | SO$_3$H | H | | | | | | | |
| 2a$^{2454}$ | SO$_3$H | H | H | SO$_3$H | NHCOCH$_3$ | OMe | CN | 3-Sulfophenyl | H | Tert butyl | H |
| 2a$^{2455}$ | H | SO$_3$H | SO$_3$H | H | | | | | | | |
| 2a$^{2456}$ | SO$_3$H | H | H | SO$_3$H | NHCOCH$_3$ | OMe | CN | 3-Sulfophenyl | H | 3-Methyl butyl | H |
| 2a$^{2457}$ | H | SO$_3$H | SO$_3$H | H | | | | | | | |
| 2a$^{2458}$ | SO$_3$H | H | H | SO$_3$H | NHCOCH$_3$ | OMe | CN | 3-Sulfophenyl | H | Sec butyl | H |
| 2a$^{2459}$ | H | SO$_3$H | SO$_3$H | H | | | | | | | |
| 2a$^{2460}$ | SO$_3$H | H | H | SO$_3$H | NHCOCH$_3$ | OMe | CN | 3-Sulfophenyl | H | Pentyl | H |
| 2a$^{2461}$ | H | SO$_3$H | SO$_3$H | H | | | | | | | |
| 2a$^{2462}$ | SO$_3$H | H | H | SO$_3$H | NHCOCH$_3$ | OMe | CN | 3-Sulfophenyl | H | Hexyl | H |
| 2a$^{2463}$ | H | SO$_3$H | SO$_3$H | H | | | | | | | |

TABLE 3-continued

| S/No | $R^{3a}$ | $R^{4a}$ | $R^{5a}$ | $R^{6a}$ | $R^{10a}/R^{14a}$ | $R^{9a}/R^{13a}$ | $R^{24a}/R^{30a}$ | $R^{27a}/R^{33a}$ | $R^{26a}/R^{34a}$ | $R^{25a}/R^{31a}$ | $R^{26a}/R^{32a}$ |
|---|---|---|---|---|---|---|---|---|---|---|---|
| 2a$^{2464}$ | SO$_3$H | H | H | SO$_3$H | NHCOCH$_3$ | OMe | CN | 3-Sulfophenyl | H | Cyclobutyl | H |
| 2a$^{2465}$ | H | SO$_3$H | SO$_3$H | H | | | | | | | |
| 2a$^{2466}$ | SO$_3$H | H | H | SO$_3$H | NHCOCH$_3$ | OMe | CN | 3-Sulfophenyl | H | Cyclopentyl | H |
| 2a$^{2467}$ | H | SO$_3$H | SO$_3$H | H | | | | | | | |
| 2a$^{2468}$ | SO$_3$H | H | H | SO$_3$H | NHCOCH$_3$ | OMe | CN | 3-Sulfophenyl | H | Cyclohexyl | H |
| 2a$^{2469}$ | H | SO$_3$H | SO$_3$H | H | | | | | | | |
| 2a$^{2470}$ | SO$_3$H | H | H | SO$_3$H | NHCOCH$_3$ | OMe | CN | 3-Sulfophenyl | H | 2-Methyl cyclohexyl | H |
| 2a$^{2471}$ | H | SO$_3$H | SO$_3$H | H | | | | | | | |
| 2a$^{2472}$ | SO$_3$H | H | H | SO$_3$H | NHCOCH$_3$ | OMe | CN | 3-Sulfophenyl | H | 3-Methyl cyclohexyl | H |
| 2a$^{2473}$ | H | SO$_3$H | SO$_3$H | H | | | | | | | |
| 2a$^{2474}$ | SO$_3$H | H | H | SO$_3$H | NHCOCH$_3$ | OMe | CN | 3-Sulfophenyl | H | Pentan-2-yl | H |
| 2a$^{2475}$ | H | SO$_3$H | SO$_3$H | H | | | | | | | |
| 2a$^{2476}$ | SO$_3$H | H | H | SO$_3$H | NHCOCH$_3$ | OMe | CN | 3-Sulfophenyl | H | 2-Ethylhexyl | H |
| 2a$^{2477}$ | H | SO$_3$H | SO$_3$H | H | | | | | | | |
| 2a$^{2478}$ | SO$_3$H | H | H | SO$_3$H | NHCOCH$_3$ | OMe | CN | 3-Sulfophenyl | H | Phenyl | H |
| 2a$^{2479}$ | H | SO$_3$H | SO$_3$H | H | | | | | | | |
| 2a$^{2480}$ | SO$_3$H | H | H | SO$_3$H | NHCOCH$_3$ | OMe | CN | 3-Sulfophenyl | H | Benzyl | H |
| 2a$^{2481}$ | H | SO$_3$H | SO$_3$H | H | | | | | | | |
| 2a$^{2482}$ | SO$_3$H | H | H | SO$_3$H | NHCOCH$_3$ | OMe | CN | 3-Sulfophenyl | H | Allyl | H |
| 2a$^{2483}$ | H | SO$_3$H | SO$_3$H | H | | | | | | | |
| 2a$^{2484}$ | SO$_3$H | H | H | SO$_3$H | NHCOCH$_3$ | OMe | CN | 3-Sulfophenyl | H | 2-Methoxy ethyl | H |
| 2a$^{2485}$ | H | SO$_3$H | SO$_3$H | H | | | | | | | |
| 2a$^{2486}$ | SO$_3$H | H | H | SO$_3$H | NHCOCH$_3$ | OMe | CN | 3-Sulfophenyl | H | 3-Methoxy propyl | H |
| 2a$^{2487}$ | H | SO$_3$H | SO$_3$H | H | | | | | | | |
| 2a$^{2488}$ | SO$_3$H | H | H | SO$_3$H | NHCOCH$_3$ | OMe | CN | 3-Sulfophenyl | H | 3-Chloropropyl | H |
| 2a$^{2489}$ | H | SO$_3$H | SO$_3$H | H | | | | | | | |
| 2a$^{2490}$ | SO$_3$H | H | H | SO$_3$H | NHCOCH$_3$ | OMe | CN | 3-Sulfophenyl | H | 2-Methyl thioethyl | H |
| 2a$^{2491}$ | H | SO$_3$H | SO$_3$H | H | | | | | | | |
| 2a$^{2492}$ | SO$_3$H | H | H | SO$_3$H | NHCOCH$_3$ | OMe | CN | 3-Sulfophenyl | H | 2-Fluoroethyl | H |
| 2a$^{2493}$ | H | SO$_3$H | SO$_3$H | H | | | | | | | |
| 2a$^{2494}$ | SO$_3$H | H | H | SO$_3$H | NHCOCH$_3$ | OMe | CN | 3-Sulfophenyl | H | 2-Chloro ethyl | H |
| 2a$^{2495}$ | H | SO$_3$H | SO$_3$H | H | | | | | | | |
| 2a$^{2496}$ | SO$_3$H | H | H | SO$_3$H | NHCOCH$_3$ | OMe | CN | 3-Sulfophenyl | H | 2-(2-Hydroxy ethyl sulfonyl)ethyl | H |
| 2a$^{2497}$ | H | SO$_3$H | SO$_3$H | H | | | | | | | |
| 2a$^{2498}$ | SO$_3$H | H | H | SO$_3$H | NHCOCH$_3$ | OMe | CN | 3-Sulfophenyl | H | 2-(2-tert Butyl sulfanyl ethyl sulfonyl)ethyl | H |
| 2a$^{2499}$ | H | SO$_3$H | SO$_3$H | H | | | | | | | |
| 2a$^{2500}$ | SO$_3$H | H | H | SO$_3$H | NHCOCH$_3$ | OMe | CN | 3-Sulfophenyl | H | 2-(2-Hydroxy ethoxy)propyl | H |
| 2a$^{2501}$ | H | SO$_3$H | SO$_3$H | H | | | | | | | |
| 2a$^{2502}$ | SO$_3$H | H | H | SO$_3$H | NHCOCH$_3$ | OMe | CN | 3-Sulfophenyl | H | 2-(2-Hydroxy ethoxy)ethyl | H |
| 2a$^{2503}$ | H | SO$_3$H | SO$_3$H | H | | | | | | | |
| 2a$^{2504}$ | SO$_3$H | H | H | SO$_3$H | NHCOCH$_3$ | OMe | CN | 3-Sulfophenyl | H | 3-(4-Hydroxy butoxy)propyl | H |
| 2a$^{2505}$ | H | SO$_3$H | SO$_3$H | H | | | | | | | |
| 2a$^{2506}$ | SO$_3$H | H | H | SO$_3$H | NHCOCH$_3$ | OMe | CN | 3-Sulfophenyl | H | 3-(2-Phenoxy ethoxyl)propyl | H |
| 2a$^{2507}$ | H | SO$_3$H | SO$_3$H | H | | | | | | | |
| 2a$^{2508}$ | SO$_3$H | H | H | SO$_3$H | NHCOCH$_3$ | OMe | CN | 3-Sulfophenyl | H | 3-Isopropxy propyl | H |
| 2a$^{2509}$ | H | SO$_3$H | SO$_3$H | H | | | | | | | |
| 2a$^{2510}$ | SO$_3$H | H | H | SO$_3$H | NHCOCH$_3$ | OMe | CN | 3-Sulfophenyl | H | 3-Ethoxy propyl | H |
| 2a$^{2511}$ | H | SO$_3$H | SO$_3$H | H | | | | | | | |
| 2a$^{2512}$ | SO$_3$H | H | H | SO$_3$H | NHCOCH$_3$ | OMe | CN | 3-Sulfophenyl | H | 3-Ethoxy butyl | H |
| 2a$^{2513}$ | H | SO$_3$H | SO$_3$H | H | | | | | | | |
| 2a$^{2514}$ | SO$_3$H | H | H | SO$_3$H | NHCOCH$_3$ | OMe | CN | 3-Sulfophenyl | H | 4-(2-Hydroxy ethane sulfonyl)phenyl | H |
| 2a$^{2515}$ | H | SO$_3$H | SO$_3$H | H | | | | | | | |
| 2a$^{2516}$ | SO$_3$H | H | H | SO$_3$H | NHCOCH$_3$ | OMe | CONH$_2$ | 3-Sulfophenyl | H | Methyl | H |
| 2a$^{2517}$ | H | SO$_3$H | SO$_3$H | H | | | | | | | |
| 2a$^{2518}$ | SO$_3$H | H | H | SO$_3$H | NHCOCH$_3$ | OMe | CONH$_2$ | 3-Sulfophenyl | H | Ethyl | H |
| 2a$^{2519}$ | H | SO$_3$H | SO$_3$H | H | | | | | | | |
| 2a$^{2520}$ | SO$_3$H | H | H | SO$_3$H | NHCOCH$_3$ | OMe | CONH$_2$ | 3-Sulfophenyl | H | n-Propyl | H |
| 2a$^{2521}$ | H | SO$_3$H | SO$_3$H | H | | | | | | | |
| 2a$^{2522}$ | SO$_3$H | H | H | SO$_3$H | NHCOCH$_3$ | OMe | CONH$_2$ | 3-Sulfophenyl | H | Isopropyl | H |
| 2a$^{2523}$ | H | SO$_3$H | SO$_3$H | H | | | | | | | |
| 2a$^{2524}$ | SO$_3$H | H | H | SO$_3$H | NHCOCH$_3$ | OMe | CONH$_2$ | 3-Sulfophenyl | H | 1-Ethyl propyl | H |
| 2a$^{2525}$ | H | SO$_3$H | SO$_3$H | H | | | | | | | |
| 2a$^{2526}$ | SO$_3$H | H | H | SO$_3$H | NHCOCH$_3$ | OMe | CONH$_2$ | 3-Sulfophenyl | H | 1,2-Dimethyl propyl | H |
| 2a$^{2527}$ | H | SO$_3$H | SO$_3$H | H | | | | | | | |
| 2a$^{2528}$ | SO$_3$H | H | H | SO$_3$H | NHCOCH$_3$ | OMe | CONH$_2$ | 3-Sulfophenyl | H | 2,2-Dimethyl propyl | H |
| 2a$^{2529}$ | H | SO$_3$H | SO$_3$H | H | | | | | | | |
| 2a$^{2530}$ | SO$_3$H | H | H | SO$_3$H | NHCOCH$_3$ | OMe | CONH$_2$ | 3-Sulfophenyl | H | Butyl | H |
| 2a$^{2531}$ | H | SO$_3$H | SO$_3$H | H | | | | | | | |
| 2a$^{2532}$ | SO$_3$H | H | H | SO$_3$H | NHCOCH$_3$ | OMe | CONH$_2$ | 3-Sulfophenyl | H | 2-Methyl butyl | H |
| 2a$^{2533}$ | H | SO$_3$H | SO$_3$H | H | | | | | | | |
| 2a$^{2534}$ | SO$_3$H | H | H | SO$_3$H | NHCOCH$_3$ | OMe | CONH$_2$ | 3-Sulfophenyl | H | Tert butyl | H |
| 2a$^{2535}$ | H | SO$_3$H | SO$_3$H | H | | | | | | | |
| 2a$^{2536}$ | SO$_3$H | H | H | SO$_3$H | NHCOCH$_3$ | OMe | CONH$_2$ | 3-Sulfophenyl | H | 3-Methyl butyl | H |
| 2a$^{2537}$ | H | SO$_3$H | SO$_3$H | H | | | | | | | |

TABLE 3-continued

| S/No | R$^{3a}$ | R$^{4a}$ | R$^{5a}$ | R$^{6a}$ | R$^{10a}$/R$^{14a}$ | R$^{9a}$/R$^{13a}$ | R$^{24a}$/R$^{30a}$ | R$^{27a}$/R$^{33a}$ | R$^{26a}$/R$^{34a}$ | R$^{25a}$/R$^{31a}$ | R$^{26a}$/R$^{32a}$ |
|---|---|---|---|---|---|---|---|---|---|---|---|
| 2a$^{2538}$ | SO$_3$H | H | H | SO$_3$H | NHCOCH$_3$ | OMe | CONH$_2$ | 3-Sulfophenyl | H | Sec butyl | H |
| 2a$^{2539}$ | H | SO$_3$H | SO$_3$H | H | | | | | | | |
| 2a$^{2540}$ | SO$_3$H | H | H | SO$_3$H | NHCOCH$_3$ | OMe | CONH$_2$ | 3-Sulfophenyl | H | Pentyl | H |
| 2a$^{2541}$ | H | SO$_3$H | SO$_3$H | H | | | | | | | |
| 2a$^{2542}$ | SO$_3$H | H | H | SO$_3$H | NHCOCH$_3$ | OMe | CONH$_2$ | 3-Sulfophenyl | H | Hexyl | H |
| 2a$^{2543}$ | H | SO$_3$H | SO$_3$H | H | | | | | | | |
| 2a$^{2544}$ | SO$_3$H | H | H | SO$_3$H | NHCOCH$_3$ | OMe | CONH$_2$ | 3-Sulfophenyl | H | Cyclobutyl | H |
| 2a$^{2545}$ | H | SO$_3$H | SO$_3$H | H | | | | | | | |
| 2a$^{2546}$ | SO$_3$H | H | H | SO$_3$H | NHCOCH$_3$ | OMe | CONH$_2$ | 3-Sulfophenyl | H | Cyclopentyl | H |
| 2a$^{2547}$ | H | SO$_3$H | SO$_3$H | H | | | | | | | |
| 2a$^{2548}$ | SO$_3$H | H | H | SO$_3$H | NHCOCH$_3$ | OMe | CONH$_2$ | 3-Sulfophenyl | H | Cyclohexyl | H |
| 2a$^{2549}$ | H | SO$_3$H | SO$_3$H | H | | | | | | | |
| 2a$^{2550}$ | SO$_3$H | H | H | SO$_3$H | NHCOCH$_3$ | OMe | CONH$_2$ | 3-Sulfophenyl | H | 2-Methyl cyclohexyl | H |
| 2a$^{2551}$ | H | SO$_3$H | SO$_3$H | H | | | | | | | |
| 2a$^{2552}$ | SO$_3$H | H | H | SO$_3$H | NHCOCH$_3$ | OMe | CONH$_2$ | 3-Sulfophenyl | H | 3-Methyl cyclohexyl | H |
| 2a$^{2553}$ | H | SO$_3$H | SO$_3$H | H | | | | | | | |
| 2a$^{2554}$ | SO$_3$H | H | H | SO$_3$H | NHCOCH$_3$ | OMe | CONH$_2$ | 3-Sulfophenyl | H | Pentan-2-yl | H |
| 2a$^{2555}$ | H | SO$_3$H | SO$_3$H | H | | | | | | | |
| 2a$^{2556}$ | SO$_3$H | H | H | SO$_3$H | NHCOCH$_3$ | OMe | CONH$_2$ | 3-Sulfophenyl | H | 2-Ethylhexyl | H |
| 2a$^{2557}$ | H | SO$_3$H | SO$_3$H | H | | | | | | | |
| 2a$^{2558}$ | SO$_3$H | H | H | SO$_3$H | NHCOCH$_3$ | OMe | CONH$_2$ | 3-Sulfophenyl | H | Phenyl | H |
| 2a$^{2559}$ | H | SO$_3$H | SO$_3$H | H | | | | | | | |
| 2a$^{2560}$ | SO$_3$H | H | H | SO$_3$H | NHCOCH$_3$ | OMe | CONH$_2$ | 3-Sulfophenyl | H | Benzyl | H |
| 2a$^{2561}$ | H | SO$_3$H | SO$_3$H | H | | | | | | | |
| 2a$^{2562}$ | SO$_3$H | H | H | SO$_3$H | NHCOCH$_3$ | OMe | CONH$_2$ | 3-Sulfophenyl | H | Allyl | H |
| 2a$^{2563}$ | H | SO$_3$H | SO$_3$H | H | | | | | | | |
| 2a$^{2564}$ | SO$_3$H | H | H | SO$_3$H | NHCOCH$_3$ | OMe | CONH$_2$ | 3-Sulfophenyl | H | 2-Methoxy ethyl | H |
| 2a$^{2565}$ | H | SO$_3$H | SO$_3$H | H | | | | | | | |
| 2a$^{2566}$ | SO$_3$H | H | H | SO$_3$H | NHCOCH$_3$ | OMe | CONH$_2$ | 3-Sulfophenyl | H | 3-Methoxy propyl | H |
| 2a$^{2567}$ | H | SO$_3$H | SO$_3$H | H | | | | | | | |
| 2a$^{2568}$ | SO$_3$H | H | H | SO$_3$H | NHCOCH$_3$ | OMe | CONH$_2$ | 3-Sulfophenyl | H | 3-Chloropropyl | H |
| 2a$^{2569}$ | H | SO$_3$H | SO$_3$H | H | | | | | | | |
| 2a$^{2570}$ | SO$_3$H | H | H | SO$_3$H | NHCOCH$_3$ | OMe | CONH$_2$ | 3-Sulfophenyl | H | 2-Methyl thioethyl | H |
| 2a$^{2571}$ | H | SO$_3$H | SO$_3$H | H | | | | | | | |
| 2a$^{2572}$ | SO$_3$H | H | H | SO$_3$H | NHCOCH$_3$ | OMe | CONH$_2$ | 3-Sulfophenyl | H | 2-Fluoroethyl | H |
| 2a$^{2573}$ | H | SO$_3$H | SO$_3$H | H | | | | | | | |
| 2a$^{2574}$ | SO$_3$H | H | H | SO$_3$H | NHCOCH$_3$ | OMe | CONH$_2$ | 3-Sulfophenyl | H | 2-Chloro ethyl | H |
| 2a$^{2575}$ | H | SO$_3$H | SO$_3$H | H | | | | | | | |
| 2a$^{2576}$ | SO$_3$H | H | H | SO$_3$H | NHCOCH$_3$ | OMe | CONH$_2$ | 3-Sulfophenyl | H | 2-(2-Hydroxy ethyl sulfonyl)ethyl | H |
| 2a$^{2577}$ | H | SO$_3$H | SO$_3$H | H | | | | | | | |
| 2a$^{2578}$ | SO$_3$H | H | H | SO$_3$H | NHCOCH$_3$ | OMe | CONH$_2$ | 3-Sulfophenyl | H | 2-(2-tert Butyl sulfanyl ethyl sulfonyl)ethyl | H |
| 2a$^{2579}$ | H | SO$_3$H | SO$_3$H | H | | | | | | | |
| 2a$^{2580}$ | SO$_3$H | H | H | SO$_3$H | NHCOCH$_3$ | OMe | CONH$_2$ | 3-Sulfophenyl | H | 2-(2-Hydroxy ethoxy)propyl | H |
| 2a$^{2581}$ | H | SO$_3$H | SO$_3$H | H | | | | | | | |
| 2a$^{2582}$ | SO$_3$H | H | H | SO$_3$H | NHCOCH$_3$ | OMe | CONH$_2$ | 3-Sulfophenyl | H | 2-(2-Hydroxy ethoxy)ethyl | H |
| 2a$^{2583}$ | H | SO$_3$H | SO$_3$H | H | | | | | | | |
| 2a$^{2584}$ | SO$_3$H | H | H | SO$_3$H | NHCOCH$_3$ | OMe | CONH$_2$ | 3-Sulfophenyl | H | 3-(4-Hydroxy butoxy)propyl | H |
| 2a$^{2585}$ | H | SO$_3$H | SO$_3$H | H | | | | | | | |
| 2a$^{2586}$ | SO$_3$H | H | H | SO$_3$H | NHCOCH$_3$ | OMe | CONH$_2$ | 3-Sulfophenyl | H | 3-(2-Phenoxy ethoxyl)propyl | H |
| 2a$^{2587}$ | H | SO$_3$H | SO$_3$H | H | | | | | | | |
| 2a$^{2588}$ | SO$_3$H | H | H | SO$_3$H | NHCOCH$_3$ | OMe | CONH$_2$ | 3-Sulfophenyl | H | 3-Isopropxy propyl | H |
| 2a$^{2589}$ | H | SO$_3$H | SO$_3$H | H | | | | | | | |
| 2a$^{2590}$ | SO$_3$H | H | H | SO$_3$H | NHCOCH$_3$ | OMe | CONH$_2$ | 3-Sulfophenyl | H | 3-Ethoxy propyl | H |
| 2a$^{2591}$ | H | SO$_3$H | SO$_3$H | H | | | | | | | |
| 2a$^{2592}$ | SO$_3$H | H | H | SO$_3$H | NHCOCH$_3$ | OMe | CONH$_2$ | 3-Sulfophenyl | H | 3-Ethoxy butyl | H |
| 2a$^{2593}$ | H | SO$_3$H | SO$_3$H | H | | | | | | | |
| 2a$^{2594}$ | SO$_3$H | H | H | SO$_3$H | NHCOCH$_3$ | OMe | CONH$_2$ | 3-Sulfophenyl | H | 4-(2-Hydroxy ethane sulfonyl)phenyl | H |

Further particular preferred embodiments of the present invention are the dyes of formula (2b) and mixtures thereof

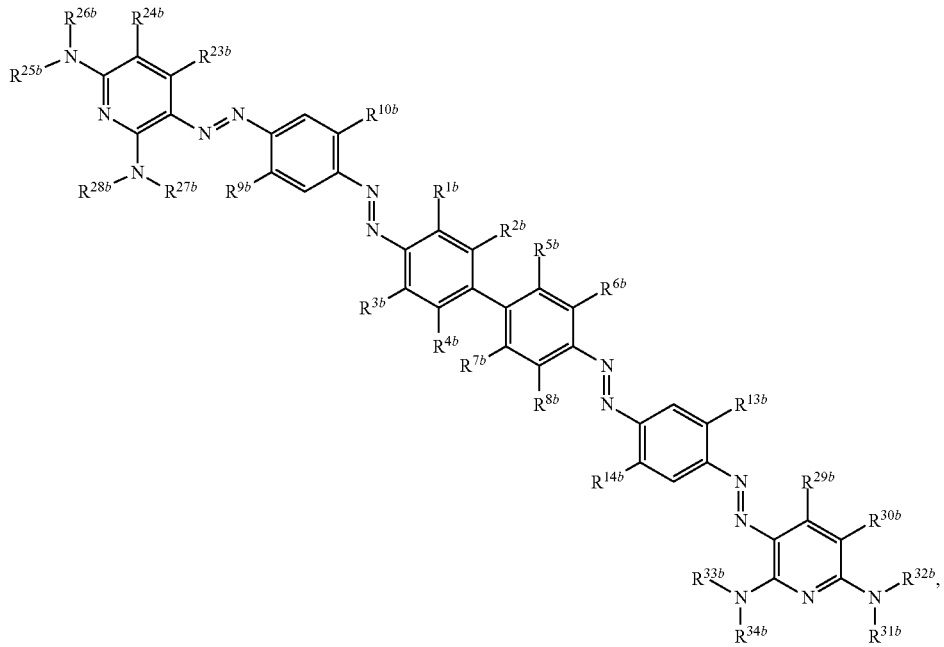

(2b)

wherein
$R^{1b}$, $R^{2b}$, $R^{3b}$, $R^{4b}$, $R^{5b}$, $R^{6b}$, $R^{7b}$ and $R^{8b}$ independent of each other is hydrogen, alkyl, alkoxy, halogen, trifluoromethyl or $SO_3M$, whereby at least two of them are $SO_3M$,
$R^{9b}$, $R^{10b}$, $R^{13b}$ and $R^{14b}$ independent of each other is hydrogen, $(C_1-C_4)$-alkyl, $(C_1-C_4)$-alkoxy, halogen, trifluoromethyl$(C_1-C_4)$-acylamino or $SO_3M$,
$R^{23b}$ and $R^{29b}$ independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl,
$R^{24b}$ and $R^{30b}$ independent of each other is cyano, carbamoyl or alkoxycarbonyl,
$R^{25b}$, $R^{26b}$, $R^{27b}$, $R^{28b}$, $R^{31b}$, $R^{32b}$, $R^{33b}$ and $R^{34b}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylamino-alkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl
or
alkyl interrupted by one or more heteroatoms selected from the group consisting of oxygen and sulphur
or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-mono-cycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
or
alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
or
joined together to form five or six membered ring being unsubstituted or substituted by one or more $(C_1-C_4)$-alkyl-groups and the ring being uninterrupted or interrupted by one or more heteroatoms selected from the group consisting of oxygen and sulphur
and
M is hydrogen, an alkali metal, ammonium, one equivalent of an alkali earth metal or a monovalent organic cation.
In especially preferred dyes of formula (2b)
$R^{1b}$, $R^{3b}$, $R^{4b}$, $R^{5b}$, $R^{6b}$ and $R^{8b}$ independent of each other is $SO_3M$, hydrogen, alkyl, alkoxy or halogen,—whereby at least two of them are $SO_3M$,
$R^{2b}$ and $R^{7b}$ is hydrogen,
$R^{9b}$, $R^{10b}$, $R^{13b}$ and $R^{14b}$ independent of each other is hydrogen, methyl, halogen, —$SO_3M$ or acetylamino,
$R^{23b}$ and $R^{29b}$ is methyl,
$R^{24b}$ and $R^{30b}$ independent of each other is cyano or carbamoyl,
$R^{25b}$, $R^{26b}$, $R^{27b}$, $R^{28b}$, $R^{31b}$, $R^{32b}$, $R^{33b}$ and $R^{34b}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, Isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfanyl)-ethyl, 2-(2-tertbutylsulfanylethanesulfonyl)-ethyl, 2-(2-hydroxyethoxy)propyl, 2-(2-hydroxy ethoxy)ethyl, 3-(4-hydroxybutoxy)propyl, 2-(2-hydroxyethanesulfonyl)-ethyl, 3-(2-phenoxy-ethoxy)-propyl, 3-isopropoxy-propyl, 3-ethoxy-propyl, 3-ethoxybutyl
or
($C_2$-$C_6$) alkyl substituted by COOM or by $SO_3M$
or
joined together to form six membered ring being unsubstituted or substituted by one or more ($C_1$-$C_4$)-alkyl-groups and the ring being uninterrupted or interrupted by one or more heteroatoms selected from the group consisting of oxygen and sulphur
and
M is hydrogen, sodium, potassium, lithium or ammonium.

Examples of preferred dyes of formula (2b) are the compounds of formulae ($2b^1$ to $2b^{192}$) and mixtures thereof, (Table 4) whereby $R^{1b}$, $R^{2b}$, $R^{7b}$ and $R^{8b}$ are hydrogen

TABLE 4

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| $2b^1$ | $SO_3H$ | H | H | $SO_3H$ | Methyl | Methyl | CN | 2-Hydroxyethyl | H | | |
| $2b^2$ | H | $SO_3H$ | $SO_3H$ | H | | | | | |  | |
| $2b^3$ | $SO_3H$ | H | H | $SO_3H$ | Methyl | Methyl | CN | 2-(2-Hydroxyethyl-sulfanyl)ethyl | H | | |
| $2b^4$ | H | $SO_3H$ | $SO_3H$ | H | | | | | |  | |
| $2b^5$ | $SO_3H$ | H | H | $SO_3H$ | Methyl | Methyl | CN | 2-(2-Hydroxy-ethyl)propyl | H | | |
| $2b^6$ | H | $SO_3H$ | $SO_3H$ | H | | | | | |  | |
| $2b^7$ | $SO_3H$ | H | H | $SO_3H$ | Methyl | Methyl | CN | 2-(2-Hydroxy-ethoxy)ethyl | H | | |
| $2b^8$ | H | $SO_3H$ | $SO_3H$ | H | | | | | |  | |
| $2b^9$ | $SO_3H$ | H | H | $SO_3H$ | Methyl | Methyl | CN | 3-(4-Hydroxy-butoxy)propyl | H | | |
| $2b^{10}$ | H | $SO_3H$ | $SO_3H$ | H | | | | | |  | |
| $2b^{11}$ | $SO_3H$ | H | H | $SO_3H$ | Methyl | Methyl | CN | 4-(2-Hydroxyethane-sulfonyl)phenyl | H | | |
| $2b^{12}$ | H | $SO_3H$ | $SO_3H$ | H | | | | | |  | |
| $2b^{13}$ | $SO_3H$ | H | H | $SO_3H$ | $NHCOCH_3$ | OMe | CN | 2-Hydroxyethyl | H | | |
| $2b^{14}$ | H | $SO_3H$ | $SO_3H$ | H | | | | | |  | |
| $2b^{15}$ | $SO_3H$ | H | H | $SO_3H$ | $NHCOCH_3$ | OMe | CN | 2-(2-Hydroxyethyl-sulfanyl)ethyl | H | | |
| $2b^{16}$ | H | $SO_3H$ | $SO_3H$ | H | | | | | |  | |
| $2b^{17}$ | $SO_3H$ | H | H | $SO_3H$ | $NHCOCH_3$ | OMe | CN | 2-(2-Hydroxy-ethyl)propyl | H | | |
| $2b^{18}$ | H | $SO_3H$ | $SO_3H$ | H | | | | | |  | |
| $2b^{19}$ | $SO_3H$ | H | H | $SO_3H$ | $NHCOCH_3$ | OMe | CN | 2-(2-Hydroxy-ethoxy)ethyl | H | | |
| $2b^{20}$ | H | $SO_3H$ | $SO_3H$ | H | | | | | |  | |
| $2b^{21}$ | $SO_3H$ | H | H | $SO_3H$ | $NHCOCH_3$ | OMe | CN | 3-(4-Hydroxy-butoxy)propyl | H | | |
| $2b^{22}$ | H | $SO_3H$ | $SO_3H$ | H | | | | | |  | |
| $2b^{23}$ | $SO_3H$ | H | H | $SO_3H$ | $NHCOCH_3$ | OMe | CN | 4-(2-Hydroxyethane-sulfonyl)phenyl | H | | |
| $2b^{24}$ | H | $SO_3H$ | $SO_3H$ | H | | | | | |  | |
| $2b^{25}$ | $SO_3H$ | H | H | $SO_3H$ | Methyl | Methyl | $CONH_2$ | 2-Hydroxyethyl | H | | |
| $2b^{26}$ | H | $SO_3H$ | $SO_3H$ | H | | | | | |  | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| 2b27 | SO3H | H | H | SO3H | Methyl | Methyl | CONH2 | 2-(2-Hydroxyethyl-sulfanyl)ethyl | H | | |
| 2b28 | H | SO3H | SO3H | H | | | | | | | |
| 2b29 | SO3H | H | H | SO3H | Methyl | Methyl | CONH2 | 2-(2-Hydroxy-ethyl)propyl | H | | |
| 2b30 | H | SO3H | SO3H | H | | | | | | | |
| 2b31 | SO3H | H | H | SO3H | Methyl | Methyl | CONH2 | 2-(2-Hydroxy-ethoxy)ethyl | H | | |
| 2b32 | H | SO3H | SO3H | H | | | | | | | |
| 2b33 | SO3H | H | H | SO3H | Methyl | Methyl | CONH2 | 3-(4-Hydroxy-butoxy)propyl | H | | |
| 2b34 | H | SO3H | SO3H | H | | | | | | | |
| 2b35 | SO3H | H | H | SO3H | Methyl | Methyl | CONH2 | 4-(2-Hydroxyethane-sulfonyl)phenyl | H | | |
| 2b36 | H | SO3H | SO3H | H | | | | | | | |
| 2b37 | SO3H | H | H | SO3H | NHCOCH3 | OMe | CONH2 | 2-Hydroxyethyl | H | | |
| 2b38 | H | SO3H | SO3H | H | | | | | | | |
| 2b39 | SO3H | H | H | SO3H | NHCOCH3 | OMe | CONH2 | 2-(2-Hydroxyethyl-sulfanyl)ethyl | H | | |
| 2b40 | H | SO3H | SO3H | H | | | | | | | |
| 2b41 | SO3H | H | H | SO3H | NHCOCH3 | OMe | CONH2 | 2-(2-Hydroxy-ethyl)propyl | H | | |
| 2b42 | H | SO3H | SO3H | H | | | | | | | |
| 2b43 | SO3H | H | H | SO3H | NHCOCH3 | OMe | CONH2 | 2-(2-Hydroxy-ethoxy)ethyl | H | | |
| 2b44 | H | SO3H | SO3H | H | | | | | | | |
| 2b45 | SO3H | H | H | SO3H | NHCOCH3 | OMe | CONH2 | 3-(4-Hydroxy-butoxy)propyl | H | | |
| 2b46 | H | SO3H | SO3H | H | | | | | | | |
| 2b47 | SO3H | H | H | SO3H | NHCOCH3 | OMe | CONH2 | 4-(2-Hydroxyethane-sulfonyl)phenyl | H | | |
| 2b48 | H | SO3H | SO3H | H | | | | | | | |
| 2b49 | SO3H | H | H | SO3H | Methyl | Methyl | CN | 2-Sulfoethyl | H | | |
| 2b50 | H | SO3H | SO3H | H | | | | | | | |
| 2b51 | SO3H | H | H | SO3H | NHCOCH3 | OMe | CN | 2-Sulfoethyl | H | | |
| 2b52 | H | SO3H | SO3H | H | | | | | | | |
| 2b53 | SO3H | H | H | SO3H | Methyl | Methyl | CONH2 | 2-Sulfoethyl | H | | |
| 2b54 | H | SO3H | SO3H | H | | | | | | | |
| 2b55 | SO3H | H | H | SO3H | NHCOCH3 | OMe | CONH2 | 2-Sulfoethyl | H | | |
| 2b56 | H | SO3H | SO3H | H | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| $2b^{57}$ | SO$_3$H | H | H | SO$_3$H | Methyl | Methyl | CN | 2-Sulfoethyl | Me | | cyclohexyl |
| $2b^{58}$ | H | SO$_3$H | SO$_3$H | H | | | | | | | |
| $2b^{59}$ | SO$_3$H | H | H | SO$_3$H | NHCOCH$_3$ | OMe | CN | 2-Sulfoethyl | Me | | cyclohexyl |
| $2b^{60}$ | H | SO$_3$H | SO$_3$H | H | | | | | | | |
| $2b^{61}$ | SO$_3$H | H | H | SO$_3$H | Methyl | Methyl | CONH$_2$ | 2-Sulfoethyl | Me | | cyclohexyl |
| $2b^{62}$ | H | SO$_3$H | SO$_3$H | H | | | | | | | |
| $2b^{63}$ | SO$_3$H | H | H | SO$_3$H | NHCOCH$_3$ | OMe | CONH$_2$ | 2-Sulfoethyl | Me | | cyclohexyl |
| $2b^{64}$ | H | SO$_3$H | SO$_3$H | H | | | | | | | |
| $2b^{65}$ | SO$_3$H | H | H | SO$_3$H | Methyl | Methyl | CN | 2-Carboxyethyl | H | | cyclohexyl |
| $2b^{66}$ | H | SO$_3$H | SO$_3$H | H | | | | | | | |
| $2b^{67}$ | SO$_3$H | H | H | SO$_3$H | NHCOCH$_3$ | OMe | CN | 2-Carboxyethyl | H | | cyclohexyl |
| $2b^{68}$ | H | SO$_3$H | SO$_3$H | H | | | | | | | |
| $2b^{69}$ | SO$_3$H | H | H | SO$_3$H | Methyl | Methyl | CONH$_2$ | 2-Carboxyethyl | H | | cyclohexyl |
| $2b^{70}$ | H | SO$_3$H | SO$_3$H | H | | | | | | | |
| $2b^{71}$ | SO$_3$H | H | H | SO$_3$H | NHCOCH$_3$ | OMe | CONH$_2$ | 2-Carboxyethyl | H | | cyclohexyl |
| $2b^{72}$ | H | SO$_3$H | SO$_3$H | H | | | | | | | |
| $2b^{73}$ | SO$_3$H | H | H | SO$_3$H | Methyl | Methyl | CN | 2-Hydroxyethyl | H | | dimethylcyclohexyl |
| $2b^{74}$ | H | SO$_3$H | SO$_3$H | H | | | | | | | |
| $2b^{75}$ | SO$_3$H | H | H | SO$_3$H | Methyl | Methyl | CN | 2-(2-Hydroxyethyl-sulfanyl)ethyl | H | | dimethylcyclohexyl |
| $2b^{76}$ | H | SO$_3$H | SO$_3$H | H | | | | | | | |
| $2b^{77}$ | SO$_3$H | H | H | SO$_3$H | Methyl | Methyl | CN | 2-(2-Hydroxy-ethyl)propyl | H | | dimethylcyclohexyl |
| $2b^{78}$ | H | SO$_3$H | SO$_3$H | H | | | | | | | |
| $2b^{79}$ | SO$_3$H | H | H | SO$_3$H | Methyl | Methyl | CN | 2-(2-Hydroxy-ethoxy)ethyl | H | | dimethylcyclohexyl |
| $2b^{80}$ | H | SO$_3$H | SO$_3$H | H | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| 2b⁸¹ | SO₃H | H | H | SO₃H | Methyl | Methyl | CN | 3-(4-Hydroxy-butoxy)propyl | H | | dimethylcyclohexane |
| 2b⁸² | H | SO₃H | SO₃H | H | | | | | | | |
| 2b⁸³ | SO₃H | H | H | SO₃H | Methyl | Methyl | CN | 4-(2-Hydroxyethane-sulfonyl)phenyl | H | | dimethylcyclohexane |
| 2b⁸⁴ | H | SO₃H | SO₃H | H | | | | | | | |
| 2b⁸⁵ | SO₃H | H | H | SO₃H | NHCOCH₃ | OMe | CN | 2-Hydroxyethyl | H | | dimethylcyclohexane |
| 2b⁸⁶ | H | SO₃H | SO₃H | H | | | | | | | |
| 2b⁸⁷ | SO₃H | H | H | SO₃H | NHCOCH₃ | OMe | CN | 2-(2-Hydroxyethyl-sulfanyl)ethyl | H | | dimethylcyclohexane |
| 2b⁸⁸ | H | SO₃H | SO₃H | H | | | | | | | |
| 2b⁸⁹ | SO₃H | H | H | SO₃H | NHCOCH₃ | OMe | CN | 2-(2-Hydroxyethyl)propyl | H | | dimethylcyclohexane |
| 2b⁹⁰ | H | SO₃H | SO₃H | H | | | | | | | |
| 2b⁹¹ | SO₃H | H | H | SO₃H | NHCOCH₃ | OMe | CN | 2-(2-Hydroxyethoxy)ethyl | H | | dimethylcyclohexane |
| 2b⁹² | H | SO₃H | SO₃H | H | | | | | | | |
| 2b⁹³ | SO₃H | H | H | SO₃H | NHCOCH₃ | OMe | CN | 3-(4-Hydroxybutoxy)propyl | H | | dimethylcyclohexane |
| 2b⁹⁴ | H | SO₃H | SO₃H | H | | | | | | | |
| 2b⁹⁵ | SO₃H | H | H | SO₃H | NHCOCH₃ | OMe | CN | 4-(2-Hydroxyethane-sulfonyl)phenyl | H | | dimethylcyclohexane |
| 2b⁹⁶ | H | SO₃H | SO₃H | H | | | | | | | |
| 2b⁹⁷ | SO₃H | H | H | SO₃H | Methyl | Methyl | CONH₂ | 2-Hydroxyethyl | H | | dimethylcyclohexane |
| 2b⁹⁸ | H | SO₃H | SO₃H | H | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | | $R^{28b}/R^{34b}$ | $R^{25b}/R^{31b}$ | $R^{26b}/R^{32b}$ |
|---|---|---|---|---|---|---|---|---|---|---|---|---|
| 2b⁹⁹ | SO₃H | H | H | SO₃H | Methyl | Methyl | CONH₂ | 2-(2-Hydroxyethyl- | | H | | 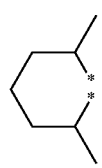 [SMILES: *C(C)CCCC(*)C] |
| 2b¹⁰⁰ | H | SO₃H | SO₃H | H | | | | sulfanyl)ethyl | | | | |
| 2b¹⁰¹ | SO₃H | H | H | SO₃H | Methyl | Methyl | CONH₂ | 2-(2-Hydroxyethyl)propyl | | H | | 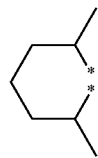 |
| 2b¹⁰² | H | SO₃H | SO₃H | H | | | | | | | | |
| 2b¹⁰³ | SO₃H | H | H | SO₃H | Methyl | Methyl | CONH₂ | 2-(2-Hydroxyethoxy)ethyl | | H | | 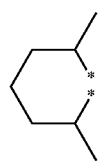 [SMILES: *C(C)CCCC(*)C] |
| 2b¹⁰⁴ | H | SO₃H | SO₃H | H | | | | | | | | |
| 2b¹⁰⁵ | SO₃H | H | H | SO₃H | Methyl | Methyl | CONH₂ | 3-(4-Hydroxybutoxy)propyl | | H | | 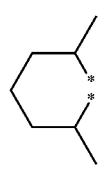 [SMILES: *C(C)CCCC(*)C] |
| 2b¹⁰⁶ | H | SO₃H | SO₃H | H | | | | | | | | |
| 2b¹⁰⁷ | SO₃H | H | H | SO₃H | Methyl | Methyl | CONH₂ | 4-(2-Hydroxyethane- | | H | | 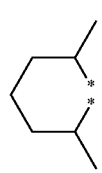 [SMILES: *C(C)CCCC(*)C] |
| 2b¹⁰⁸ | H | SO₃H | SO₃H | H | | | | sulfonyl)phenyl | | | | |
| 2b¹⁰⁸ | SO₃H | H | H | SO₃H | NHCOCH₃ | OMe | CONH₂ | 2-Hydroxyethyl | | H | | 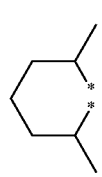 [SMILES: *C(C)CCCC(*)C] |
| 2b¹¹⁰ | H | SO₃H | SO₃H | H | | | | | | | | |
| 2b¹¹¹ | SO₃H | H | H | SO₃H | NHCOCH₃ | OMe | CONH₂ | 2-(2-Hydroxyethyl- | | H | | 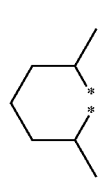 [SMILES: *C(C)CCCC(*)C] |
| 2b¹¹² | H | SO₃H | SO₃H | H | | | | sulfanyl)ethyl | | | | |
| 2b¹¹³ | SO₃H | H | H | SO₃H | NHCOCH₃ | OMe | CONH₂ | 2-(2-Hydroxyethyl)propyl | | H | | 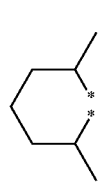 [SMILES: *C(C)CCCC(*)C] |
| 2b¹¹⁴ | H | SO₃H | SO₃H | H | | | | | | | | |
| 2b¹¹⁵ | SO₃H | H | H | SO₃H | NHCOCH₃ | OMe | CONH₂ | 2-(2-Hydroxyethoxy)ethyl | | H | | 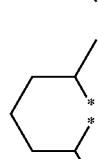 |
| 2b¹¹⁶ | H | SO₃H | SO₃H | H | | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| 2b$^{117}$ | SO$_3$H | H | H | SO$_3$H | NHCOCH$_3$ | OMe | CONH$_2$ | 3-(4-Hydroxybutoxy)propyl | H | |  |
| 2b$^{118}$ | H | SO$_3$H | SO$_3$H | H | | | | | | | |
| 2b$^{119}$ | SO$_3$H | H | H | SO$_3$H | NHCOCH$_3$ | OMe | CONH$_2$ | 4-(2-Hydroxyethane-sulfonyl)phenyl | H | |  |
| 2b$^{120}$ | H | SO$_3$H | SO$_3$H | H | | | | | | | |
| 2b$^{121}$ | SO$_3$H | H | H | SO$_3$H | Methyl | Methyl | CN | 2-Hydroxyethyl | H | |  |
| 2b$^{122}$ | H | SO$_3$H | SO$_3$H | H | | | | | | | |
| 2b$^{123}$ | SO$_3$H | H | H | SO$_3$H | Methyl | Methyl | CN | 2-(2-Hydroxyethyl-sulfanyl)ethyl | H | |  |
| 2b$^{124}$ | H | SO$_3$H | SO$_3$H | H | | | | | | | |
| 2b$^{125}$ | SO$_3$H | H | H | SO$_3$H | Methyl | Methyl | CN | 2-(2-Hydroxyethyl)propyl | H | |  |
| 2b$^{126}$ | H | SO$_3$H | SO$_3$H | H | | | | | | | |
| 2b$^{127}$ | SO$_3$H | H | H | SO$_3$H | Methyl | Methyl | CN | 2-(2-Hydroxyethoxy)ethyl | H | |  |
| 2b$^{128}$ | H | SO$_3$H | SO$_3$H | H | | | | | | | |
| 2b$^{129}$ | SO$_3$H | H | H | SO$_3$H | Methyl | Methyl | CN | 3-(4-Hydroxybutoxy)propyl | H | |  |
| 2b$^{130}$ | H | SO$_3$H | SO$_3$H | H | | | | | | | |
| 2b$^{131}$ | SO$_3$H | H | H | SO$_3$H | Methyl | Methyl | CN | 4-(2-Hydroxyethane-sulfonyl)phenyl | H | |  |
| 2b$^{132}$ | H | SO$_3$H | SO$_3$H | H | | | | | | | |
| 2b$^{133}$ | SO$_3$H | H | H | SO$_3$H | NHCOCH$_3$ | OMe | CN | 2-Hydroxyethyl | H | |  |
| 2b$^{134}$ | H | SO$_3$H | SO$_3$H | H | | | | | | | |
| 2b$^{135}$ | SO$_3$H | H | H | SO$_3$H | NHCOCH$_3$ | OMe | CN | 2-(2-Hydroxyethyl-sulfanyl)ethyl | H | |  |
| 2b$^{136}$ | H | SO$_3$H | SO$_3$H | H | | | | | | | |
| 2b$^{137}$ | SO$_3$H | H | H | SO$_3$H | NHCOCH$_3$ | OMe | CN | 2-(2-Hydroxyethyl)propyl | H | |  |
| 2b$^{138}$ | H | SO$_3$H | SO$_3$H | H | | | | | | | |
| 2b$^{139}$ | SO$_3$H | H | H | SO$_3$H | NHCOCH$_3$ | OMe | CN | 2-(2-Hydroxyethoxy)ethyl | H | |  |
| 2b$^{140}$ | H | SO$_3$H | SO$_3$H | H | | | | | | | |
| 2b$^{141}$ | SO$_3$H | H | H | SO$_3$H | NHCOCH$_3$ | OMe | CN | 3-(4-Hydroxybutoxy)propyl | H | |  |
| 2b$^{142}$ | H | SO$_3$H | SO$_3$H | H | | | | | | | |
| 2b$^{143}$ | SO$_3$H | H | H | SO$_3$H | NHCOCH$_3$ | OMe | CN | 4-(2-Hydroxyethane-sulfonyl)phenyl | H | |  |
| 2b$^{144}$ | H | SO$_3$H | SO$_3$H | H | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ | $R^{26b}/R^{32b}$ |
|---|---|---|---|---|---|---|---|---|---|---|---|
| 2b$^{145}$ | SO$_3$H | H | H | SO$_3$H | Methyl | Methyl | CONH$_2$ | 2-Hydroxyethyl | H | | (pyran ring) |
| 2b$^{146}$ | H | SO$_3$H | SO$_3$H | H | | | | | | | |
| 2b$^{147}$ | SO$_3$H | H | H | SO$_3$H | Methyl | Methyl | CONH$_2$ | 2-(2-Hydroxyethyl-sulfanyl)ethyl | H | | (pyran ring) |
| 2b$^{148}$ | H | SO$_3$H | SO$_3$H | H | | | | | | | |
| 2b$^{149}$ | SO$_3$H | H | H | SO$_3$H | Methyl | Methyl | CONH$_2$ | 2-(2-Hydroxyethyl)propyl | H | | (pyran ring) |
| 2b$^{150}$ | H | SO$_3$H | SO$_3$H | H | | | | | | | |
| 2b$^{151}$ | SO$_3$H | H | H | SO$_3$H | Methyl | Methyl | CONH$_2$ | 2-(2-Hydroxyethoxy)ethyl | H | | (pyran ring) |
| 2b$^{152}$ | H | SO$_3$H | SO$_3$H | H | | | | | | | |
| 2b$^{153}$ | SO$_3$H | H | H | SO$_3$H | Methyl | Methyl | CONH$_2$ | 3-(4-Hydroxybutoxy)propyl | H | | (pyran ring) |
| 2b$^{154}$ | H | SO$_3$H | SO$_3$H | H | | | | | | | |
| 2b$^{155}$ | SO$_3$H | H | H | SO$_3$H | Methyl | Methyl | CONH$_2$ | 4-(2-Hydroxyethane-sulfonyl)phenyl | H | | (pyran ring) |
| 2b$^{156}$ | H | SO$_3$H | SO$_3$H | H | | | | | | | |
| 2b$^{157}$ | SO$_3$H | H | H | SO$_3$H | NHCOCH$_3$ | OMe | CONH$_2$ | 2-Hydroxyethyl | H | | (pyran ring) |
| 2b$^{158}$ | H | SO$_3$H | SO$_3$H | H | | | | | | | |
| 2b$^{159}$ | SO$_3$H | H | H | SO$_3$H | NHCOCH$_3$ | OMe | CONH$_2$ | 2-(2-Hydroxyethyl-sulfanyl)ethyl | H | | (pyran ring) |
| 2b$^{160}$ | H | SO$_3$H | SO$_3$H | H | | | | | | | |
| 2b$^{161}$ | SO$_3$H | H | H | SO$_3$H | NHCOCH$_3$ | OMe | CONH$_2$ | 2-(2-Hydroxyethyl)propyl | H | | (pyran ring) |
| 2b$^{162}$ | H | SO$_3$H | SO$_3$H | H | | | | | | | |
| 2b$^{163}$ | SO$_3$H | H | H | SO$_3$H | NHCOCH$_3$ | OMe | CONH$_2$ | 2-(2-Hydroxyethoxy)ethyl | H | | (pyran ring) |
| 2b$^{164}$ | H | SO$_3$H | SO$_3$H | H | | | | | | | |
| 2b$^{165}$ | SO$_3$H | H | H | SO$_3$H | NHCOCH$_3$ | OMe | CONH$_2$ | 3-(4-Hydroxybutoxy)propyl | H | | (pyran ring) |
| 2b$^{166}$ | H | SO$_3$H | SO$_3$H | H | | | | | | | |
| 2b$^{167}$ | SO$_3$H | H | H | SO$_3$H | NHCOCH$_3$ | OMe | CONH$_2$ | 4-(2-Hydroxyethane-sulfonyl)phenyl | H | | (pyran ring) |
| 2b$^{168}$ | H | SO$_3$H | SO$_3$H | H | | | | | | | |
| 2b$^{169}$ | SO$_3$H | H | H | SO$_3$H | Methyl | Methyl | CN | 2-Sulfoethyl | H | | (pyran ring) |
| 2b$^{170}$ | H | SO$_3$H | SO$_3$H | H | | | | | | | |
| 2b$^{171}$ | SO$_3$H | H | H | SO$_3$H | NHCOCH$_3$ | OMe | CN | 2-Sulfoethyl | H | | (pyran ring) |
| 2b$^{172}$ | H | SO$_3$H | SO$_3$H | H | | | | | | | |
| 2b$^{173}$ | SO$_3$H | H | H | SO$_3$H | Methyl | Methyl | CONH$_2$ | 2-Sulfoethyl | H | | (pyran ring) |
| 2b$^{174}$ | H | SO$_3$H | SO$_3$H | H | | | | | | | |
| 2b$^{175}$ | SO$_3$H | H | H | SO$_3$H | NHCOCH$_3$ | OMe | CONH$_2$ | 2-Sulfoethyl | H | | (pyran ring) |
| 2b$^{176}$ | H | SO$_3$H | SO$_3$H | H | | | | | | | |

TABLE 4-continued

| S/No | $R^{3b}$ | $R^{4b}$ | $R^{5b}$ | $R^{6b}$ | $R^{10b}/R^{14b}$ | $R^{9b}/R^{13b}$ | $R^{24b}/R^{30b}$ | $R^{27b}/R^{33b}$ | $R^{28b}/R^{34b}$ | $R^{25b}/R^{31b}$ $R^{26b}/R^{32b}$ |
|---|---|---|---|---|---|---|---|---|---|---|
| $2b^{177}$ | $SO_3H$ | H | H | $SO_3H$ | Methyl | Methyl | CN | 2-Sulfoethyl | Me | (O-containing 6-membered ring, both attachment points *) |
| $2b^{178}$ | H | $SO_3H$ | $SO_3H$ | H | | | | | | |
| $2b^{179}$ | $SO_3H$ | H | H | $SO_3H$ | $NHCOCH_3$ | OMe | CN | 2-Sulfoethyl | Me | (O-containing 6-membered ring, both attachment points *) |
| $2b^{180}$ | H | $SO_3H$ | $SO_3H$ | H | | | | | | |
| $2b^{181}$ | $SO_3H$ | H | H | $SO_3H$ | Methyl | Methyl | $CONH_2$ | 2-Sulfoethyl | Me | (O-containing 6-membered ring, both attachment points *) |
| $2b^{182}$ | H | $SO_3H$ | $SO_3H$ | H | | | | | | |
| $2b^{183}$ | $SO_3H$ | H | H | $SO_3H$ | $NHCOCH_3$ | OMe | $CONH_2$ | 2-Sulfoethyl | Me | (O-containing 6-membered ring, both attachment points *) |
| $2b^{184}$ | H | $SO_3H$ | $SO_3H$ | H | | | | | | |
| $2b^{185}$ | $SO_3H$ | H | H | $SO_3H$ | Methyl | Methyl | CN | 2-Carboxyethyl | H | (O-containing 6-membered ring, both attachment points *) |
| $2b^{186}$ | H | $SO_3H$ | $SO_3H$ | H | | | | | | |
| $2b^{187}$ | $SO_3H$ | H | H | $SO_3H$ | $NHCOCH_3$ | OMe | CN | 2-Carboxyethyl | H | (O-containing 6-membered ring, both attachment points *) |
| $2b^{188}$ | H | $SO_3H$ | $SO_3H$ | H | | | | | | |
| $2b^{189}$ | $SO_3H$ | H | H | $SO_3H$ | Methyl | Methyl | $CONH_2$ | 2-Carboxyethyl | H | (O-containing 6-membered ring, both attachment points *) |
| $2b^{190}$ | H | $SO_3H$ | $SO_3H$ | H | | | | | | |
| $2b^{191}$ | $SO_3H$ | H | H | $SO_3H$ | $NHCOCH_3$ | OMe | $CONH_2$ | 2-Carboxyethyl | H | (O-containing 6-membered ring, both attachment points *) |
| $2b^{192}$ | H | $SO_3H$ | $SO_3H$ | H | | | | | | |

* refers to the point of attachment to the nitrogen atom

Further preferred embodiments of the present invention are the dyes of formula (2c) and mixtures thereof

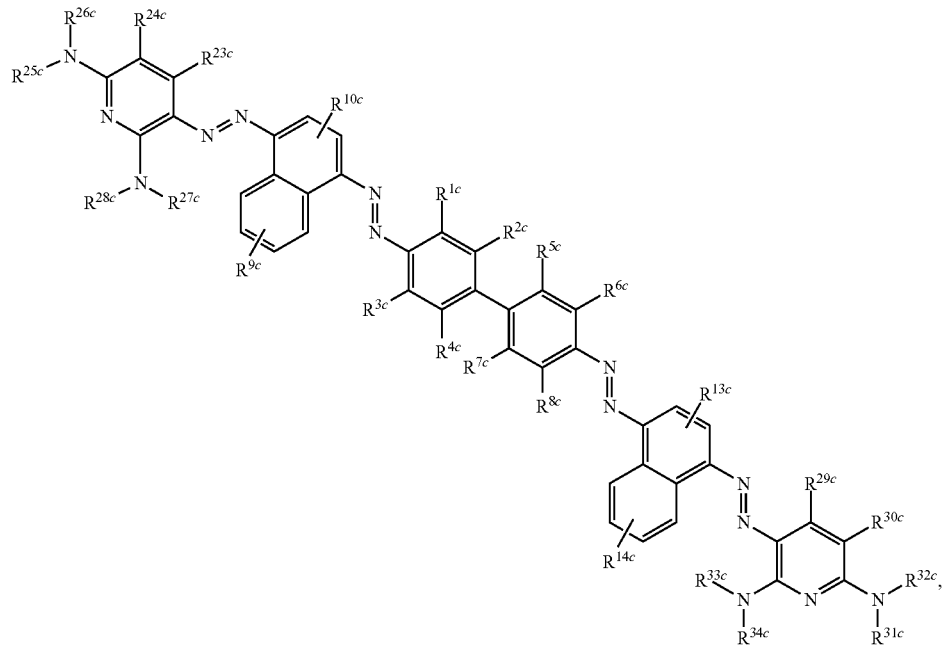

(2c)

wherein
$R^{1c}, R^{2c}, R^{3c}, R^{4c}, R^{5c}, R^{6c}, R^{7c}$ and $R^{8c}$ independent of each other is hydrogen, alkyl, alkoxy, halogen, trifluoromethyl or $SO_3M$, whereby at least two of them are $SO_3M$ $R^{9c}, R^{10c}, R^{13c}$ and $R^{14c}$ independent of each other is hydrogen, $(C_1-C_4)$-alkyl, $(C_1-C_4)$-alkoxy, halogen, trifluoromethyl$(C_1-C_4)$-acylamino or $SO_3M$, $R^{23c}$ and $R^{29c}$ independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl, $R^{24c}$ and $R^{30c}$ independent of each other is cyano, carbamoyl or alkoxycarbonyl, $R^{25c}, R^{26c}, R^{27c}, R^{28c}, R^{31c}, R^{32c}, R^{33c}$ and $R^{34c}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl
or
alkyl interrupted by one or more heteroatoms selected from the group consisting of oxygen and sulphur
or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-mono-cycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
or
alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
and
M is hydrogen, an alkali metal, ammonium, one equivalent of an alkali earth metal or a monovalent organic cation.

In especially preferred dyes of formula (2c)
$R^{1c}, R^{3c}, R^{4c}, R^{5c}, R^{6c}$ and $R^{8c}$ independent of each other is $SO_3M$, hydrogen, alkyl, alkoxy or halogen,—whereby at least two of them are $SO_3M$,
$R^{2c}$ and $R^{7c}$ is hydrogen,
$R^{9c}, R^{10c}, R^{13c}$ and $R^{14c}$ independent of each other is hydrogen, methyl, halogen, $SO_3M$ or acetylamino,
$R^{23c}$ and $R^{29c}$ is methyl,
$R^{24c}$ and $R^{30c}$ independent of each other is cyano or carbamoyl,
$R^{25c}, R^{26c}, R^{27c}, R^{28c}, R^{31c}, R^{32c}, R^{33c}$ and $R^{34c}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, Isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfanyl)-ethyl, 2-(2-tertbutylsulfanylethanesulfonyl)-ethyl, 2-(2-hydroxyethoxy)propyl, 2-(2-hydroxy ethoxy)ethyl, 3-(4-hydroxybutoxy)propyl, 2-(2-hydroxyethanesulfonyl)-ethyl, 3-(2-phenoxy-ethoxy)-propyl, 3-isopropoxy-propyl, 3-ethoxy-propyl or 3-ethoxybutyl or $(C_2-C_5)$ alkyl substituted by COOM or by $SO_3M$ and M is hydrogen, sodium, potassium, lithium or ammonium.

Examples of preferred dyes of formula (2c) are the compounds of formulae ($2c^1$ to $2c^{184}$) (Table 5) and mixtures thereof:

hereby $R^{1c}$, $R^{2c}$, $R^{7c}$ and $R^{8c}$ are hydrogen

TABLE 5

| S/No | $R^{3c}$ | $R^{4c}$ | $R^{5c}$ | $R^{6c}$ | $R^{10c}/R^{14c}$ | $R^{9c}/R^{13c}$ | $R^{24c}/R^{30c}$ | $R^{27c}/R^{33c}$ | $R^{28c}/R^{34c}$ | $R^{25c}/R^{31c}$ | $R^{26c}/R^{32c}$ |
|---|---|---|---|---|---|---|---|---|---|---|---|
| $2c^1$ | SO$_3$H | H | H | SO$_3$H | 6-SO$_3$H | H | CN | Methyl | H | Methyl | H |
| $2c^2$ | H | SO$_3$H | SO$_3$H | H | | | | | | | |
| $2c^3$ | SO$_3$H | H | H | SO$_3$H | 6-SO$_3$H | H | CN | Ethyl | H | Ethyl | H |
| $2c^4$ | H | SO$_3$H | SO$_3$H | H | | | | | | | |
| $2c^5$ | SO$_3$H | H | H | SO$_3$H | 6-SO$_3$H | H | CN | Propyl | H | Propyl | H |
| $2c^6$ | H | SO$_3$H | SO$_3$H | H | | | | | | | |
| $2c^7$ | SO$_3$H | H | H | SO$_3$H | 6-SO$_3$H | H | CN | Butyl | H | Butyl | H |
| $2c^8$ | H | SO$_3$H | SO$_3$H | H | | | | | | | |
| $2c^9$ | SO$_3$H | H | H | SO$_3$H | 6-SO$_3$H | H | CN | Pentyl | H | Pentyl | H |
| $2c^{10}$ | H | SO$_3$H | SO$_3$H | H | | | | | | | |
| $2c^{11}$ | SO$_3$H | H | H | SO$_3$H | 6-SO$_3$H | H | CN | Hexyl | H | Hexyl | H |
| $2c^{12}$ | H | SO$_3$H | SO$_3$H | H | | | | | | | |
| $2c^{13}$ | SO$_3$H | H | H | SO$_3$H | 6-SO$_3$H | H | CN | Cyclobutyl | H | Cyclobutyl | H |
| $2c^{14}$ | H | SO$_3$H | SO$_3$H | H | | | | | | | |
| $2c^{15}$ | SO$_3$H | H | H | SO$_3$H | 6-SO$_3$H | H | CN | Cyclopentyl | H | Cyclopentyl | H |
| $2c^{16}$ | H | SO$_3$H | SO$_3$H | H | | | | | | | |
| $2c^{17}$ | SO$_3$H | H | H | SO$_3$H | 6-SO$_3$H | H | CN | Cyclohexyl | H | Cyclohexyl | H |
| $2c^{18}$ | H | SO$_3$H | SO$_3$H | H | | | | | | | |
| $2c^{19}$ | SO$_3$H | H | H | SO$_3$H | 6-SO$_3$H | H | CN | 2-Methyl cyclohexyl | H | 2-Methyl cyclohexyl | H |
| $2c^{20}$ | H | SO$_3$H | SO$_3$H | H | | | | | | | |
| $2c^{21}$ | SO$_3$H | H | H | SO$_3$H | 6-SO$_3$H | H | CN | 3-Methyl cyclohexyl | H | 3-Methyl cyclohexyl | H |
| $2c^{22}$ | H | SO$_3$H | SO$_3$H | H | | | | | | | |
| $2c^{23}$ | SO$_3$H | H | H | SO$_3$H | 6-SO$_3$H | H | CN | Isopropyl | H | Isopropyl | H |
| $2c^{24}$ | H | SO$_3$H | SO$_3$H | H | | | | | | | |
| $2c^{25}$ | SO$_3$H | H | H | SO$_3$H | 6-SO$_3$H | H | CN | Sec-butyl | H | Sec-butyl | H |
| $2c^{26}$ | H | SO$_3$H | SO$_3$H | H | | | | | | | |
| $2c^{27}$ | SO$_3$H | H | H | SO$_3$H | 6-SO$_3$H | H | CN | 2-Methyl butyl | H | 2-Methyl butyl | H |
| $2c^{28}$ | H | SO$_3$H | SO$_3$H | H | | | | | | | |
| $2c^{29}$ | SO$_3$H | H | H | SO$_3$H | 6-SO$_3$H | H | CN | 1-Ethyl propyl | H | 1-Ethyl propyl | H |
| $2c^{30}$ | H | SO$_3$H | SO$_3$H | H | | | | | | | |
| $2c^{31}$ | SO$_3$H | H | H | SO$_3$H | 6-SO$_3$H | H | CN | 1,2-Dimethyl propyl | H | 1,2-Dimethyl propyl | H |
| $2c^{32}$ | H | SO$_3$H | SO$_3$H | H | | | | | | | |
| $2c^{33}$ | SO$_3$H | H | H | SO$_3$H | 6-SO$_3$H | H | CN | Tert-butyl | H | Tert-butyl | H |
| $2c^{34}$ | H | SO$_3$H | SO$_3$H | H | | | | | | | |
| $2c^{35}$ | SO$_3$H | H | H | SO$_3$H | 6-SO$_3$H | H | CN | 3-Methyl butyl | H | 3-Methyl butyl | H |
| $2c^{36}$ | H | SO$_3$H | SO$_3$H | H | | | | | | | |
| $2c^{37}$ | SO$_3$H | H | H | SO$_3$H | 6-SO$_3$H | H | CN | Pentan-2-yl | H | Pentan-2-yl | H |
| $2c^{38}$ | H | SO$_3$H | SO$_3$H | H | | | | | | | |
| $2c^{39}$ | SO$_3$H | H | H | SO$_3$H | 6-SO$_3$H | H | CN | 2-Ethylhexyl | H | 2-Ethylhexyl | H |
| $2c^{40}$ | H | SO$_3$H | SO$_3$H | H | | | | | | | |
| $2c^{41}$ | SO$_3$H | H | H | SO$_3$H | 6-SO$_3$H | H | CN | 2,2-Dimethyl propyl | H | 2,2-Dimethyl propyl | H |
| $2c^{42}$ | H | SO$_3$H | SO$_3$H | H | | | | | | | |
| $2c^{43}$ | SO$_3$H | H | H | SO$_3$H | 6-SO$_3$H | H | CN | Phenyl | H | Phenyl | H |
| $2c^{44}$ | H | SO$_3$H | SO$_3$H | H | | | | | | | |
| $2c^{45}$ | SO$_3$H | H | H | SO$_3$H | 6-SO$_3$H | H | CN | Benzyl | H | Benzyl | H |
| $2c^{46}$ | H | SO$_3$H | SO$_3$H | H | | | | | | | |
| $2c^{47}$ | SO$_3$H | H | H | SO$_3$H | 7-SO$_3$H | H | CN | Methyl | H | Methyl | H |
| $2c^{48}$ | H | SO$_3$H | SO$_3$H | H | | | | | | | |
| $2c^{49}$ | SO$_3$H | H | H | SO$_3$H | 7-SO$_3$H | H | CN | Ethyl | H | Ethyl | H |
| $2c^{50}$ | H | SO$_3$H | SO$_3$H | H | | | | | | | |
| $2c^{51}$ | SO$_3$H | H | H | SO$_3$H | 7-SO$_3$H | H | CN | Propyl | H | Propyl | H |
| $2c^{52}$ | H | SO$_3$H | SO$_3$H | H | | | | | | | |
| $2c^{53}$ | SO$_3$H | H | H | SO$_3$H | 7-SO$_3$H | H | CN | Butyl | H | Butyl | H |
| $2c^{54}$ | H | SO$_3$H | SO$_3$H | H | | | | | | | |
| $2c^{55}$ | SO$_3$H | H | H | SO$_3$H | 7-SO$_3$H | H | CN | Pentyl | H | Pentyl | H |
| $2c^{56}$ | H | SO$_3$H | SO$_3$H | H | | | | | | | |
| $2c^{57}$ | SO$_3$H | H | H | SO$_3$H | 7-SO$_3$H | H | CN | Hexyl | H | Hexyl | H |
| $2c^{58}$ | H | SO$_3$H | SO$_3$H | H | | | | | | | |
| $2c^{59}$ | SO$_3$H | H | H | SO$_3$H | 7-SO$_3$H | H | CN | Cyclobutyl | H | Cyclobutyl | H |
| $2c^{60}$ | H | SO$_3$H | SO$_3$H | H | | | | | | | |
| $2c^{61}$ | SO$_3$H | H | H | SO$_3$H | 7-SO$_3$H | H | CN | Cyclopentyl | H | Cyclopentyl | H |
| $2c^{62}$ | H | SO$_3$H | SO$_3$H | H | | | | | | | |
| $2c^{63}$ | SO$_3$H | H | H | SO$_3$H | 7-SO$_3$H | H | CN | Cyclohexyl | H | Cyclohexyl | H |
| $2c^{64}$ | H | SO$_3$H | SO$_3$H | H | | | | | | | |

TABLE 5-continued

| S/No | $R^{3c}$ | $R^{4c}$ | $R^{5c}$ | $R^{6c}$ | $R^{10c}/R^{14c}$ | $R^{9c}/R^{13c}$ | $R^{24c}/R^{30c}$ | $R^{27c}/R^{33c}$ | $R^{28c}/R^{34c}$ | $R^{25c}/R^{31c}$ | $R^{26c}/R^{32c}$ |
|---|---|---|---|---|---|---|---|---|---|---|---|
| $2c^{65}$ | SO$_3$H | H | H | SO$_3$H | 7-SO$_3$H | H | CN | 2-Methyl cyclohexyl | H | 2-Methyl cyclohexyl | H |
| $2c^{66}$ | H | SO$_3$H | SO$_3$H | H | | | | | | | |
| $2c^{67}$ | SO$_3$H | H | H | SO$_3$H | 7-SO$_3$H | H | CN | 3-Methyl cyclohexyl | H | 3-Methyl cyclohexyl | H |
| $2c^{68}$ | H | SO$_3$H | SO$_3$H | H | | | | | | | |
| $2c^{69}$ | SO$_3$H | H | H | SO$_3$H | 7-SO$_3$H | H | CN | Isopropyl | H | Isopropyl | H |
| $2c^{70}$ | H | SO$_3$H | SO$_3$H | H | | | | | | | |
| $2c^{71}$ | SO$_3$H | H | H | SO$_3$H | 7-SO$_3$H | H | CN | Sec-butyl | H | Sec-butyl | H |
| $2c^{72}$ | H | SO$_3$H | SO$_3$H | H | | | | | | | |
| $2c^{73}$ | SO$_3$H | H | H | SO$_3$H | 7-SO$_3$H | H | CN | 2-Methyl butyl | H | 2-Methyl butyl | H |
| $2c^{74}$ | H | SO$_3$H | SO$_3$H | H | | | | | | | |
| $2c^{75}$ | SO$_3$H | H | H | SO$_3$H | 7-SO$_3$H | H | CN | 1-Ethyl propyl | H | 1-Ethyl propyl | H |
| $2c^{76}$ | H | SO$_3$H | SO$_3$H | H | | | | | | | |
| $2c^{77}$ | SO$_3$H | H | H | SO$_3$H | 7-SO$_3$H | H | CN | 1,2-Dimethyl propyl | H | 1,2-Dimethyl propyl | H |
| $2c^{78}$ | H | SO$_3$H | SO$_3$H | H | | | | | | | |
| $2c^{79}$ | SO$_3$H | H | H | SO$_3$H | 7-SO$_3$H | H | CN | Tert-butyl | H | Tert-butyl | H |
| $2c^{80}$ | H | SO$_3$H | SO$_3$H | H | | | | | | | |
| $2c^{81}$ | SO$_3$H | H | H | SO$_3$H | 7-SO$_3$H | H | CN | 3-Methyl butyl | H | 3-Methyl butyl | H |
| $2c^{82}$ | H | SO$_3$H | SO$_3$H | H | | | | | | | |
| $2c^{83}$ | SO$_3$H | H | H | SO$_3$H | 7-SO$_3$H | H | CN | Pentan-2-yl | H | Pentan-2-yl | H |
| $2c^{84}$ | H | SO$_3$H | SO$_3$H | H | | | | | | | |
| $2c^{85}$ | SO$_3$H | H | H | SO$_3$H | 7-SO$_3$H | H | CN | 2-Ethylhexyl | H | 2-Ethylhexyl | H |
| $2c^{86}$ | H | SO$_3$H | SO$_3$H | H | | | | | | | |
| $2c^{87}$ | SO$_3$H | H | H | SO$_3$H | 7-SO$_3$H | H | CN | 2,2-Dimethyl propyl | H | 2,2-Dimethyl propyl | H |
| $2c^{88}$ | H | SO$_3$H | SO$_3$H | H | | | | | | | |
| $2c^{89}$ | SO$_3$H | H | H | SO$_3$H | 7-SO$_3$H | H | CN | Phenyl | H | Phenyl | H |
| $2c^{90}$ | H | SO$_3$H | SO$_3$H | H | | | | | | | |
| $2c^{91}$ | SO$_3$H | H | H | SO$_3$H | 7-SO$_3$H | H | CN | Benzyl | H | Benzyl | H |
| $2c^{92}$ | H | SO$_3$H | SO$_3$H | H | | | | | | | |
| $2c^{93}$ | SO$_3$H | H | H | SO$_3$H | 6-SO$_3$H | H | CONH$_2$ | Methyl | H | Methyl | H |
| $2c^{94}$ | H | SO$_3$H | SO$_3$H | H | | | | | | | |
| $2c^{95}$ | SO$_3$H | H | H | SO$_3$H | 6-SO$_3$H | H | CONH$_2$ | Ethyl | H | Ethyl | H |
| $2c^{96}$ | H | SO$_3$H | SO$_3$H | H | | | | | | | |
| $2c^{97}$ | SO$_3$H | H | H | SO$_3$H | 6-SO$_3$H | H | CONH$_2$ | Propyl | H | Propyl | H |
| $2c^{98}$ | H | SO$_3$H | SO$_3$H | H | | | | | | | |
| $2c^{99}$ | SO$_3$H | H | H | SO$_3$H | 6-SO$_3$H | H | CONH$_2$ | Butyl | H | Butyl | H |
| $2c^{100}$ | H | SO$_3$H | SO$_3$H | H | | | | | | | |
| $2c^{101}$ | SO$_3$H | H | H | SO$_3$H | 6-SO$_3$H | H | CONH$_2$ | Pentyl | H | Pentyl | H |
| $2c^{102}$ | H | SO$_3$H | SO$_3$H | H | | | | | | | |
| $2c^{103}$ | SO$_3$H | H | H | SO$_3$H | 6-SO$_3$H | H | CONH$_2$ | Hexyl | H | Hexyl | H |
| $2c^{104}$ | H | SO$_3$H | SO$_3$H | H | | | | | | | |
| $2c^{105}$ | SO$_3$H | H | H | SO$_3$H | 6-SO$_3$H | H | CONH$_2$ | Cyclobutyl | H | Cyclobutyl | H |
| $2c^{106}$ | H | SO$_3$H | SO$_3$H | H | | | | | | | |
| $2c^{107}$ | SO$_3$H | H | H | SO$_3$H | 6-SO$_3$H | H | CONH$_2$ | Cyclopentyl | H | Cyclopentyl | H |
| $2c^{108}$ | H | SO$_3$H | SO$_3$H | H | | | | | | | |
| $2c^{109}$ | SO$_3$H | H | H | SO$_3$H | 6-SO$_3$H | H | CONH$_2$ | Cyclohexyl | H | Cyclohexyl | H |
| $2c^{110}$ | H | SO$_3$H | SO$_3$H | H | | | | | | | |
| $2c^{111}$ | SO$_3$H | H | H | SO$_3$H | 6-SO$_3$H | H | CONH$_2$ | 2-Methyl cyclohexyl | H | 2-Methyl cyclohexyl | H |
| $2c^{112}$ | H | SO$_3$H | SO$_3$H | H | | | | | | | |
| $2c^{113}$ | SO$_3$H | H | H | SO$_3$H | 6-SO$_3$H | H | CONH$_2$ | 3-Methyl cyclohexyl | H | 3-Methyl cyclohexyl | H |
| $2c^{114}$ | H | SO$_3$H | SO$_3$H | H | | | | | | | |
| $2c^{115}$ | SO$_3$H | H | H | SO$_3$H | 6-SO$_3$H | H | CONH$_2$ | Isopropyl | H | Isopropyl | H |
| $2c^{116}$ | H | SO$_3$H | SO$_3$H | H | | | | | | | |
| $2c^{117}$ | SO$_3$H | H | H | SO$_3$H | 6-SO$_3$H | H | CONH$_2$ | Sec-butyl | H | Sec-butyl | H |
| $2c^{118}$ | H | SO$_3$H | SO$_3$H | H | | | | | | | |
| $2c^{119}$ | SO$_3$H | H | H | SO$_3$H | 6-SO$_3$H | H | CONH$_2$ | 2-Methyl butyl | H | 2-Methyl butyl | H |
| $2c^{120}$ | H | SO$_3$H | SO$_3$H | H | | | | | | | |
| $2c^{121}$ | SO$_3$H | H | H | SO$_3$H | 6-SO$_3$H | H | CONH$_2$ | 1-Ethyl propyl | H | 1-Ethyl propyl | H |
| $2c^{122}$ | H | SO$_3$H | SO$_3$H | H | | | | | | | |
| $2c^{123}$ | SO$_3$H | H | H | SO$_3$H | 6-SO$_3$H | H | CONH$_2$ | 1,2-Dimethyl propyl | H | 1,2-Dimethyl propyl | H |
| $2c^{124}$ | H | SO$_3$H | SO$_3$H | H | | | | | | | |
| $2c^{125}$ | SO$_3$H | H | H | SO$_3$H | 6-SO$_3$H | H | CONH$_2$ | Tert-butyl | H | Tert-butyl | H |
| $2c^{126}$ | H | SO$_3$H | SO$_3$H | H | | | | | | | |
| $2c^{127}$ | SO$_3$H | H | H | SO$_3$H | 6-SO$_3$H | H | CONH$_2$ | 3-Methyl butyl | H | 3-Methyl butyl | H |
| $2c^{128}$ | H | SO$_3$H | SO$_3$H | H | | | | | | | |
| $2c^{129}$ | SO$_3$H | H | H | SO$_3$H | 6-SO$_3$H | H | CONH$_2$ | Pentan-2-yl | H | Pentan-2-yl | H |
| $2c^{130}$ | H | SO$_3$H | SO$_3$H | H | | | | | | | |
| $2c^{131}$ | SO$_3$H | H | H | SO$_3$H | 6-SO$_3$H | H | CONH$_2$ | 2-Ethylhexyl | H | 2-Ethylhexyl | H |
| $2c^{132}$ | H | SO$_3$H | SO$_3$H | H | | | | | | | |
| $2c^{133}$ | SO$_3$H | H | H | SO$_3$H | 6-SO$_3$H | H | CONH$_2$ | 2,2-Dimethyl propyl | H | 2,2-Dimethyl propyl | H |
| $2c^{134}$ | H | SO$_3$H | SO$_3$H | H | | | | | | | |
| $2c^{135}$ | SO$_3$H | H | H | SO$_3$H | 6-SO$_3$H | H | CONH$_2$ | Phenyl | H | Phenyl | H |
| $2c^{136}$ | H | SO$_3$H | SO$_3$H | H | | | | | | | |
| $2c^{137}$ | SO$_3$H | H | H | SO$_3$H | 6-SO$_3$H | H | CONH$_2$ | Benzyl | H | Benzyl | H |
| $2c^{138}$ | H | SO$_3$H | SO$_3$H | H | | | | | | | |
| $2c^{139}$ | SO$_3$H | H | H | SO$_3$H | 7-SO$_3$H | H | CONH$_2$ | Methyl | H | Methyl | H |
| $2c^{140}$ | H | SO$_3$H | SO$_3$H | H | | | | | | | |
| $2c^{141}$ | SO$_3$H | H | H | SO$_3$H | 7-SO$_3$H | H | CONH$_2$ | Ethyl | H | Ethyl | H |
| $2c^{142}$ | H | SO$_3$H | SO$_3$H | H | | | | | | | |

TABLE 5-continued

| S/No | $R^{3c}$ | $R^{4c}$ | $R^{5c}$ | $R^{6c}$ | $R^{10c}/R^{14c}$ | $R^{9c}/R^{13c}$ | $R^{24c}/R^{30c}$ | $R^{27c}/R^{33c}$ | $R^{28c}/R^{34c}$ | $R^{25c}/R^{31c}$ | $R^{26c}/R^{32c}$ |
|---|---|---|---|---|---|---|---|---|---|---|---|
| 2c143 | SO3H | H | H | SO3H | 7-SO3H | H | CONH2 | Propyl | H | Propyl | H |
| 2c144 | H | SO3H | SO3H | H | | | | | | | |
| 2c145 | SO3H | H | H | SO3H | 7-SO3H | H | CONH2 | Butyl | H | Butyl | H |
| 2c146 | H | SO3H | SO3H | H | | | | | | | |
| 2c147 | SO3H | H | H | SO3H | 7-SO3H | H | CONH2 | Pentyl | H | Pentyl | H |
| 2c148 | H | SO3H | SO3H | H | | | | | | | |
| 2c149 | SO3H | H | H | SO3H | 7-SO3H | H | CONH2 | Hexyl | H | Hexyl | H |
| 2c150 | H | SO3H | SO3H | H | | | | | | | |
| 2c151 | SO3H | H | H | SO3H | 7-SO3H | H | CONH2 | Cyclobutyl | H | Cyclobutyl | H |
| 2c152 | H | SO3H | SO3H | H | | | | | | | |
| 2c153 | SO3H | H | H | SO3H | 7-SO3H | H | CONH2 | Cyclopentyl | H | Cyclopentyl | H |
| 2c154 | H | SO3H | SO3H | H | | | | | | | |
| 2c155 | SO3H | H | H | SO3H | 7-SO3H | H | CONH2 | Cyclohexyl | H | Cyclohexyl | H |
| 2c156 | H | SO3H | SO3H | H | | | | | | | |
| 2c157 | SO3H | H | H | SO3H | 7-SO3H | H | CONH2 | 2-Methyl cyclohexyl | H | 2-Methyl cyclohexyl | H |
| 2c158 | H | SO3H | SO3H | H | | | | | | | |
| 2c159 | SO3H | H | H | SO3H | 7-SO3H | H | CONH2 | 3-Methyl cyclohexyl | H | 3-Methyl cyclohexyl | H |
| 2c160 | H | SO3H | SO3H | H | | | | | | | |
| 2c161 | SO3H | H | H | SO3H | 7-SO3H | H | CONH2 | Isopropyl | H | Isopropyl | H |
| 2c162 | H | SO3H | SO3H | H | | | | | | | |
| 2c163 | SO3H | H | H | SO3H | 7-SO3H | H | CONH2 | Sec-butyl | H | Sec-butyl | H |
| 2c164 | H | SO3H | SO3H | H | | | | | | | |
| 2c165 | SO3H | H | H | SO3H | 7-SO3H | H | CONH2 | 2-Methyl butyl | H | 2-Methyl butyl | H |
| 2c166 | H | SO3H | SO3H | H | | | | | | | |
| 2c167 | SO3H | H | H | SO3H | 7-SO3H | H | CONH2 | 1-Ethyl propyl | H | 1-Ethyl propyl | H |
| 2c168 | H | SO3H | SO3H | H | | | | | | | |
| 2c169 | SO3H | H | H | SO3H | 7-SO3H | H | CONH2 | 1,2-Dimethyl propyl | H | 1,2-Dimethyl propyl | H |
| 2c170 | H | SO3H | SO3H | H | | | | | | | |
| 2c171 | SO3H | H | H | SO3H | 7-SO3H | H | CONH2 | Tert-butyl | H | Tert-butyl | H |
| 2c172 | H | SO3H | SO3H | H | | | | | | | |
| 2c173 | SO3H | H | H | SO3H | 7-SO3H | H | CONH2 | 3-Methyl butyl | H | 3-Methyl butyl | H |
| 2c174 | H | SO3H | SO3H | H | | | | | | | |
| 2c175 | SO3H | H | H | SO3H | 7-SO3H | H | CONH2 | Pentan-2-yl | H | Pentan-2-yl | H |
| 2c176 | H | SO3H | SO3H | H | | | | | | | |
| 2c177 | SO3H | H | H | SO3H | 7-SO3H | H | CONH2 | 2-Ethylhexyl | H | 2-Ethylhexyl | H |
| 2c178 | H | SO3H | SO3H | H | | | | | | | |
| 2c179 | SO3H | H | H | SO3H | 7-SO3H | H | CONH2 | 2,2-Dimethyl propyl | H | 2,2-Dimethyl propyl | H |
| 2c180 | H | SO3H | SO3H | H | | | | | | | |
| 2c181 | SO3H | H | H | SO3H | 7-SO3H | H | CONH2 | Phenyl | H | Phenyl | H |
| 2c182 | H | SO3H | SO3H | H | | | | | | | |
| 2c183 | SO3H | H | H | SO3H | 7-SO3H | H | CONH2 | Benzyl | H | Benzyl | H |
| 2c184 | H | SO3H | SO3H | H | | | | | | | |

The present invention also provides a process for the production of dyes of formula (I) comprising the steps of:

a) diazotization of a compound of formula (3)

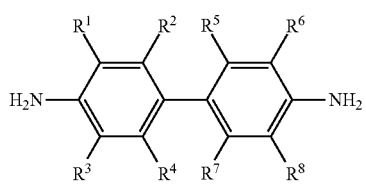

(3)

wherein $R^1$ to $R^8$ are defined as above, b) reacting the diazonium salt obtained in step a) with compounds of the formula (4) and (5)

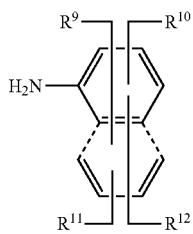

(4)

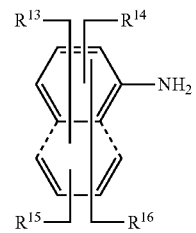

(5)

wherein $R^9$ to $R^{16}$ are defined as above, to yield an intermediate of formula (6)

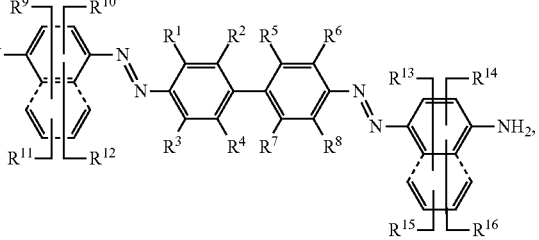

(6)

c) diazotization of the compound of formula (6), d) reacting the diazonium salt obtained in step c) with compounds of formula (7) and (8), (9) and (10), (11) and (12) or mixtures thereof:

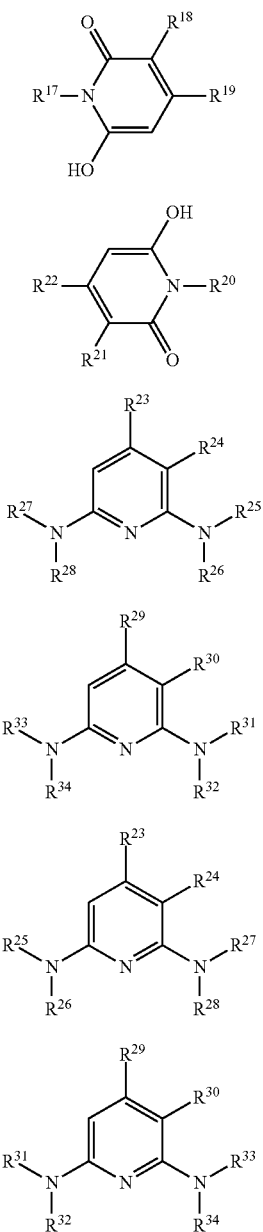

wherein $R^{17}$ to $R^{19}$ and $R^{20}$ to $R^{22}$ and $R^{23}$ to $R^{28}$ and $R^{29}$ to $R^{34}$ are defined as given above.

The diazotization of the compound of the formula (3) and (6) can be performed by means of diazotization methods that are known to a person skilled in the art, preferably by using sodium nitrite or nitrosylsulphuric acid in acidic medium using inorganic acids such as hydrochloric acid, sulphuric acid or phosphoric acid or mixtures thereof or organic acids such as acetic acid or propionic acid or mixtures thereof. Also mixtures of inorganic acid with organic acids can be advantageously used.

The coupling reaction of the diazonium salt obtained by diazotization of the compound of the formula (3) onto the compounds of formulae (4) and (5) as well as the coupling reaction of the diazonium salt obtained by diazotization of the compound of the formula (6) onto the compounds of formulae (7) and (8) or (9) and (10) or (11) and (12) or mixtures thereof can likewise be performed by known methods.

The compounds of the formula (3) are known and commercially available or can be synthesised by means of common chemical reactions known to a person skilled in the art such as the methods disclosed in U.S. Pat. No. 5,728,874 or DE172106.

The pyridones of formula (7) and (8) in which $R^{18}$ and $R^{21}$ are cyano are commercially available or can be synthesized via methods disclosed in the literature such as US 2004006234 A1. The obtained pyridone nitriles can be further derivatized by reactions known to persons skilled in the art, such as hydrolysis to form pyridones of formula (7) and (8) in which $R^{18}$ and $R^{21}$ are carbonamide or by hydrolysis and further esterification to form pyridones of formula (7) and (8) in which $R^{18}$ and $R^{21}$ are alkoxycarbonyl.

The pyridines of formula (9), (10), (11) and (12) in which $R^{24}$ and $R^{30}$ denote cyano are commercially available or can be synthesized via methods disclosed in the literature such as DE2230392. Through analogy, all the diamino pyridines that are used in this invention can be synthesized with the protocol. The obtained pyridines can be further derivatized by reactions known to persons skilled in the art, such as hydrolysis to form pyridines of formula (7), (8), (9) and (10) in which $R^{24}$ and $R^{30}$ are carbonamide or by hydrolysis and further esterification to form pyridines in which $R^{24}$ and $R^{30}$ are alkoxycarbonyl.

The above-mentioned derivatization reactions can be carried out in alkaline or acidic media, preferably in acidic media using strong inorganic acids such as sulphuric acid or hydrochloric acid gaseous or solution, acidic resins or chlorotrimethylsilane or other suitable acid catalyst in the presence of the corresponding alcohol. The reactions are advantageously carried out under inert atmosphere at temperatures in the range from 40° C. to 150° C.

Alternatively, the above mentioned derivatization reactions can be undertaken as a final step after the synthesis of the corresponding dyes with pyridone nitriles.

The dyes of the present invention can be used alone or as a mixture with other dyes according to the present invention and/or other substances.

Thus a chemical composition comprising one or more dye(s) as described above is also an aspect of the present invention.

A chemical composition consisting of two or more dyes as described above forms another preferred aspect of the present invention.

Also an aqueous solution for dying comprising one or more dye(s) as described above forms an aspect of the present invention.

The dyes of the present invention are suitable for dyeing and printing of natural, manufactured regenerated, modified or synthetic hydroxyl-amino-, and/or carboxamido-containing fiber materials and their blends by the application methods numerously described in the art for acid dyes.

Therefore, the present invention also is directed to a Process for dyeing or printing carboxamido- and/or hydroxyl-containing material, comprising contacting the carboxamido- and/or hydroxyl-containing material with a dye as described above.

The use of a dye as described above, a chemical composition as described above or of an aqueous solution as described above for dying fibers, as well as blends of such fibres selected from the group consisting of: synthetic fiber materials, nylon materials, nylon-6, nylon-6.6 and aramid fibres, vegetable fibres, seed fibres, cotton, organic cotton, kapok, coir from coconut husk; best fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers forms another aspect of the present invention.

Still another aspect of the present invention is/are: Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) of the present invention either in chemically and/or physically bound form.

The above-mentioned substrates to be dyed can be present in various forms such as but not limited to yarn, woven fabric, loop-formingly knitted fabric or carpet. For instance in the form of sheetlike structures, such as paper and leather, in the form of films, such as nylon films, or in the form of a bulk mass, for example composed of polyamide and polyurethane, in particular in the form of fibers, for example cellulose fibers. The fibers are preferably textile fibers, for example in the form of woven fabrics or yarns or in the form of hanks or wound packages.

The dyes of the present invention and their salts and/or mixtures can be used as a single dyeing colorant in dyeing or printing processes or can be part of a di-, tri- or multi-component combination colorant in dyeing or in printing compositions. The di-, tri- or multi-component shade dyeings show similar fastness level as compared to dyeing performed with a single colorant component.

Dyes of the present invention and their salts or mixtures are highly compatible with other known and/or commercially available acid dyes and they can be used together with such dyes of related chromophores and similar technical performance to obtain specific hues. Similar technical performance includes: comparable build-up, comparable fastness properties and comparable exhaustion rates during dyeings.

The dyes according to the invention can be applied to the materials mentioned, especially the fiber materials mentioned, by the application techniques known for water-soluble dyes. This applies to both, dyeing and printing processes.

It applies in particular to the production of dyeings on fiber materials composed of wool or other natural polyamides or of synthetic polyamides and their mixtures with other fiber material. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in a sealed dyeing apparatus at temperatures of up to 106° C.

Since the water solubility of the dyes according to the invention is very good, they can also be used with advantage in customary continuous dyeing processes.

The dyes of the present invention can also be used in digital printing processes, in particular in digital textile printing. For this the dyes of the present invention need to be formulated in aqueous inks.

An Ink for digital textile printing, comprising a dye of the present invention is another aspect of the present invention.

The inks of the present invention comprise the dye of the present invention in amounts which preferably range from 0.1 to 50% by weight, more preferably from 0.5 to 30% by weight and most preferably from 1 to 15% by weight, based on the total weight of the ink.

If desired the inks may contain further dyes used in digital printing in addition to the one or more dyes of the present invention.

For the inks of the present invention to be used in the continuous flow process, a conductivity of 0.5 to 25 mS/m can be set by adding an electrolyte. Useful electrolytes include for example lithium nitrate and potassium nitrate. The inks of the present invention may include organic solvents at a total level of 1 to 50% by weight and preferably 5 to 30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 1 to 8 alkylene groups, for example: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4- dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane ethyl acetate, ethylenediaminetetraacetate ethyl pentyl ether, 1,2-dimethoxypropane and trimethylpropane.

The inks of the present invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology). Useful surface-active substances include for example: all surfactants, preferably nonionic surfactants, butyldiglycol, 1,2-hexanediol.

The inks of the present invention may further comprise customary additives, for example substances to inhibit fungal and bacterial growth in amounts from 0.01 to 1% by weight based on the total weight of the ink.

The inks may be prepared in a conventional manner by mixing the components in water.

The inks of the invention are particularly useful in inkjet printing processes for printing a wide variety of pretreated materials, such as silk, leather, wool, polyamide fibers and polyurethanes, and cellulosic fiber materials of any kind. Blend fabrics, for example blends of cotton, silk, wool with polyester fibers or polyamide fibers can similarly be printed.

In contrast to conventional textile printing, where the printing ink already contains all necessary chemicals, in digital or inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. In addition there is a need for thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

The examples below serve to illustrate the invention. Parts and percentages are by weigh unless noted otherwise. The relationship between parts by weight and parts by volume is that of the kilogram to the liter.

EXAMPLES

Production Example 1

8.62 g of 4,4'-Diamino-biphenyl-2,2'-disulfonic acid were first dissolved in water at slightly acidic pH to give a complete solution. Ice was added to the solution and when temperature reached 10 to 15° C., 10.6 ml of 5N sodium nitrite solution were added dropwise into the 4,4'-Diamino-biphenyl-2,2'-disulfonic acid solution. The reaction mixture was further cooled down to 0 to 8° C. using an ice-salt-water bath. When the temperature reached 0 to 8° C., the mixture was added dropwise into 12.38 g of concentrated HCl with 12 g of ice. The reaction mixture was stirred for one hour until completion and a yellow suspension has formed.

6.55 g of 2,5-Dimethyl-phenylamine were added directly into the yellow suspension and stirred. A violet precipitate was observed upon addition. The intermediate precipitate, 4,4'-Bis-(4-amino-2,5-dimethyl-phenylazo)-biphenyl-2,2'-disulfonic acid, obtained was filtered off with suction and washed with organic solvent and dried.

14.50 g of the dried intermediate, 4,4'-Bis-(4-amino-2,5-dimethyl-phenylazo)-biphenyl-2,2'-disulfonic acid, were then dissolved in water at slightly acidic pH to give a complete reddish violet solution. Ice was added to the solution and when the temperature reached 10 to 15° C., 10.1 ml of 5N sodium nitrite solution was added dropwise into the 4,4'-Bis-(4-amino-2,5-dimethyl-phenylazo)-biphenyl-2,2'-disulfonic acid solution. The reaction mixture was further cooled down to 0 to 8° C. using an ice-salt-water bath. When the temperature reached 0 to 8° C., the mixture was added dropwise into concentrated HCl with ice. A violet suspension formed and reaction mixture was stirred until completion.

The obtained reaction mixture was used in the next step as described below without further purification:

10.93 g of 1-Ethyl-6-hydroxy-4-methyl-2-oxo-1,2-dihydro-pyridine-3-carbonitrile were stirred in methanol and adjusted to slightly acidic. The violet suspension was added dropwise into the methanol solution and stirred. Brilliant orange precipitate was observed upon addition. The obtained precipitate was filtered off with suction and washed with brine giving product of formula $1a^8$.

The analytic data are consistent with the assigned structure for product $1a^8$.

Product $1a^8$ dyes the targeted fibre materials in brilliant orange shades.

Through analogy, all the dyes of formulae ($1a^1$-$1a^{1249}$) can be synthesized according to the method described above.

Dyeing Example 1-1

1 part of the dye $1a^8$ of this invention was dissolved in 2000 parts of water and 1 part of levelling assistant (based on condensation product of a higher aliphatic amine and ethylene oxide) and 6 parts of sodium acetate were added. The pH was then adjusted to 5 using acetic acid (80%). The dyebath was heated to 50° C. for 10 minutes and then entered with 100 parts of a woven polyamide-6 fabric. The temperature was raised to 98° C. over the course of 50 minutes and then dyeing was carried out at this temperature for 60 minutes. This was followed by cooling to 60° C. and removal of the dyed material. The polyamide-6 fabric was washed with hot and cold water, soaped and then spunned and dried.

The orange dyeings obtained have very good light and wet fastness and also good levelness in the fibre.

Dyeing Example 1-2

1 part of the dye $1a^8$ of this invention was dissolved in 2000 parts of water and 1 part of levelling assistant (based on condensation product of a higher aliphatic amine and ethylene oxide) and 6 parts of sodium acetate were added. The pH was then adjusted to 5.5 using acetic acid (80%). The dyebath was heated to 50° C. for 10 minutes and then entered with 100 parts of a woven polyamide-6,6 fabric. The temperature was raised to 120° C. in the closed dyeing beaker over the course of 50 minutes and then dyeing was carried out at this temperature for 60 minutes. This was followed by cooling to 60° C. and removal of the dyed material. The polyamide-6,6 fabric was washed with hot and cold water, soaped and then spun and dried.

The orange dyeings obtained have very good light and wet fastness and also good levelness in the fibre.

Dyeing Example 1-3

100 parts of polyamide-6 material were padded with a 1000 parts 50° C. liquor solution that consisted of 40 parts of the dye $1a^8$, 100 parts of urea, 20 parts of a non ionic solubilizer based on butyldiglycol, 20 parts of acetic acid to adjust the pH to 4.0, 10 parts of levelling assistant (based on ethoxylated aminopropyl fatty acid amide) and 815 parts of water. The material was rolled up and placed into a steaming chamber at 85° C. to 98° C. for 3 to 6 hours. After fixation, the fabric was washed with hot and cold water, soaped and then spun and dried.

The orange dyeings obtained have very good light and wet fastness and also good levelness in the fibre.

Dyeing Example 1-4

1 part of the dye $1a^8$ of this invention was dissolved in 2000 parts of water and 5 parts of sodium sulphate, and 1 part of levelling assistant (based on condensation product of a higher aliphatic amine and ethylene oxide) and 5 parts of sodium acetate were added. The pH was then adjusted to 4.5 using acetic acid (80%). The dyebath was heated to 50° C. for 10 minutes and then entered with 100 parts of a woven wool fabric. The temperature was raised to 100° C. over the course of 50 minutes and then dyeing was carried out at this temperature for 60 minutes. This was followed by cooling to 90° C. and removal of the dyed material. The wool fabric was washed with hot and cold water, soaped and then spun and dried.

The orange dyeings obtained have very good light and wet fastness and also good levelness in the fibre.

Dyeing Example 1-5

1 part of the dye $1a^8$ of this invention was dissolved in 1000 parts of soft water and 7.5 parts of sodium sulphate, and 1 part of a wetting agent (anionic) was added. 100 parts of bleached cotton knitted fabric were added to this solution.

The dye bath was then heated up to 98° C. with a gradient of 2° C./min then dyeing was carried out at this temperature for 60 minutes. This was followed by cooling down to 80° C. At 80° C. the dyeing was continued for another 20 minutes. The dyed material was then removed and was washed with hot and cold water, soaped and then spunned and dried.

The orange dyeings obtained have very good light and wet fastness and also good levelness in the fibre.

Dyeing Example 1-6

4 parts of chemically bleached (pine wood) sulphite pulp were mixed with 100 parts of 55° C. water. 1 part of the dye $1a^8$ of this invention was dissolved in 100 parts of hot water. 80 parts of this solution were given to the mixed-up pulp and mixed for 2 minutes. After that the mixture was sized with resin size in a conventional manner and mixed for another 2 minutes. 55 parts of this solution were then diluted with 2000 parts of cold water and the paper was produced out of this solution.

The orange dyed paper has good wet fastnesses.

Production Example 2—Preparation of an Ink 3 parts of the dye $1a^8$ of this invention were dissolved in 82 parts of deionized water and were added into the dyebath with 15 parts of diethylene glycol at 60° C. On cooling, an orange printing ink was obtained. The orange printing ink can be used for ink jet printing on paper, polyamide or wool textiles.

Production Example 3

8.62 g of 4,4'-Diamino-biphenyl-2,2'-disulfonic acid was first dissolved in water at slightly acidic pH to give a complete solution. Ice was added to the solution and when temperature reached 10 to 15° C., 10.6 ml of 5 N sodium nitrite solution were added dropwise. The reaction mixture was further cooled down to 0 to 8° C. when the mixture was added dropwise into 12.38 g of concentrated HCl with 12 g of Ice. Yellow suspension was formed and reaction mixture was completed within an hour.

6.30 g of 2,5-Dimethyl-phenylamine were added directly into the diazo suspension and stirred. A violet precipitate was observed upon addition. The obtained intermediate precipitate, 4,4'-Bis-(4-amino-2,5-dimethyl-phenylazo)-biphenyl-2,2'-disulfonic acid, was filtered off with suction and washed with organic solvent and dried.

15.22 g of the dried intermediate, 4,4'-Bis-(4-amino-2,5-dimethyl-phenylazo)-biphenyl-2,2'-disulfonic acid, was then dissolved in water at slightly acidic pH to give a complete reddish orange solution. Ice was added to the solution and when the temperature reached 10 to 15° C., 10.1 ml of 5 N sodium nitrite solution were added dropwise. The reaction mixture was further cooled down to 0 to 8° C. when the mixture was added dropwise into concentrated HCl with ice. Violet suspension was formed and reaction mixture was completed in 90 mins.

The obtained reaction mixture was used in the next step as described below:

14.62 g of 2,6-Bis-(3-methoxy-propylamino)-4-methyl-nicotinonitrile were stirred in methanol and adjusted to slightly acidic. The reaction mixture was added dropwise into the methanol solution and stirred. Brilliant orange precipitate was observed upon addition. Precipitate obtained was filtered off with suction and washed with brine giving product of the formula $2a^{842}$. The analytic data are consistent with the assigned structure for product $2a^{842}$. The product dyes the targeted fibre materials in brilliant orange to red shades.

Through analogy, all the dyes of formulae ($2a^1$-$2a^{1938}$) can be synthesized according to the method described above.

Dyeing Example 3-1

1 part of the dye $2a^{842}$ of this invention was dissolved in 2000 parts of water and 1 part of levelling assistant (based on condensation product of a higher aliphatic amine and ethylene oxide) and 6 parts of sodium acetate were added.

The pH was then adjusted to 5 using acetic acid (80%). The dyebath was heated to 50° C. for 10 minutes and then entered with 100 parts of a woven polyamide-6 fabric. The temperature was raised to 98° C. over the course of 50 minutes and then dyeing was carried out at this temperature for 60 minutes. This was followed by cooling to 60° C. and removal of the dyed material. The polyamide-6 fabric was washed with hot and cold water, soaped and then spun and dried. The dyeing obtained gave red shade and has very good light and wet fastness and also good levelness in the fibre.

Dyeing Example 3-2

1 part of the dye $2a^{842}$ of this invention was dissolved in 2000 parts of water and 1 part of levelling assistant (based on condensation product of a higher aliphatic amine and ethylene oxide) and 6 parts of sodium acetate were added. The pH was then adjusted to 5.5 using acetic acid (80%). The dyebath was heated to 50° C. for 10 minutes and then entered with 100 parts of a woven polyamide-6,6 fabric. The temperature was raised to 120° C. over the course of 50 minutes and then dyeing was carried out at this temperature for 60 minutes. This was followed by cooling to 60° C. and removal of the dyed material. The polyamide-6,6 fabric was washed with hot and cold water, soaped and then spun and dried. The dyeing obtained gave red shade and has very good light and wet fastness and also good levelness in the fibre.

Dyeing Example 3-3

100 parts of polyamide-6 material were padded with a 1000 parts 50° C. liquor solution that consisted of 40 parts of the dye $2a^{842}$, 100 parts of urea, 20 parts of a non ionic solubilizer based on butyldiglycol, 20 parts of acetic acid to adjust the pH to 4.0, 10 parts of levelling assistant (based on ethoxylated aminopropyl fatty acid amide) and 815 parts of water. The material was rolled up and placed into a steaming chamber at 85 to 98° C. for 3 to 6 hours. After fixation, the fabric was washed with hot and cold water, soaped and then spun and dried. The dyeing obtained gave red shade and has very good light and wet fastness and also good levelness in the fibre.

Dyeing Example 3-4

1 part of the dye $2a^{842}$ of this invention was dissolved in 2000 parts of water and 5 parts of sodium sulphate, and 1 part of levelling assistant (based on condensation product of a higher aliphatic amine and ethylene oxide) and 5 parts of sodium acetate are added. The pH was then adjusted to 4.5 using acetic acid (80%). The dyebath was heated to 50° C. for 10 minutes and then entered with 100 parts of a woven wool fabric. The temperature was raised to 100° C. over the course of 50 minutes and then dyeing was carried out at this temperature for 60 minutes. This was followed by cooling to 90° C. and removal of the dyed material. The wool fabric was washed with hot and cold water, soaped and then spun and dried. The dyeing obtained gave red shade and has very good light and wet fastness and also good levelness in the fibre.

Dyeing Example 3-5

1 part of the dye $2a^{842}$ of this invention was dissolved in 1000 parts of soft water and 7.5 parts of sodium sulphate and 1 part of a wetting agent (anionic) were added. 100 parts of bleached cotton knitted fabric were added to this solution. The dye bath was then heated up to 98° C. with a gradient of 2° C./min, then dyeing was carried out at this temperature for 60 minutes. This was followed by cooling down to 80° C. At 80° C. the dyeing was continued for another 20 minutes. The dyed material was then removed and was washed with hot and cold water, soaped and then spun and dried. The dyeings obtained gave red shade and has very good light and wet fastness and also good levelness in the fibre.

Dyeing Example 3-6

4 parts of chemically bleached (pine wood) sulphite pulp was mixed up with 100 parts of 55° C. water. 1 part of the dye $2a^{842}$ of this invention was dissolved in 100 parts of hot water. 80 parts of this solution were given to the mixed-up pulp and mixed for 2 minutes. After that the mixture was sized with resin size in a conventional manner and mixed for another 2 minutes. 55 parts of this solution were then diluted with 2000 parts of cold water and the paper was produced out of this solution. The red paper produced from the mixture has good wet fastnesses.

Production Example 4—Preparation of an Ink 3 parts of the dye $2a^{842}$ of this invention dissolved in 82 parts of deionized water was added into the dyebath with 15 parts of diethylene glycol at 60° C. On cooling, a red printing ink was obtained. The red printing ink can be used for ink jet printing on paper, polyamide or wool textiles.

The invention claimed is:
1. A dye of the formula (I)

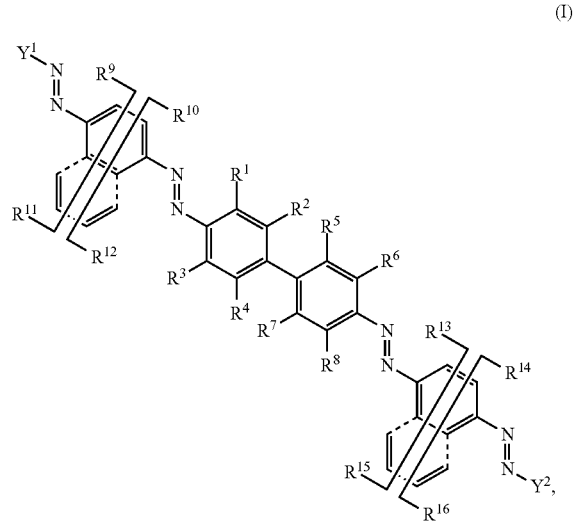

wherein independent from each other
$Y^1$ is formula IIa

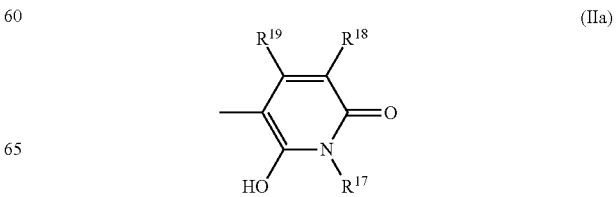

or formula II b,

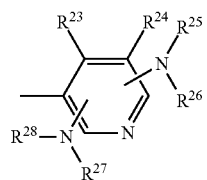

(IIb)

Y² is formula IIIa

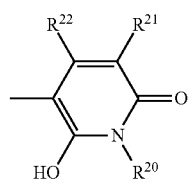

(IIIa)

or formula IIIb,

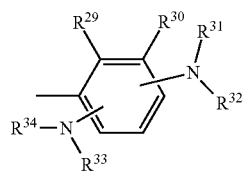

(IIIb)

R¹, R², R³, R⁴, R⁵, R⁶, R⁷ and R⁸ independent of each other is hydrogen, alkyl, alkoxy, halogen, trifluoromethyl or SO₃M,
whereby at least two of them are SO₃M, R⁹, R¹⁰, R¹¹, R¹², R¹³, R¹⁴, R¹⁵, R¹⁶ independent of each other is hydrogen, alkyl, substituted alkyl, alkyl interrupted by one or two heteroatoms selected from the group consisting of oxygen and sulphur, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —SO₃M or alkylureido, R¹⁷ and R²⁰ independent of each other is hydrogen, alkyl, alkenyl, cycloalkyl, trifluoromethyl, aryl, heteroaryl, heterocycloalkyl, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoarylcarbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoaryl-sulfamoyl, amino, N-acylamino, N-thioacylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino, N-heteroarylamino, N-heterocycloalkylamino or hydroxyalkylsulfonylalkyl,
or
alkyl interrupted by one or more heteroatoms selected from the group consisting of oxygen and sulphur,
or
alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and SO₃M,
or
alkyl interrupted by one or more heteroatoms selected from the group consisting of oxygen and sulphur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and SO₃M, R¹⁸ and R²¹ independent of each other is cyano, carbamoyl, substituted carbamoyl, alkoxycarbonyl, trifluoromethyl, carbonyltrifluoromethyl, alkylsulfonyl, halogen, alkylsulfonic acid or SO₃M, $R^{19}$ and $R^{22}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio or arylthio, or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{23}$ and $R^{29}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio or arylthio, or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{24}$ and $R^{30}$ independent of each other is cyano, carbamoyl, substituted carbamoyl, alkoxycarbonyl, trifluoromethyl, carbonyltrifluoromethyl or halogen, $R^{25}$, $R^{26}$, $R^{27}$, $R^{28}$, $R^{31}$, $R^{32}$, $R^{33}$ and $R^{34}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyakylsulfonylalkyl, aminoalkyl, amino-hydroxy-alkyl, alkoxyalkylaminoalkyl, thioalkoxyalkyl-aminoalkyl, amino-alkyloxyalkyl, amino-alkylthioxyalkyl, cycloalkylalkyl, aryloxyalkyl, arylthioxyalkyl, heteroarylalkyl or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, or alkyl interrupted by one or more heteroatoms selected from the group consisting of oxygen and sulfur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, M is hydrogen, an alkali metal, ammonium, one equivalent of an alkali earth metal or a monovalent organic cation, the dyes of formula (I) have two to six sulfonic acid groups and whereby the bonds with unfixed attachment points on the pyridine couplers mean that the amino rests bearing the substituents $R^{25}$, $R^{26}$, $R^{27}$ and $R^{28}$, respectively can be positioned ortho or para to $R^{24}$, meaning that when the amino rest bearing the substituents $R^{25}$ and $R^{26}$ is positioned ortho to $R^{24}$, the amino rest bearing the substituents $R^{27}$ to $R^{28}$ is positioned para to $R^{24}$, and vice versa; and the same applies to the amino rests bearing the substituents $R^{31}$, $R^{32}$, $R^{33}$ to $R^{34}$, respectively that can be positioned ortho or para to $R^{30}$, meaning that when the amino rest bearing the substituents $R^{31}$ and $R^{32}$ is positioned ortho to $R^{30}$, the amino rest bearing the substituents $R^{33}$ to $R^{34}$ is positioned para to $R^{30}$, and vice versa.

2. The dye according to claim 1, having formula (I)

(1)

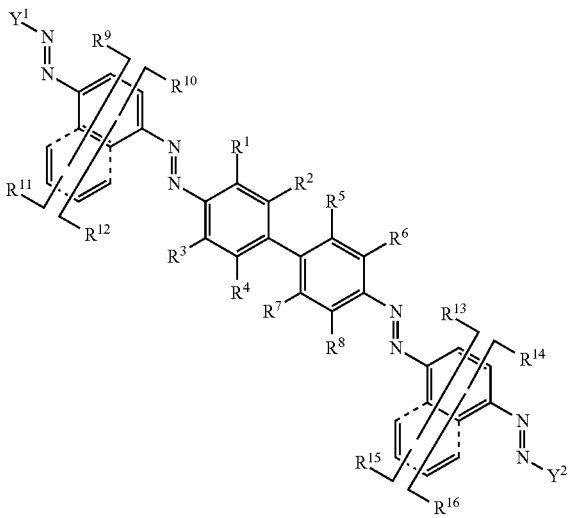

wherein
Y¹ is formula IIa

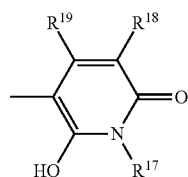

(IIa)

Y² is formula IIIa

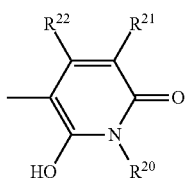

(IIIa)

$R^1$, $R^2$, $R^3$, $R^4$, $R^5$, $R^6$, $R^7$ and $R^8$ independent of each other is hydrogen, alkyl, alkoxy, halogen, trifluoromethyl or $SO_3M$, whereby at least two of them are $SO_3M$, $R^9$, $R^{10}$, $R^{11}$, $R^{12}$, $R^{13}$, $R^{14}$, $R^{15}$, $R^{16}$ independent of each other is hydrogen, alkyl, substituted alkyl, alkyl interrupted by one or two heteroatoms selected from the group consisting of oxygen and sulphur, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —$SO_3M$ or alkylureido, $R^{17}$ and $R^{20}$ independent of each other is hydrogen, alkyl, alkenyl, cycloalkyl, trifluoromethyl, aryl, heteroaryl, heterocycloalkyl, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoarylcarbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoaryl-sulfamoyl, amino, N-acylamino, N-thioacylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino, N-heteroarylamino, N-heterocycloalkylamino or hydroxyalkylsulfonylalkyl, or alkyl interrupted by one or more heteroatoms selected from the group consisting of oxygen and sulphur, or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, or alkyl interrupted by one or more heteroatoms selected from the group consisting of oxygen and sulphur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, $R^{18}$ and $R^{21}$ independent of each other is cyano, carbamoyl, alkoxycarbonyl, trifluoromethyl, carbonyltrifluoromethyl, alkylsulfonyl, halogen, alkylsulfonic acid or $SO_3M$, $R^{19}$ and $R^{22}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio or arylthio, or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, M is hydrogen, an alkali metal, ammonium, one equivalent of an alkali earth metal or a monovalent organic cation and the dyes of formula (1) have two to six sulfonic acid groups.

3. The dye according to claim 1, having formula (1a)

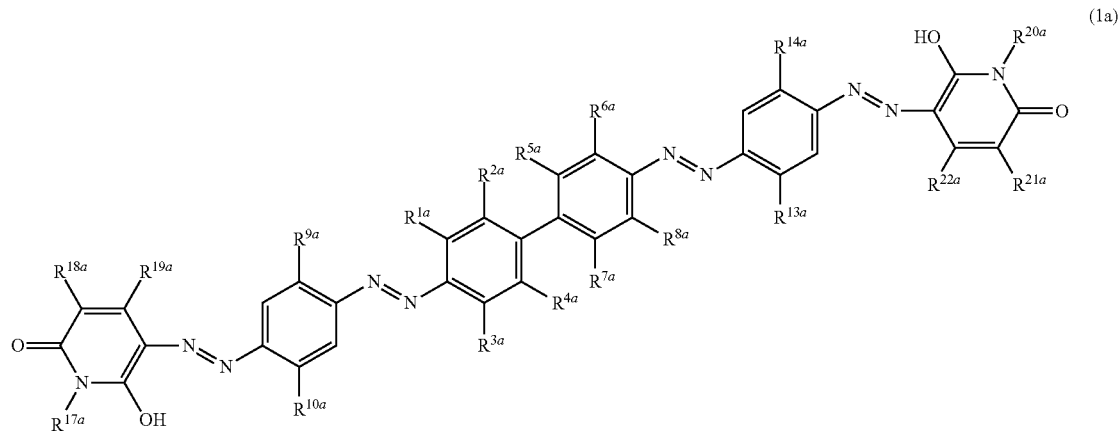

(1a)

wherein $R^{1a}$, $R^{2a}$, $R^{3a}$, $R^{4a}$, $R^{5a}$, $R^{6a}$, $R^{7a}$ and $R^{8a}$ independent of each other is hydrogen, alkyl, alkoxy, halogen, trifluoromethyl or $SO_3M$ whereby at least two of them are $SO_3M$, $R^{9a}$, $R^{10a}$, $R^{13a}$ and $R^{14}$ independently of one another are hydrogen, ($C_1$-$C_4$)-alkyl, ($C_1$-$C_4$)-alkoxy, halogen, trifluoromethyl, —$SO_3M$ or ($C_1$-$C_4$)-acylamino, $R^{17a}$ and $R^{20a}$ independent of each other is hydrogen, alkyl, alkenyl, cycloalkyl, trifluoromethyl, aryl, heteroaryl, heterocycloalkyl, carbamoyl, sulfamoyl, amino, N-acylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino or hydroxyalkylsulfonylalkyl, or alkyl interrupted by one or more heteroatoms selected from the group consisting of oxygen and sulphur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, $R^{18a}$ and $R^{21a}$ independent of each other is cyano, carbamoyl or alkoxycarbonyl, $R^{19a}$ and $R^{22a}$ independent of each other is unsubstituted, linear or branched ($C_1$-$C_4$) alkyl, unsubstituted ($C_5$-$C_7$) cycloalkyl or substituted ($C_5$-$C_7$) cycloalkyl with one or more substituents such as methyl, ethyl, isobutyl, sec-butyl, tert-butyl and methylbutyl, and M is hydrogen, an alkali metal, ammonium, one equivalent of an alkali earth metal or a monovalent organic cation.

4. The dye according to claim 3, having formula (1a) wherein $R^{1a}$, $R^{3a}$, $R^{4a}$, $R^{5a}$, $R^{6a}$ and $R^{8a}$ independent from each other is $SO_3M$, hydrogen, alkyl, alkoxy or halogen, —whereby at least two of them are $SO_3M$, $R^{2a}$ and $R^{7a}$ is hydrogen, $R^{9a}$, $R^{10a}$, $R^{13a}$ and $R^{14a}$ independent of each other is hydrogen, methyl, halogen, $SO_3M$ or acetylamino, $R^{17a}$ and $R^{20a}$ independent of each other is methyl, ethyl, butyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, l-ethylpropyl, 1,2-dimethylpropyl, tert-butyl, 3-methylbutyl, pentene-2-yl, 2-ethylhexyl, 2,2-dimethylpropyl, phenyl, benzyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 6-hydroxy-1-[2-(2-hydroxyethylsulfanyl)-ethyl], 2-(2-tertbutylsulfanylethanesulfonyl)-ethyl, 2-(ethylsulfonyl)ethanol, 3-(4-hydroxybutoxy)propyl, 2-(2-hydroxyethoxy)ethyl, 3-Isopropoxy propyl or 3-ethoxypropyl, $R^{18a}$ and $R^{21a}$ independent of each other is cyano or carbamoyl, $R^{19a}$ and $R^{22a}$ is methyl and M is hydrogen, sodium, potassium, lithium or ammonium.

5. The dye according to claim 1, having formula (1b)

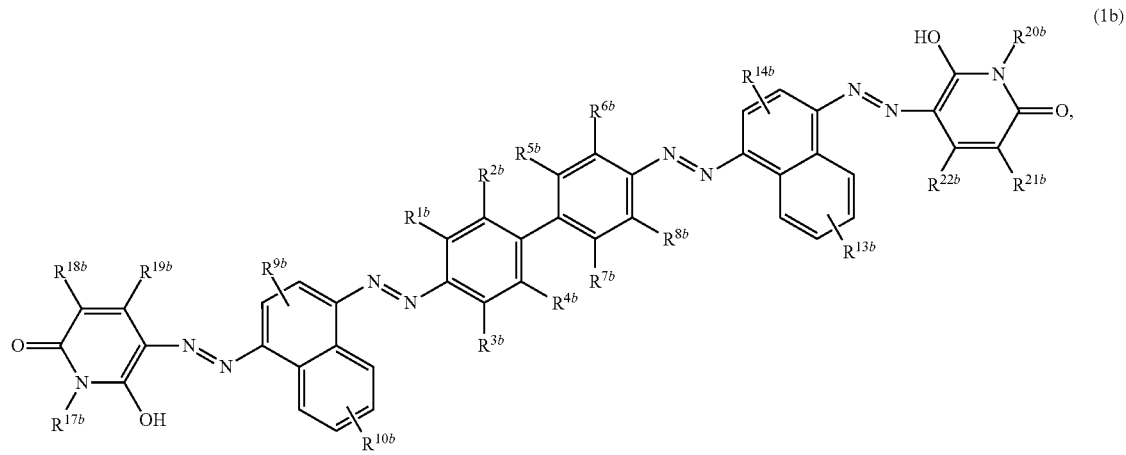

wherein $R^{1b}$, $R^{2b}$, $R^{3b}$, $R^{4b}$, $R^{5b}$, $R^{6b}$, $R^{7b}$ and $R^{8b}$ independent of each other is hydrogen, alkyl, alkoxy, halogen, trifluoromethyl or $SO_3M$ whereby at least two of them are $SO_3M$, $R^{9b}$, $R^{10b}$, $R^{13b}$ and $R^{14b}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{17b}$ and $R^{20b}$ independent of each other is hydrogen, alkyl, alkenyl, cycloalkyl, trifluoromethyl, aryl, heteroaryl, heterocycloalkyl, carbamoyl, sulfamoyl, amino, N-acylamino, ureido, alkylureido, phenylureido, N-monoalkylamino, N,N-dialkyl-amino, N-arylamino, N,N-diarylamino, N-alkyl-N-aryl-amino, N-monocycloalkylamino, N,N-dicycloalkylamino, N-alkyl-N-cycloalkyl-amino, N-aryl-N-cycloalkyl-amino or hydroxyalkylsulfonylalkyl, or alkyl interrupted by one or more heteroatoms selected from the group consisting of oxygen and sulphur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, $R^{18b}$ and $R^{21b}$ independent of each other is cyano, carbamoyl or alkoxycarbonyl, $R^{19b}$ and $R^{22b}$ independent of each other is unsubstituted, linear or branched $(C_1-C_4)$ alkyl, unsubstituted $(C_5-C_7)$ cycloalkyl or substituted $(C_5-C_7)$ cycloalkyl with one or more substituents such as methyl, ethyl, isobutyl, sec-butyl, tert-butyl and methylbutyl, and M is hydrogen, an alkali metal, ammonium, one equivalent of an alkali earth metal or a monovalent organic cation.

6. The dye according to claim 5, having formula (1b) wherein $R^{1b}$, $R^{3b}$, $R^{4b}$, $R^{5b}$, $R^{6b}$ and $R^{8b}$ independent of each other is $SO_3M$, hydrogen, alkyl, alkoxy or halogen, —whereby at least two of them are $SO_3M$, $R^{2b}$ and $R^{7b}$ is hydrogen, $R^{9b}$, $R^{10b}$, $R^{13b}$ and $R^{14b}$ independent of each other is hydrogen, methyl, halogen, —$SO_3M$ or acetylamino, $R^{17b}$ and $R^{20b}$ independent of each other is methyl, ethyl, butyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentene-2-yl, 2-ethylhexyl, 2,2-dimethylpropyl, phenyl, benzyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 6-hydroxy-1-[2-(2-hydroxyethylsulfanyl)-ethyl], 2-(2-tertbutylsulfanylethanesulfonyl)-ethyl, 2-(ethylsulfonyl)ethanol, 3-(4-hydroxybutoxy)propyl, 2-(2-hydroxyethoxy)ethyl, 3-Isopropoxy propyl or 3-ethoxypropyl, $R^{18b}$ and $R^{21b}$ independent of each other is cyano or carbamoyl, $R^{19b}$ and $R^{22b}$ is methyl, and M is hydrogen, sodium, potassium, lithium or ammonium.

7. The dye according to claim 1, having formula (2) and mixtures thereof

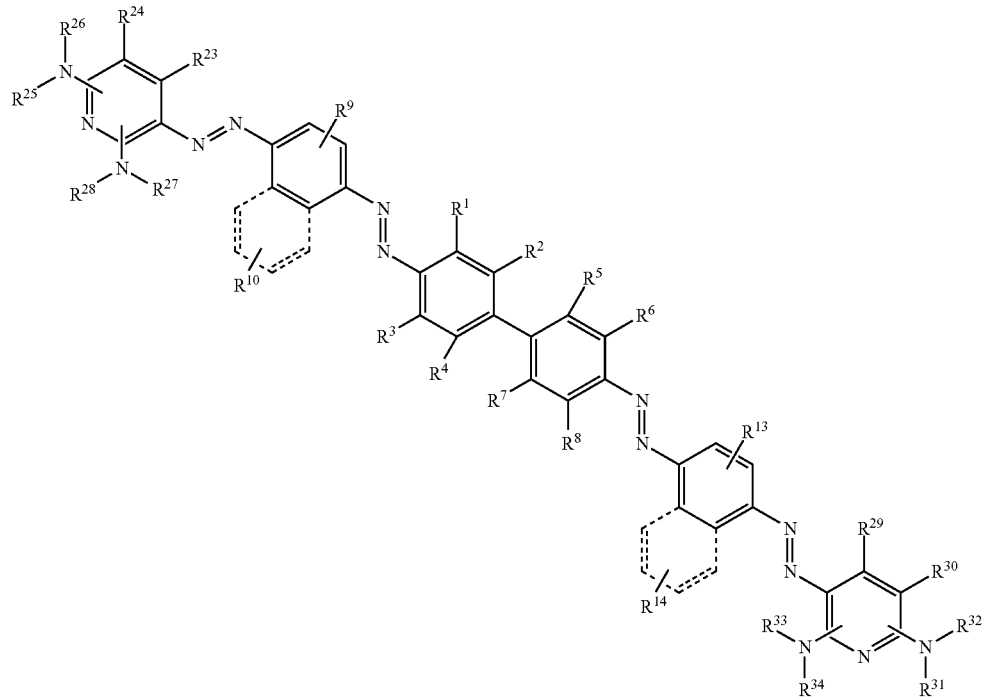

(2)

wherein
$R^1$, $R^2$, $R^3$, $R^4$, $R^5$, $R^6$, $R^7$ and $R^8$ independent of each other is hydrogen, alkyl, alkoxy, halogen, trifluoromethyl or $SO_3M$, whereby at least two of them are $SO_3M$, $R^9$, $R^{10}$, $R^{13}$, $R^{14}$ independent of each other is hydrogen, alkyl, substituted alkyl, alkyl chain interrupted by one or two heteroatoms, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, alkylureido or $SO_3M$, $R^{24}$ and $R^{30}$ independent of each other is cyano, carbamoyl, substituted carbamoyl, alkoxycarbonyl, trifluoromethyl, carbonyltrifluoromethyl or halogen, $R^{23}$ and $R^{29}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio or arylthio, or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{25}$, $R^{26}$, $R^{27}$, $R^{28}$, $R^{31}$, $R^{32}$, $R^{33}$ and $R^{34}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, amino-alkylthioxyalkyl, cycloalkylalkyl, aryloxyalkyl, arylthioxyalkyl, heteroarylalky or heterocycloalkylalkyl, or alkyl interrupted by one or more heteroatoms selected from the group consisting of oxygen and sulfur or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, or alkyl interrupted by one or more heteroatoms selected from the group consisting of oxygen and sulfur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, M is hydrogen, an alkali metal, ammonium, one equivalent of an alkali earth metal or a monovalent organic cation, the dyes of formula (2) have two to six sulfonic acid groups, and whereby the bonds with unfixed attachment points on the pyridine couplers mean that the amino rests bearing the substituents $R^{25}$, $R^{26}$, $R^{27}$ and $R^{28}$, respectively can be positioned ortho or para to $R^{24}$, meaning that when the amino rest bearing the substituents $R^{25}$ and $R^{26}$ is positioned ortho to $R^{24}$, the amino rest bearing the substituents $R^{27}$ to $R^{28}$ is positioned para to $R^{24}$, and vice versa;

and the same applies to the amino rests bearing the substituents $R^{31}$, $R^{32}$, $R^{33}$ and $R^{34}$, respectively that can be positioned ortho or para to $R^{30}$, meaning that when the amino rest bearing the substituents $R^{31}$ and $R^{32}$ is positioned ortho to $R^{30}$, the amino rest bearing the substituents $R^{33}$ to $R^{34}$ is positioned para to $R^{30}$, and vice versa.

8. The dye according to claim 1, having formula (2a) and mixtures thereof

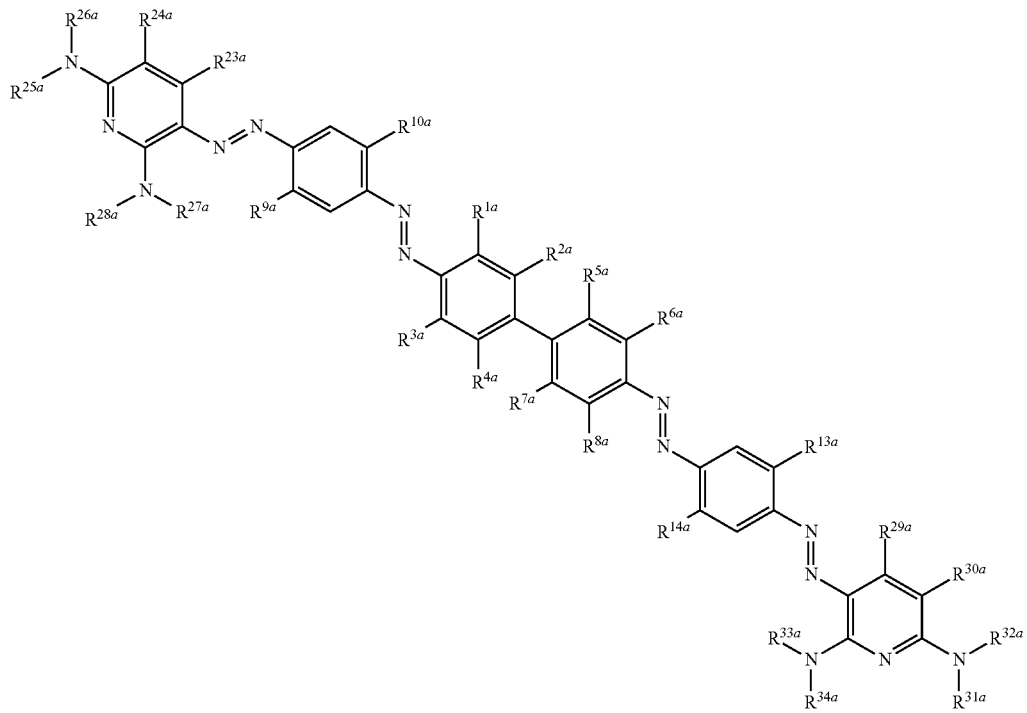

(2a)

wherein $R^{1a}$, $R^{2a}$, $R^{3a}$, $R^{4a}$, $R^{5a}$, $R^{6a}$, $R^{7a}$ and $R^{8a}$ independent of each other is hydrogen, alkyl, alkoxy, halogen, trifluoromethyl or $SO_3M$, —whereby at least two of them are $SO_3M$, $R^{9a}$, $R^{10a}$, $R^{13a}$ and $R^{14a}$ independent of each other is hydrogen, $(C_1-C_4)$-alkyl, $(C_1-C_4)$-alkoxy, halogen, trifluoromethyl$(C_1-C_4)$-acylamino or $SO_3M$, $R^{23a}$ and $R^{29a}$ independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl, $R^{24a}$ and $R^{30a}$ independent of each other is cyano, carbamoyl or alkoxycarbonyl, $R^{25a}$, $R^{26a}$, $R^{27a}$, $R^{28a}$, $R^{31a}$, $R^{32a}$, $R^{33a}$ and $R^{34a}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkylaminoalkyl, aminoalkyloxyalkyl, aminoalkylthioxyalkyl, cycloalkylalkyl, aryloxyalkyl, aryithioxyalkyl, heteroarylalky or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, and M is hydrogen, an alkali metal, ammonium, one equivalent of an alkali earth metal or a monovalent organic cation.

9. The dye according to claim 8, having formula (2a) wherein $R^{1a}$, $R^{3a}$, $R^{4a}$, $R^{5a}$, $R^{6a}$ and $R^{8a}$ independent of each other is $SO_3M$, hydrogen, alkyl, alkoxy or halogen,
—whereby at least two of them are $SO_3M$, $R^{2a}$ and $R^{7a}$ is hydrogen, $R^{9a}$, $R^{10a}$, $R^{13a}$ and $R^{14a}$ independent of each other is hydrogen, methyl, halogen, $SO_3M$ or acetylamino, $R^{23a}$ and $R^{29a}$ is methyl, $R^{24a}$ and $R^{30a}$ independent of each other is cyano or carbamoyl, $R^{25a}$, $R^{26a}$, $R^{27a}$, $R^{28a}$, $R^{31a}$, $R^{32a}$, $R^{33a}$ and $R^{34a}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfanyl)-ethyl, 2-(2-tertbutylsulfanylethanesulfonyl)-ethyl, 2-(2-hydroxyethoxy)propyl, 2-(2-hydroxy ethoxy)ethyl, 3-(4-hydroxybutoxy)propyl, 2-(2-hydroxyethanesulfonyl)-ethyl, 3-(2-phenoxyethoxy)-propyl, 3-isopropoxy-propyl, 3-ethoxy-propyl or 3-ethoxybutyl, or $(C_2-C_6)$-alkyl substituted by COOM or by $SO_3M$, and M is hydrogen, sodium, potassium, lithium or ammonium.

10. The dye according to claim 1, having formula (2b) and mixtures thereof (2b)

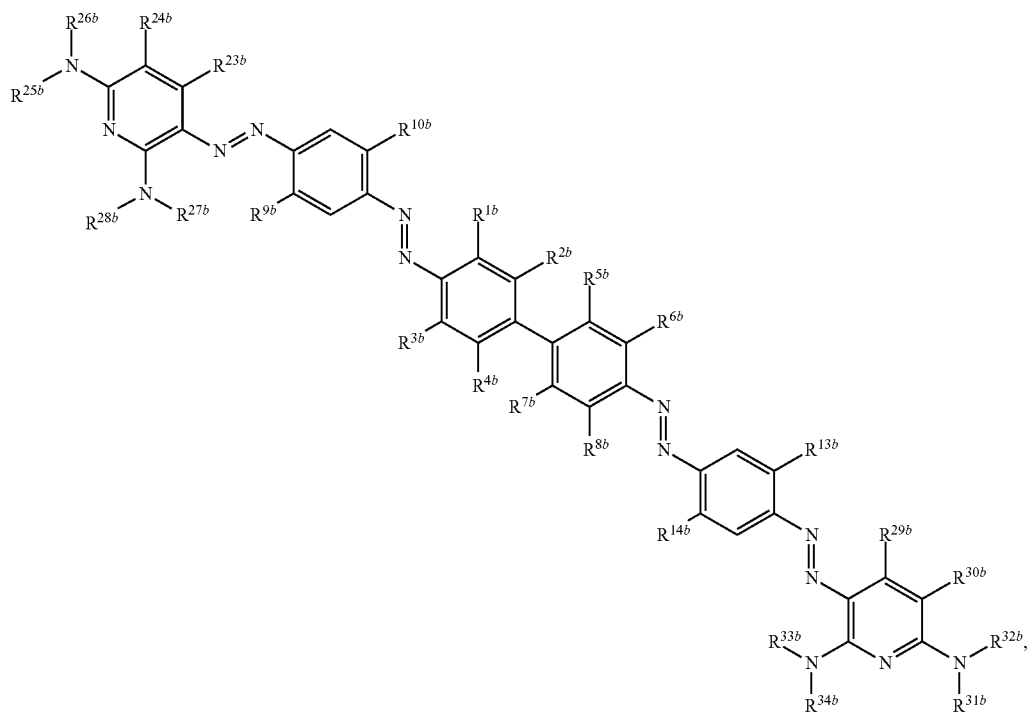

wherein $R^{1b}$, $R^{2b}$, $R^{3b}$, $R^{4b}$, $R^{5b}$, $R^{6b}$, $R^{7b}$ and $R^{8b}$ independent of each other is hydrogen, alkyl, alkoxy, halogen, trifluoromethyl or $SO_3M$, whereby at least two of them are $SO_3M$, $R^{9b}$, $R^{10b}$, $R^{13b}$ and $R^{14b}$ independent of each other is hydrogen, $(C_1-C_4)$-alkyl, $(C_1-C_4)$-alkoxy, halogen, trifluoromethyl $(C_1-C_4)$-acylamino or $SO_3M$, $R^{23b}$ and $R^{29b}$ independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl, $R^{24b}$ and $R^{30b}$ independent of each other is cyano, carbamoyl or alkoxycarbonyl, $R^{25b}$, $R^{26b}$, $R^{27b}$, $R^{28b}$, $R^{31b}$, $R^{32b}$, $R^{33b}$ and $R^{34b}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkylaminoalkyl, aminoalkyloxyalkyl, aminoalkylthioxyalkyl, cycloalkylalkyl, aryloxyalkyl, arylthioxyalkyl, heteroarylalkyl or heterocycloalkylalkyl, or alkyl interrupted by one or more heteroatoms selected from the group consisting of oxygen and sulphur or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or joined together to form five or six membered ring being unsubstituted or substituted by one or more $(C_1-C_4)$-alkyl-groups and the ring being uninterrupted or interrupted by one or more heteroatoms selected from the group consisting of oxygen and sulphur, and M is hydrogen, an alkali metal, ammonium, one equivalent of an alkali earth metal or a monovalent organic cation.

11. The dye according to claim 10, having formula (2b) wherein $R^{1b}$, $R^{3b}$, $R^{4b}$, $R^{5b}$, $R^{6b}$ and $R^{8b}$ independent of each other is $SO_3M$, hydrogen, alkyl, alkoxy or halogen, —whereby at least two of them are $SO_3M$, $R^{2b}$ and $R^{7b}$ is hydrogen, $R^{9b}$, $R^{10b}$, $R^{13b}$ and $R^{14b}$ independent of each other is hydrogen, methyl, halogen, —$SO_3M$ or acetylamino, $R^{23b}$ and $R^{29b}$ is methyl, $R^{24b}$ and $R^{30b}$ independent of each other is cyano or carbamoyl, $R^{25b}$, $R^{26b}$, $R^{27b}$, $R^{28b}$, $R^{31b}$, $R^{32b}$, $R^{33b}$ and $R^{34b}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfanyl)-ethyl, 2-(2-tertbutylsulfanylethanesulfonyl)-ethyl, 2-(2-hydroxyethoxy)propyl, 2-(2-hydroxy ethoxy)ethyl, 3-(4-hydroxybutoxy)propyl, 2-(2-hydroxyethanesulfonyl)-ethyl, 3-(2-phenoxyethoxy)-propyl, 3-isopropoxy-propyl, 3-ethoxy-propyl or 3-ethoxybutyl, or $(C_2-C_6)$ alkyl substituted by COOM or by $SO_3M$, or joined together to form six membered ring being unsubstituted or substituted by one or more $(C_1-C_4)$-alkyl-groups and the ring being uninterrupted or interrupted by one or more heteroatoms selected from the group consisting of oxygen and sulphur and M is hydrogen, sodium, potassium, lithium or ammonium.

12. The dye according to claim 1, having formula (2c) and mixtures thereof

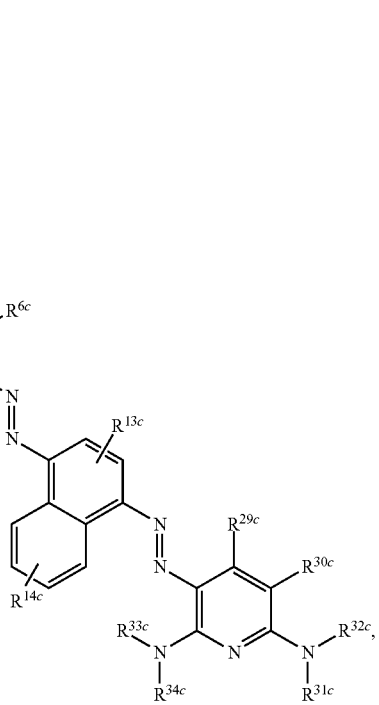

wherein
$R^{1c}$, $R^{2c}$, $R^{3c}$, $R^{4c}$, $R^{5c}$, $R^{6c}$, $R^{7c}$ and $R^{8c}$ independent of each other is hydrogen, alkyl, alkoxy, halogen, trifluoromethyl or $SO_3M$, whereby at least two of them are $SO_3M$, $R^{9c}$, $R^{10c}$, $R^{13c}$ and $R^{14c}$ independent of each other is hydrogen, $(C_1-C_4)$-alkyl, $(C_1-C_4)$-alkoxy, halogen, trifluoromethyl$(C_1-C_4)$-acylamino or $SO_3M$, $R^{23c}$ and $R^{29c}$ independent of each other is unsubstituted, linear or branched $(C_1-C_4)$-alkyl, unsubstituted $(C_5-C_7)$-cycloalkyl or substituted $(C_5-C_7)$-cycloalkyl with one or more substituents preferably selected from the group consisting of methyl, ethyl, isobutyl, sec-butyl, tert-butyl and methylbutyl, $R^{24c}$ and $R^{30c}$ independent of each other is cyano, carbamoyl or alkoxycarbonyl, $R^{25c}$, $R^{26c}$ $R^{27c}$, $R^{28c}$, $R^{31c}$, $R^{32c}$, $R^{33c}$ and $R^{34c}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkylaminoalkyl, aminoalkyloxyalkyl, aminoalkylthioxyalkyl, cycloalkylalkyl, aryloxyalkyl, arylthioxyalkyl, heteroarylalkyl or heterocycloalkylalkyl, or
alkyl interrupted by one or more heteroatoms selected from the group consisting of oxygen and sulphur, or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, or
alkyl interrupted by one or more heteroatoms selected from the group consisting of oxygen and sulphur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$, and
M is hydrogen, an alkali metal, ammonium, one equivalent of an alkali earth metal or a monovalent organic cation.

13. The dye according to claim 12, having formula (2c) wherein
$R^{1c}$, $R^{3c}$, $R^{4c}$, $R^{5c}$, $R^{6c}$ and $R^{8c}$ independent of each other is $SO_3M$, hydrogen, alkyl, alkoxy or halogen,
—whereby at least two of them are $SO_3M$,
$R^{2c}$ and $R^{7c}$ is hydrogen,
$R^{9c}$, $R^{10c}$, $R^{13c}$ and $R^{14c}$ independent of each other is hydrogen, methyl, halogen, $SO_3M$ or acetylamino,
$R^{23c}$ and $R^{29c}$ is methyl,
$R^{24c}$ and $R^{30c}$ independent of each other is cyano or carbamoyl,
$R^{25c}$, $R^{26c}$ $R^{27c}$, $R^{28c}$, $R^{31c}$, $R^{32c}$, $R^{33c}$ and $R^{34c}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, 2-(2-hydroxyethylsulfanyl)-ethyl, 2-(2-tertbutylsulfanylethanesulfonyl)-ethyl, 2-(2-hydroxyethoxy)propyl, 2-(2-hydroxy ethoxy) ethyl, 3-(4-hydroxybutoxy)propyl, 2-(2-hydroxyethanesulfonyl)-ethyl, 3-(2-phenoxy-ethoxy)-propyl, 3-isopropoxy-propyl, 3-ethoxy-propyl or 3-ethoxybutyl,
or
$(C_2-C_6)$ alkyl substituted by COOM or by $SO_3M$,
and
M is hydrogen, sodium, potassium, lithium or ammonium.

14. A process to produce the dyes according to claim 1 comprising the steps of:
a) diazotization of a compound of formula (3)

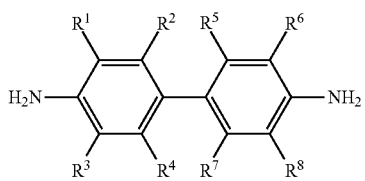
(3)

wherein $R^1$ to $R^8$ are defined as above,
b) reacting the diazonium salt obtained in step a) with compounds of the formula (4) and (5)

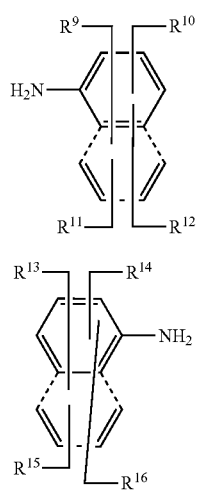
(4)

(5)

wherein $R^9$ to $R^{16}$ are defined as above, to yield an intermediate of formula (6)

c) diazotization of the compound of formula (6),
d) reacting the diazonium salt obtained in step c) with compounds of formula (7) and (8), (9) and (10), (11) and (12) or mixtures thereof:

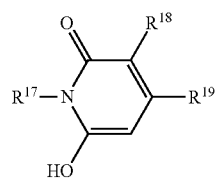
(7)

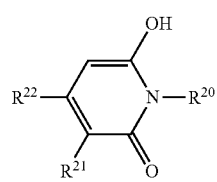
(8)

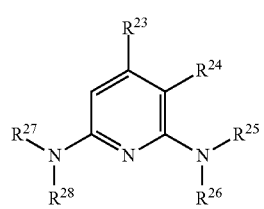
(9)

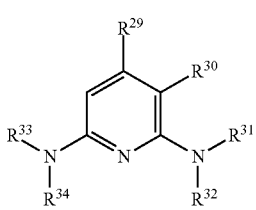
(10)

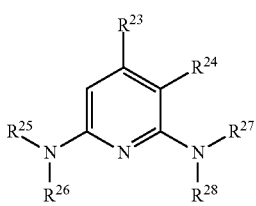
(11)

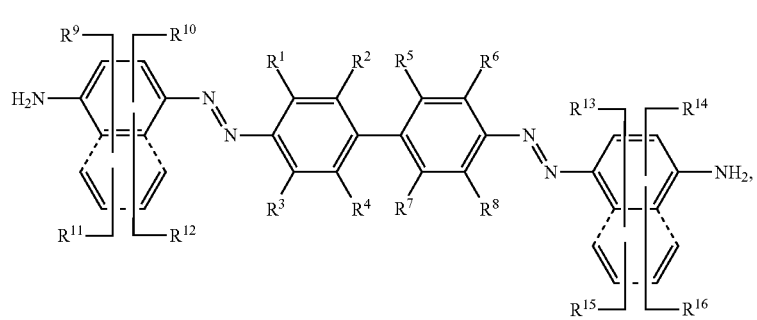
(6)

-continued

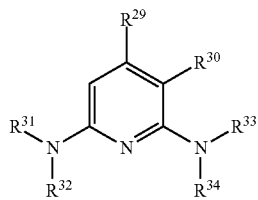

(12)

wherein $R^{17}$ to $R^{19}$ and $R^{20}$ to $R^{22}$ and $R^{23}$ to $R^{28}$ and $R^{29}$ to $R^{34}$ are defined as given above.

15. A chemical composition comprising one or more dye(s) according to claim 1.

16. A chemical composition consisting of two or more dyes according to claim 1.

17. An aqueous solution for dying comprising one or more chemical compounds according to claim 1.

18. A process for dyeing or printing carboxamido- and/or hydroxyl-containing material, comprising contacting the carboxamido- and/or hydroxyl-containing material with the dye according to claim 1.

19. An ink for digital textile printing, comprising a dye according to claim 1.

20. A process for dying fibers which comprises contacting the fiber with the dye according to claim 1, wherein the fiber is selected from the group consisting of: synthetic fiber materials, nylon materials, nylon-6, nylon-6.6 and aramid fibres, vegetable fibers, seed fibers, cotton, organic cotton, kapok, coir from coconut husk; bast fibers, flax, hemp, jute, kenaf, ramie, rattan; leaf fibers, sisal, henequen, banana; stalk fibers, bamboo; fibers from animals, wool, organic wool, silk, cashmere wool, alpaca fiber, mohair, Angora fiber, fur, leather materials; manufactured, regenerated and recycled fibers, cellulosic fibers; paper fibers, cellulosic regenerated fibers, viscose rayon fibers, acetate and triacetate fibers and Lyocell fibers.

21. A fiber and blends containing a fiber selected from the group consisting of: synthetic fiber materials, nylon materials, nylon-6, nylon-6.6 and aramid fibres, vegetable fibers, seed fibers, cotton, organic cotton, kapok, coir from coconut husk; bast fibers, flax, hemp, jute, kenaf, ramie, rattan; leaf fibers, sisal, henequen, banana; stalk fibers, bamboo; fibers from animals, wool, organic wool, silk, cashmere wool, alpaca fiber, mohair, Angora fiber, fur, leather materials; manufactured, regenerated and recycled fibers, cellulosic fibers; paper fibers, cellulosic regenerated fibers, viscose rayon fibers, acetate and triacetate fibers, and Lyocell fibers comprising one or more dye(s) according to claim 1, either in chemically and/or physically bound form on the fiber.

* * * * *